US006708286B2

(12) United States Patent
Alexander et al.

(10) Patent No.: US 6,708,286 B2
(45) **Date of Patent: *Mar. 16, 2004**

(54) STANDBY SBC BACKPLANE

(75) Inventors: Curtis R. Alexander, San Diego, CA (US); Alonso Perez, San Ysidro, CA (US); Thang Doan, Sparks, NV (US)

(73) Assignee: I-Bue Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/235,513

(22) Filed: Sep. 4, 2002

(65) Prior Publication Data

US 2003/0005357 A1 Jan. 2, 2003

Related U.S. Application Data

(63) Continuation of application No. 09/397,844, filed on Sep. 15, 1999.

(51) Int. Cl.7 ................................................ G06F 11/00

(52) U.S. Cl. ............................ 714/11; 714/10; 714/12; 714/13; 714/47; 714/22; 714/55

(58) Field of Search .............................. 714/10, 11, 12, 714/13, 47, 22, 55

(56) References Cited

U.S. PATENT DOCUMENTS 4,118,792 A * 10/1978 Struger et al. ................ 714/43
4,200,226 A * 4/1980 Piras ........................... 714/55
4,610,013 A * 9/1986 Long et al. ................... 714/11
5,155,729 A * 10/1992 Rysko et al. .................. 714/11
5,185,693 A * 2/1993 Loftis et al. .................. 700/82
5,406,472 A * 4/1995 Simmons et al. .............. 700/4
5,434,998 A * 7/1995 Akai et al. .................... 714/11
5,583,987 A 12/1996 Kobayashi et al.
5,729,675 A 3/1998 Miller et al.
5,870,573 A * 2/1999 Johnson ...................... 710/316
6,070,250 A * 5/2000 Yeager et al. ................. 714/11
6,138,247 A * 10/2000 McKay et al. ................ 714/10
6,148,415 A * 11/2000 Kobayashi et al. ........... 714/15
6,510,529 B1 * 1/2003 Alexander et al. ............ 714/11

OTHER PUBLICATIONS www.sbs.com/communications/products/cascade.shtml.*

* cited by examiner

*Primary Examiner*—Robert Beausoliel
*Assistant Examiner*—Yolanda L. Wilson
(74) *Attorney, Agent, or Firm*—Thomas F. Lebens; Fitch, Even, Tabin & Flannery

(57) ABSTRACT

A computer system comprising a first computer coupled to a primary PCI bus via a first PCI bus switch and a second computer coupled to the primary PCI bus via a second PCI bus switch. A monitor system is coupled to both the first and second computers as well as the first and second PCI bus switches. In the event of a malfunction in the first computer, the monitor system decouples the first computer from the primary PCI bus, by opening the first PCI bus switch and coupling the second computer to the primary PCI bus by closing the second PCI bus switch.

21 Claims, 131 Drawing Sheets

STANDBY SBC BACKPLANE

CROSS-REFERENCE TO RELATED APPLICATION

This application is a continuation of U.S. patent application Ser. No. 09/397,844, filed Sep. 15, 1999, of Curtis R. Alexander, for STANDBY SBC BACKPLANE, which United States patent application is hereby fully incorporated herein by reference.

BACKGROUND OF THE INVENTION

The present invention relates to backup hardware in electronic computer systems, and, in particular, to standby single board computers (SBC's). Even more particularly, the present invention relates to a standby single board computer backplane system and method.

During the past decade, the personal computer industry has literally exploded into the culture and business of many industrialized nations. Personal computers, while first designed for applications of limited scope involving individuals sitting at terminals, producing work products such as documents, databases, and spread sheets, have matured into highly sophisticated and complicated tools. What was once a business machine reserved for home and office applications, has now found numerous deployments in complicated industrial control systems, communications, data gathering, and other industrial and scientific venues. As the power of personal computers has increased by orders of magnitude every year since the introduction of the personal computer, personal computers have been found performing tasks once reserved to mini-computers, mainframes and even supercomputers.

In many of these applications, personal computers perform mission critical tasks involving significant stakes and low tolerance for failure. In these environments, even a single short-lived failure of a personal computer can represent a significant financial event for its owner.

Industrial personal computers are used in critical applications that require much higher levels of reliability than provided by most personal computers. They are used for telephony applications, such as controlling a company's voice mail or e-mail systems. They may be used to control critical machines, such as check sorting, or mail sorting for the U.S. Postal Service. Computer failures in these applications can result in significant loss of revenue or loss of critical information. For this reason, companies seek to purchase industrial personal computers, specifically looking for features that increase reliability, such as better cooling, redundant, hot-swapable power supplies or redundant disk arrays. These features have provided relief for some failures, but these systems are still vulnerable to failures of the single board computer (SBC) within the industrial personal computer system itself. If the processor, memory or support circuitry on a single board computer fails, or software fails, the single board computer can be caused to hangup or behave in such a way that the entire industrial personal computer system fails. Some industry standards heretofore dictated that the solution to this problem is to maintain two completely separate industrial personal computer systems, including a redundant single board computers and interface cards. In many cases, these interface cards are very expensive, perhaps as much as ten times the cost of the single board computer.

As a result, various mechanisms for creating redundancy within and between personal computers have been attempted in an effort to provide backup hardware that can take over in the event of a failure.

One approach, mentioned above, to providing backup hardware, referred to herein as complete redundancy, involves maintaining a duplicate (or backup) personal computer and duplicate attendant interface devices, storage devices, chassis and power supplies on hand to either manually or automatically switch into control in the event that a primary personal computer fails in one way or another. Unfortunately, this level of redundancy requires that all components of the primary personal computer be duplicated in the backup personal computer. While this provides arguably a maximum
degree of redundancy and thus security, it requires that in many instances very expensive or non-critical hardware be duplicated.

For example, in many industrial applications, highly specialized interface boards are used to interface systems with the personal computer. These systems may involve telephony, such as cellular telephony, voice mail data acquisition, monitoring, control, and other such applications. In the event that one of these interface boards were to fail, generally, the remaining operations performed by the personal computer can continue to perform. For example, in the case of a cellular telephone system, the loss of a single interface board may mean that one "line" is out of service, but remaining "lines" remain in service. This level of failure is hardly noticeable by customers of the cellular telephony system, and thus is generally considered tolerable. On the other hand, however, these interface boards are extremely expensive and highly specialized. Thus, maintaining redundancy of these boards is both undesirable and unnecessary.

Unfortunately, prior approaches, including complete redundancy, fail to address this real world fact adequately.

For example, in U.S. Pat. No. 5,185,693, Loftis, et al., teach a backup mode of operation in which a primary personal computer can be replaced by a backup personal computer in the event a failure is detected. Failure is detected through a local area network that couples the primary personal computer to the secondary personal computer. The primary and secondary personal computers are coupled through a complicated bus switch that routes either a bus from the primary personal computer or a bus from the secondary personal computer to a plurality of remotely located (field) input/output units. The input/output units are further coupled to process instrumentation for monitoring and/or controlling an ongoing process, such as a manufacturing process.

In operation, the backup personal computer monitors the status of the primary personal computer through the local area network. Through the local area network, active data in the secondary personal computer is constantly updated with current information concerning process monitoring and control. This local area network connection may further be used to monitor the status of the primary personal computer using the secondary personal computer by, for example, deploying a watchdog timer to detect loss of bus activity. Alternatively, a separate digital output device, coupled to a terminal end of the input/output bus may use a watchdog timer to monitor the bus for a lack of bus activity and to effect the switch over from the primary personal computer to the secondary personal computer in the event of such loss for mor than a timeout period. In either case, in the event a loss of bus activity is detected, a switch switches from the primary personal computer to the secondary personal computer to gain control over the data bus leading to the remotely located input/output units.

Unfortunately, the switch employed in the illustrated device is highly complicated, and thus, is itself, sensitive to failures. In the event the switch does fail, switch over from the primary personal computer to the secondary personal computer cannot occur. Monitoring of the primary personal computer for failures is disadvantageously hindered by the fact that the secondary personal computer, in one embodiment, monitors the primary personal computer—and even then, monitoring is primitive, i.e., bus activity is monitored. Because of this, in the event that the secondary personal computer fails, the primary personal computer will no longer be monitored, and thus the switch over to the secondary personal computer will not occur. And, because no monitoring of the secondary personal computer is performed, this failure of the secondary personal computer will not be detected, thus meaning that the primary personal computer can go unmonitored and unbacked up for a significant period of time without detection. Similarly, in an alternative embodiment, the data output on the remote bus is used to monitor for bus activity, and effect switch over between the primary computer and the secondary computer in the event the lack of bus activity. Unfortunately, bus activity can be generated by devices other than the primary and secondary personal computers, and thus may not be a good indicator of failure. And, with modern personal computers, a failure in one process on the primary personal computer may not result in a complete failure of the personal computer. Thus, a process can remain locked up while bus activity continues (as a result of activities of other processes on the primary personal computer or remote input/output units), and thus the failure goes undetected. As a result, bus activity may continue despite a catastrophic failure of the primary personal computer.

Furthermore, the approach offered by Loftis, et al., fails to address the principal issue outlined above. Specifically, having a backup of the primary personal computer using the secondary personal computer, while at the same time utilizing a common set of interface cards. Unlike the input/output units shown by Loftis, et al., interface cards are internal to the system of the personal computer, generally housed within a single housing therewith. The external approach offered by Loftis, et al., thus would not offer a solution to the needs of modern industrial computer users.

Other examples of backup systems are shown in U.S. Pat. No. 5,434,998 (Akai, et al.), U.S. Pat. No. 5,583,987 (Kobayashi, et al.), and U.S. Pat. No. 5,729,675 (Miller, et al.).

The present invention addresses the above and other needs.

SUMMARY OF THE INVENTION

The present invention advantageously addresses the needs above as well as other needs by providing a standby computer backplane system and method.

In one embodiment, the invention can be characterized as a computer system comprising a first computer coupled to a primary PCI bus via a first PCI bus switch and a second computer coupled to the primary PCI bus via a second PCI bus switch. A monitor system is coupled to both the first and second computers as well as the first and second PCI bus switches. In the event of a malfunction in the first computer, the monitor system decouples the first computer from the primary PCI bus, by opening the first PCI bus switch and coupling the second computer to the primary PCI bus by closing the second PCI bus switch.

In another embodiment, the present invention can be characterized as a computer system comprising a computer coupled to a primary PCI bus via a PCI bus switch. A monitor system is coupled to both the computer and the PCI bus switch. In the event of a malfunction in the computer, the monitor system decouples the computer from the primary PCI bus by opening the PCI bus switch and produces a signal indicating that a malfunction has occurred. In a preferred embodiment, the signal may be an illuminated light. The illuminated light may be located on a housing of the computer system.

In yet another embodiment, the present invention can be characterized as a method of monitoring a computer system comprising coupling a first computer to a primary PCI bus via a first PCI bus switch and coupling a second computer to the primary PCI bus via a second PCI bus switch. Further comprising, coupling the first and second computers and the first and second PCI bus switches to a monitor system. Additionally, producing a signal in the first computer at a regular interval and resetting a watchdog timer in the monitor system in response to the signal. Further comprising, decoupling the first computer from the primary PCI bus by opening the first PCI bus switch and coupling the second computer to the primary PCI bus by closing the second PCI bus switch in the event the watchdog timer is not reset.

In another embodiment, the invention can be characterized as a system comprising a first computer coupled to a primary PCI bus via a first PCI bus switch and a second computer coupled to the primary PCI bus via a second PCI bus switch. A monitoring system is coupled to the first and second computers and the first and second PCI bus switches. Within the monitoring system is a watchdog timer which is periodically reset in response to signals from the first computer. A switch over circuit is coupled to the watchdog timer such that in the event a malfunction occurs in the first computer, a watchdog timeout period is exceeded when the signals are not sent to the watchdog timer and is therefore not reset resulting in arming the switch over circuit so that the monitoring system decouples the first computer from the primary PCI bus, by opening the first PCI bus switch and coupling the second computer to the primary PCI bus by closing the second PCI bus switch.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
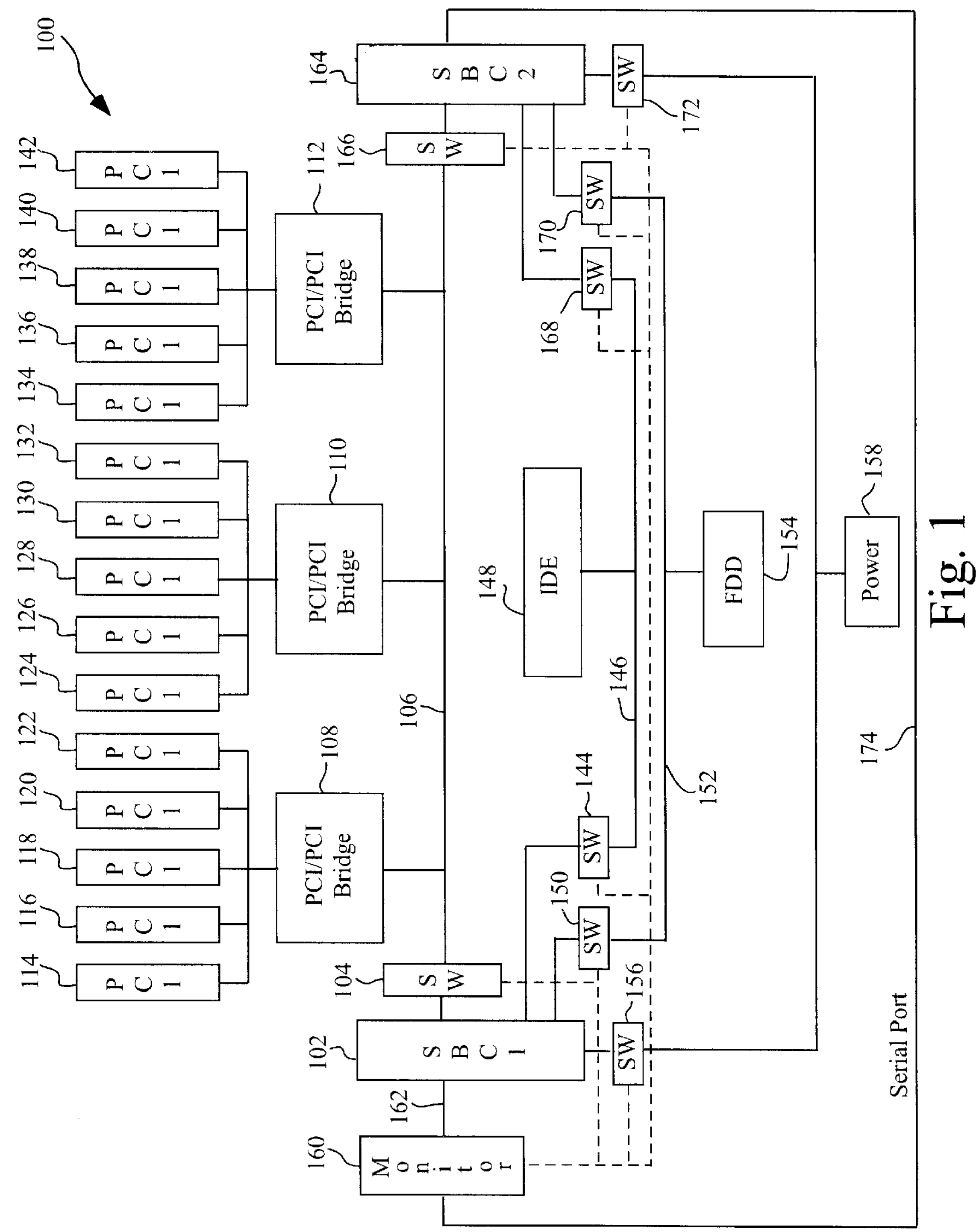
FIG. 1 is a block diagram of an industrial personal computer system employing a standby single board computer backplane, in which a primary and a second single board computers are selectively coupled through first and second PCI bus switches, respectively, to a primary PCI bus, in accordance with one embodiment of the present invention.

Referring to FIG. 1, a block diagram is shown of an industrial personal computer system 100 consistent with the present invention and in accordance with one embodiment.

Shown is a first single board computer 102, or primary personal computer, coupled through a PCI bus 104 switch to a primary PCI bus 106. The primary PCI bus 106 is coupled to each of three PCI/PCI bridges 108, 110, 112, each of which are coupled to five PCI card slots 114, 116, 118, 120, 122, 124, 126, 128, 130, 132, 134, 136, 138 for supporting, in this embodiment, up to 15 different PCI based interface cards. These interface cards can take numerous forms, such as telecommunications control boards, voice mail control boards, data acquisition boards, process control boards, and the like. The PCI/PCI bridges 108, 110, 112 function in a conventional, well known manner to convey data between the first single board computer 102 and respective ones of the PCI based interface boards.

The first single board computer 102 is also coupled through a first IDE channel switch 144 to an IDE channel 146, which is in turn coupled to an IDE device 148, such as a CD ROM drive, or a hard drive. The first single board computer 102 is coupled through a first floppy disk channel switch 150 to a floppy disk channel 152 on which a floppy disk drive 154 resides. Finally, the first single board computer 102 is coupled through a power switch 156 to a power supply 158.

Aside from the above-identified switches, i.e., the first PCI bus switch 104, the first IDE channel switch 144, the first floppy disk drive channel switch 150, and the first power switch 156, the above configuration (as so far described) is typical of industrial personal computer systems employing a single board computer to supply processing and memory capabilities.

Unlike in typical industrial personal computer systems, however, with this embodiment, a monitor system 160 is coupled to the first single board computer 102 through an industry standard architecture (ISA) bus 162. Through the ISA bus 162, the monitor system 160 is able to reset one or more watchdog timers in response to signals from the first single board computer 102. Unlike in prior systems, these signals are generated by the first single board computer 102 in response to custom code within software operating on the first single board computer 102. The custom code may be for example in an operating system, driver, application program, or the like.

For example, within the software operating on the first single board computer, there may be custom code programmed to periodically cause the generation of the signals, during normal operation. In this case, in the event that the signals are at some point not generated, such would be an indication that a particular portion of the software in which the custom code is located is not operating normally on the first single board computer 102.

Within the system monitor 160, the watchdog timers are configured to cause a fault condition when they are not reset after a predetermined period of time. Thus, if one or more of the signals are not generated, because there is a fault in one or more particular portion of the software, the watchdog timers corresponding to those particular portions of the software will fail to be reset and, after the predetermined period of time, will signal a fault. In response to this, the monitor system 160 can, for example, signal an operator that a fault has occurred, such as by illuminating a light on a front panel on a housing of the computer system. In response to observing the light, the operator can then effect a manual switch over from the first single board computer 102 to the second single board computer 164 at a convenient time. (Manual switch over can be effected, for example, by operating a switch on the front panel of the housing. When manual switch over is effected, the monitor system 160 is signaled to perform the switch over in the matter described below in reference to an automated switch over alternative.)

Alternatively, the monitor system 160 can be configured to automatically decouple the first single board computer 102 from the primary PCI bus 106, the IDE channel 146, the floppy disk drive channel 152, and the power supply 158, by opening the switches 104, 144, 150, 156. In this case, a second single board computer 164 is coupled through a second bus switch 166 to the primary PCI bus 106; is coupled to the IDE channel 146 through the second IDE channel switch 168; is coupled to the floppy drive channel 152 through a second floppy drive channel switch 170; and is coupled to the power supply 158 through a second power switch 172.

Thus, the monitor system 160 is able to simultaneously decouple the first single board computer 102 from the primary PCI bus 106, the IDE channel 146, the floppy disk drive channel 152 and the power supply 158, while coupling the second single board computer 164 to the primary PCI bus 160; the IDE channel 146; the floppy disk drive channel 152; and the power supply 158. As a result, the first single board computer 102 will, in effect, disappear, while simultaneously the second single board computer 164 will appear, as far as the PCI based interface cards, the IDE device 148, and the floppy disk drive 154 are concerned. In response to the application of power to the second single board computer 164, the second single board computer 164 will begin to boot up (i.e., perform bootstrap operations), and thus will initialize the PCI based interface cards and load software from the IDE device 148, such as a CD ROM device, or the floppy disk drive 156 (from a floppy disk). As a result, within moments of a failure of the first single board computer 102 being detected, the second single board computer 164 begins to boot, and will, shortly thereafter, generally on the order of a minute or two, resume operation in place of the first single board computer 102.

Note that the first IDE channel switch 144 and the second IDE channel switch 168 may together form a priority IDE channel switch. In this case, both the first single board computer 102 and the second single board computer 164 remain coupled to the IDE channel 146 at all times, with either the first single board computer 102 or the second single board computer 164 having priority over the other for access to the IDE channel 146. Priority may be either electronically or manually switchable or may be assigned to either the first single board computer 102 or the second single board computer 164 permanently. Similarly, the first floppy disk drive channel switch 150 and the second floppy disk drive channel switch 168 may together form a priority floppy disk drive channel switch, maintaining both the first single board computer 102 and the second single board computer 164 coupled to the floppy disk drive channel 152, with either the first single board computer 102 or the second single board computer 164 having priority, as determined either electronically, manually, or permanently.

Monitoring of the second single board computer 164 is performed in a manner analogous to that described above for monitoring the first single board computer 102, except that the second single board computer 164 is coupled to and communicates with the monitor system 160 via a serial port 174 as opposed to the ISA bus 162. Advantageously, the custom code in the software generates the signals on both the ISA bus 162 and the serial port 174 simultaneously, so identical software can be executed by first single board computer 102 and the second single board computer 164, with the unused signals, i.e., the signals generated on the second single board computer's ISA bus, and the signals generated on the first single board computer's serial port being ignored.

Advantageously, the same PCI interface cards are used through the same extremely high speed PCI bus, regardless of whether or not the first single board computer or the second single board computer is active. Similarly, the same IDE device 148, i.e., CD ROM drives or hard drives, are employed, and thus data recorded during operation of the industrial personal computer system 10 is maintained; and the same floppy disk drive 154 is used so, for example, a single boot disk can be employed.

This is particularly advantageous because the PCI based interface cards 114, 116, 118, 120, 122, 124, 126, 128, 130, 132, 134, 136, 138, 140, 142 used in the PCI bus slots can be highly specialized and extremely expensive devices, while at the same time, shutdown of the entire industrial personal computer system 10 can be catastrophic.

Because failure of a single PCI based interface card is generally not catastrophic, these PCI based interface cards 114, 116, 118, 120, 122, 124, 126, 128, 130, 132, 134, 134, 136, 138, 140, 142 need not, in accordance with the present embodiment, be maintained redundantly. At the same time, however, redundancy can be maintained on such critical components as the first single board computer 102 so that significant downtime does not occur upon a failure. Further advantageously, the monitor system 160 operates completely independently of the first single board computer 102 and the second single board computer 164. Thus, the second single board computer 164, for example, can be maintained in a completely powered down, and, therefore, relatively safer condition, while the first single board computer 102 is actively monitored. Furthermore, the monitor system 160 can, by design, be substantially independent in functioning from the first single board computer, with the exception of receiving signals generated by particular portions of the software running on the first single board computer 102, and in response to which the monitor system 160 resets the watchdog timers. As a result, software failures (even partial software failures involving only one particular portion of the software) and/or hardware failures on the first single board computer 102 do not adversely affect the ability of the monitor system 160 to perform its critical function.

Finally, advantageously, simple Field Effect Transistor (FET) switches are employed as the first PCI bus switch 104 and the second PCI bus switch 166 allowing extremely fast switch over between the first single board computer and the second single board computer, while at the same time maintaining a highly simple and effective mechanism for switching.

Since power is removed from the first single board computer 102 on the detection of a fault, maintenance personal can be alerted and can replace the first single board computer 102 after a failure while the industrial personal computer system continues to run. In this case the computer system will continue to run using the second single board computer 164. Because the monitor system 160 is coupled to the second single board computer 164 through a serial port 174, the second single board computer 164 can continue to operate until another fault is signaled. In that case, the system monitor can activate the first single board computer 102, and deactivate the second single board computer 164, allowing maintenance personal to then replace the second single board computer 164.

In a variation, both single board computers can be provided with power at all times. Independent operation of the first power switch 156 or the second power switch 172 can allow replacement of the first or second single board computer 102 or 164, respectively. With both single board computers 102, 164 running, the second single board computer 164 can be communicating with the first single board computer via, for example, the serial port 174, so as to be up to date on critical application statuses. Switch over, in this case, simply involves disconnection of the first single board computer 102 from the primary PCI bus 106 using the first PCI bus switch 104, the IDE channel 146 using the first IDE channel switch 144, and the floppy drive channel using the floppy drive switch 150, and connection of the second single board computer 164 to the primary PCI bus 106 using the secured PCI bus switch 166, the IDE channel 146 using the second IDE channel switch 168 and the floppy drive channel 152 using the second floppy drive channel switch 170. Switch over in this instance can be accomplished much more quickly because a re-boot is not required. However, this approach requires altering application software and perhaps operating systems software in a more significant way.

Figure 2:
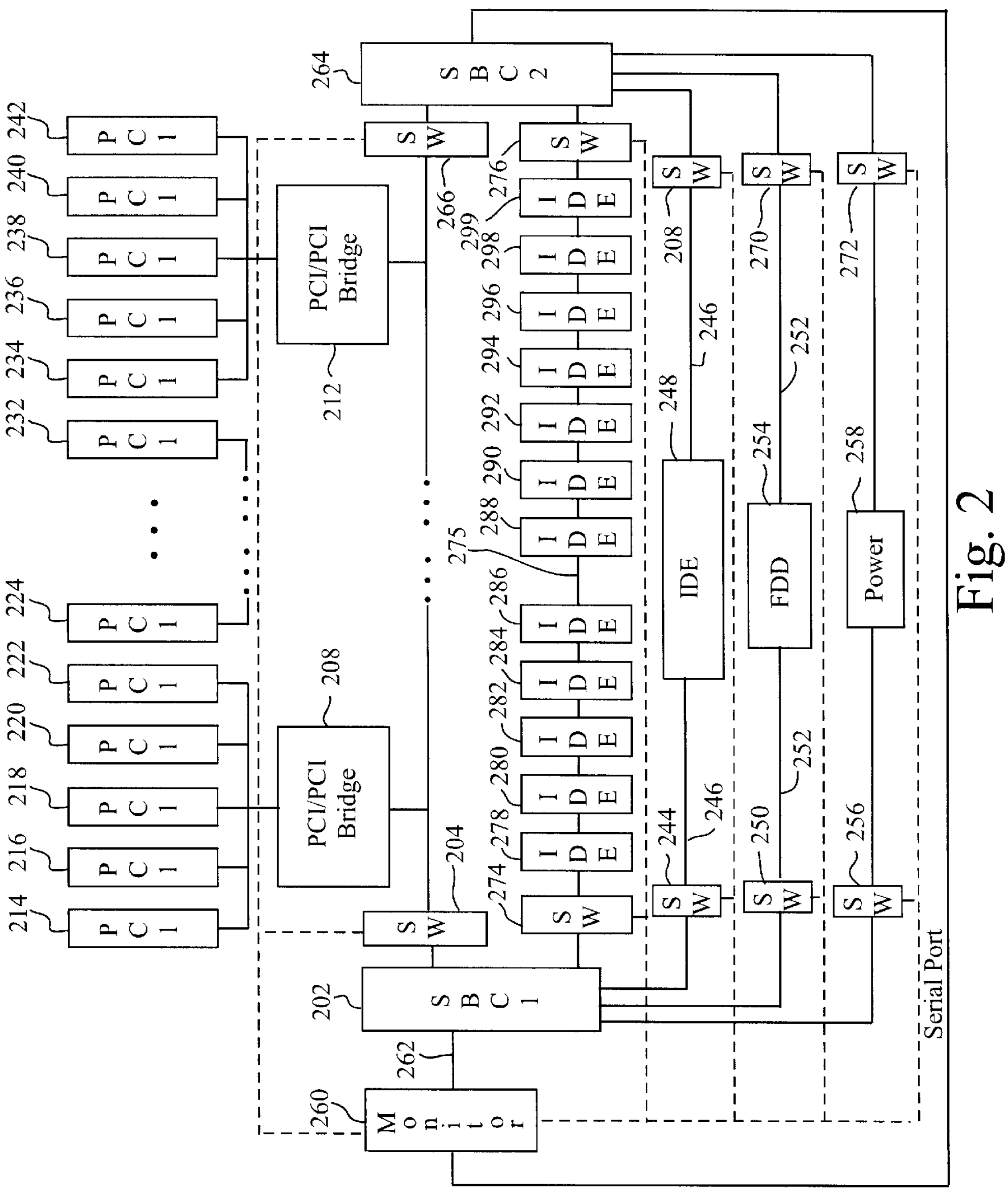
FIG. 2 is a block diagram of another industrial computer system employing another standby single board computer backplane, in which a primary and a second single board computers are selectively coupled through first and second PCI bus switches, respectively, to a primary PCI bus and through first and second ISA bus switches, respectively, to an ISA bus, in accordance with one embodiment of the present invention.

Referring to FIG. 2, a block diagram is shown of an industrial personal computer system 200 consistent with the present invention and in accordance with one embodiment.

Shown is a first single board computer 102, or primary personal computer, coupled through a first PCI bus switch 204 to a primary PCI bus 206. The primary PCI bus 206 is coupled to each of three PCI/PCI bridges 208, 212, each of which are coupled to five PCI card slots 214, 216, 218, 220, 222, 224, 226, 228, 230, 232, 234, 236, 238 for supporting, in this embodiment, up to 15 different PCI based interface cards. These interface cards can take numerous forms, such as telecommunications control boards, voice mail control boards, data acquisition boards, process control boards, and the like. The PCI/PCI bridges 208, 212 function in a conventional, well known manner to convey data between the first single board computer 202 and respective ones of the PCI based interface boards.

Also shows in the first single board computer 202 coupled through a first ISA bus switch 274 to an ISA bus 275. The ISA bus is coupled to a number of ISA card slots 278, 280, 282, 284, 286, 288, 290, 292, 294, 296, 298, 299 for supporting various ISA based interface cards. These interface cards can also take numerous forms, such as telecommunications control boards, voice mail control boards, data acquisition boards, process control boards, and the like.

The first single board computer 202 is also coupled through a first IDE channel switch 244 to an IDE channel 246, which is in turn coupled to an IDE device 248 as a CD ROM drive, or a hard drive. The first signal board computer 202 is coupled through a first floppy disk channel switch 250 to a floppy disk channel 252 on which a floppy disk drive 254 resides. Finally, the first single board computer 202 is coupled through a power switch 256 to a power supply 258.

Aside from the above-identified switches, i.e., the first PCI bus switch 204, the first ISA bus switch 274, the first IDE channel switch 244, the first floppy disk drive channel switch 252, and the first power switch 256, the above configuration (as so far described) is typical of industrial personal computer systems employing a single board computer to supply processing and memory capabilities.

Unlike in typical industrial personal computer systems, however, with this embodiment, a monitor system 260 is coupled to the first single board computer 202 through an (ISA) bus 262. Through the ISA bus 262, the monitor system 260 is able to reset various watchdog timers in response to signals from the first single board computer 202. Unlike in prior systems, these signals are generated by the first single board computer 202 in response to custom code within software operating on the first single board computer 202. For example, the software may be programmed to periodically cause the generation of the signals, during normal operation. In this case, in the event that the signals are at some point not generated, such would be an indication that a particular portion of the software is not operating normally on the first single board computer 202. Within the system monitor 260, the watchdog timers are configured to cause a fault condition when they are not reset after a predetermined period of time. Thus, if one or more of the signals are not generated, because there is a fault in one or more particular portion of the software, the watchdog timers corresponding to those particular portions of the software will fail to be reset and, after the predetermined period of time, will signal a fault. In response to this, the system monitor 260 can, for example, signal an operator that a fault has occurred, such as by illuminating a light on a front panel on the computer system.

Alternatively, the monitor system 260 can be configured to automatically decouple the first single board computer 202 from the primary PCI bus 206, the ISA bus 275, the IDE channel 246, the floppy disk drive channel 252, and the power supply 258, by opening the switches 204, 274, 244, 250, 256. In this case, a second single board computer 264 is coupled through a second bus switch 266 to the primary PCI bus 206; is coupled through a second ISA bus switch 276 to the ISA bus 275; is coupled to the IDE channel 246 through the second IDE channel switch 268; is coupled to the floppy drive channel 252 through a second floppy drive channel switch 270; and is coupled to the power supply 258 through a second power switch 272.

Thus, as with the embodiment described with reference to FIG. 1, the monitor system 260 is able to simultaneously decouple the first single board computer 202 from the primary PCI bus 206; the IDE channel 246; the floppy disk drive channel 252 and the power supply 258, while coupling the second single board computer 264 to the primary PCI bus 260; the IDE channel 246; the floppy disk drive channel 252; and the power supply 258. In addition, the monitor system 260 is able to simultaneously decouple the first single board computer 202 from the ISA bus 275, while coupling the second single board computer 264 to the ISA bus 275. As a result, the first single board computer 202 will, in effect, disappear while simultaneously the second single board computer 264 will appear, as far as the PCI based interface cards, ISA based interface cards, the IDE device 248, and the floppy disk drive 254 are concerned. As with the embodiment of FIG. 1,, in response to the application of power to the second single board computer 264, the second single board computer 264 will begin to boot, and thus will initialize the PCI based interface cards and the ISA based interface cards, and load software from the IDE device 248, such as a CD ROM device, or the floppy disk drive 256 (from a floppy disk). As a result, within moments of a failure of the first single board computer 202 being detected, the second single board computer 264 begins to boot, and will shortly thereafter, generally on the order of a minute or two, resume operation in place of the first single board computer 202. Monitoring of the second single board computer 264 is performed in a manner analogous to that described above for monitoring the first single board computer 202, except that the second single board computer 264 is coupled to and communicates with the monitor system 260 via a serial port 274 as opposed to the ISA bus 262.

Advantageously, the same PCI based interface cards and the same ISA based interfaced cards are used through the same PCI bus, or ISA bus, respectively, regardless of whether or not the first single board computer or the second single board computer is active. Similarly, as with the embodiment of FIG. 1, the same IDE device 248, i.e., CD ROM drives or hard drives, are employed, and thus data recorded during operation of the industrial personal computer system 20 is maintained; and the same floppy disk drive 254 is used so, for example, a single boot disk can be employed.

Thus this embodiment offers all of the advantages of the embodiment of FIG. 1, while additionally providing for switch over of the first single board computer 202 to the second single board computer on the ISA bus 275. As with the PCI based interface cards, the ISA based interface cards used in the ISA bus slots can be highly specialized and extremely expensive devices, while at the same time, shutdown of the entire industrial personal computer system 20 can be catastrophic.

As with the PCI based interface cards, the failure of a single ISA based interface card is generally not catastrophic.

Finally, simple Field Effect Transistor (FET) switches are also employed as the first ISA bus switch 274 and the second ISA bus switch 266, again, allowing extremely fast switch over between the first single board computer and the second single board computer, while at the same time maintaining a highly simple and effective mechanism for switching.

In all other material respects the embodiment of FIG. 2 is identical to the embodiment of FIG. 1, and the variations of the embodiment of FIG. 1 similarly applicable to the embodiment of FIG. 2, Thus, further detailed explanation is not repeated. Instead the reader is directed to the description of FIG. 1 for further details and embodiments regarding the structure, operation, features and advantages of the present embodiment (the embodiment of FIG. 2).

Figure 3:
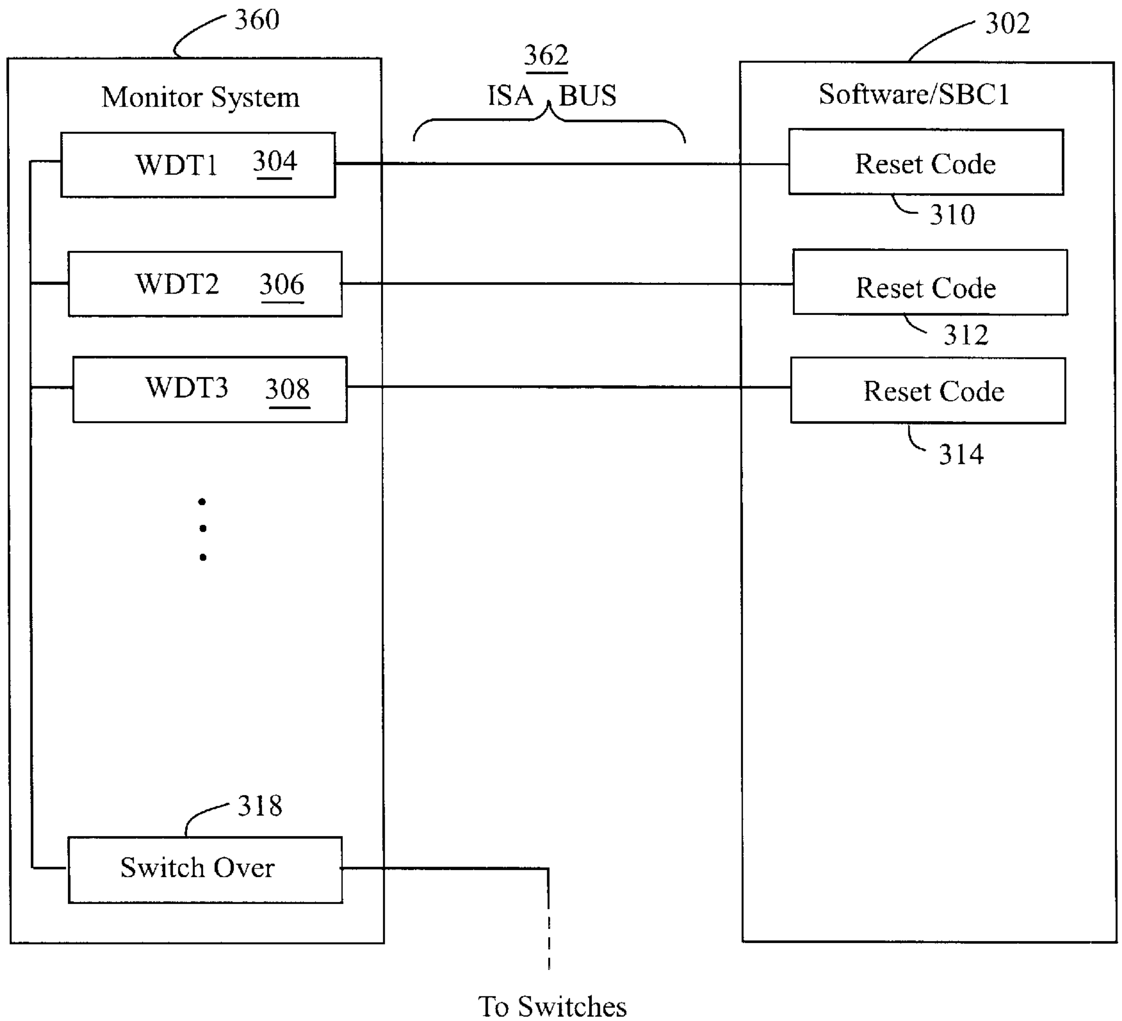
FIG. 3 is a block diagram illustrating a plurality of watchdog timers in a monitor system, which are coupled through an ISA bus to the first single board computer, of FIGS. 1 and 2, where corresponding reset code resets the watchdog timers before corresponding watchdog timeout periods in the event the first single board computer is functioning normally, and where one or more instances of the corresponding reset code do not reset the watchdog timers before the corresponding watchdog timeout periods in the even the first single board computer is not functioning normally.

Referring to FIG. 3, a block diagram is shown of the monitor system 360, the ISA bus 362, the first single board computer 302, the serial port 374, and the second single board computer 364. Also shown within the monitor system 360 are a plurality of watchdog timers 304, 306, 308, each coupled through the ISA bus 362 to respective custom code 310, 312, 314 within software within the first single board computer 302. Further shown within the second single board computer is custom code 316, 318, 320 coupled through the serial port 374, to the watchdog timers 304, 306, 308. As described above, the watchdog timers 304, 306, 308 operate independently from one another, each being coupled to a switch over circuit 318. The switch over circuit 318 effects switch over from the first single board computer 302 to the second single board computer (or vice versa) by operating the switches, as described above, e.g., by opening the first PCI bus switch, and thereby disconnecting the first single board computer 302 from the primary PCI bus, and simultaneously closing the second PCI bus switch, and thereby connecting the second single board computer 302 to the primary PCI bus (or vice versa, i.e., opening the second PCI bus switch and closing the first PCI bus switch).

As described above, the reset code 310, 312, 316 periodically executes as a part of normal operation of the software within the first single board computer 302 or the second single board computer 364. The periodicity of execution of the custom code 310, 312, 314 (or reset code) is used, on an individual basis, to determine a watchdog timeout period for each watchdog timer 304, 306, 308. Specifically, each watchdog timeout period is selected to be longer than the normal period between executions of the custom code 310, 312, 314. The watchdog timers 304, 306, 308 are reset in response to signals generated on the ISA bus 362 in response to execution of the respective custom code 310, 312, 314 within the first single board computer or signals on the serial port 374 in response to execution of the respective custom code 316, 318, 320 within the second single board computer 364. As a result, when the custom code 310, 312, 314 is being periodically executed, the watchdog timers 304, 306, 308 are reset before their respective watchdog timeout periods are reached. If, however, one or more of the custom code 310, 312, 314 processes is not executed, such as would be the case if one or more software routines fails, or of there is a hardware failure on the first single board computer 302 (or the second single board computer 364), and therefore the corresponding signals are not generated, the watchdog timeout period for the corresponding watchdog timer 304, 306, 308 is reached. In response to reaching the respective watchdog timeout period, the respective watchdog timer will signal the switch over circuit 318 to effect a switch over, thus causing the second single board computer (or the first single board computer) to boot, and to take control of the industrial personal computer system.

Figure 4A:
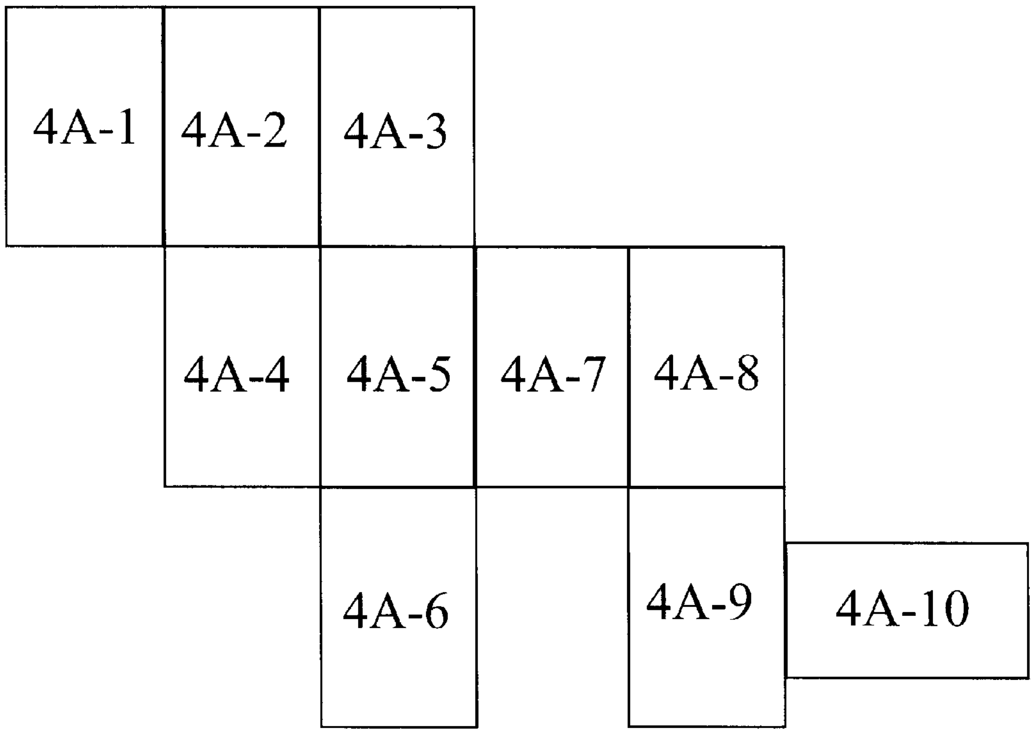
FIG. 4 is a schematic diagram showing an exemplary implementation of the industrial personal computer system of FIG. 1.
Figures 1, 4A:
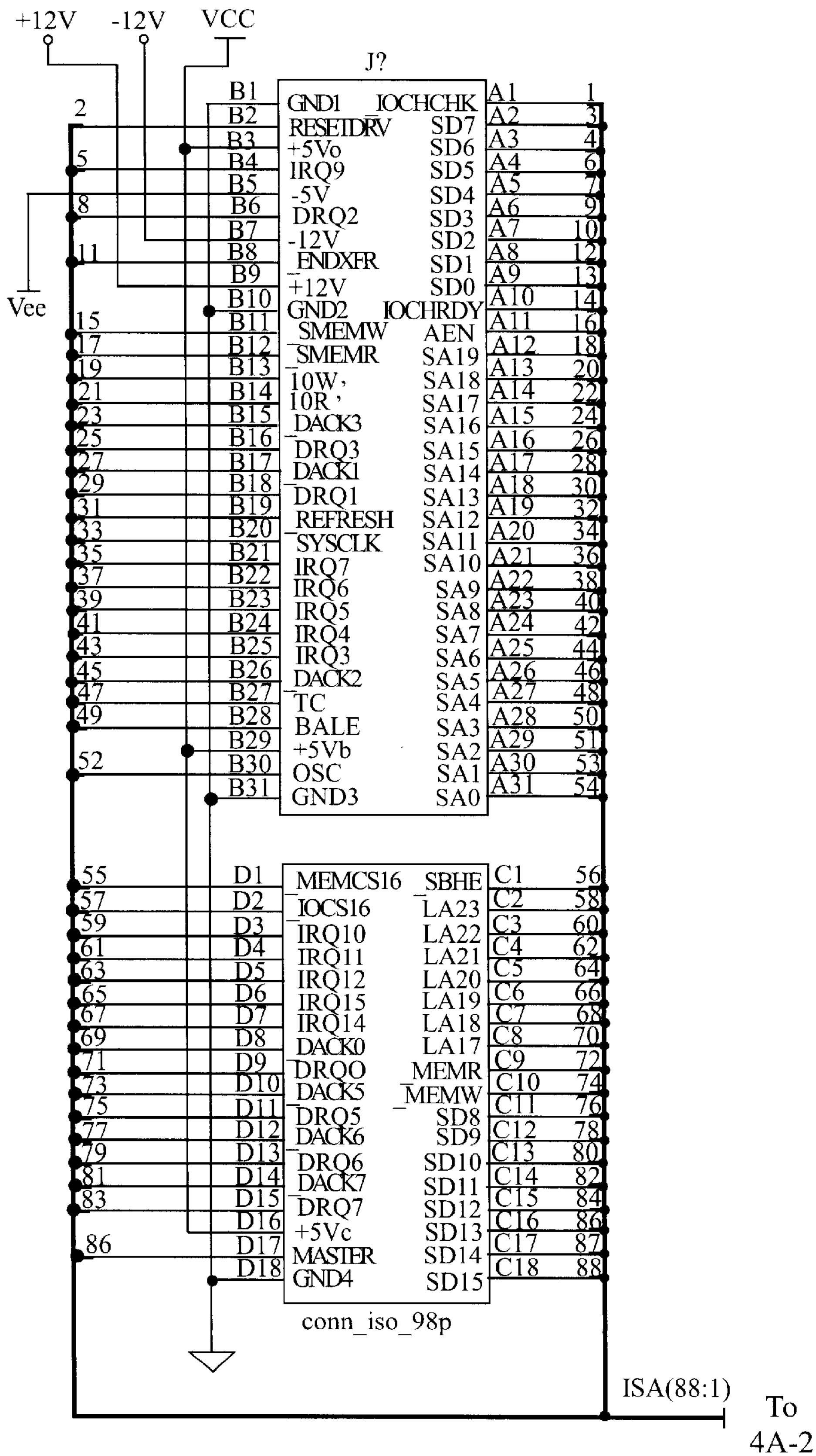
Figures 2, 4A:
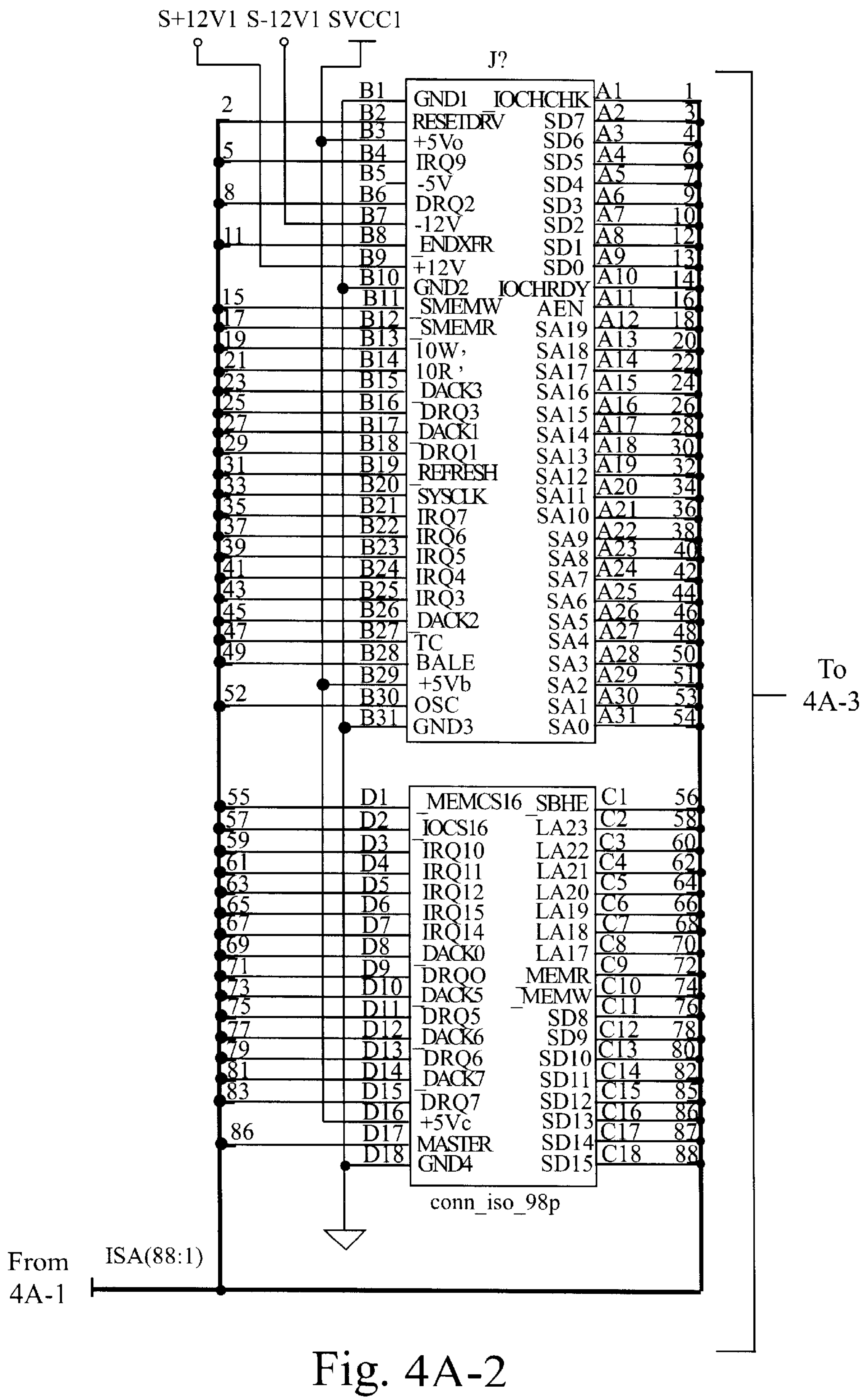
Figures 3, 4A:
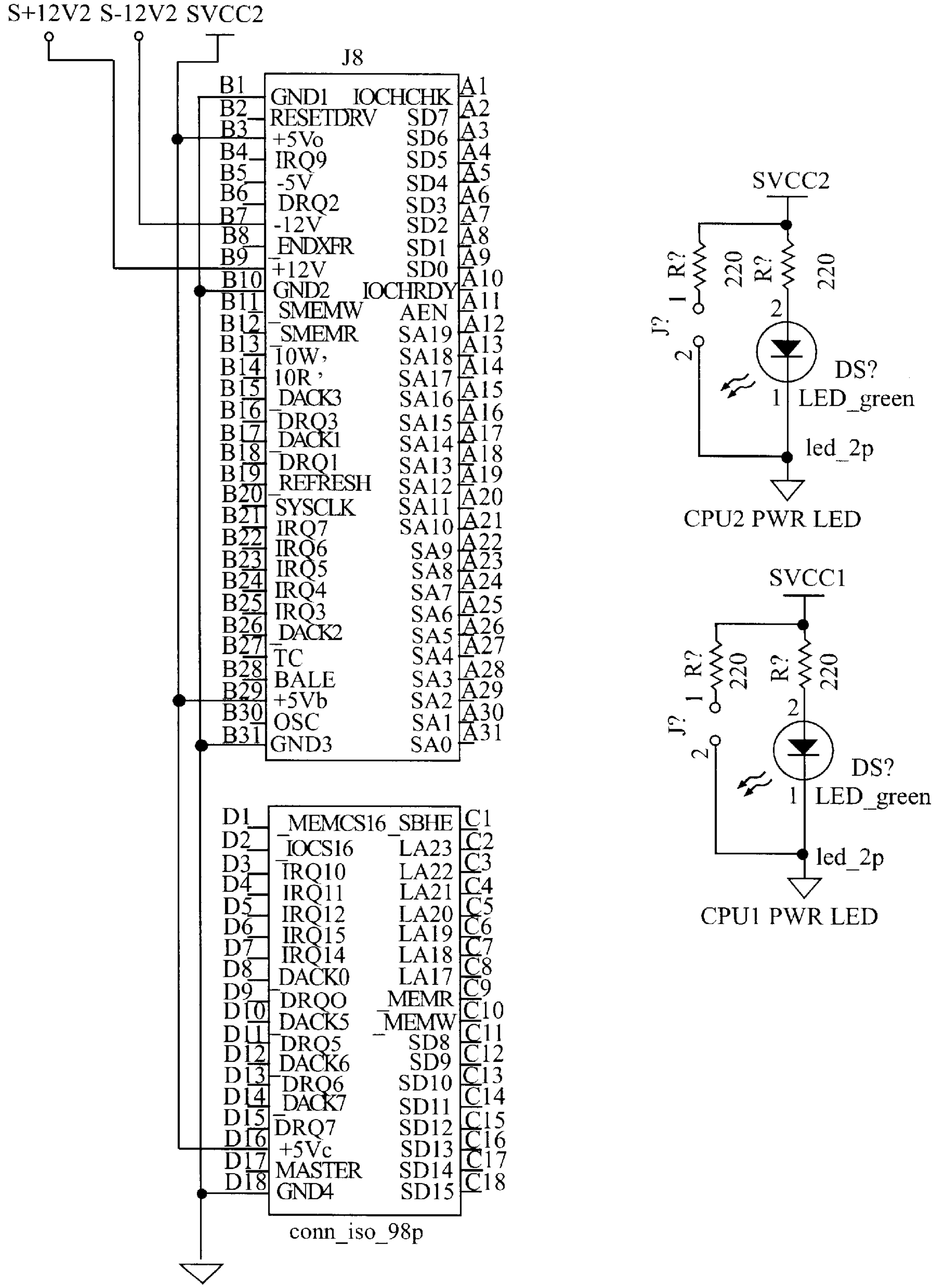
Figures 4, 4A:
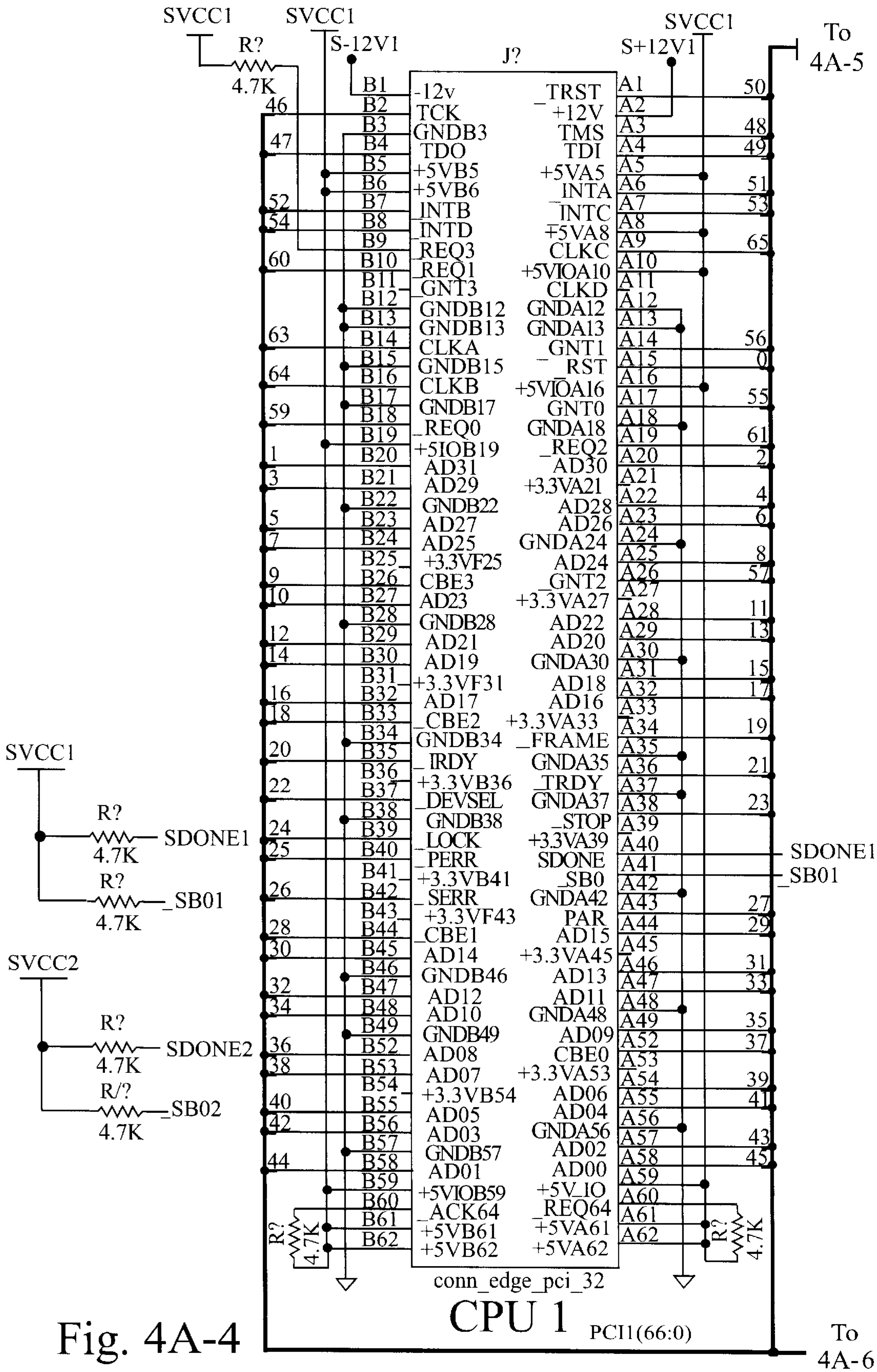
Figures 4, 4A, 5:
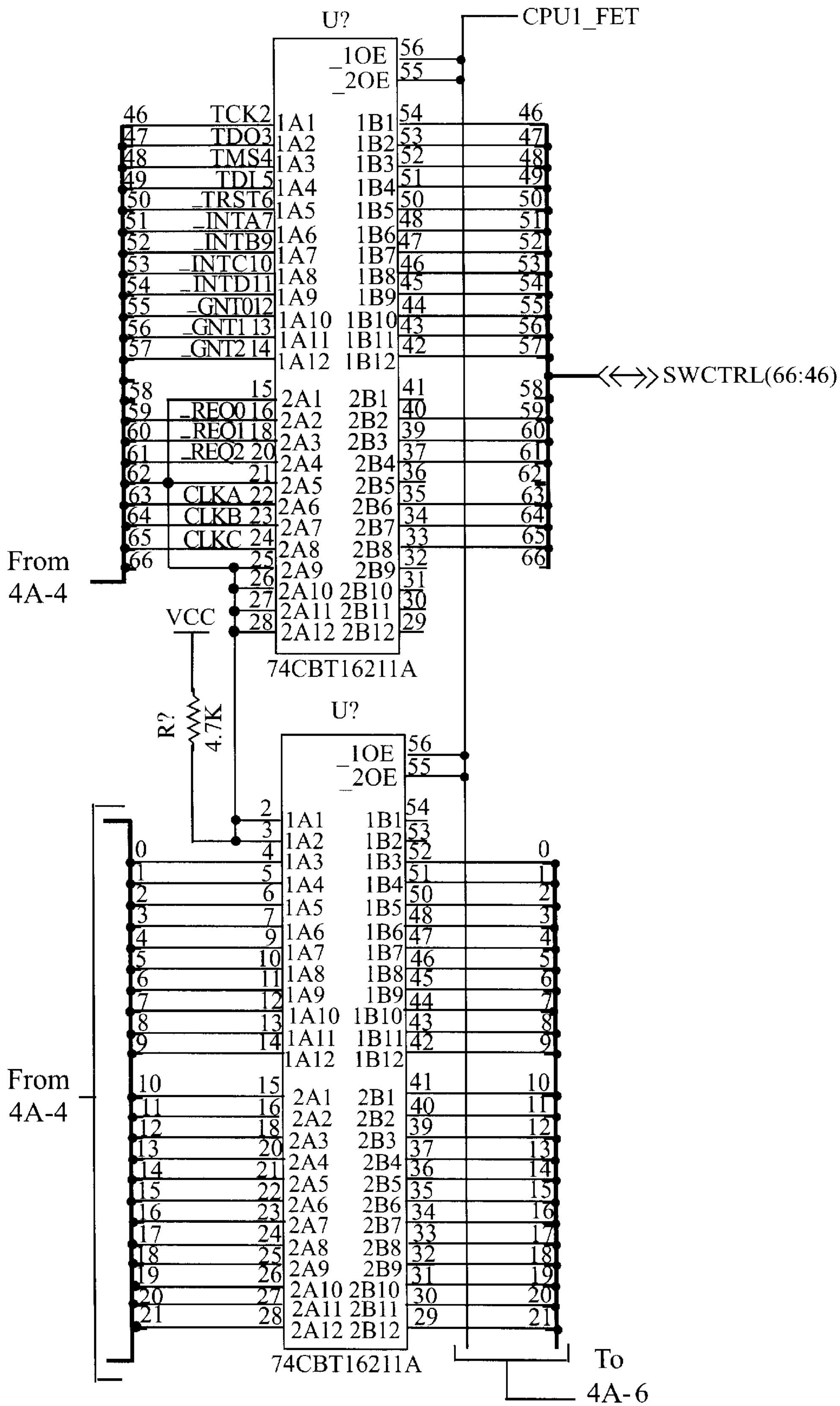
FIG. 5 is a schematic diagram showing an exemplary implementation of the industrial personal computer system of FIG. 2.
Figures 4, 4A, 5, 6:
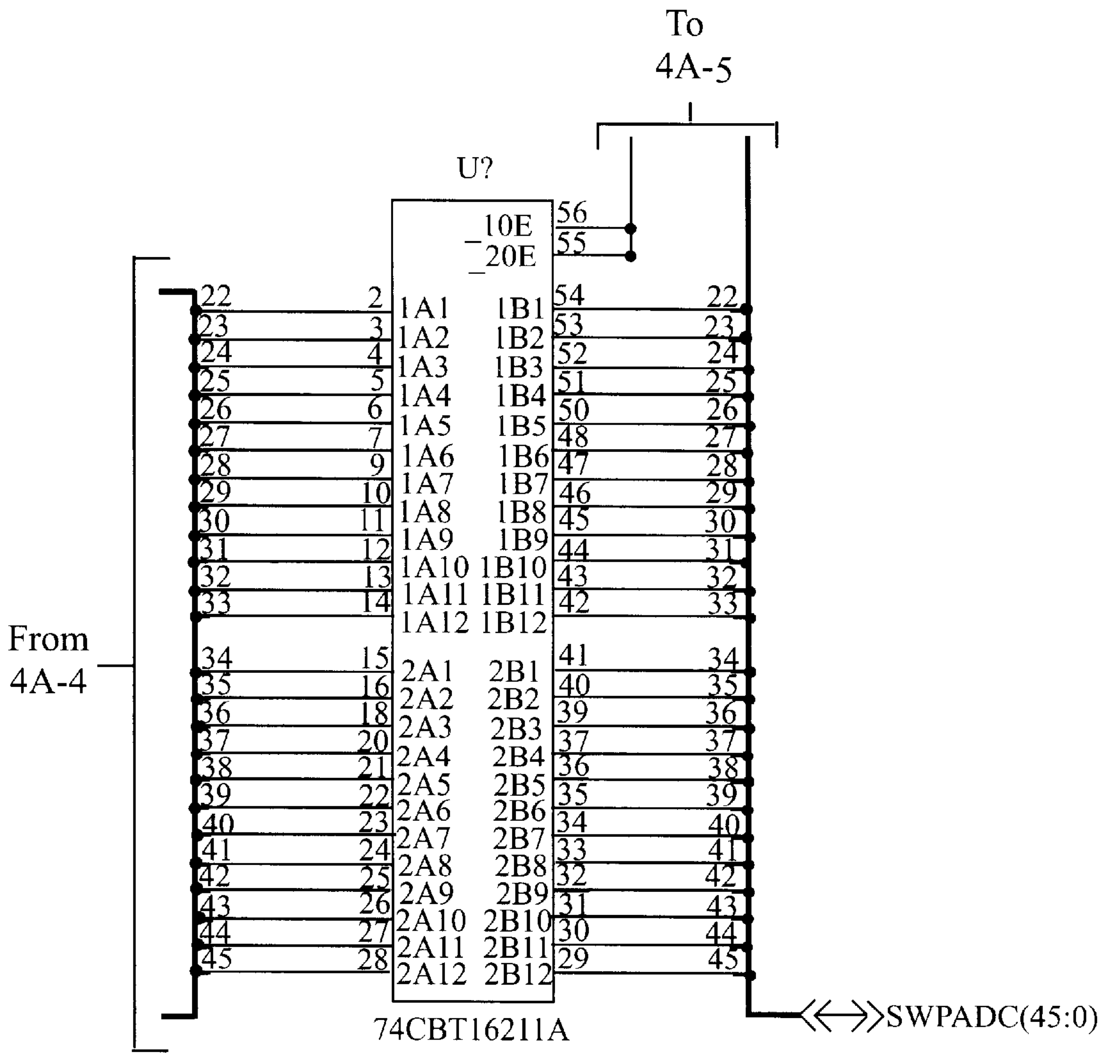
Figures 4, 4A, 5, 6, 7:
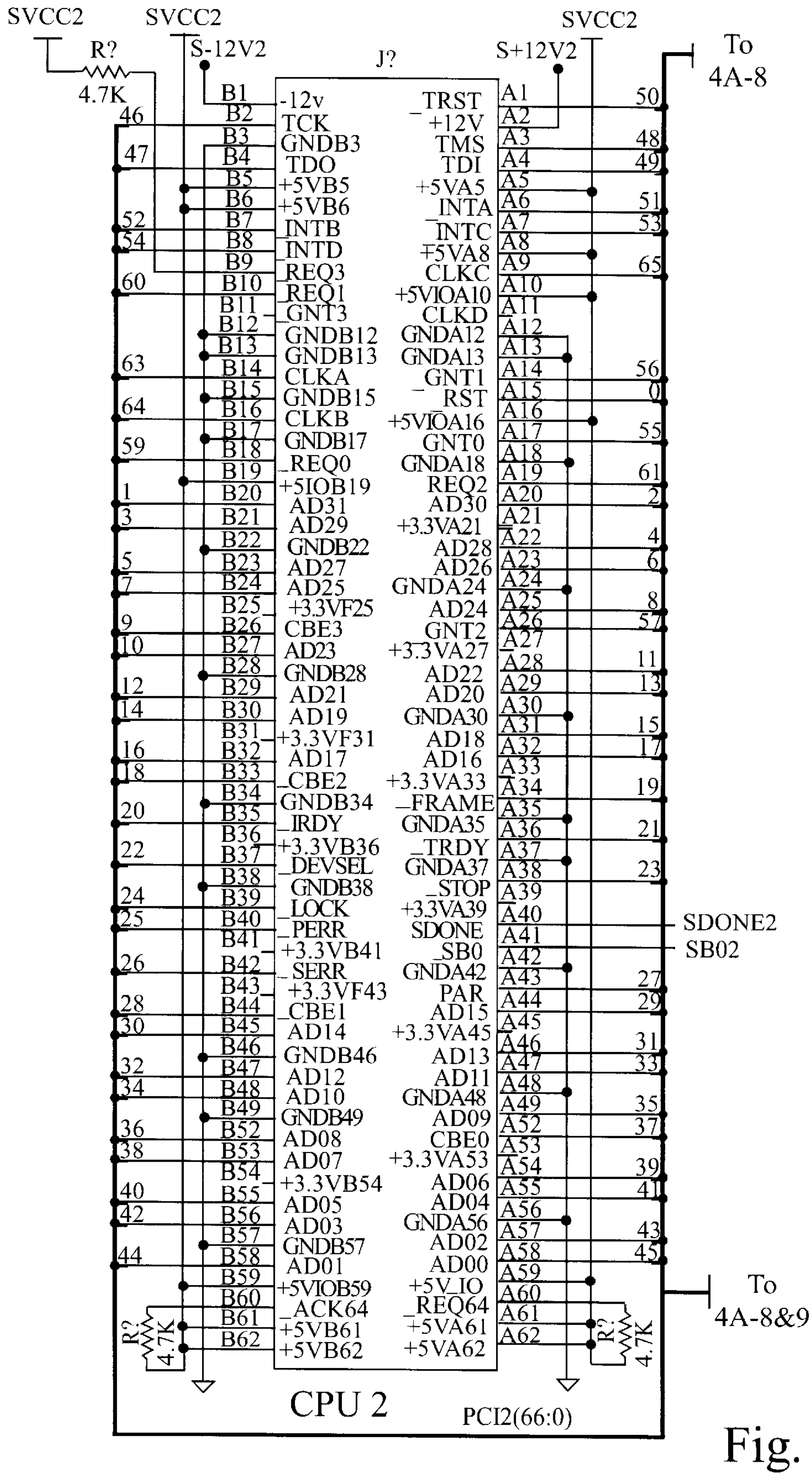
Figures 4, 4A, 5, 6, 7, 8:
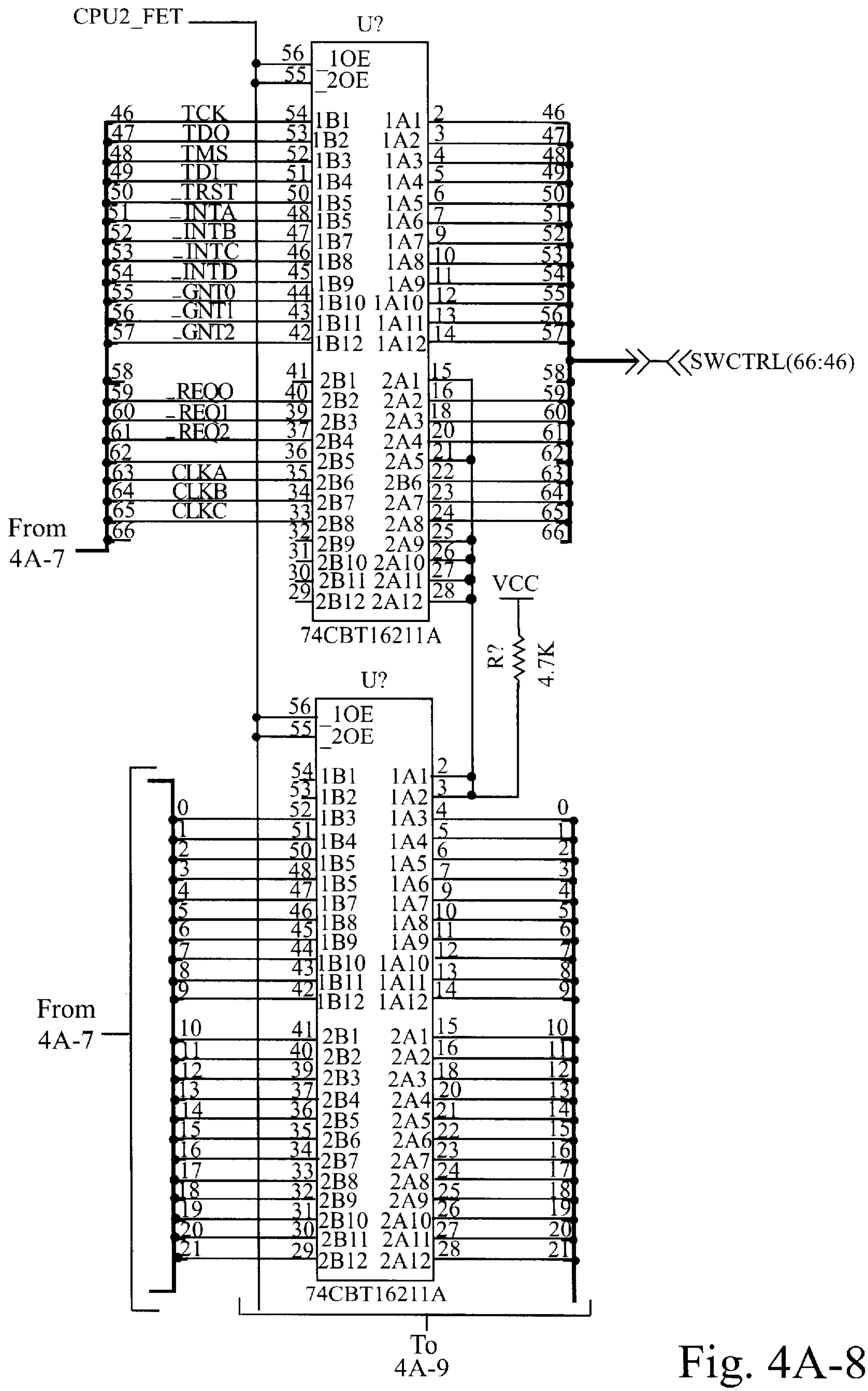
Figures 4, 4A, 5, 6, 7, 8, 9:
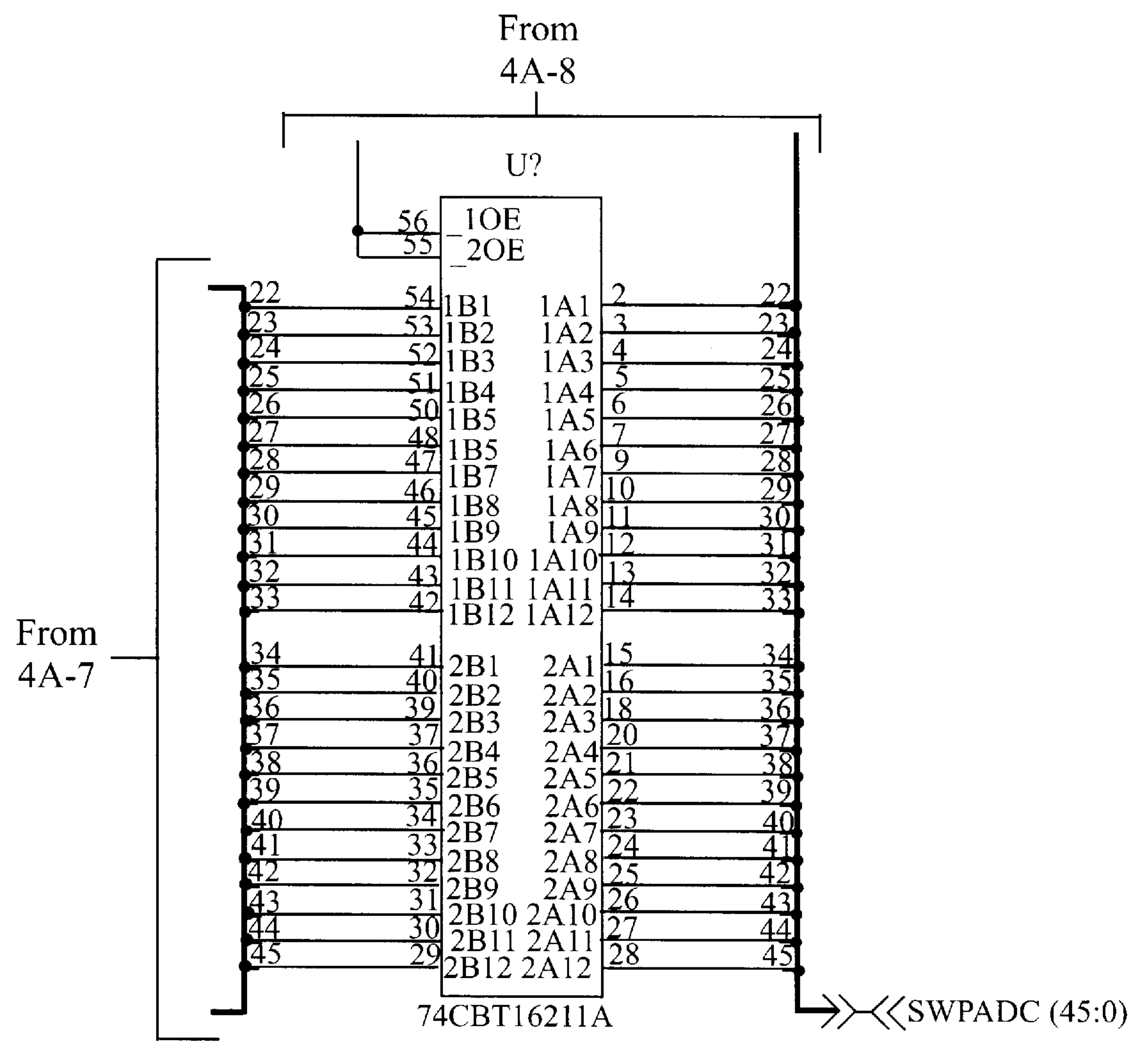
Figures 4, 4A, 5, 6, 7, 8, 9, 10:
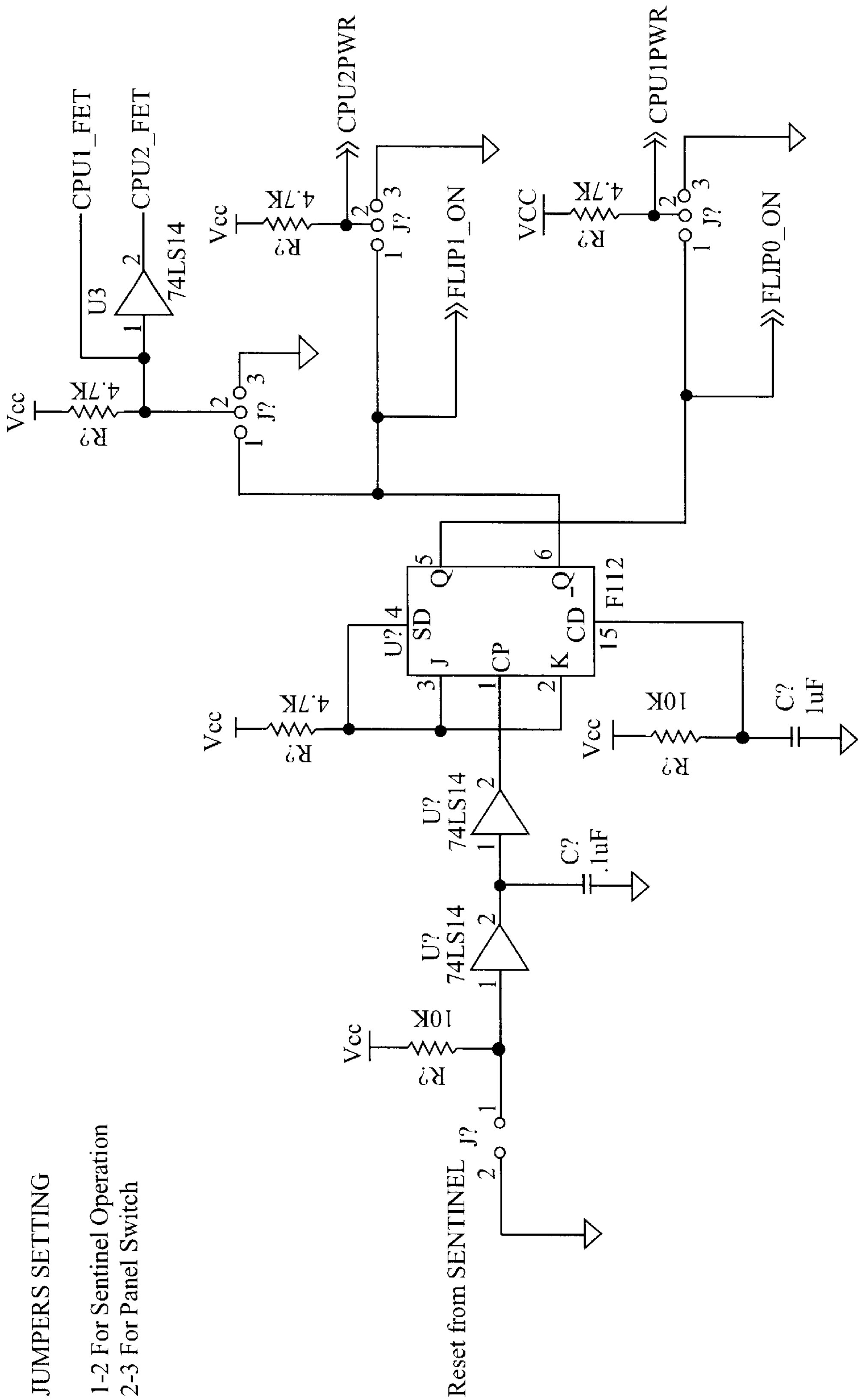
Figure 4B:
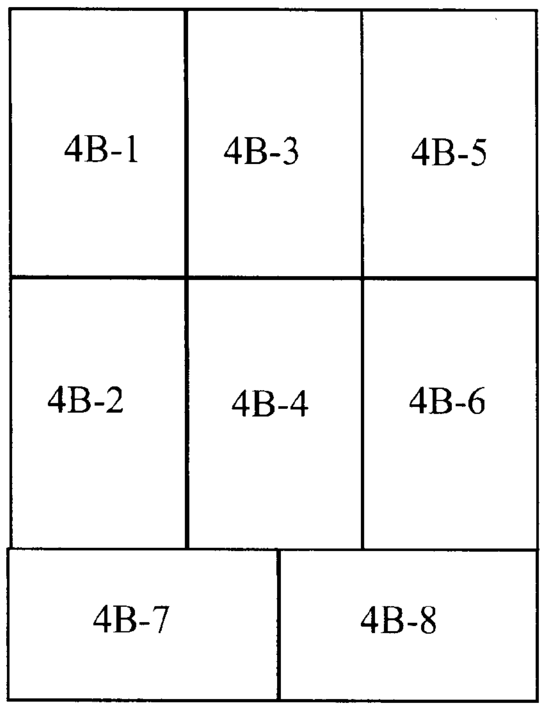
Figures 1, 4B:
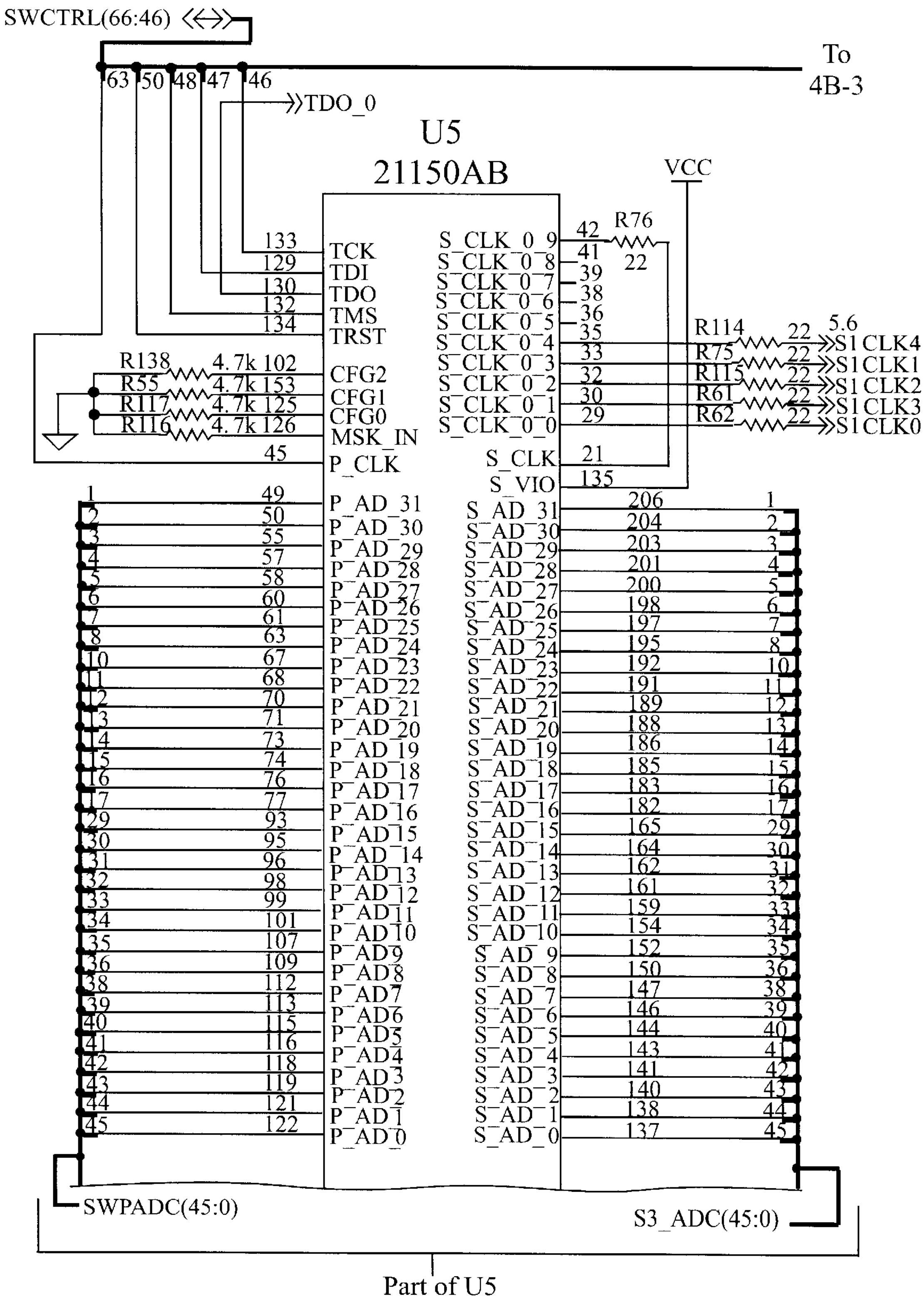
Figures 2, 4B:
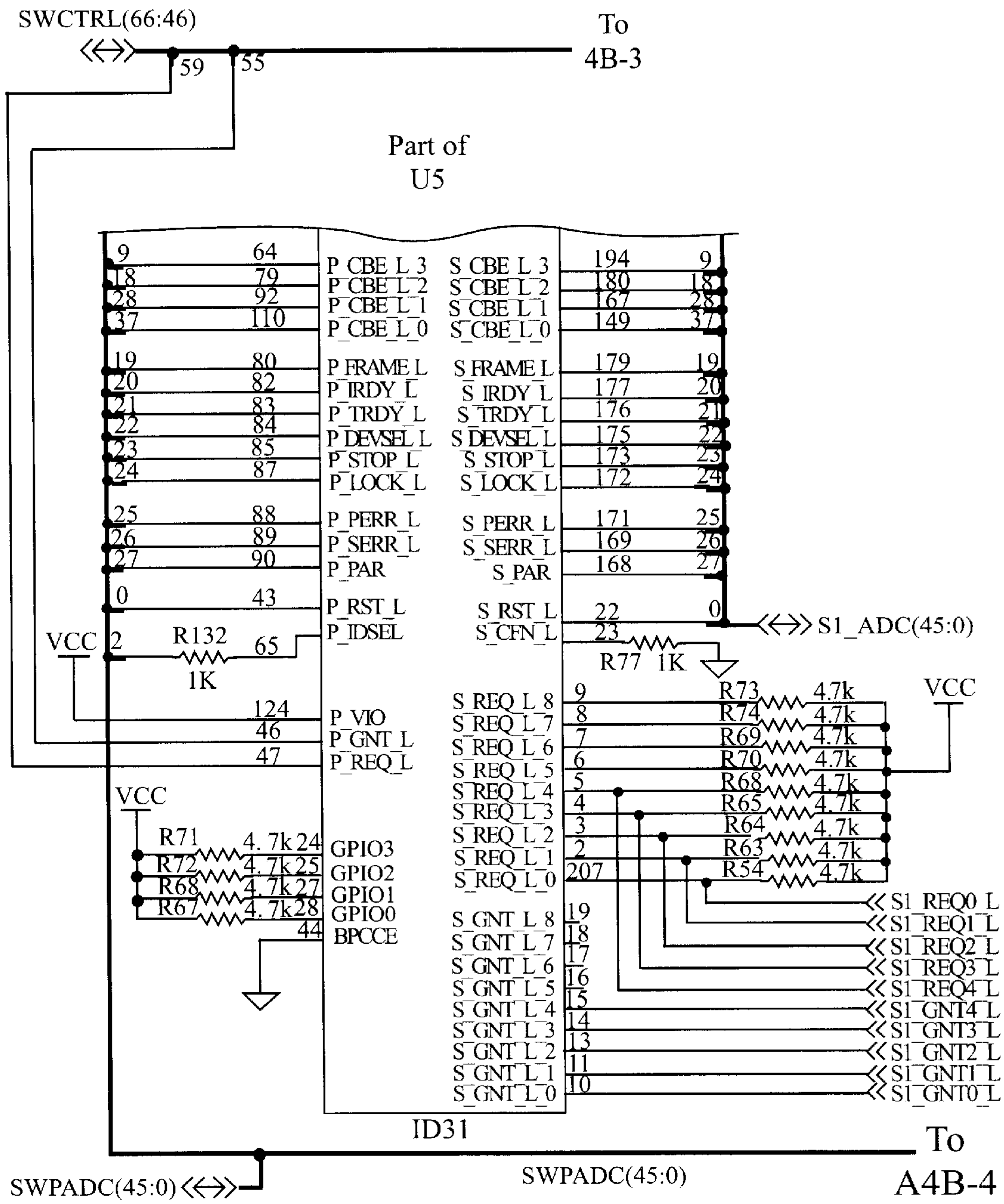
Figures 3, 4B:
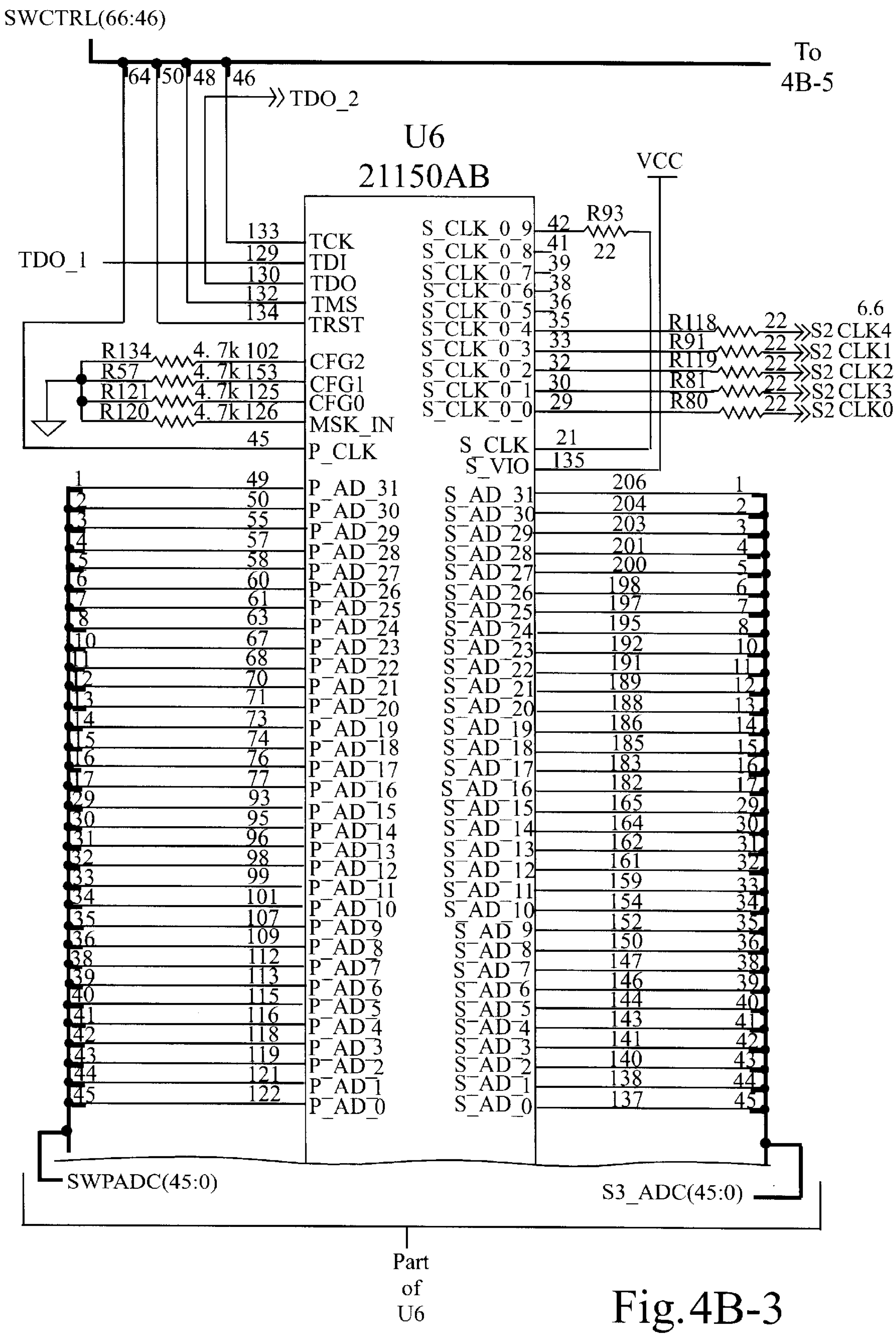
Figures 4, 4B:
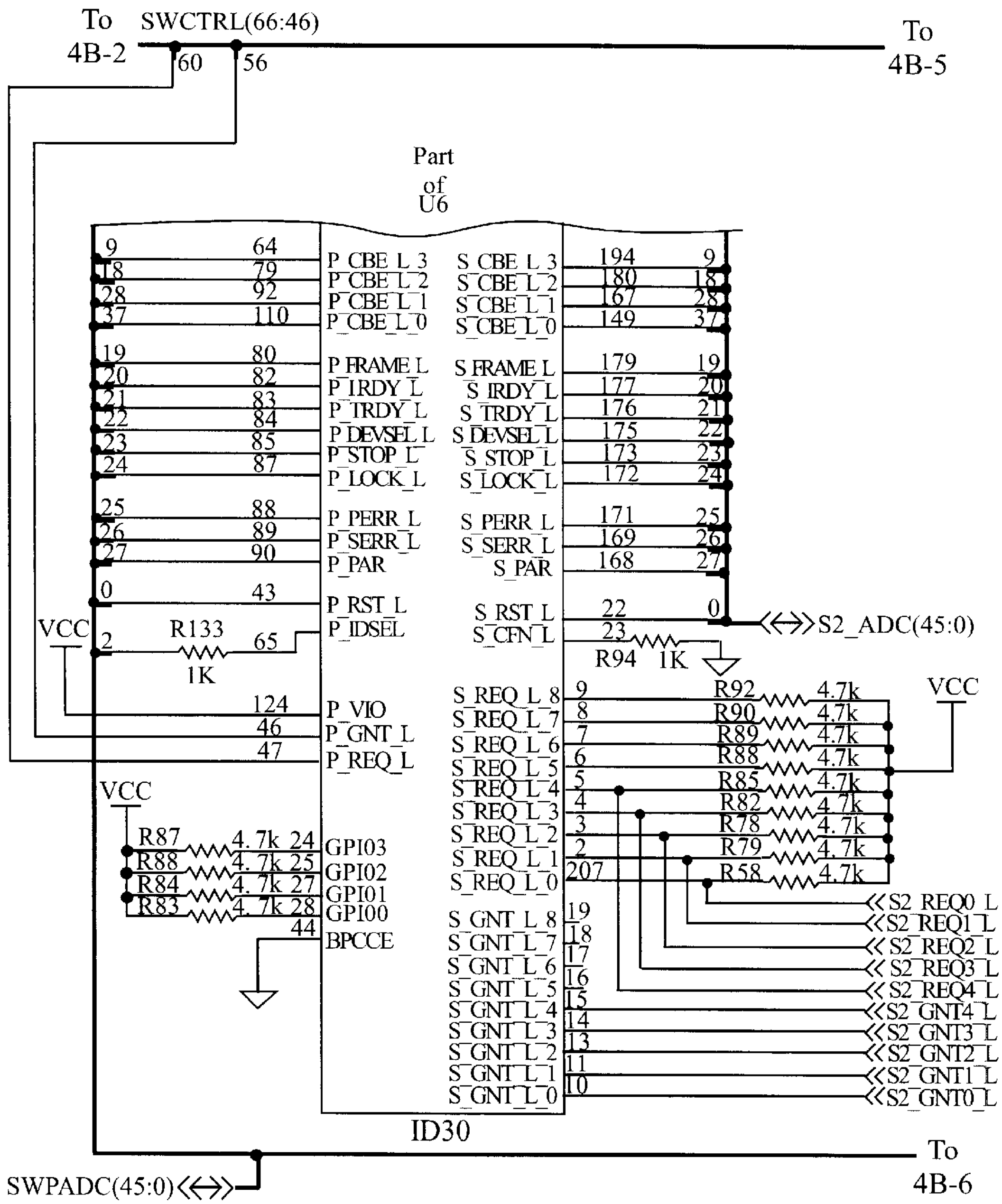
Figures 4, 4B, 5:
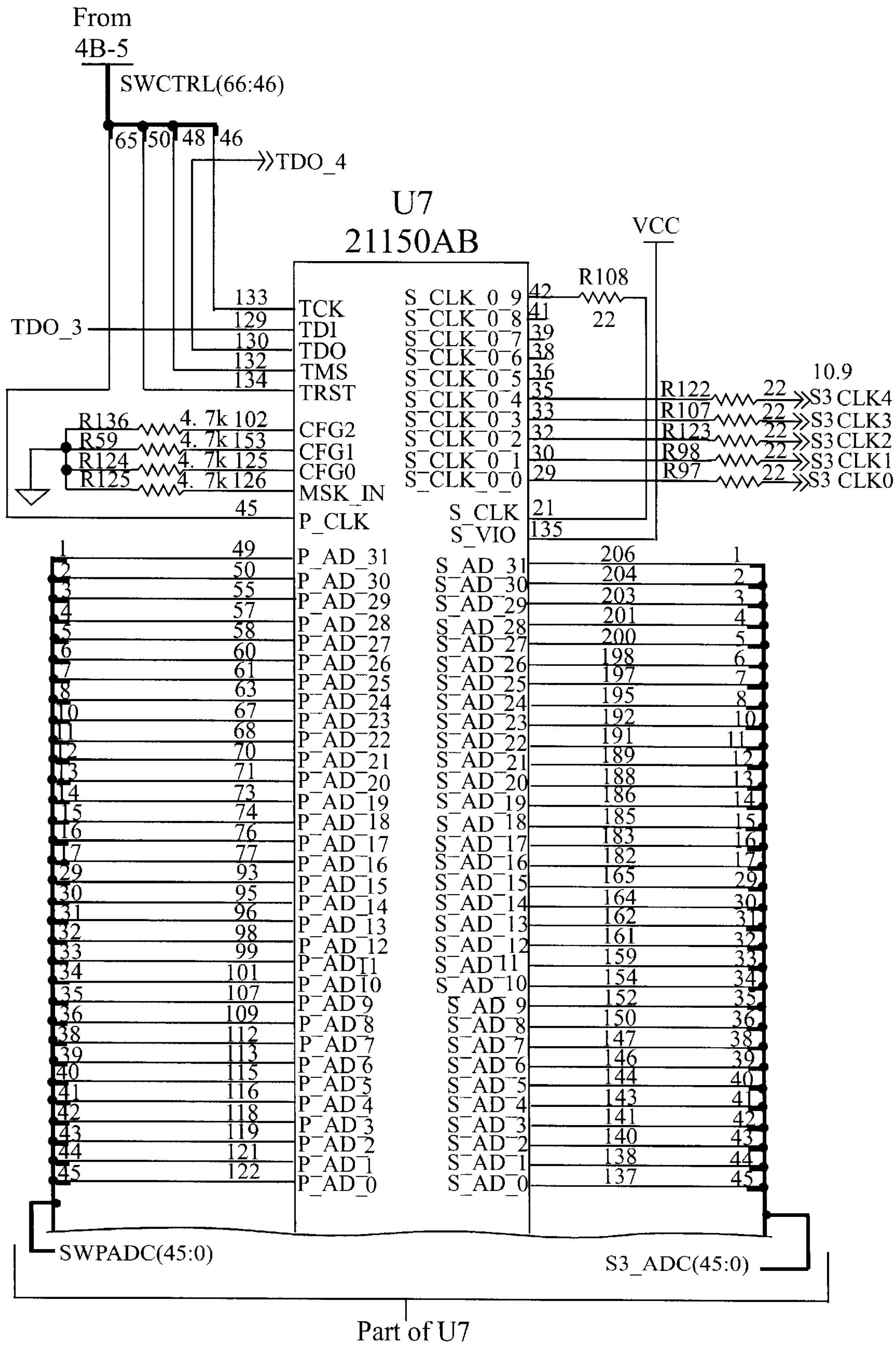
Figures 4, 4B, 5, 6:
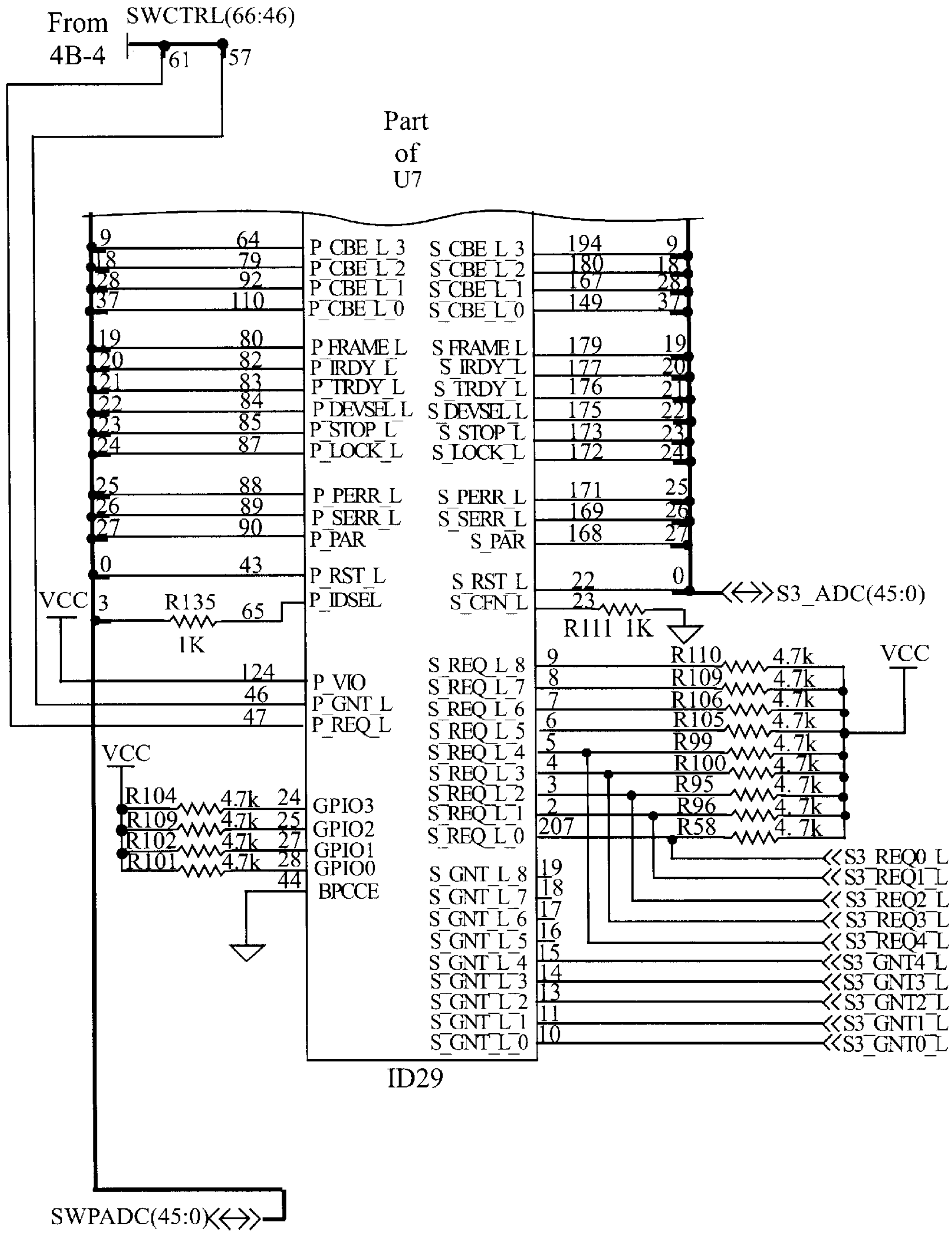
Figures 4, 4B, 5, 6, 7:
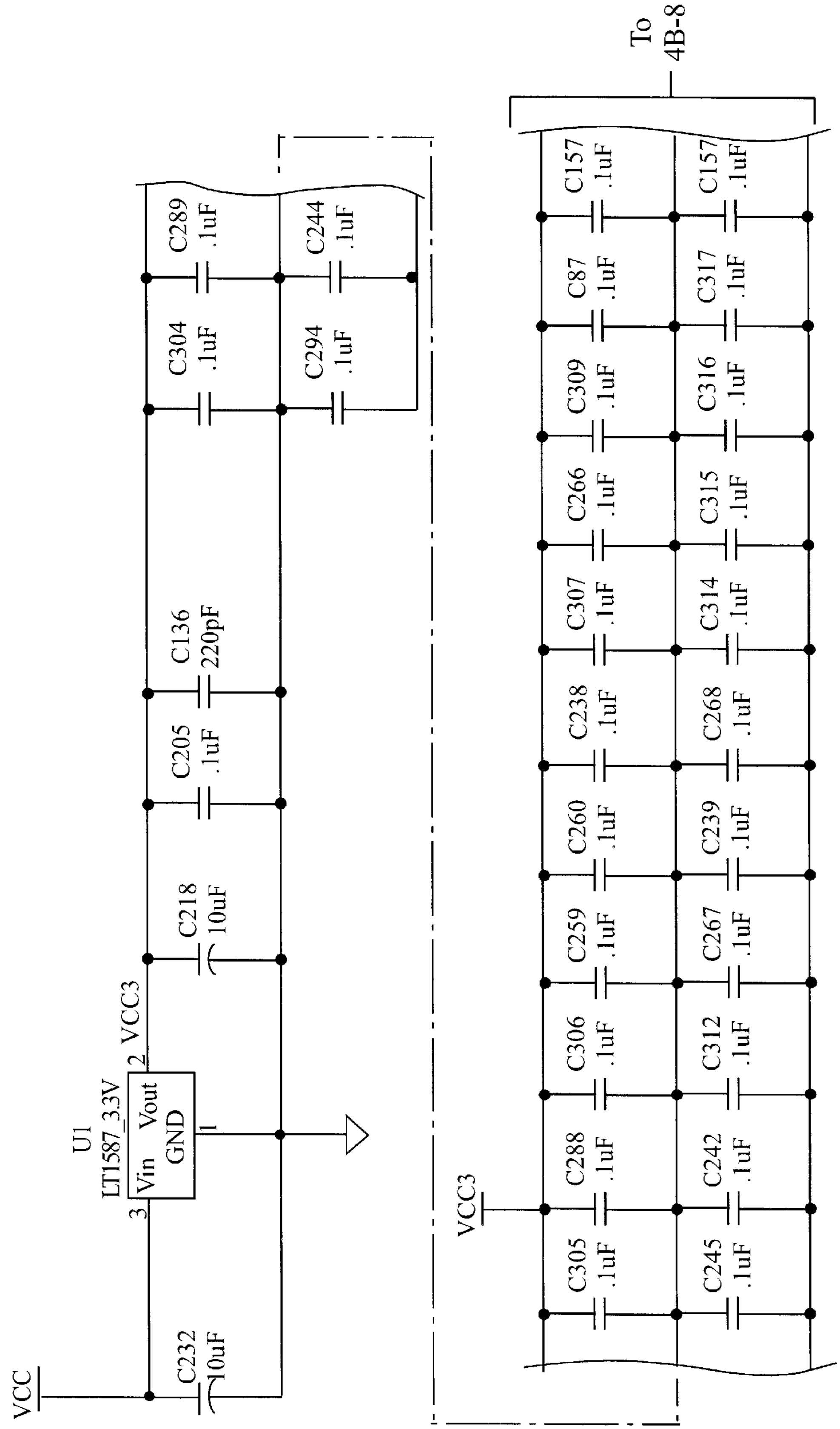
Figures 4, 4B, 5, 6, 7, 8:
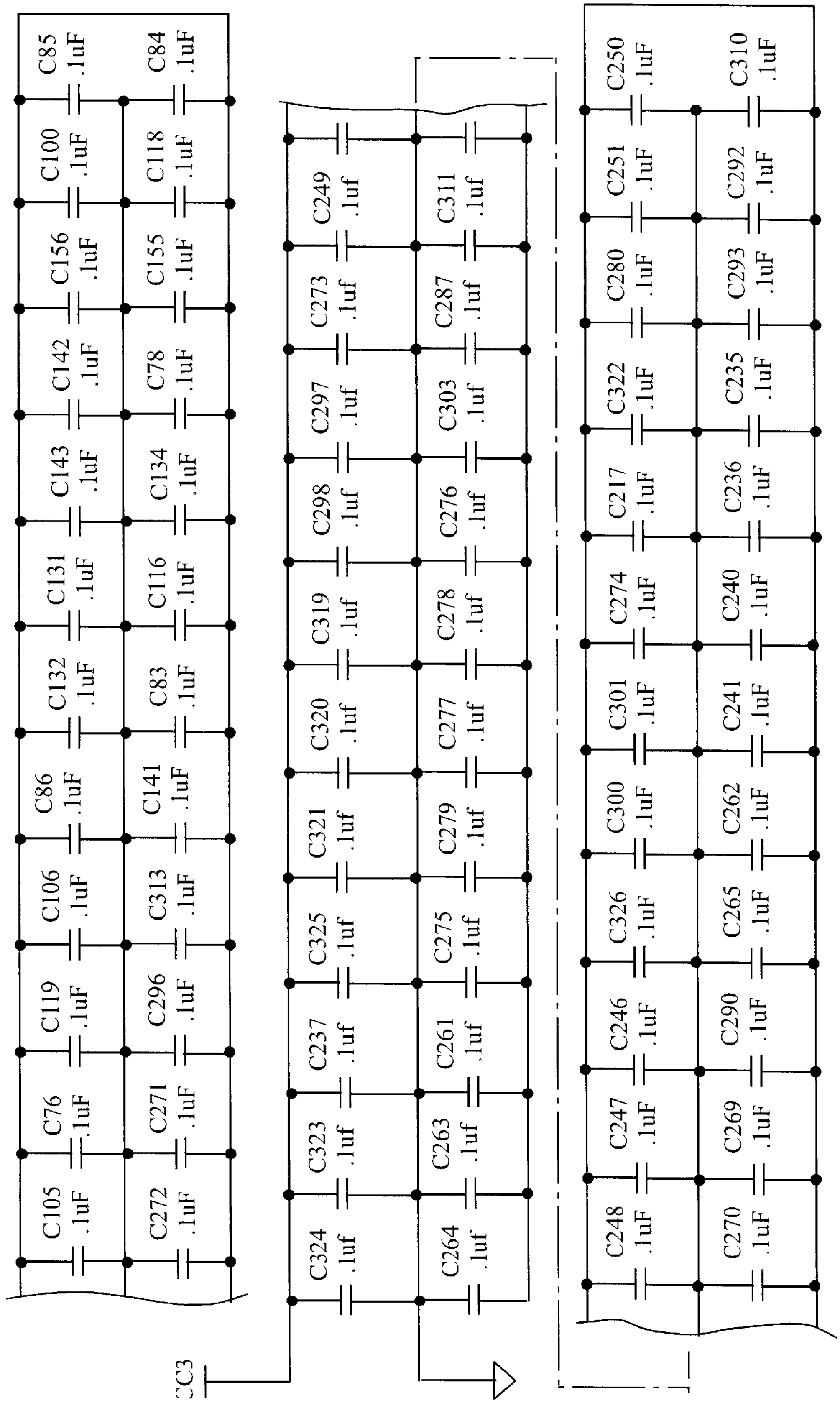
Figure 4C:
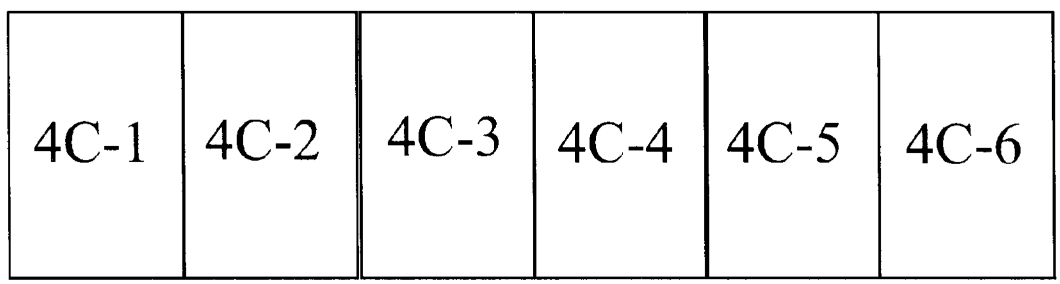
Figures 1, 4C:
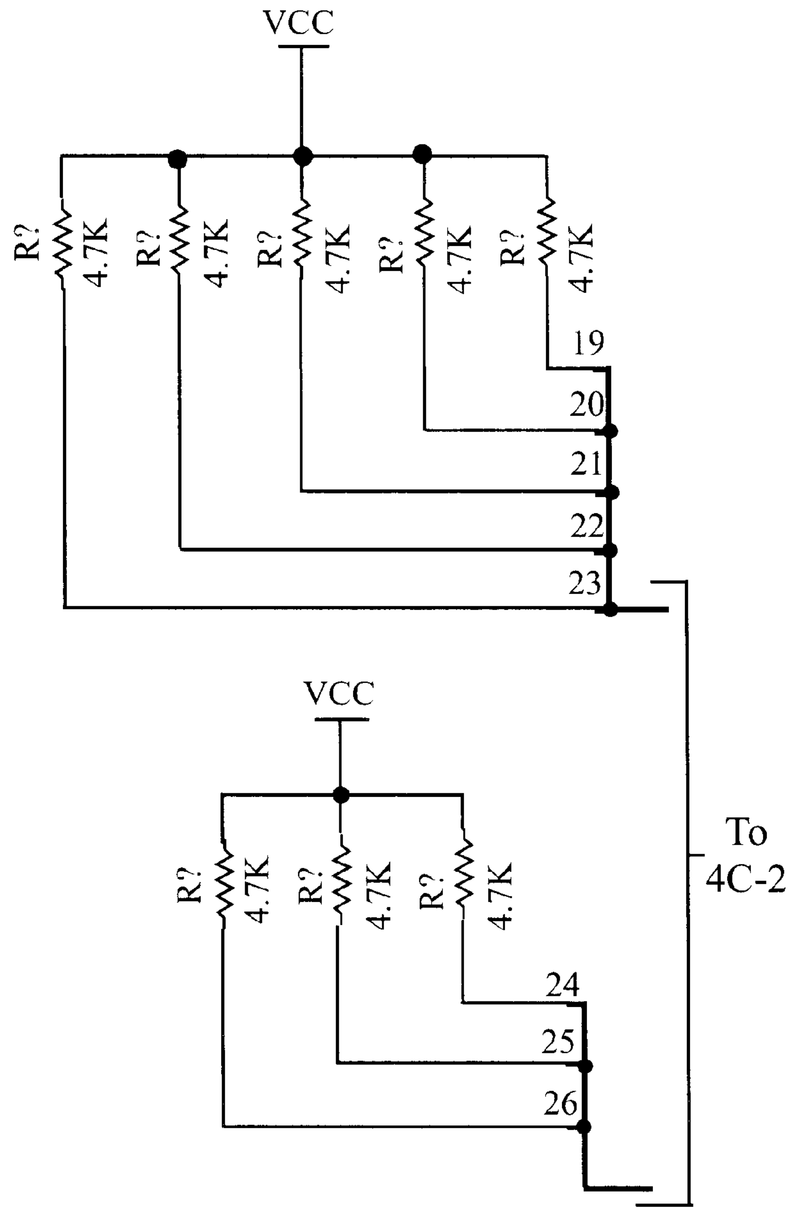
Figures 2, 4C:
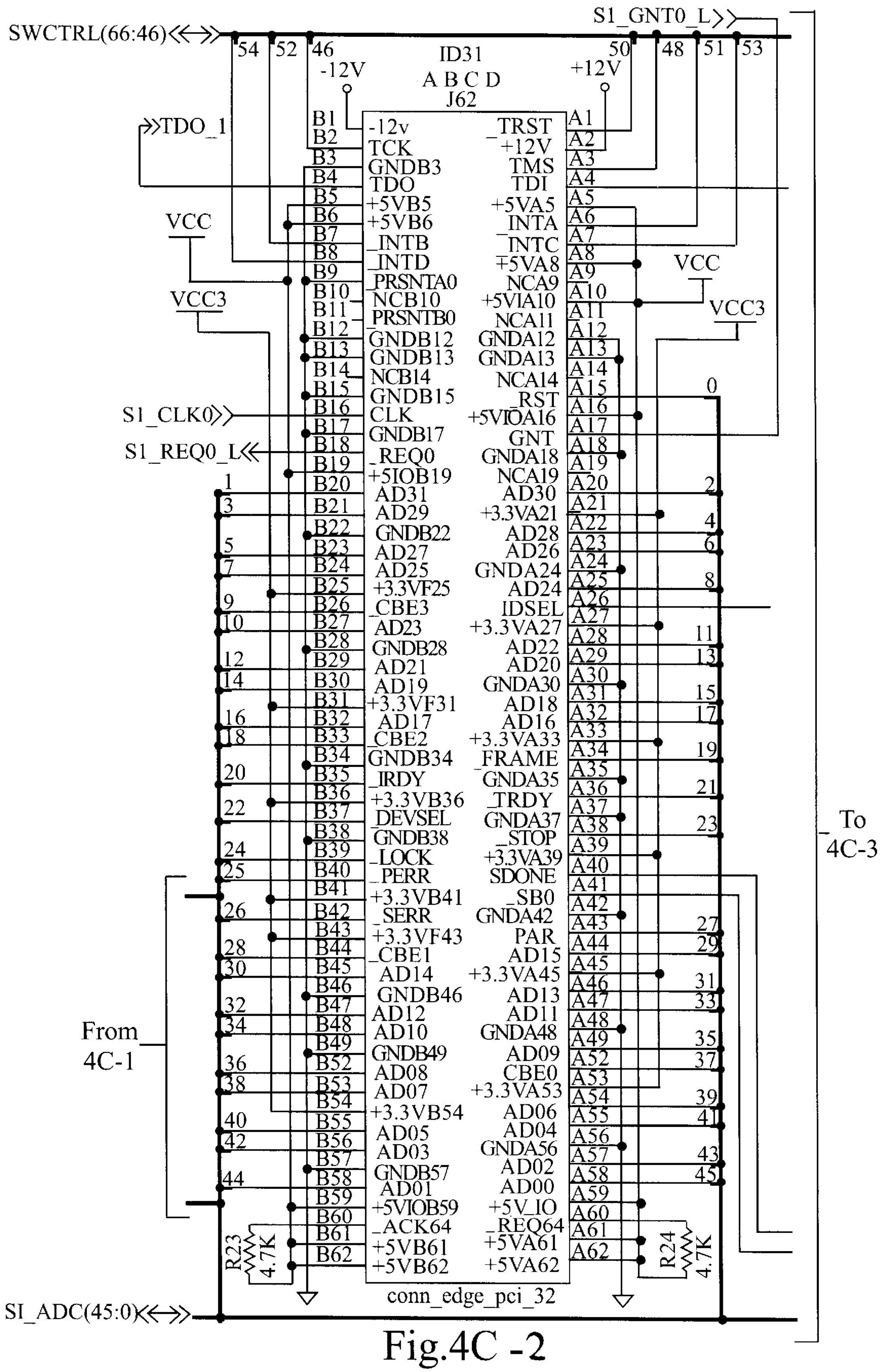
Figures 3, 4C:
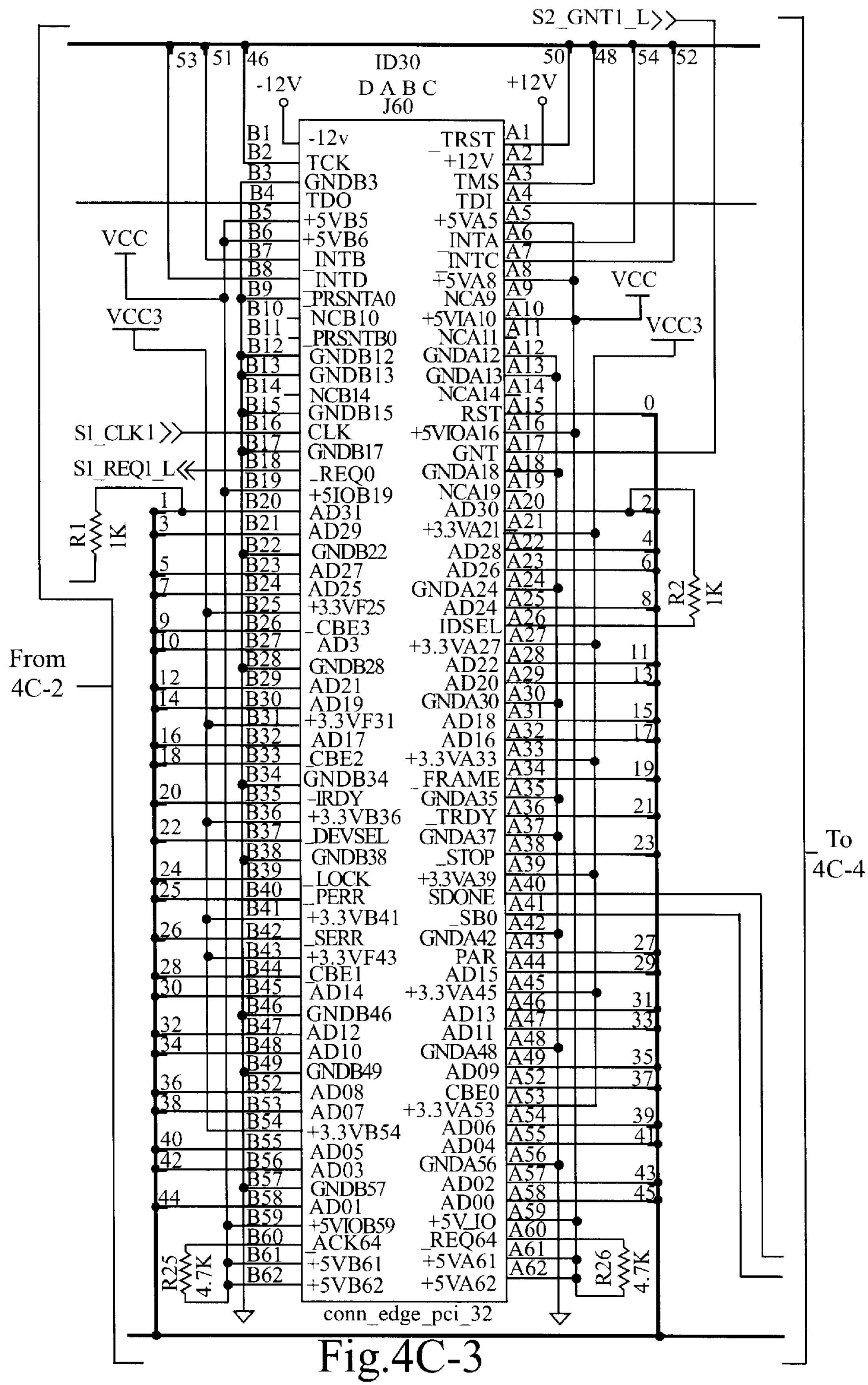
Figures 4, 4C:
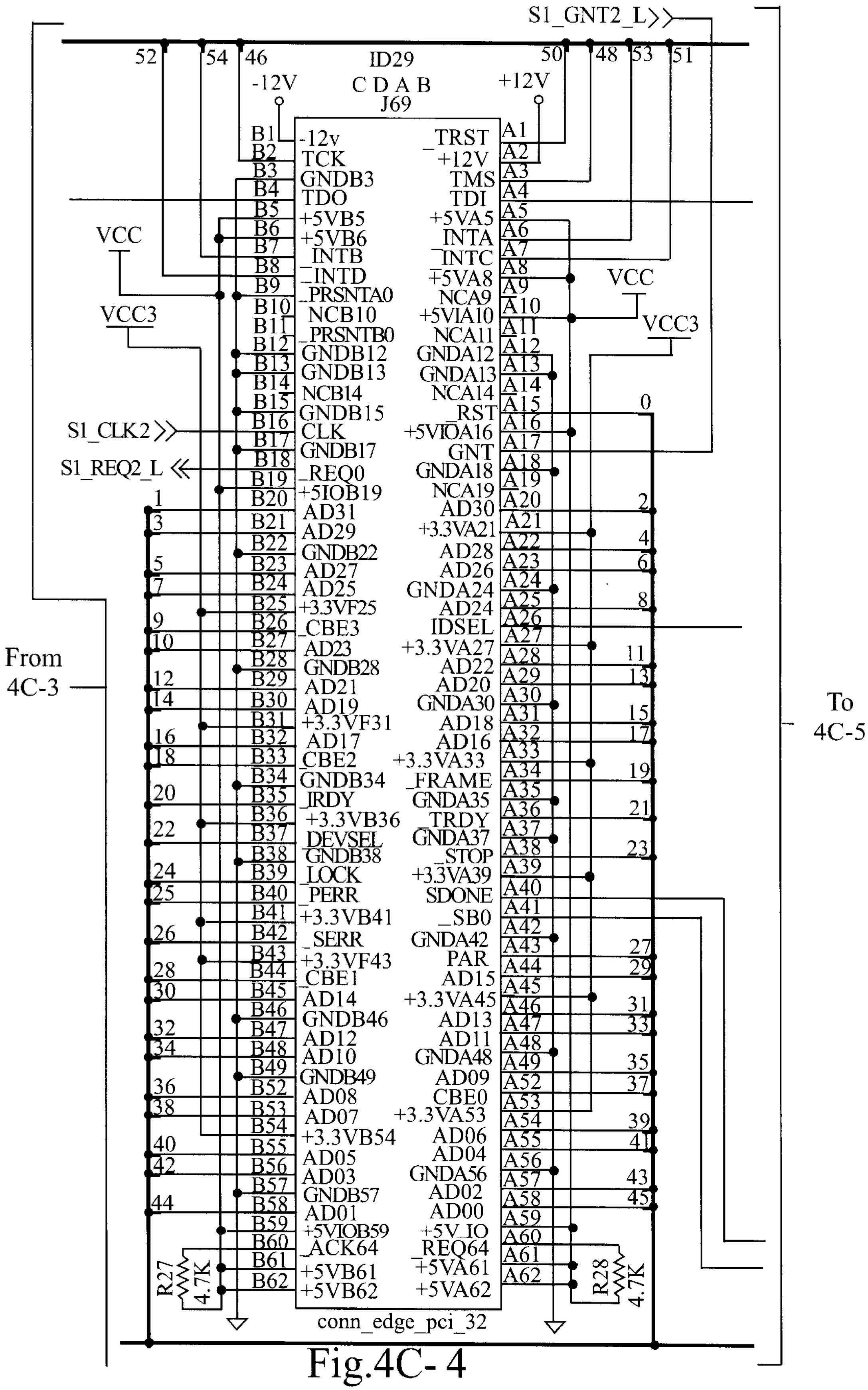
Figures 4, 4C, 5:
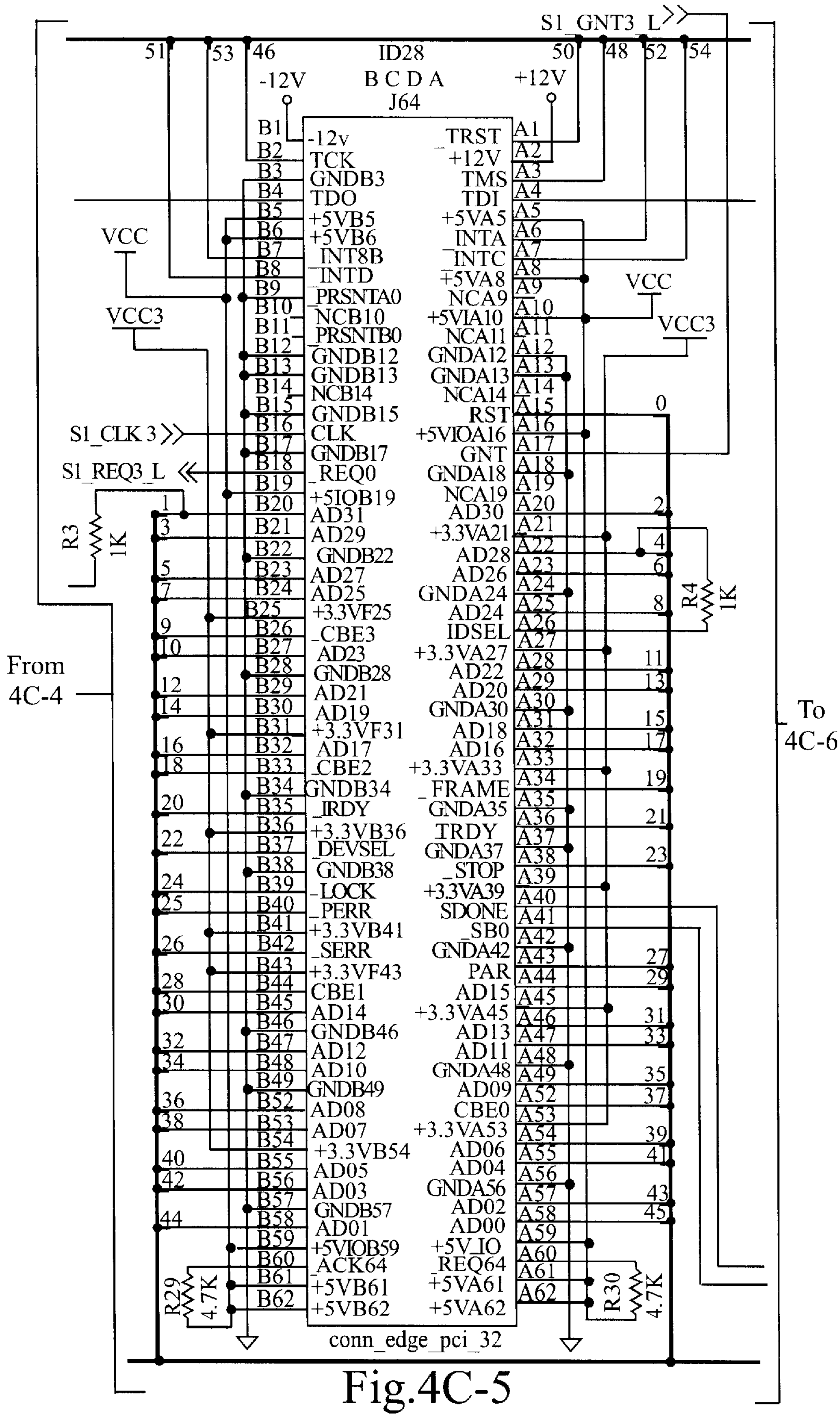
Figures 4, 4C, 5, 6:
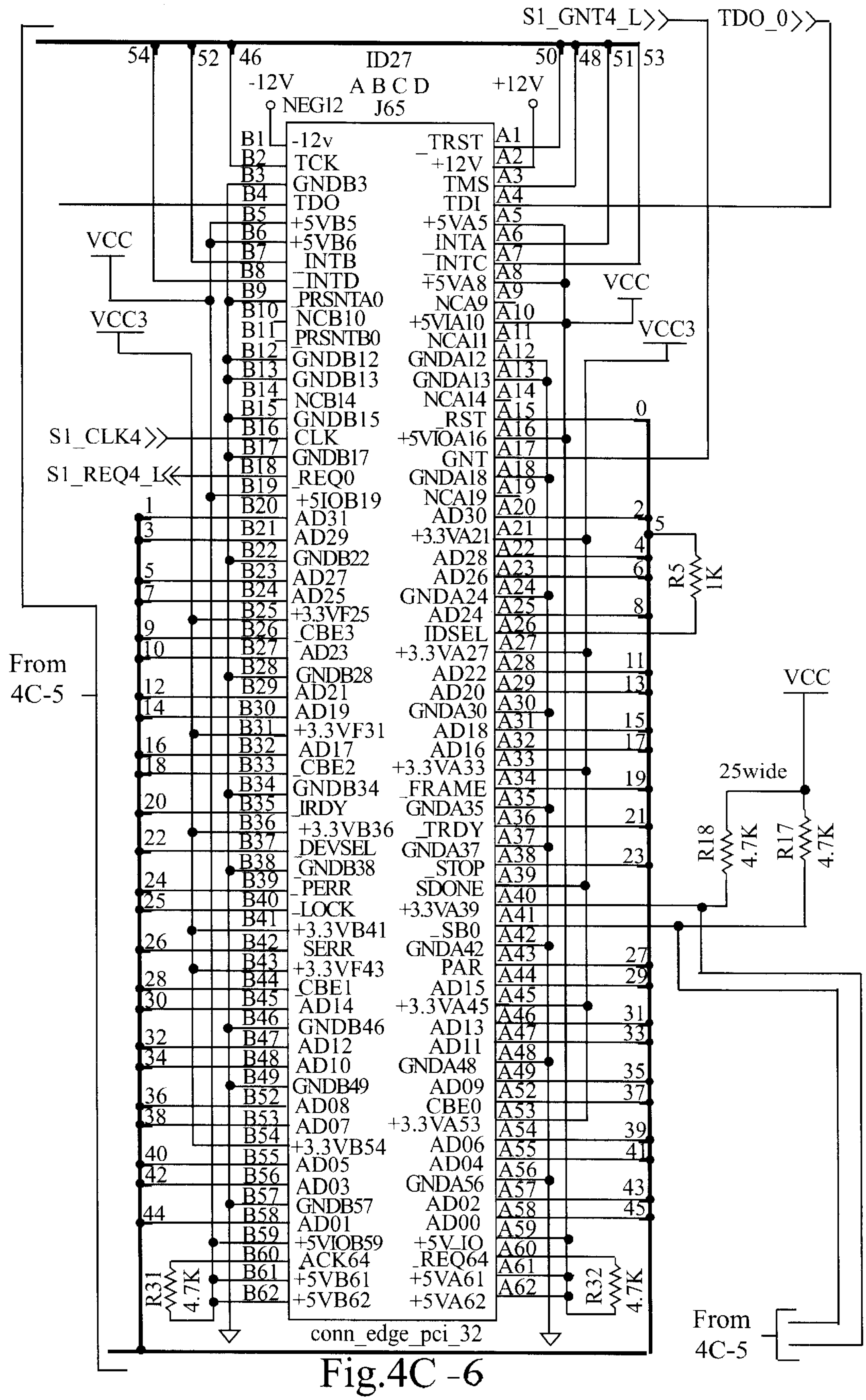
Figure 4D:
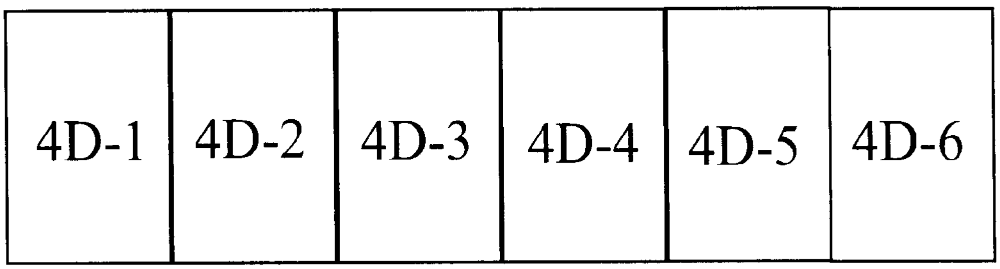
Figures 1, 4D:
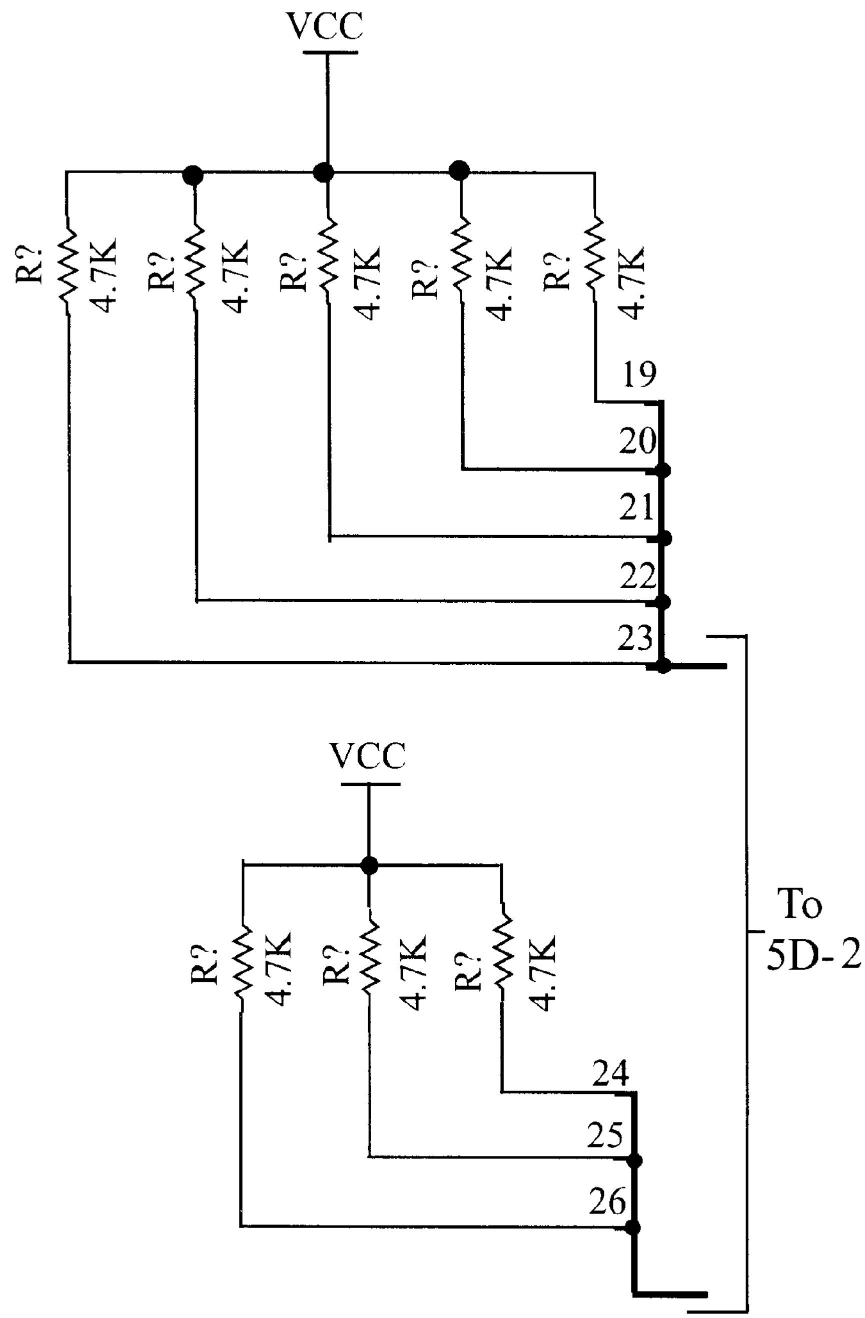
Figures 2, 4D:
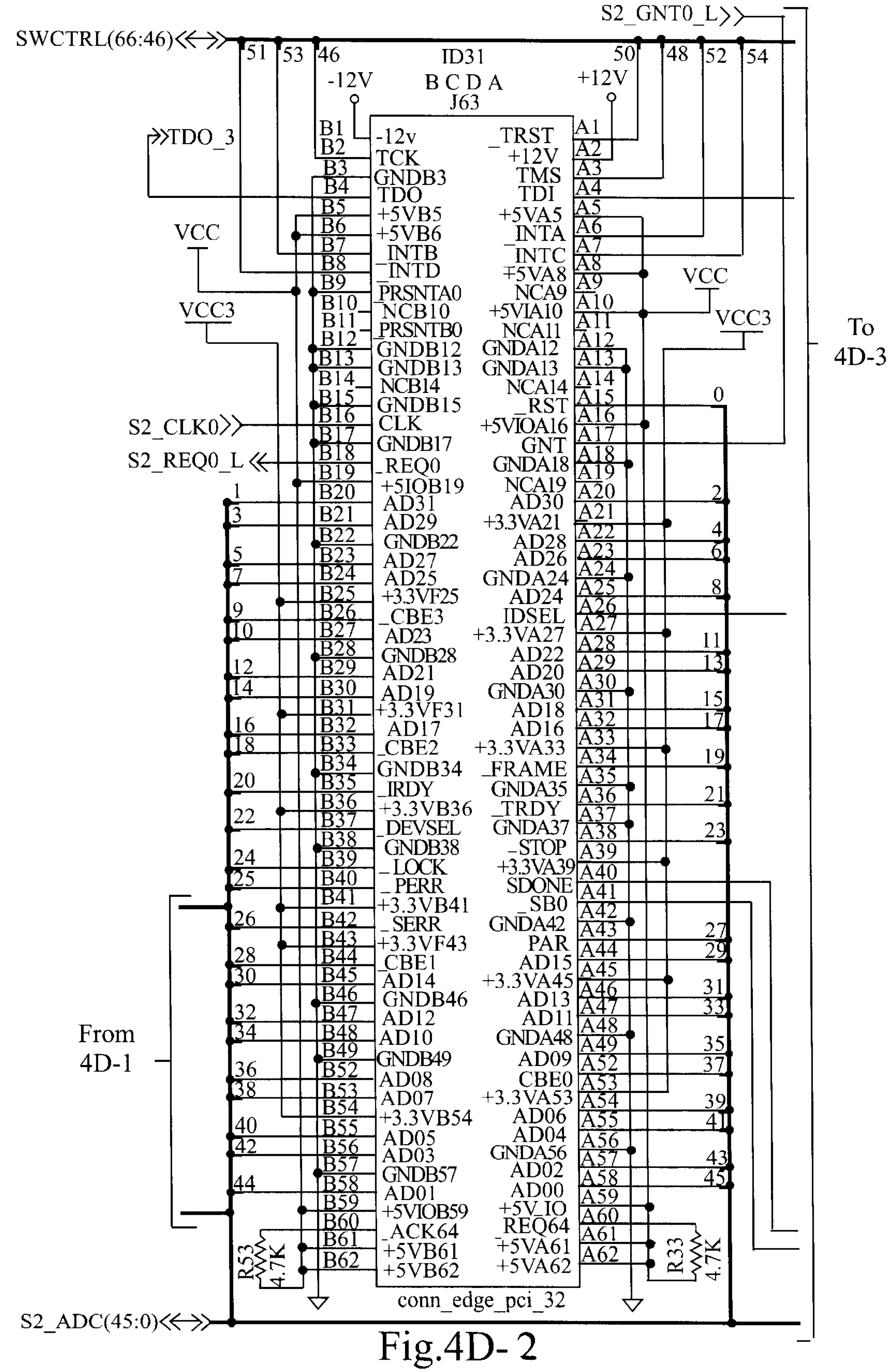
Figures 3, 4D:
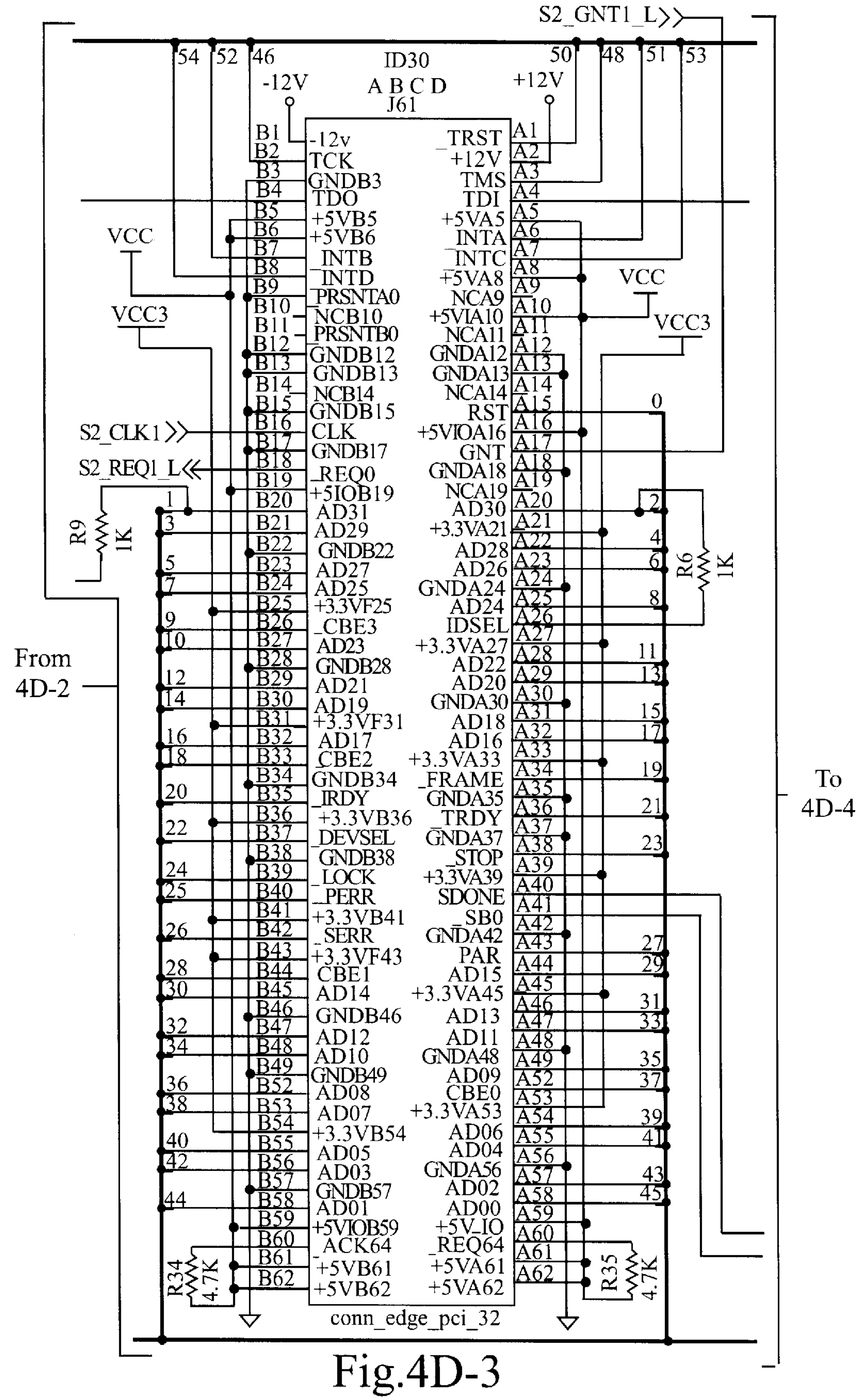
Figures 4, 4D:
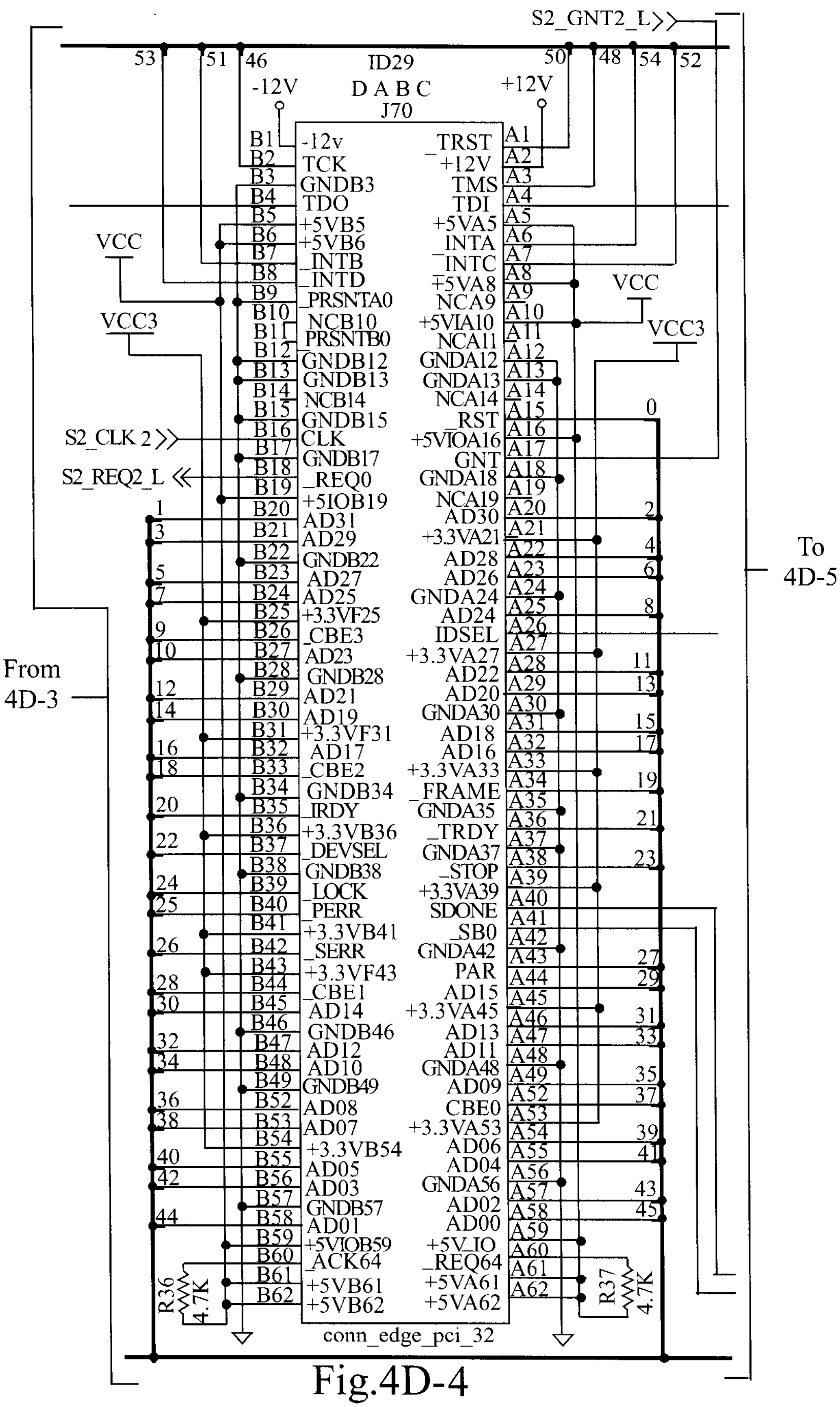
Figures 4, 4D, 5:
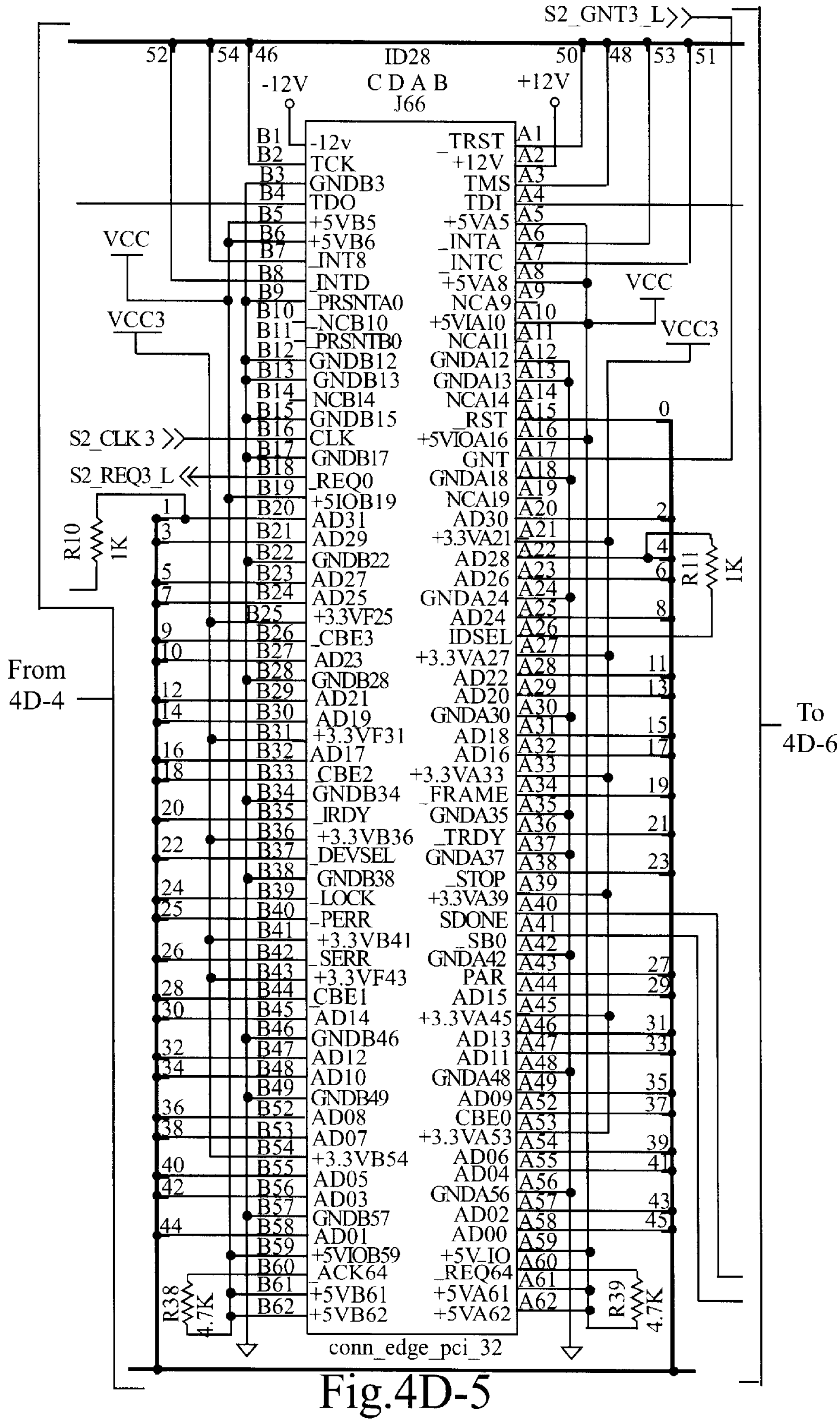
Figures 4, 4D, 5, 6:
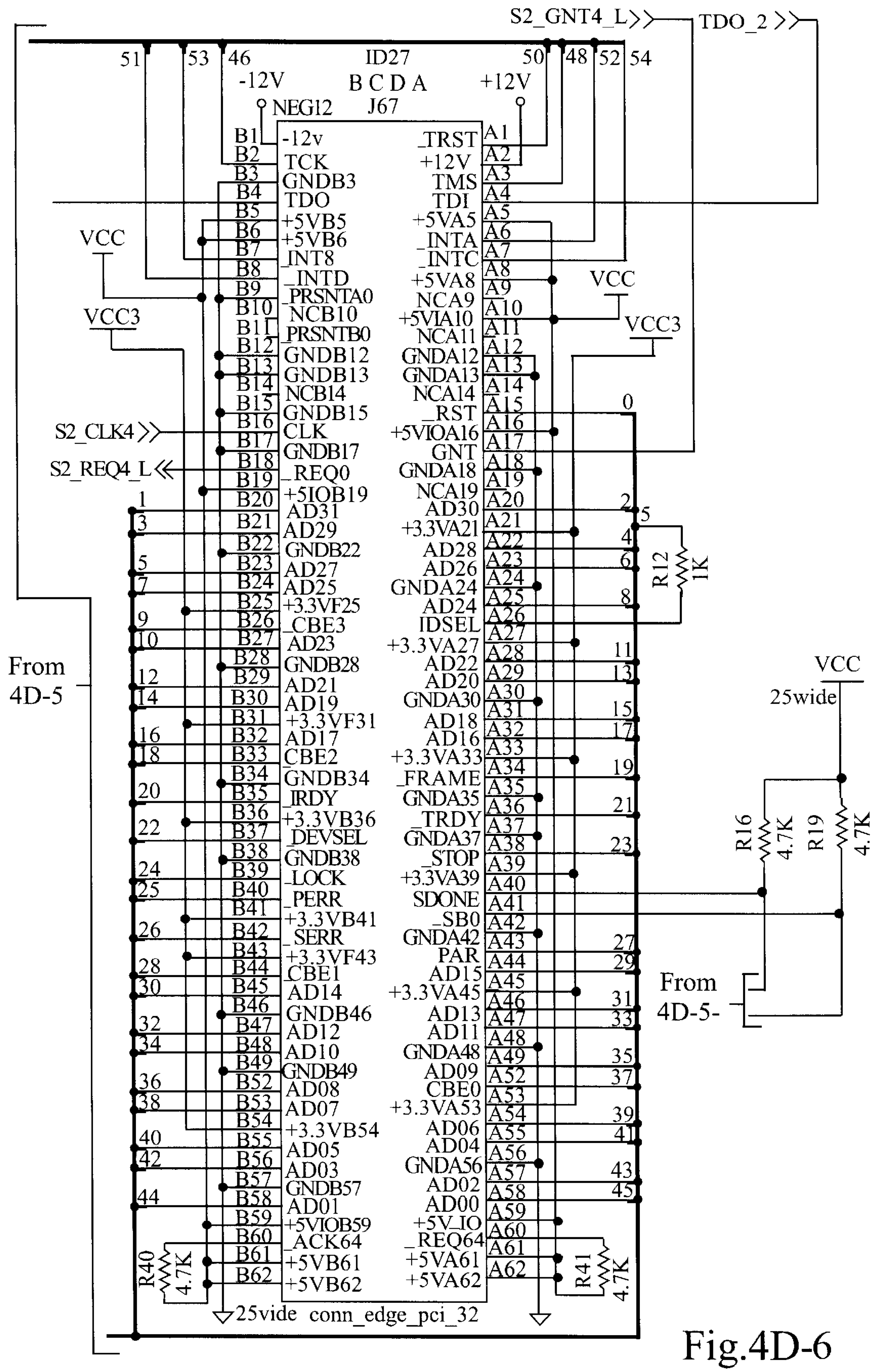
Figure 4E:
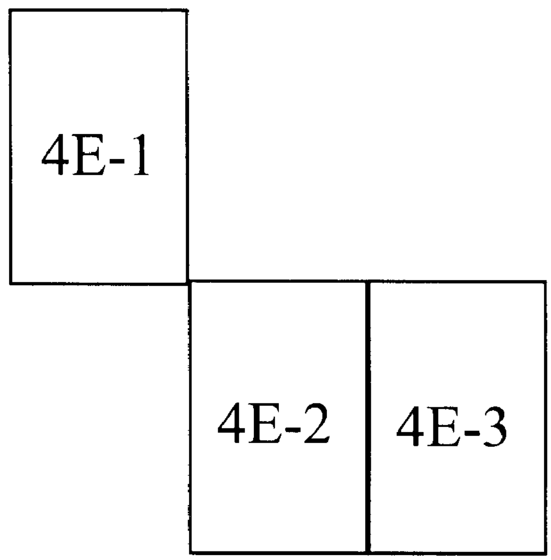
Figures 1, 4E:
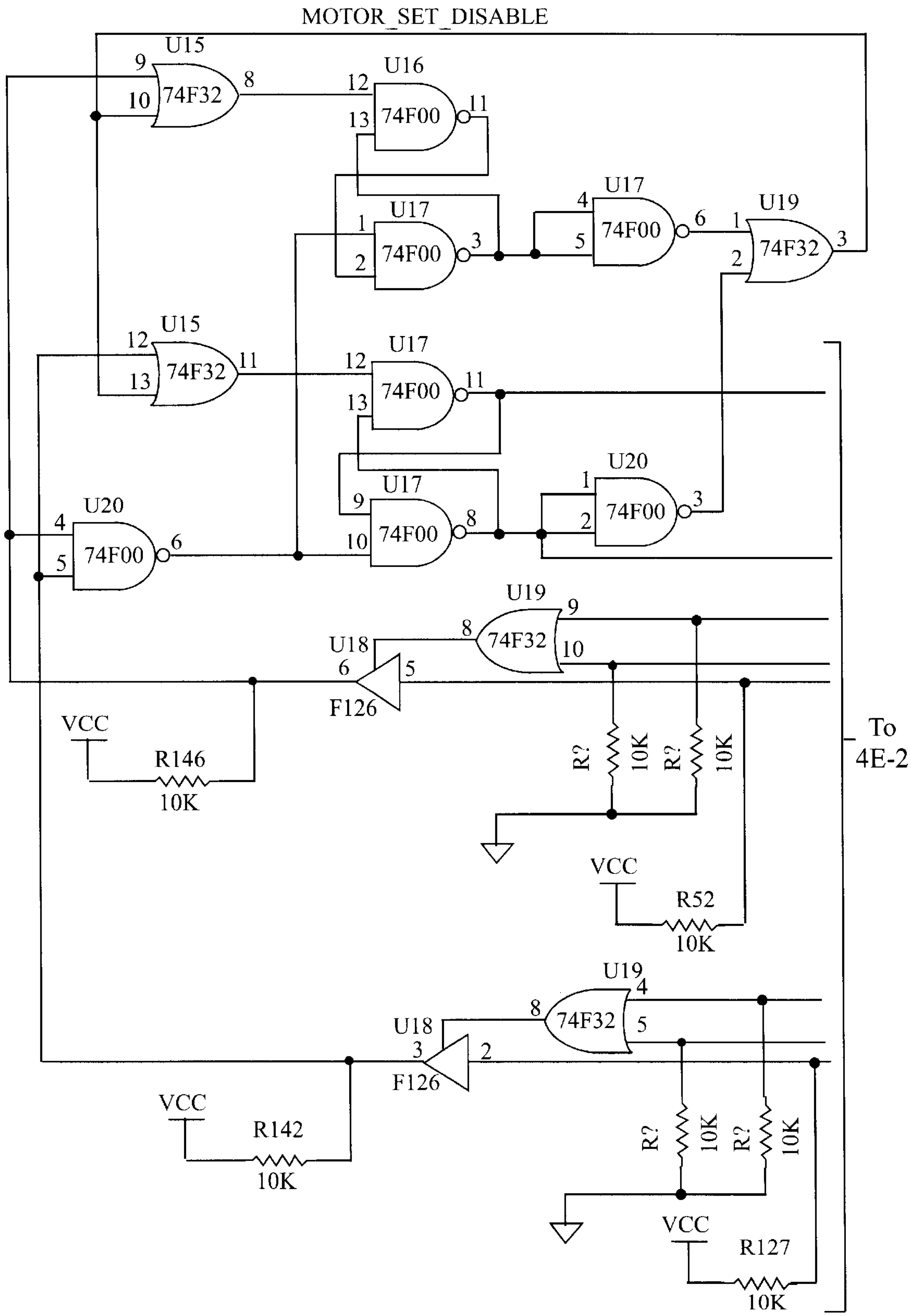
Figures 2, 4E:
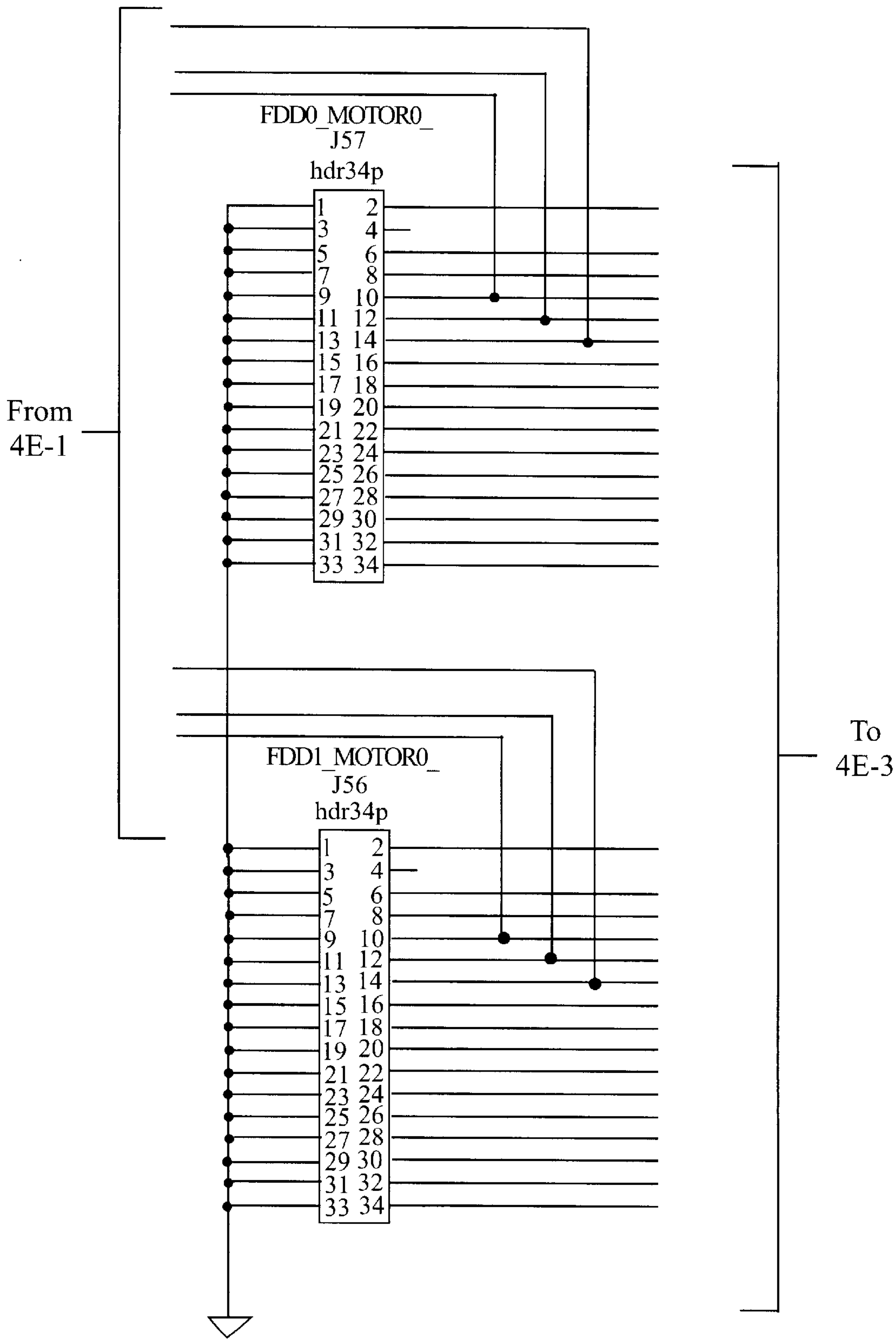
Figures 3, 4E:
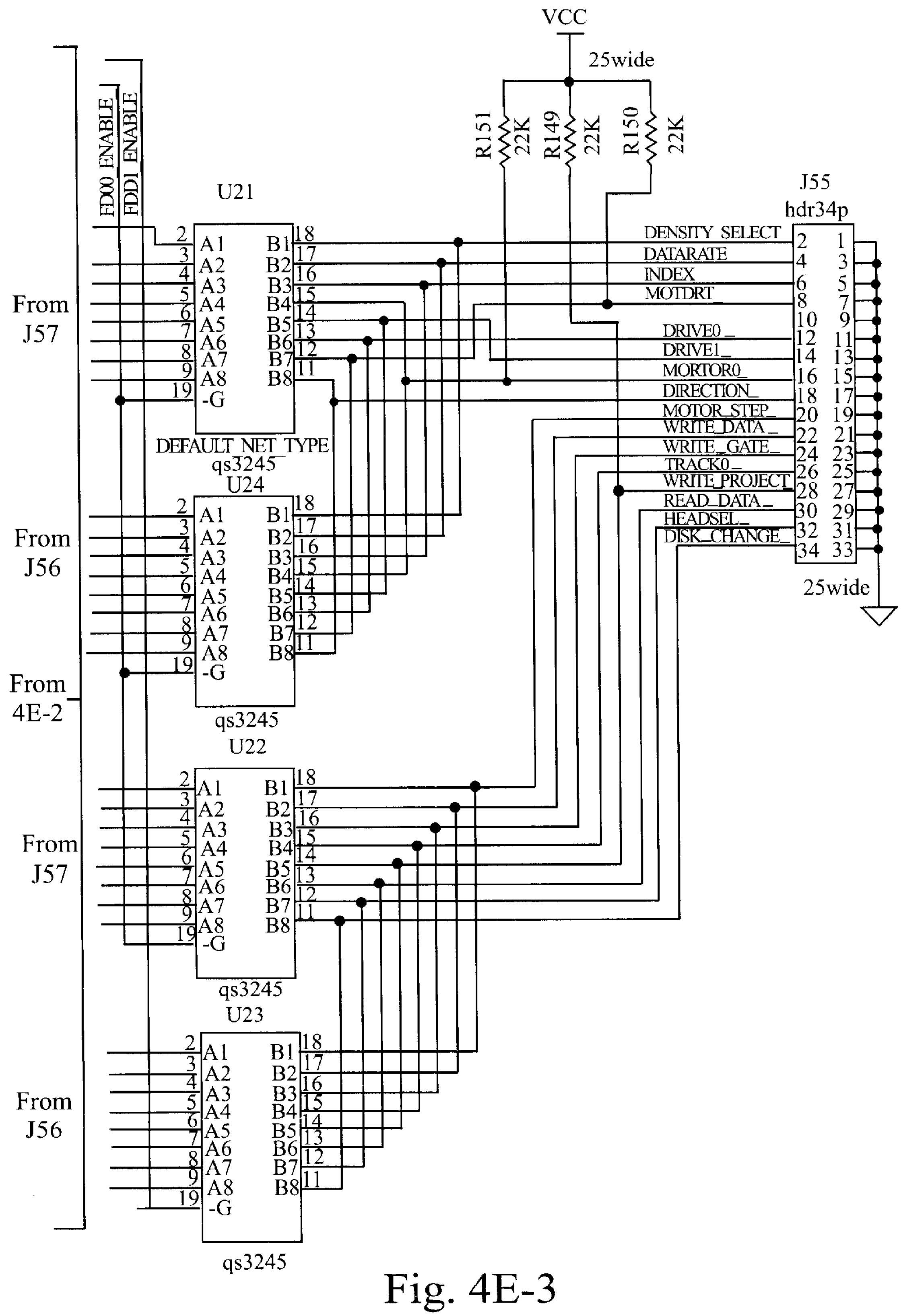
Figure 4F:
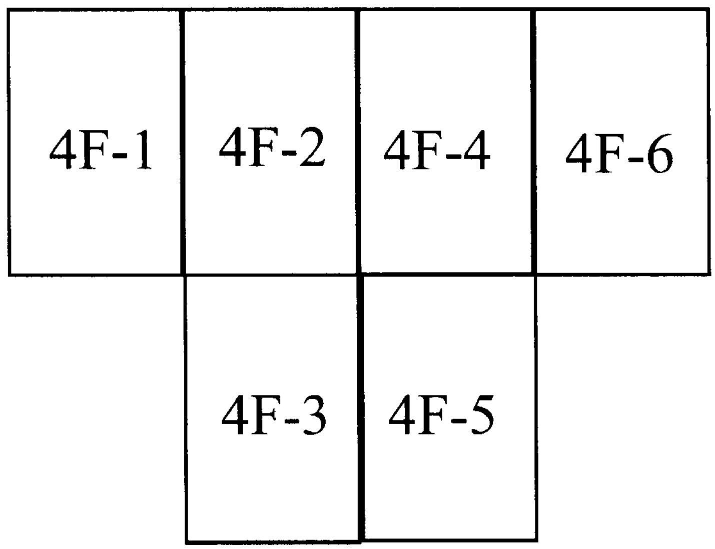
Figures 1, 4F:
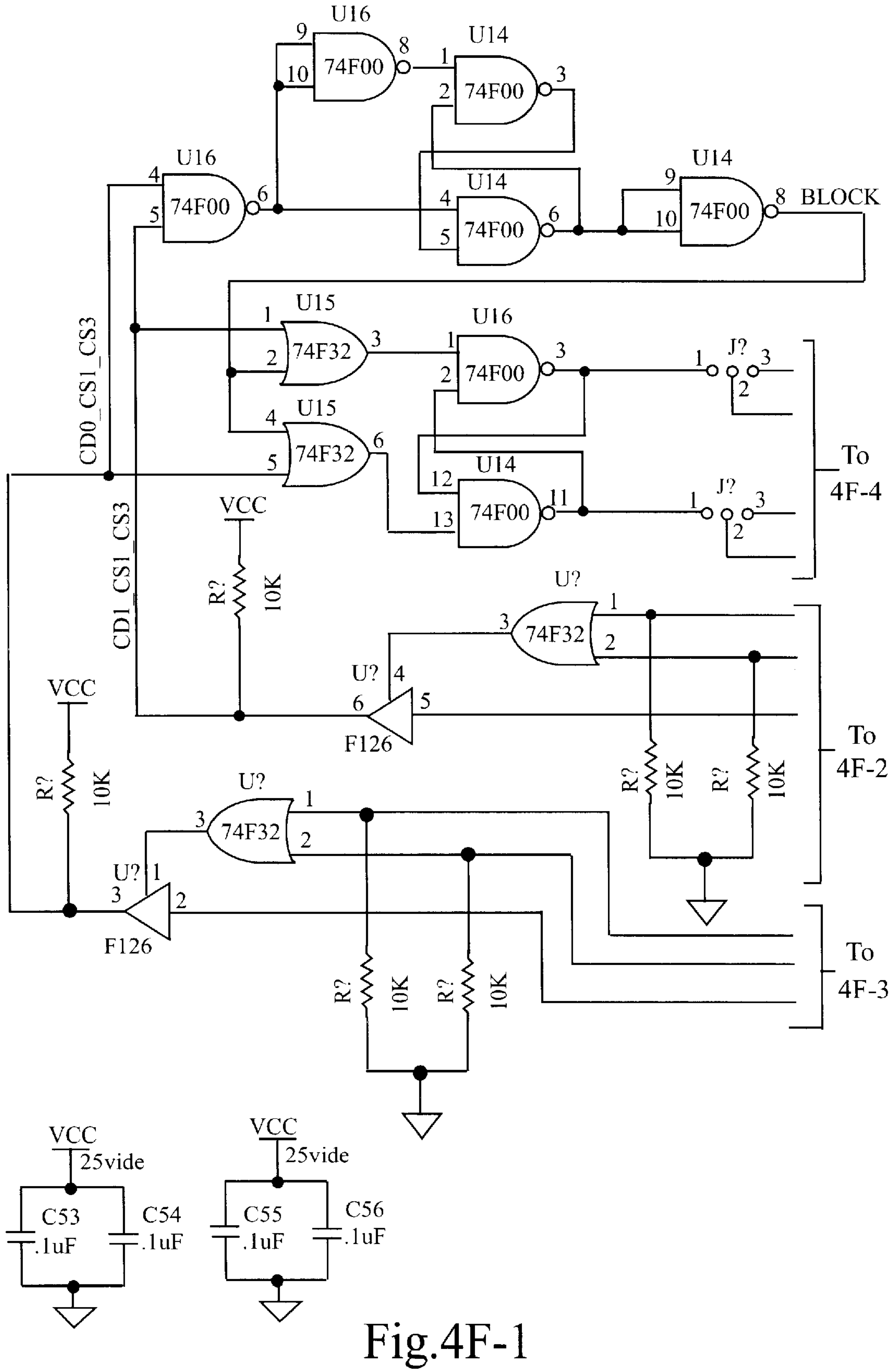
Figures 2, 4F:
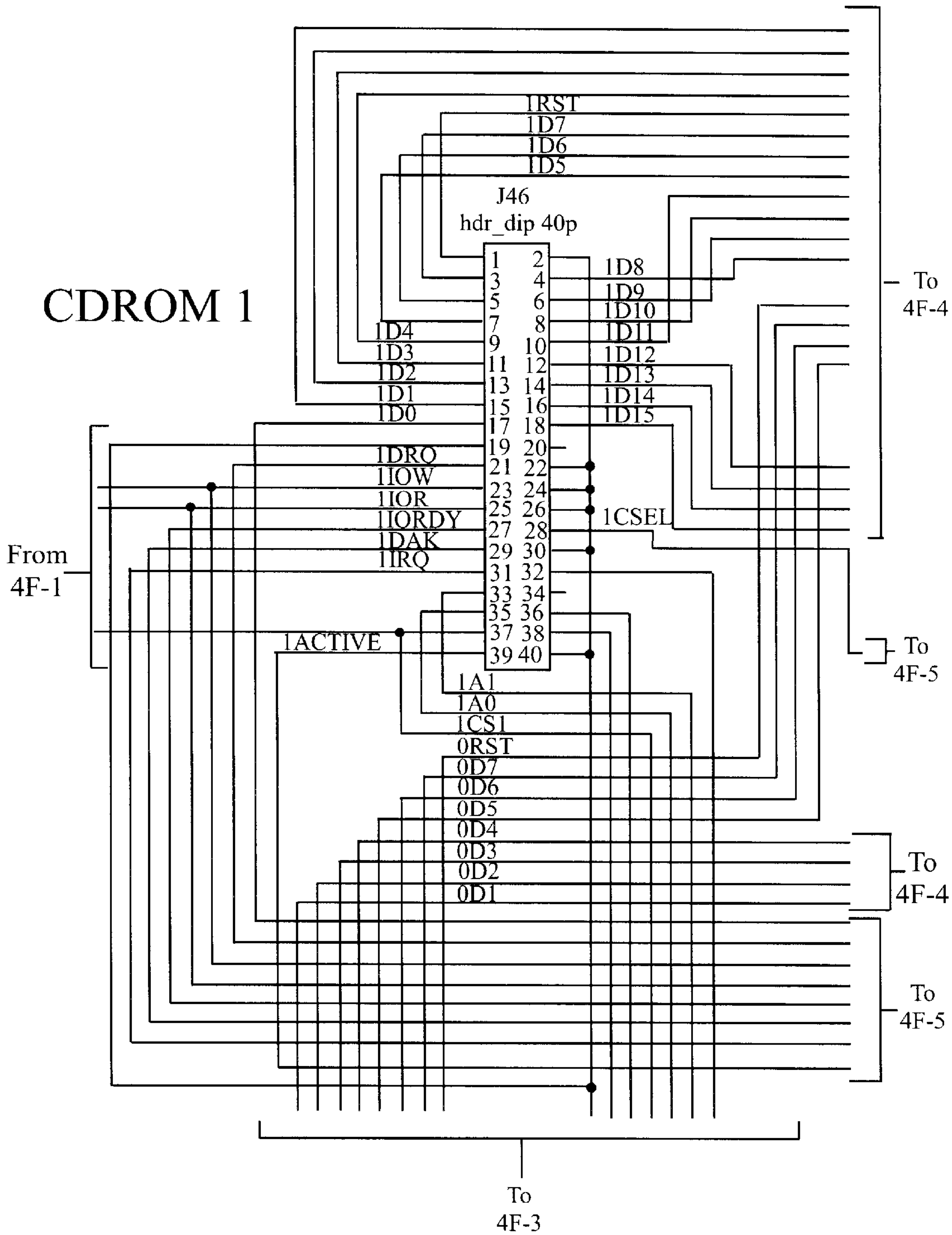
Figures 3, 4F:
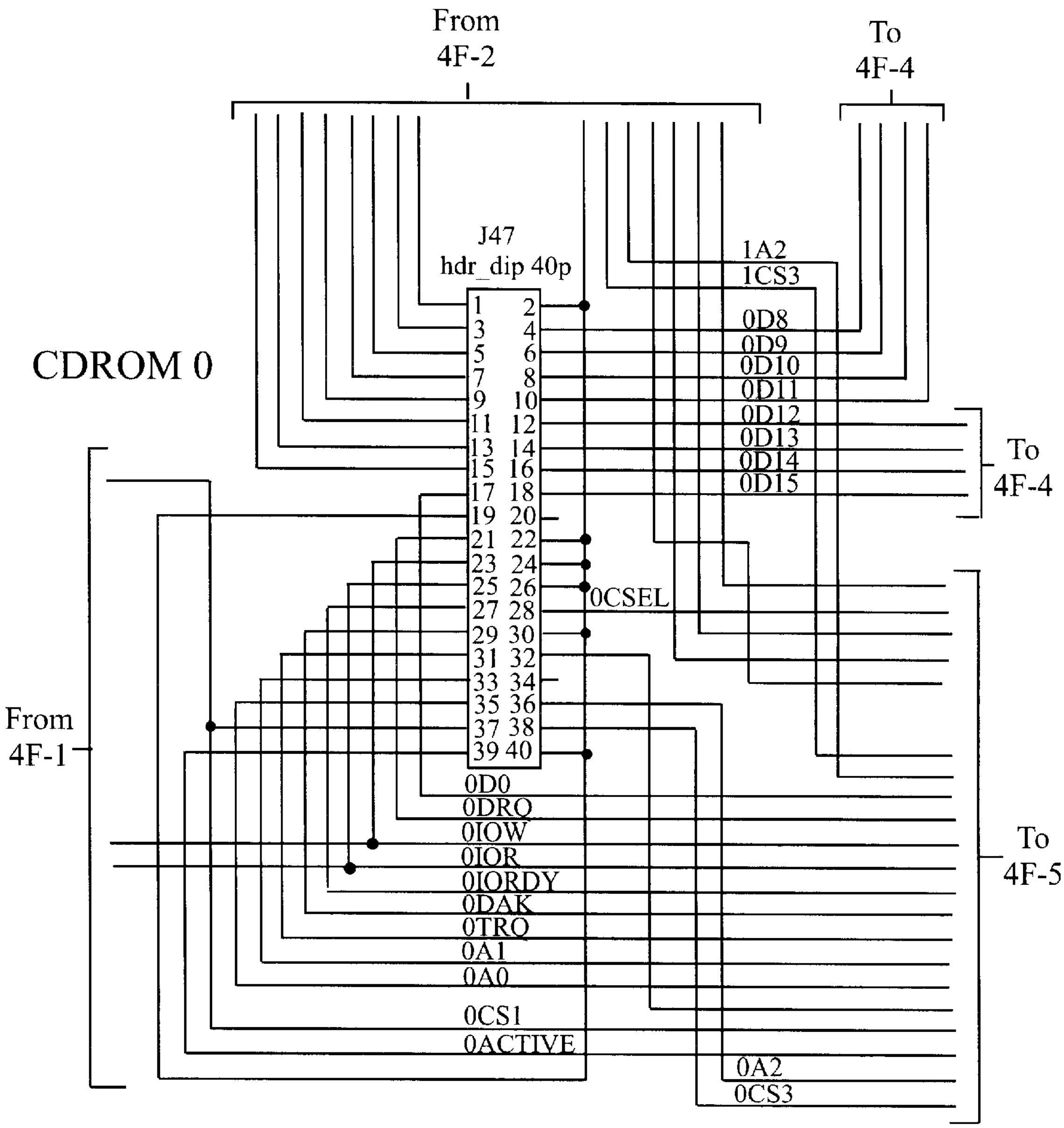
Figures 4, 4F:
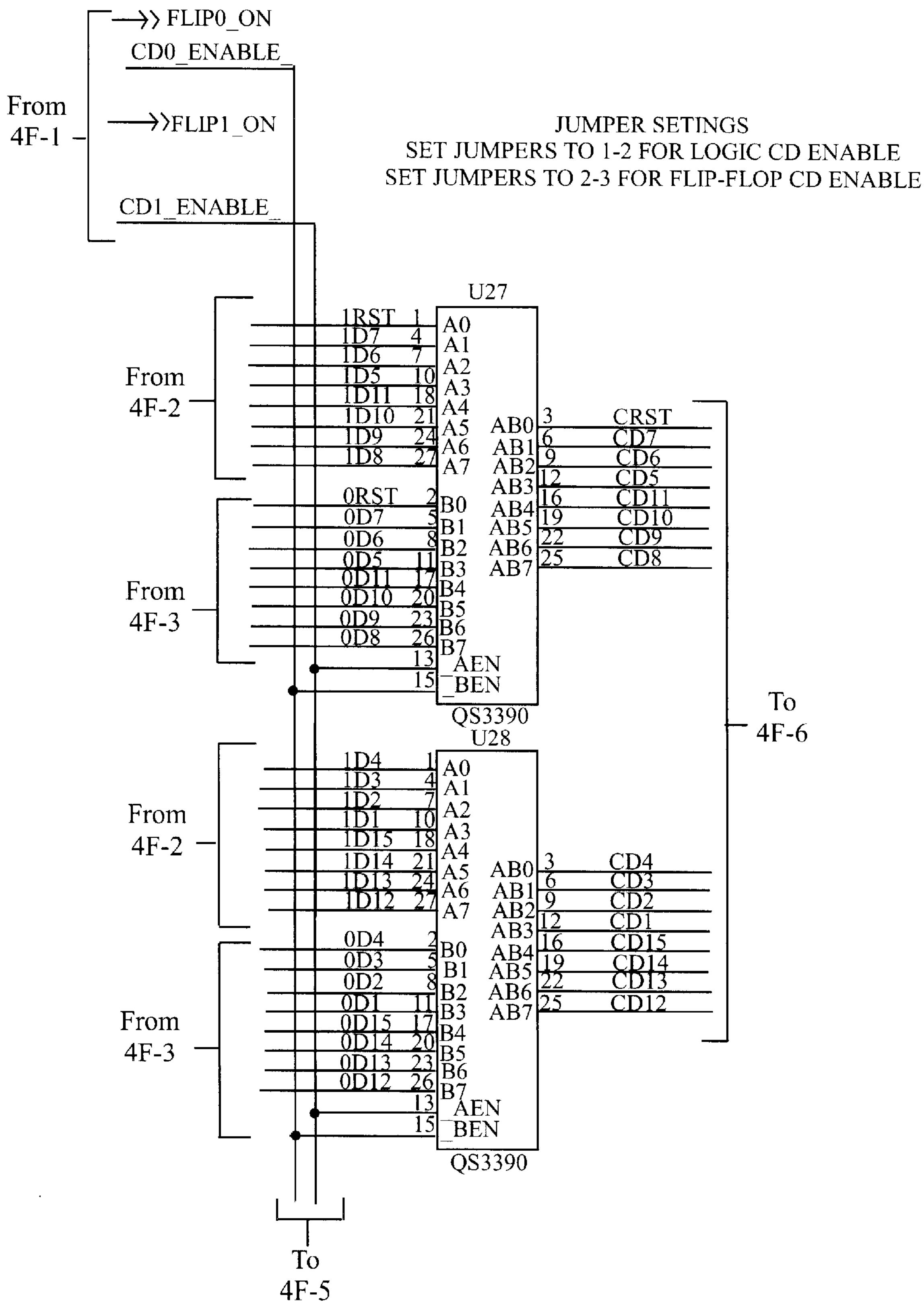
Figures 4, 4F, 5:
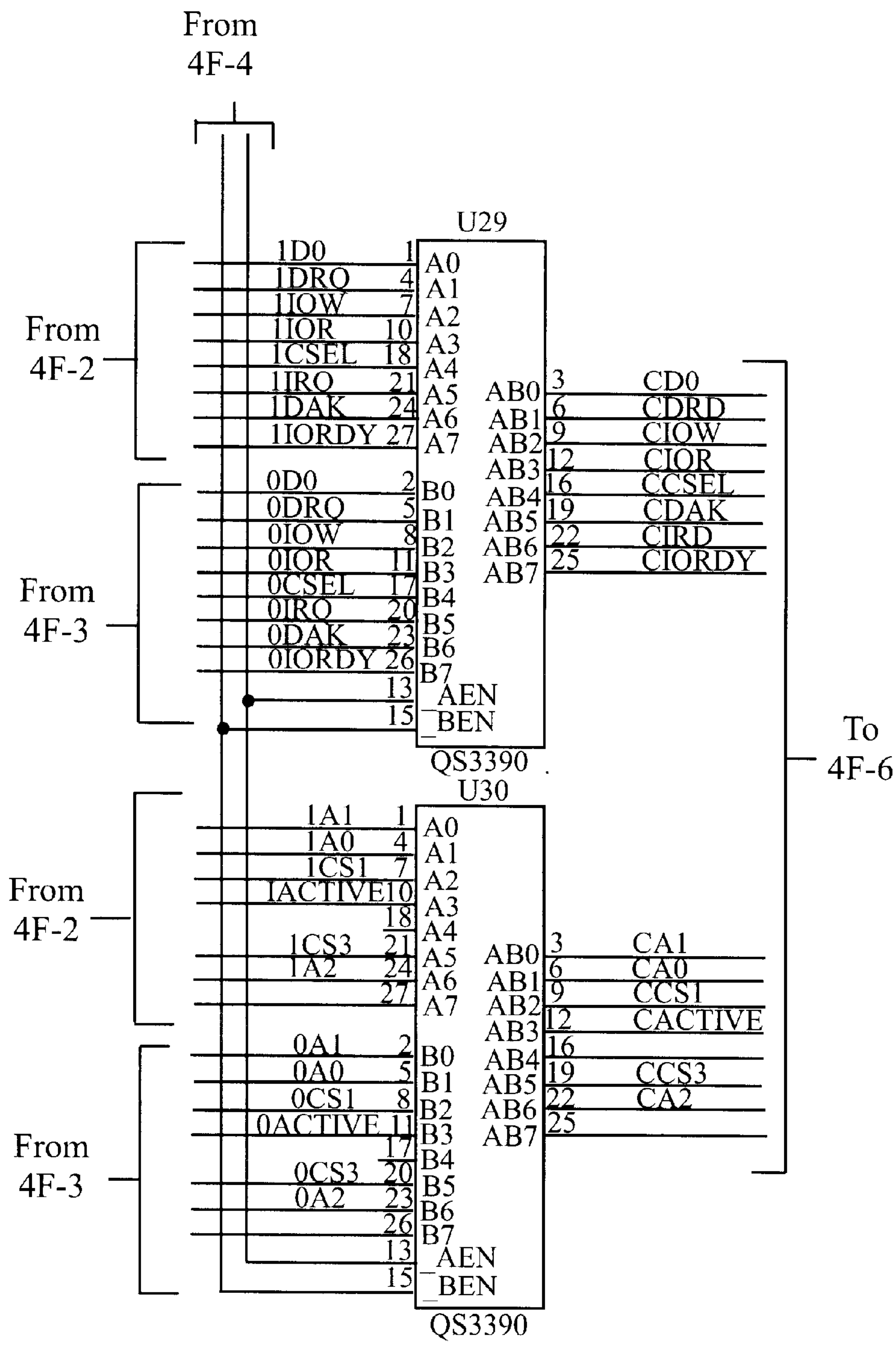
Figures 4, 4F, 5, 6:
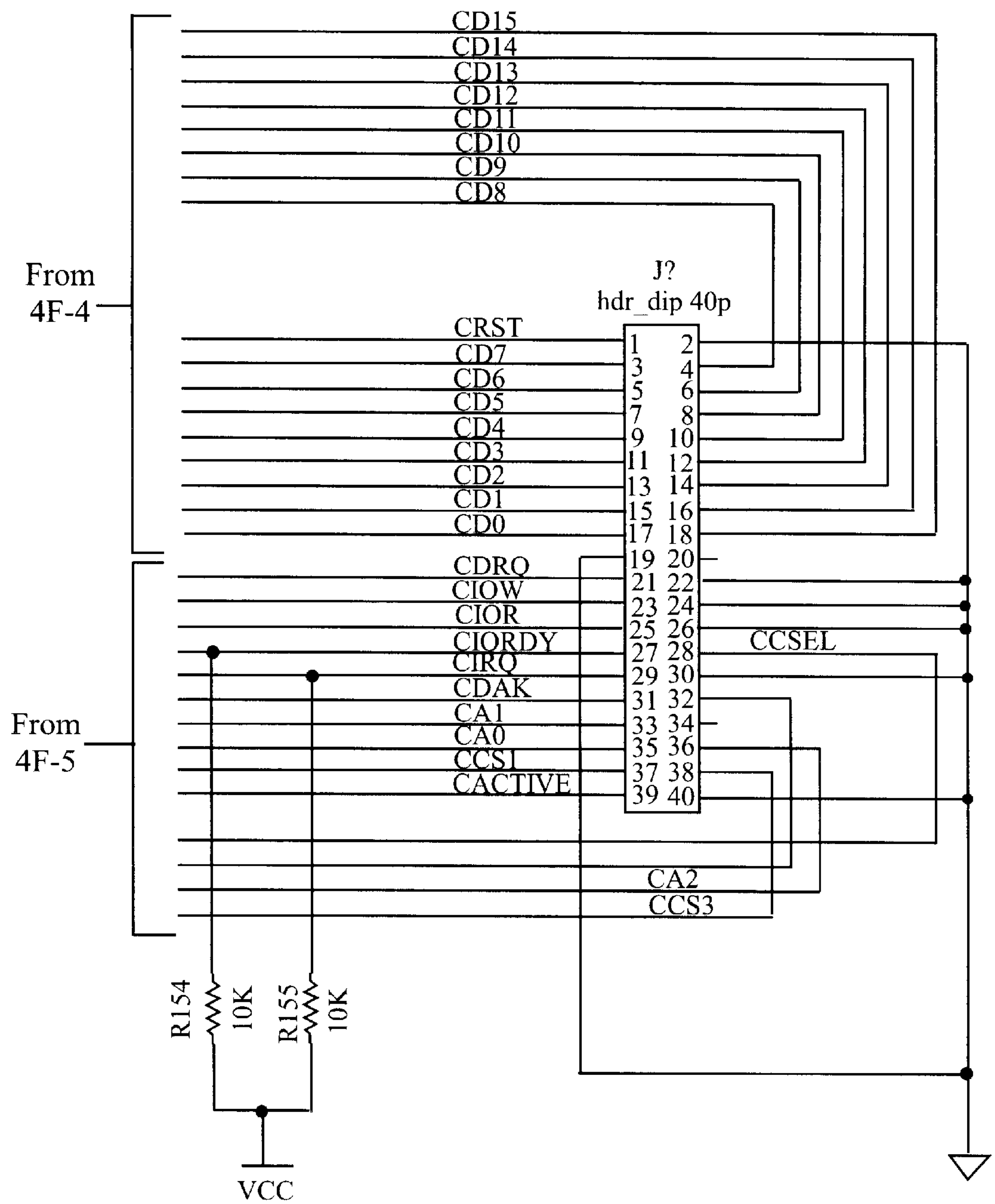
Figure 4G:
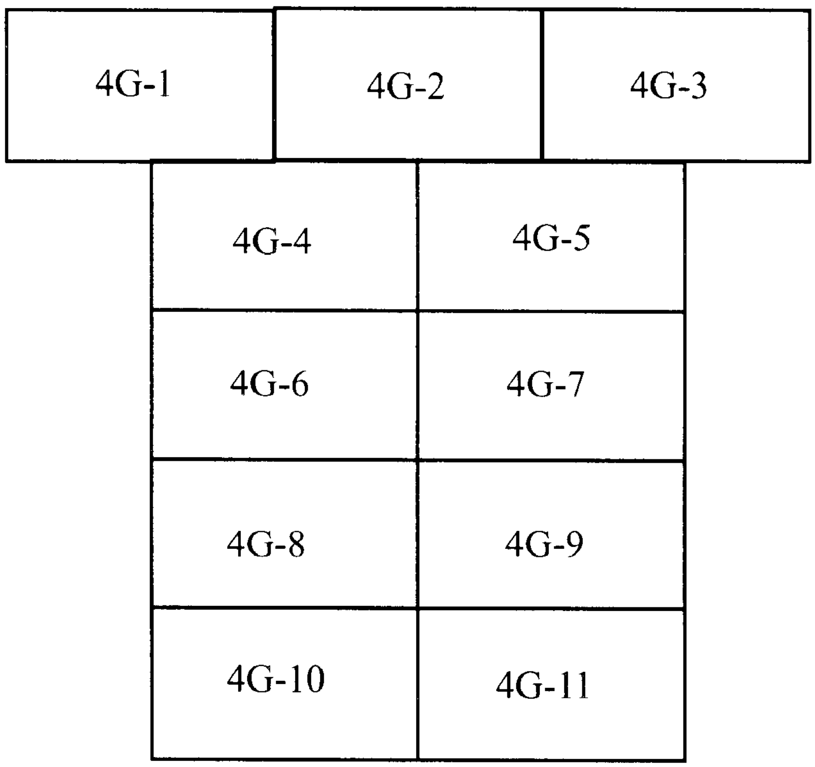
Figures 1, 4G:
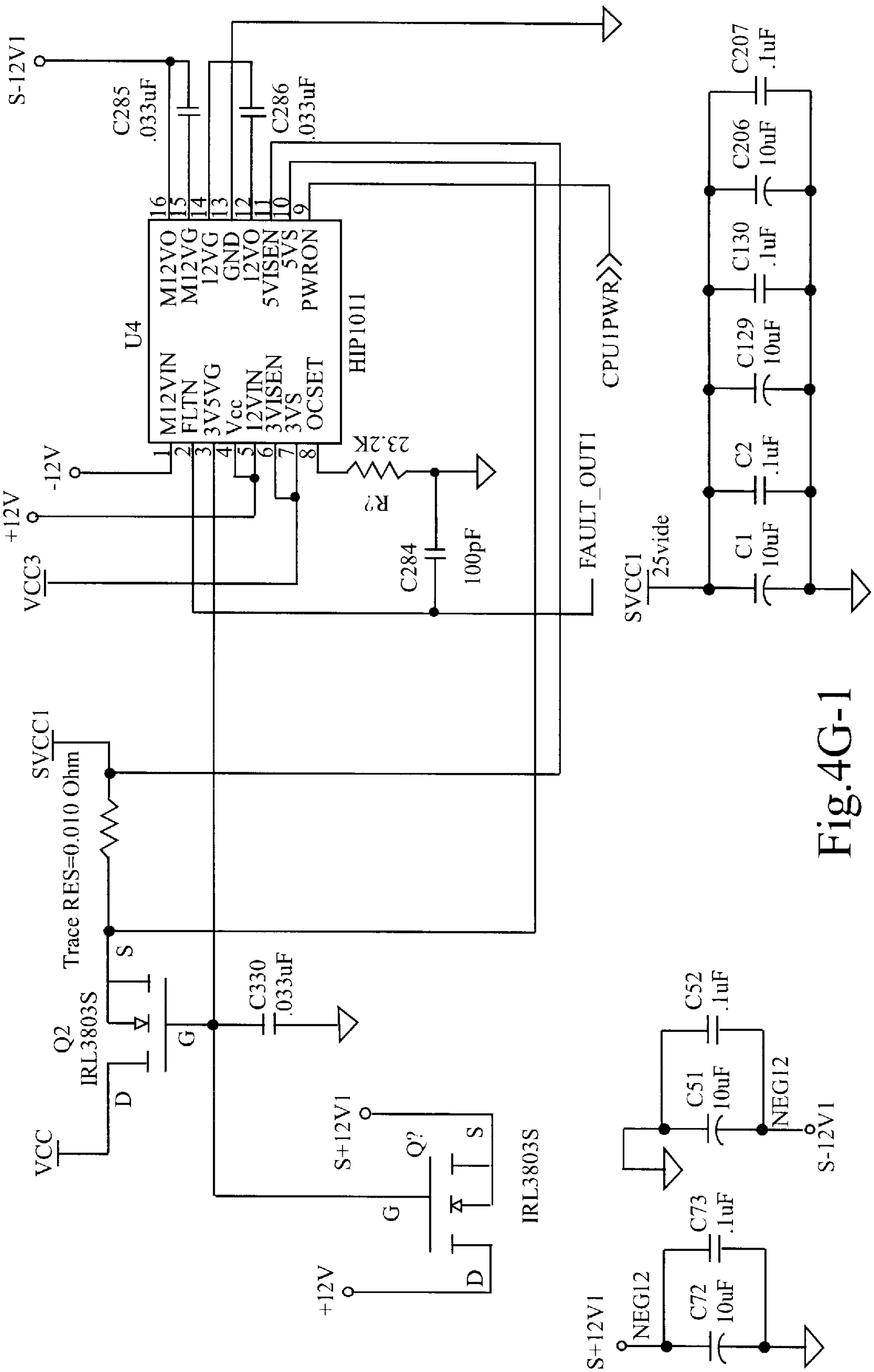
Figures 2, 4G:
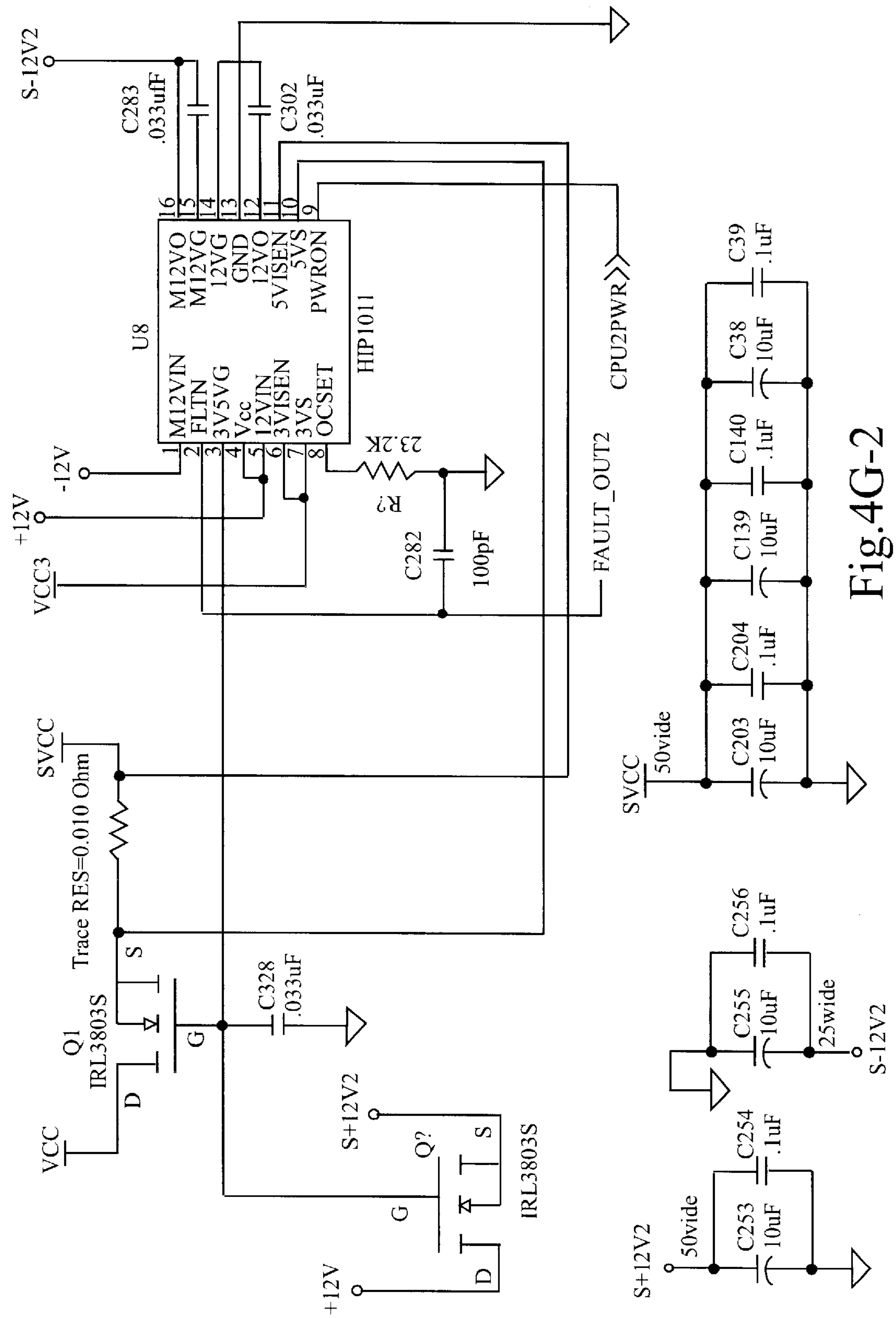
Figures 3, 4G:
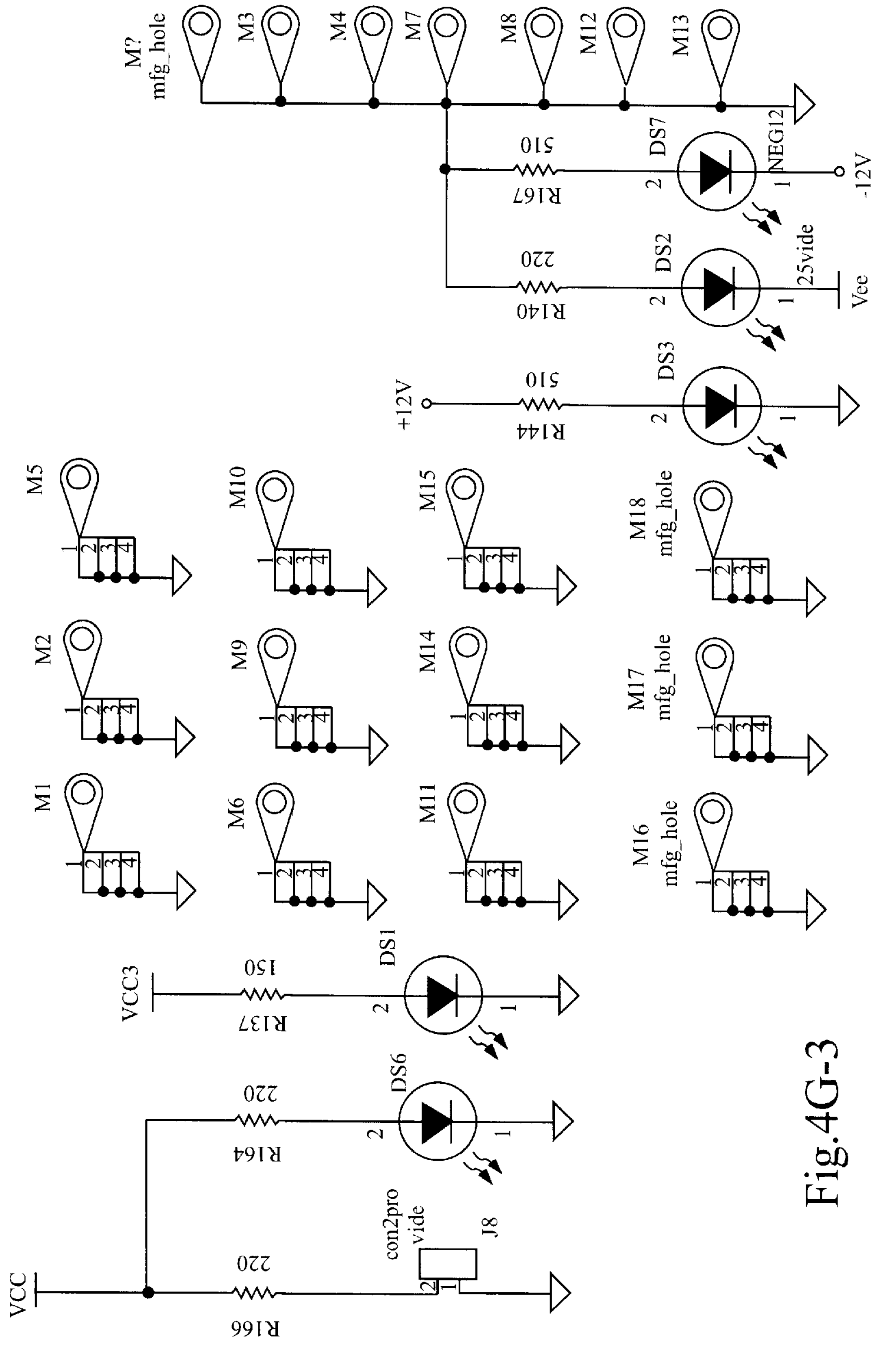
Figures 4, 4G:
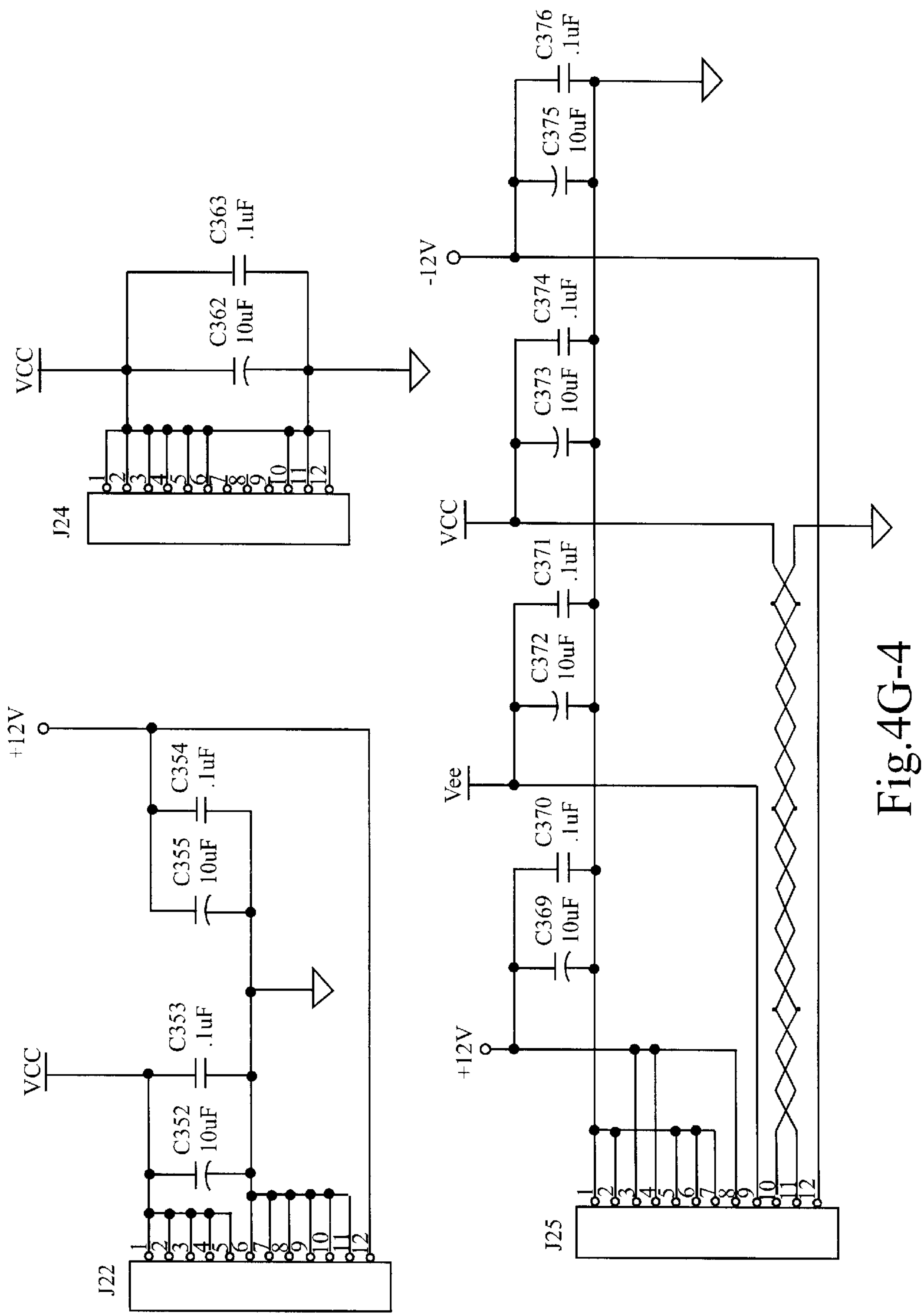
Figures 4, 4G, 5:
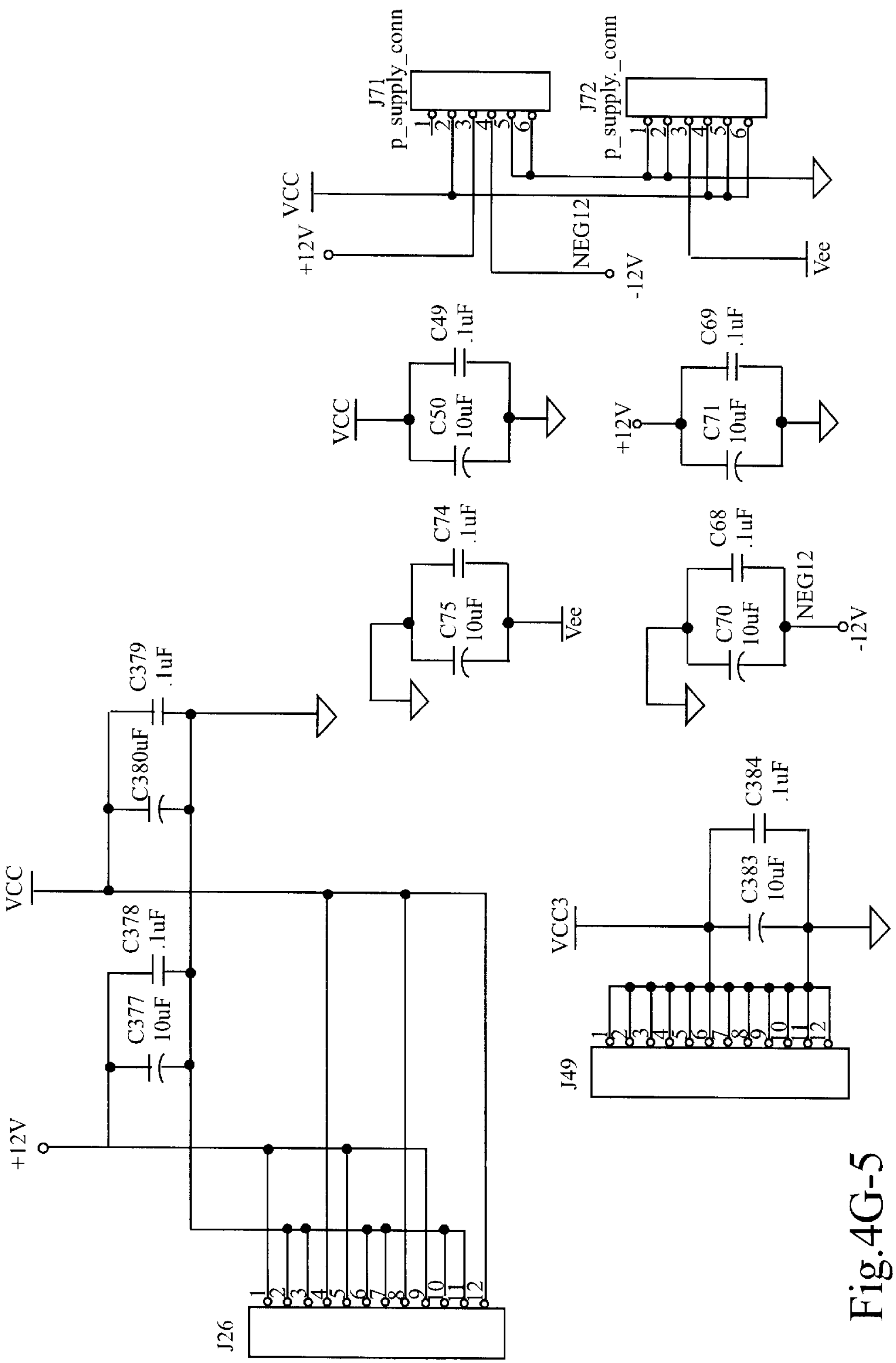
Figures 4, 4G, 5, 6:
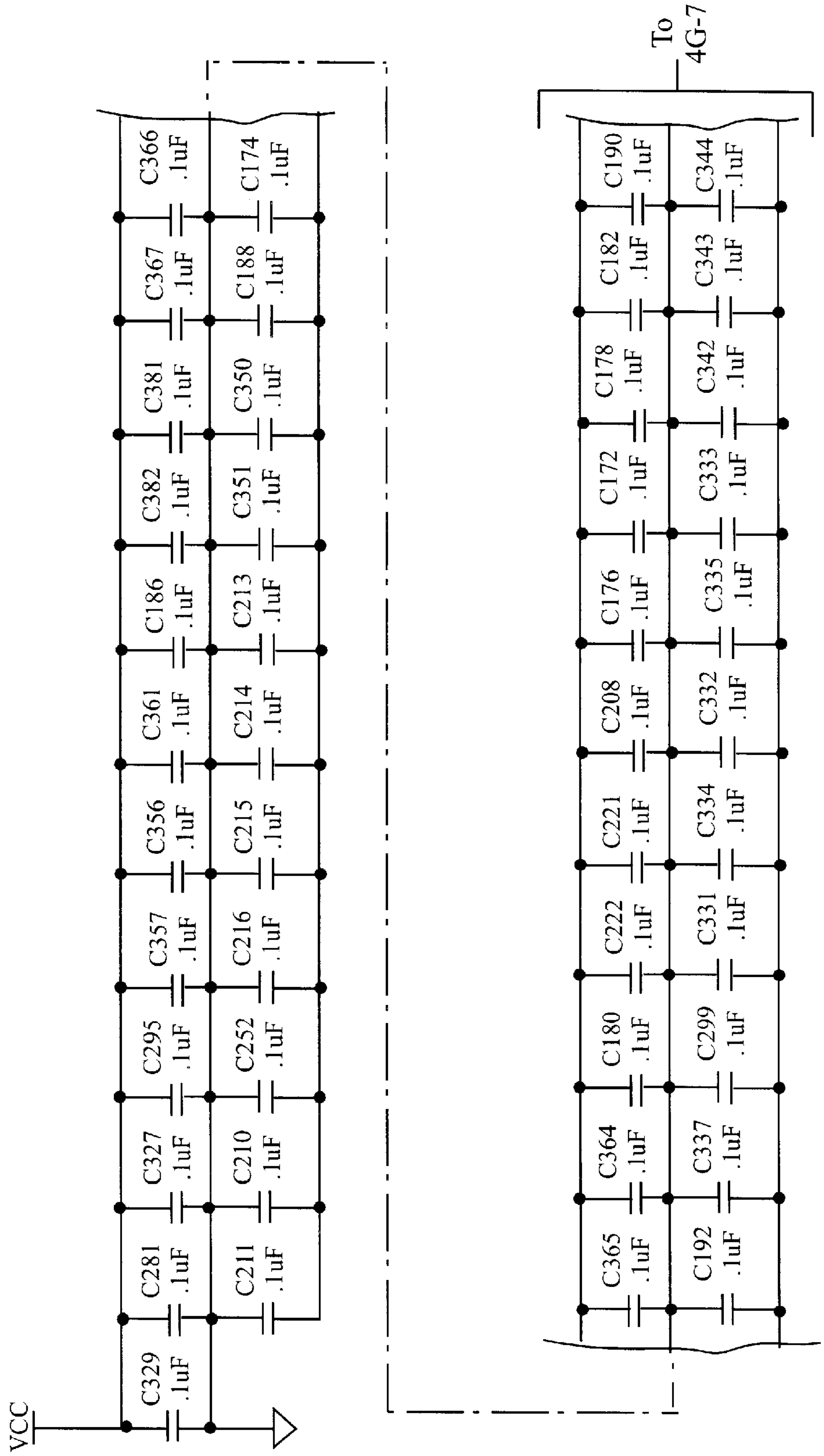
Figures 4, 4G, 5, 6, 7:
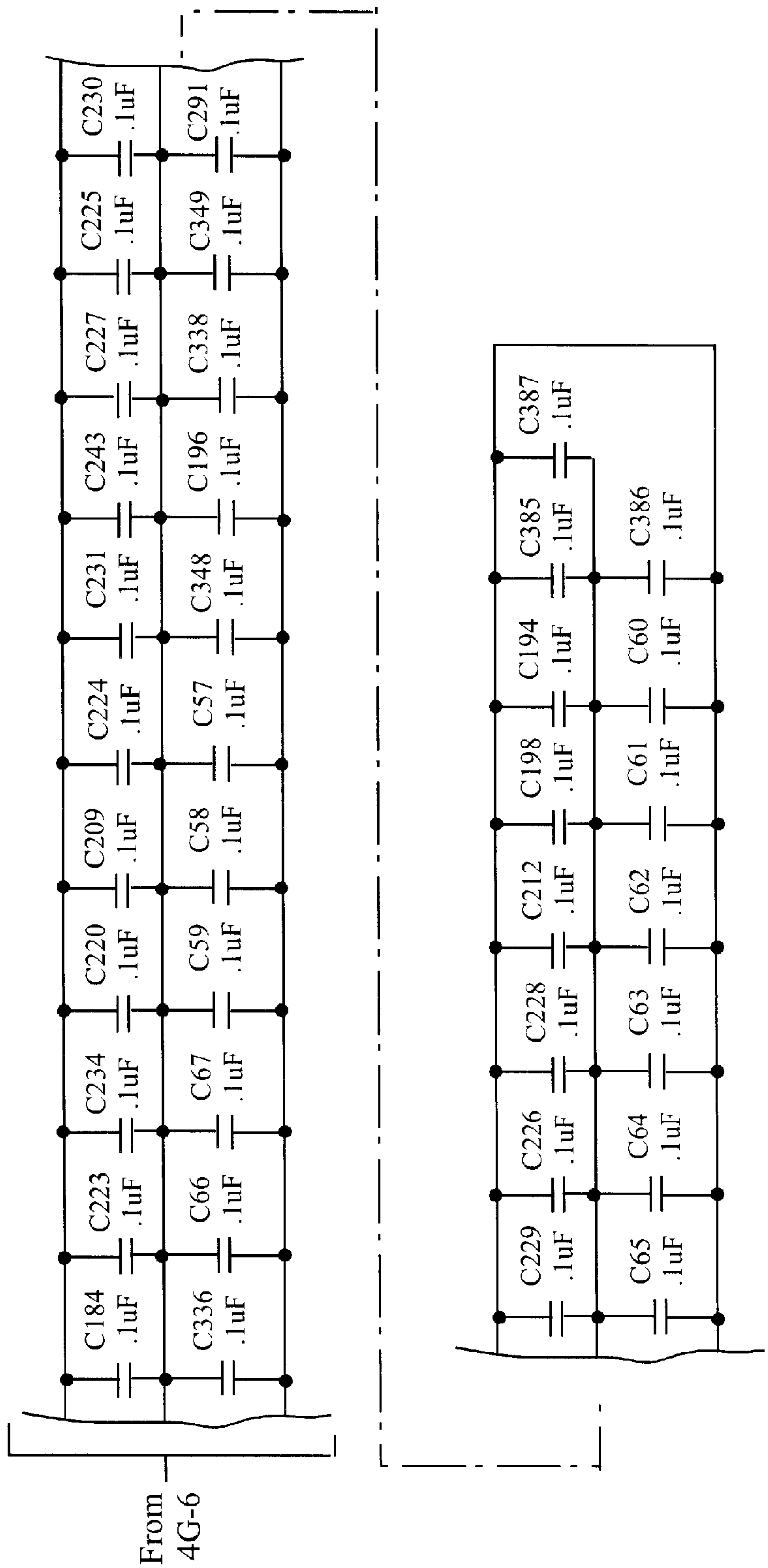
Figures 4, 4G, 5, 6, 7, 8:
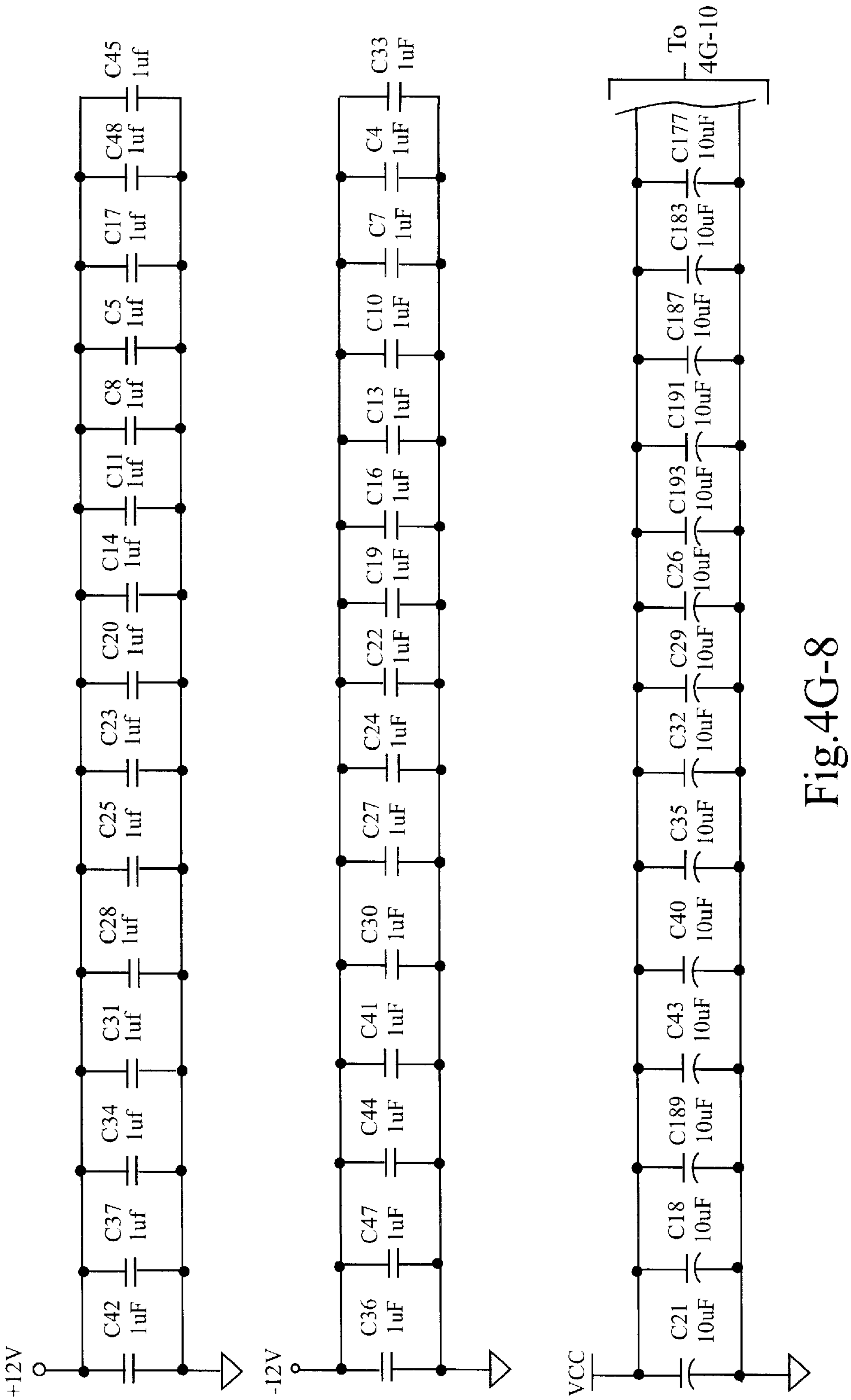
Figures 4, 4G, 5, 6, 7, 8, 9:
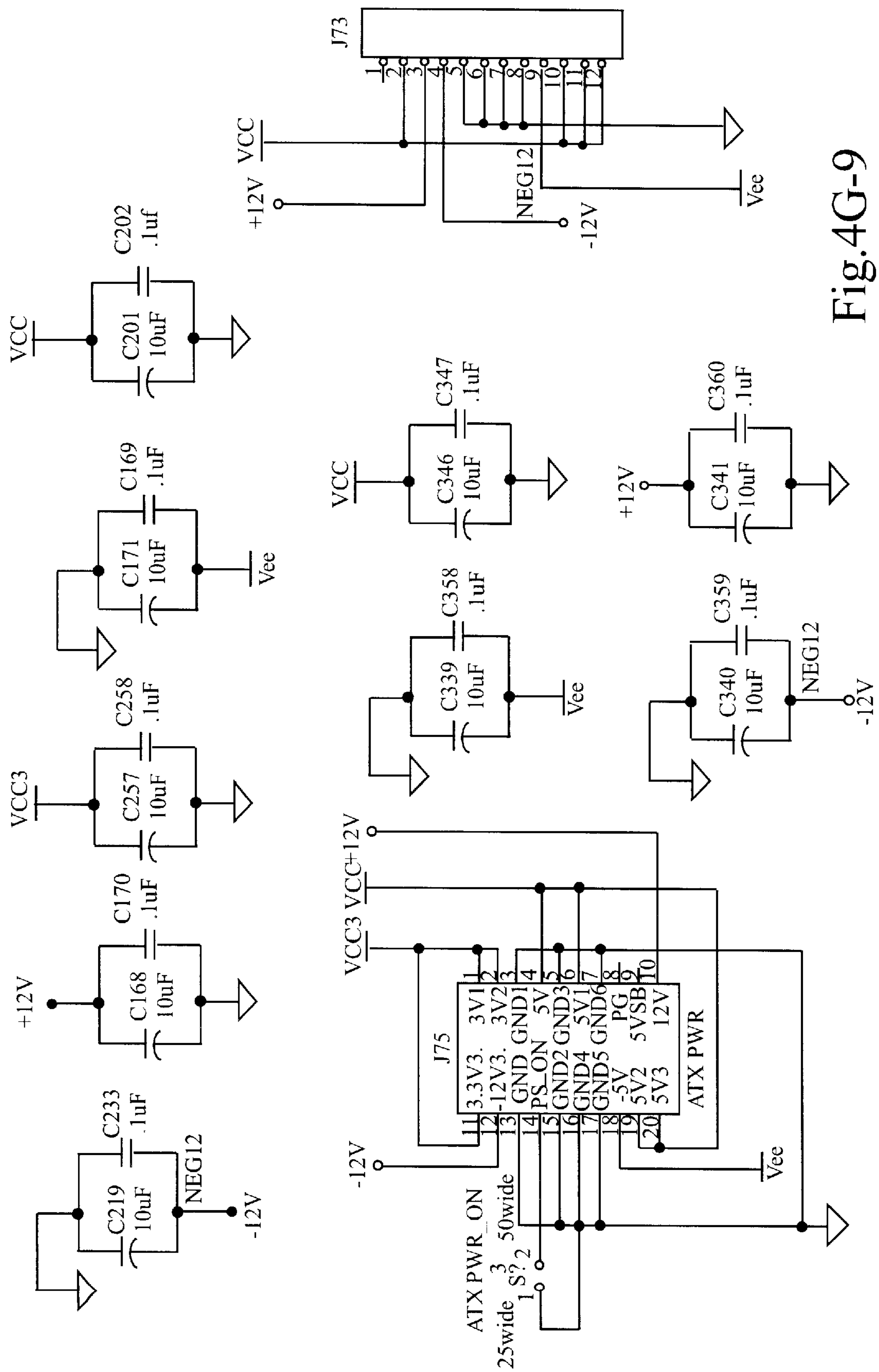
Figures 4, 4G, 5, 6, 7, 8, 9, 10:
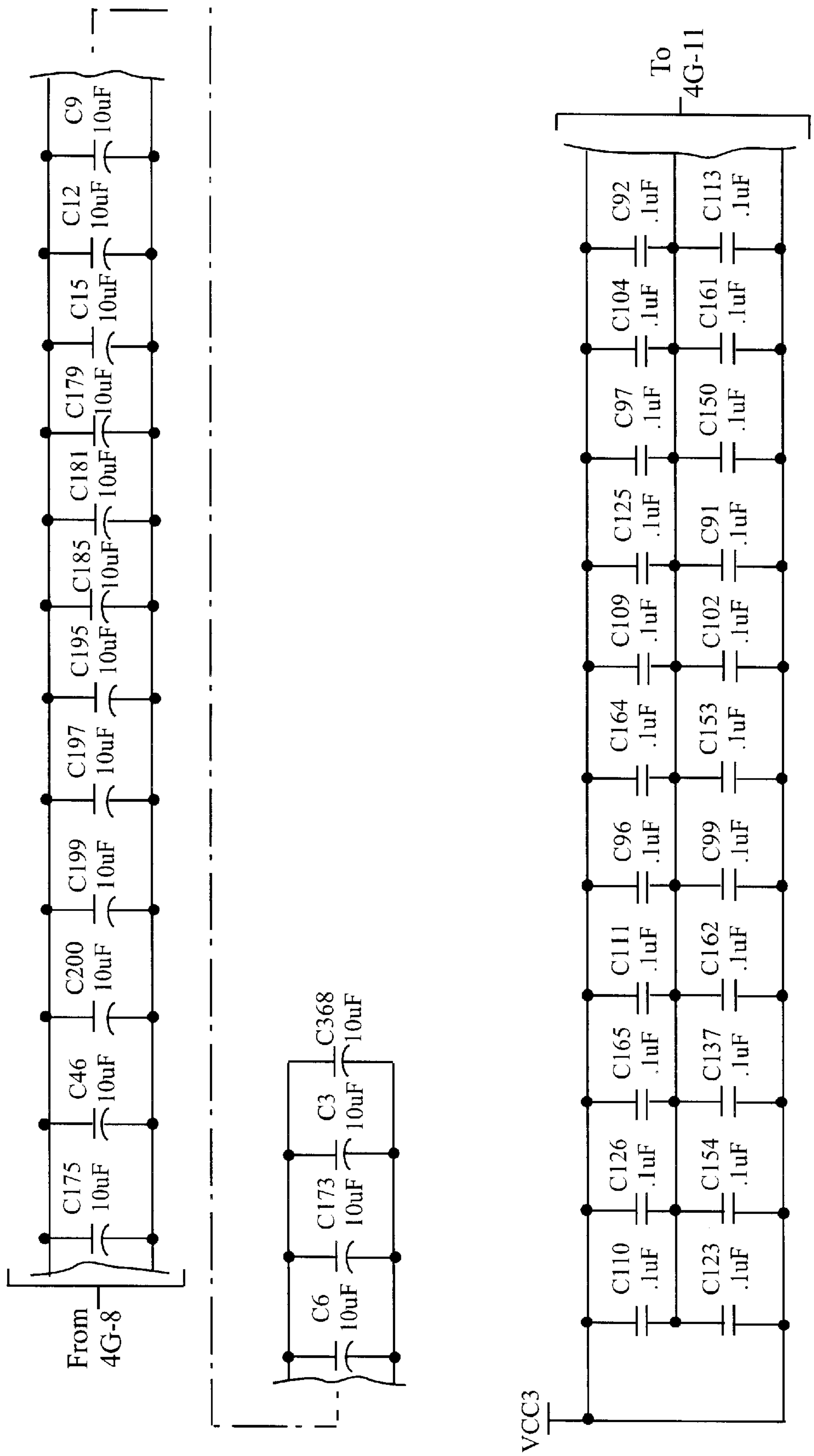
Figures 4, 4G, 5, 6, 7, 8, 9, 10, 11:
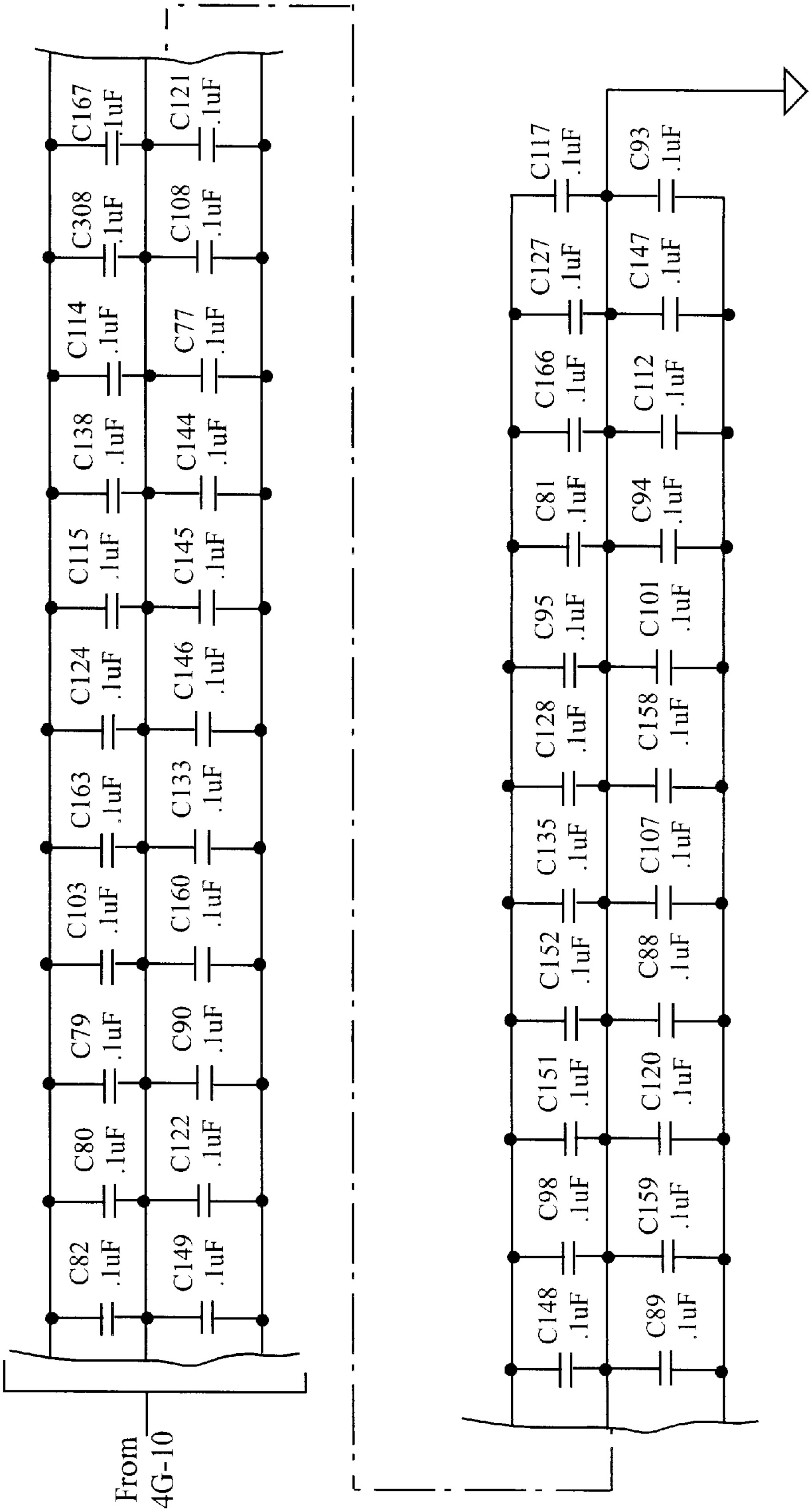
Figure 4H:
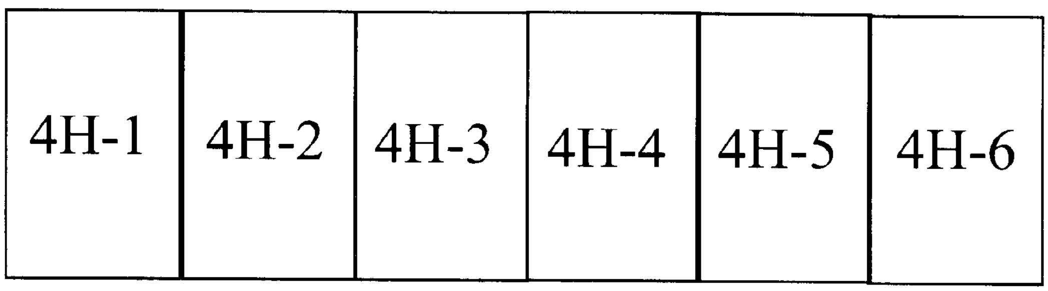
Figures 1, 4H:
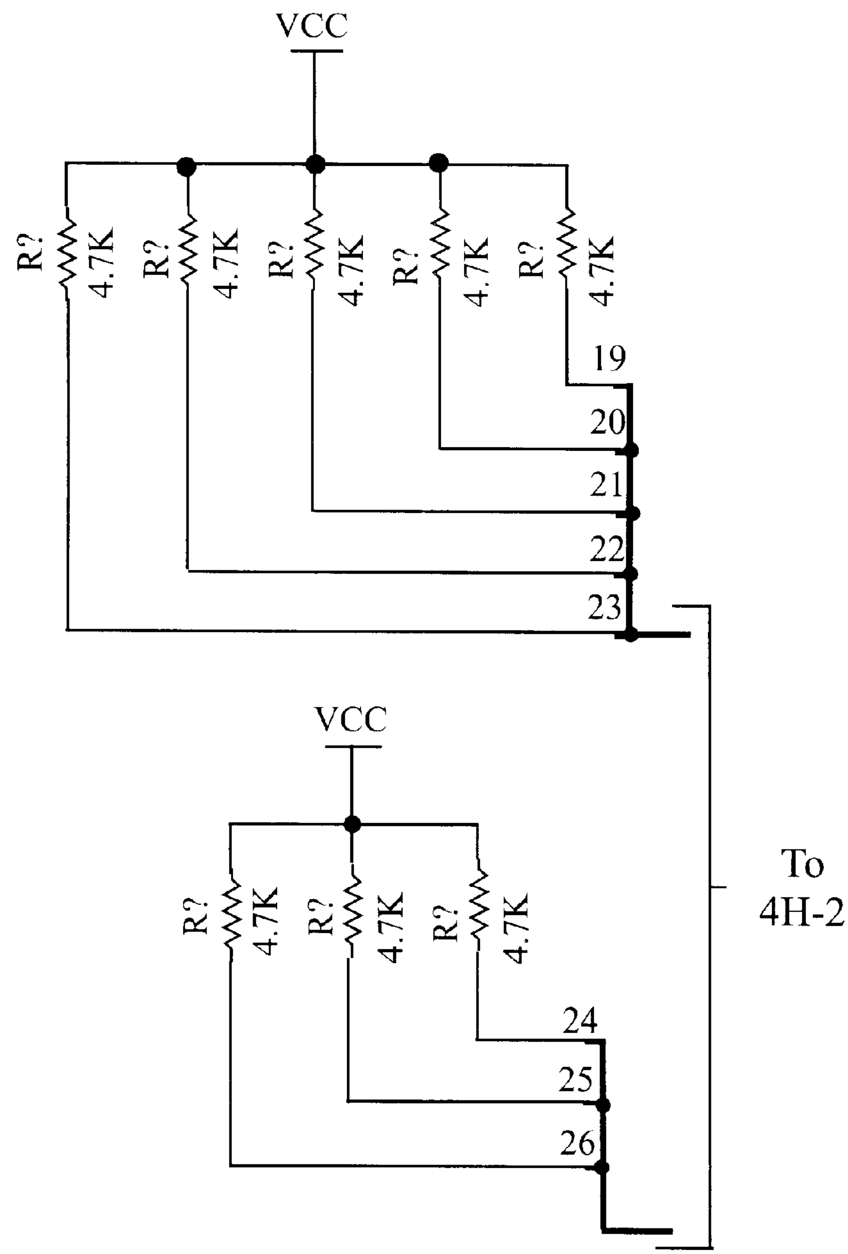
Figures 2, 4H:
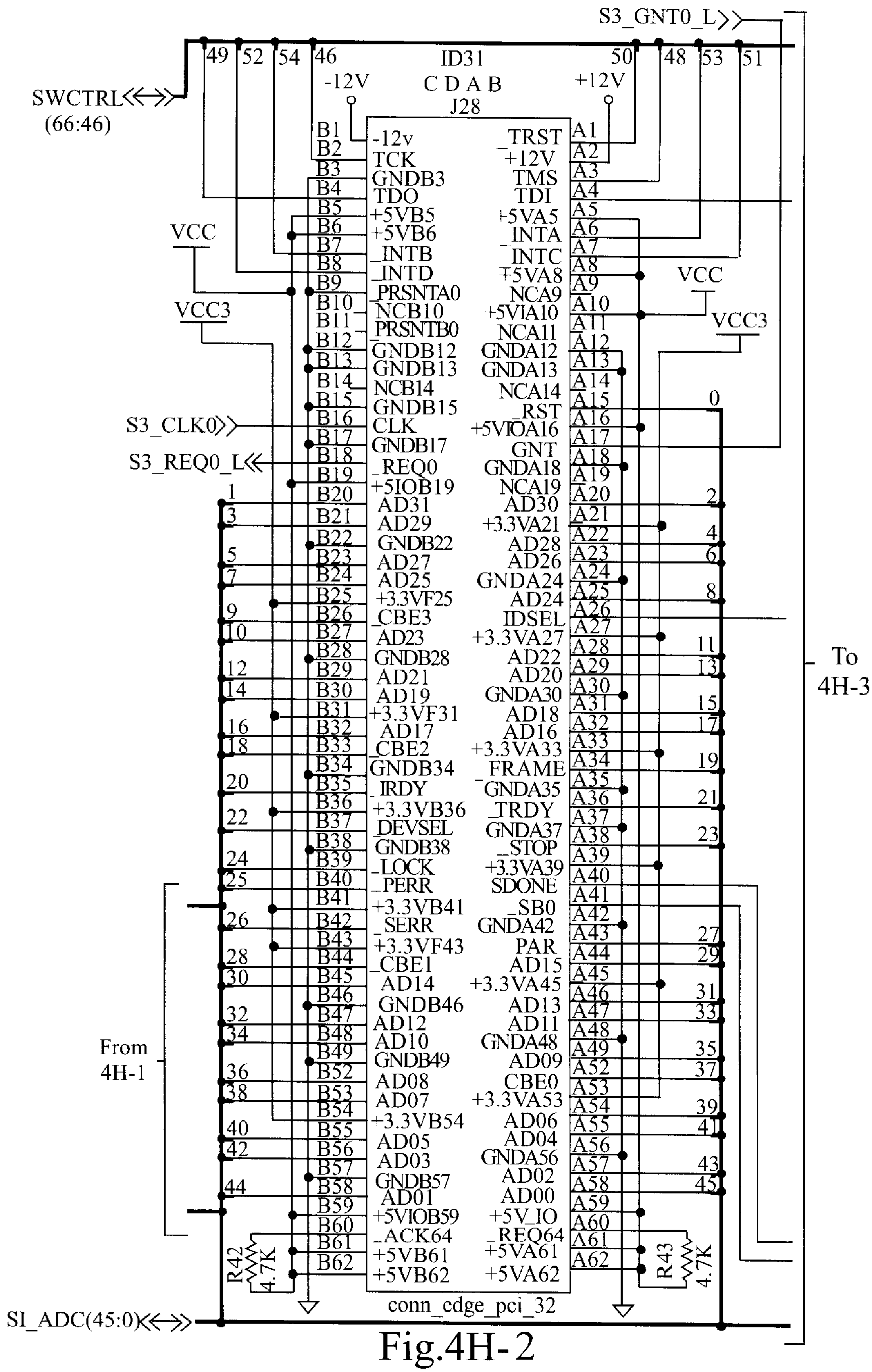
Figures 3, 4H:
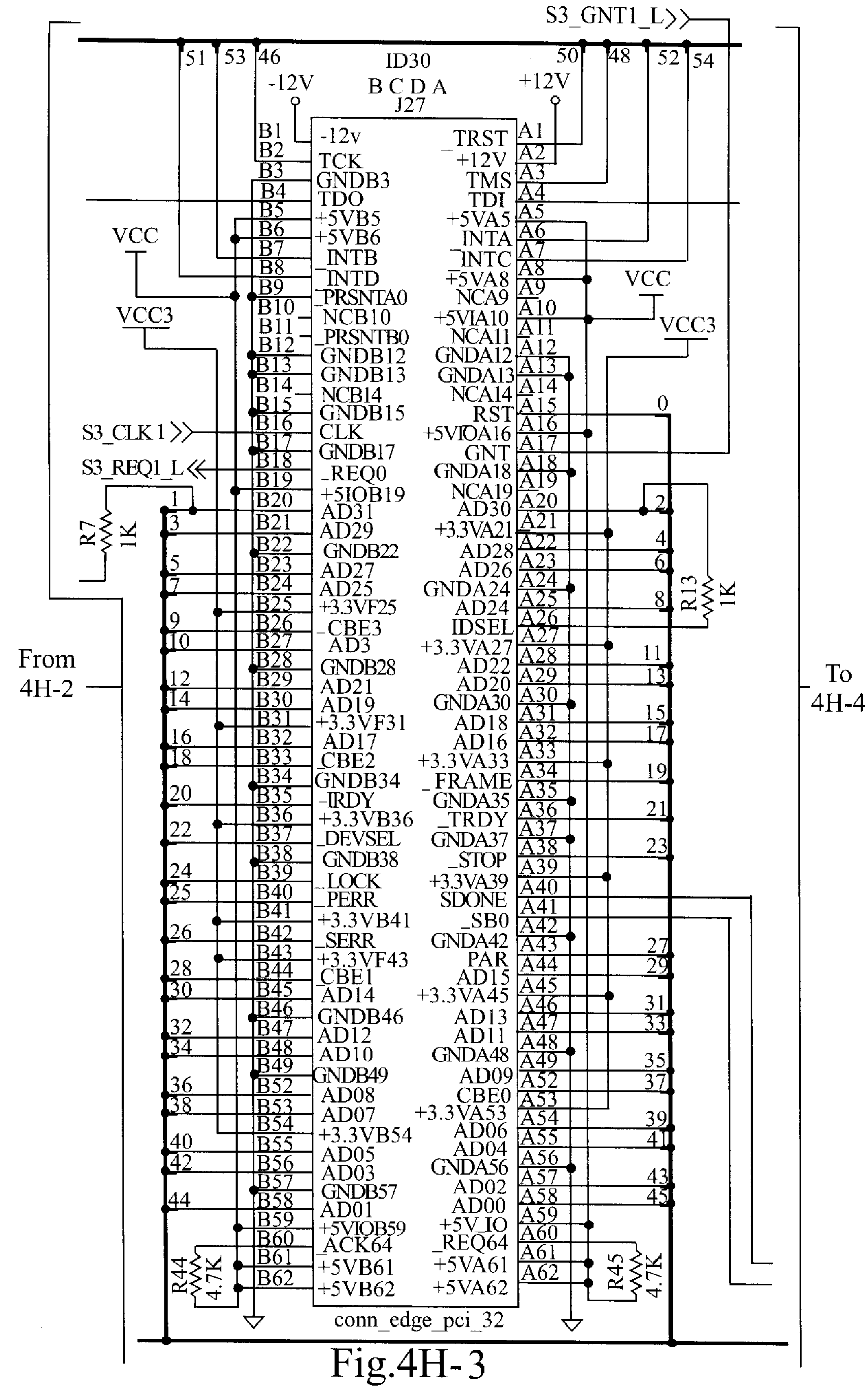
Figures 4, 4H:
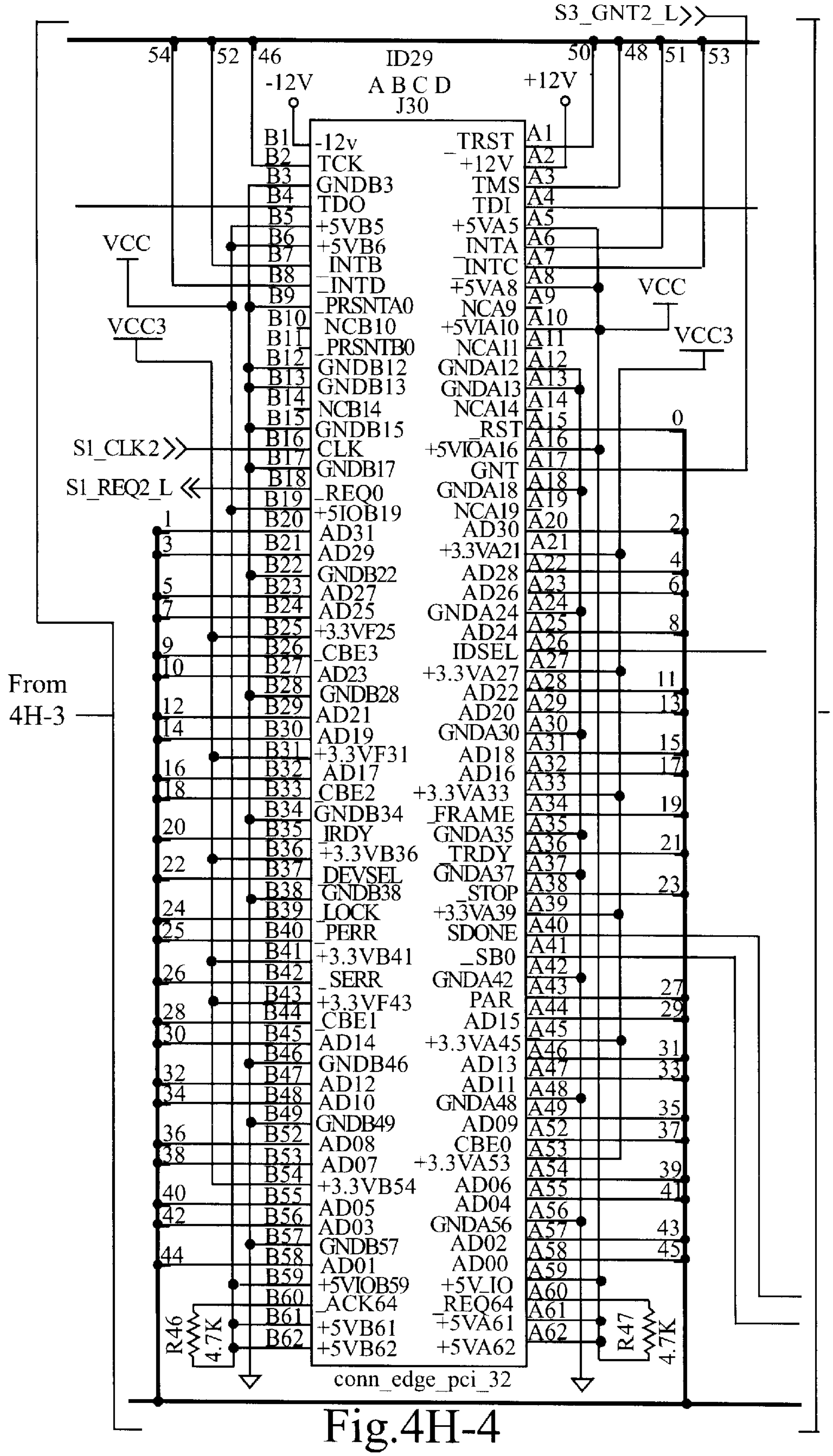
Figures 4, 4H, 5:
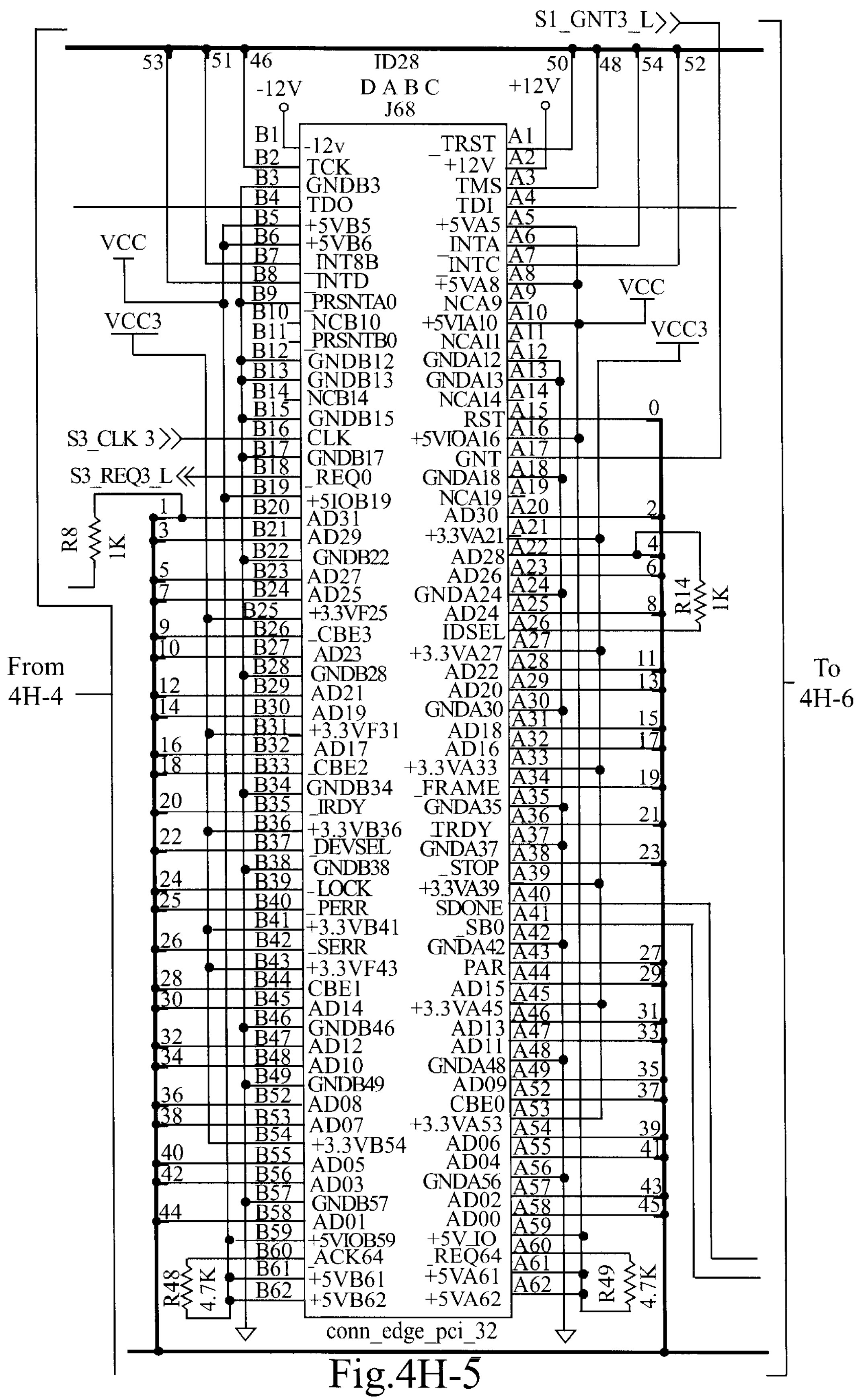
Figures 4, 4H, 5, 6:
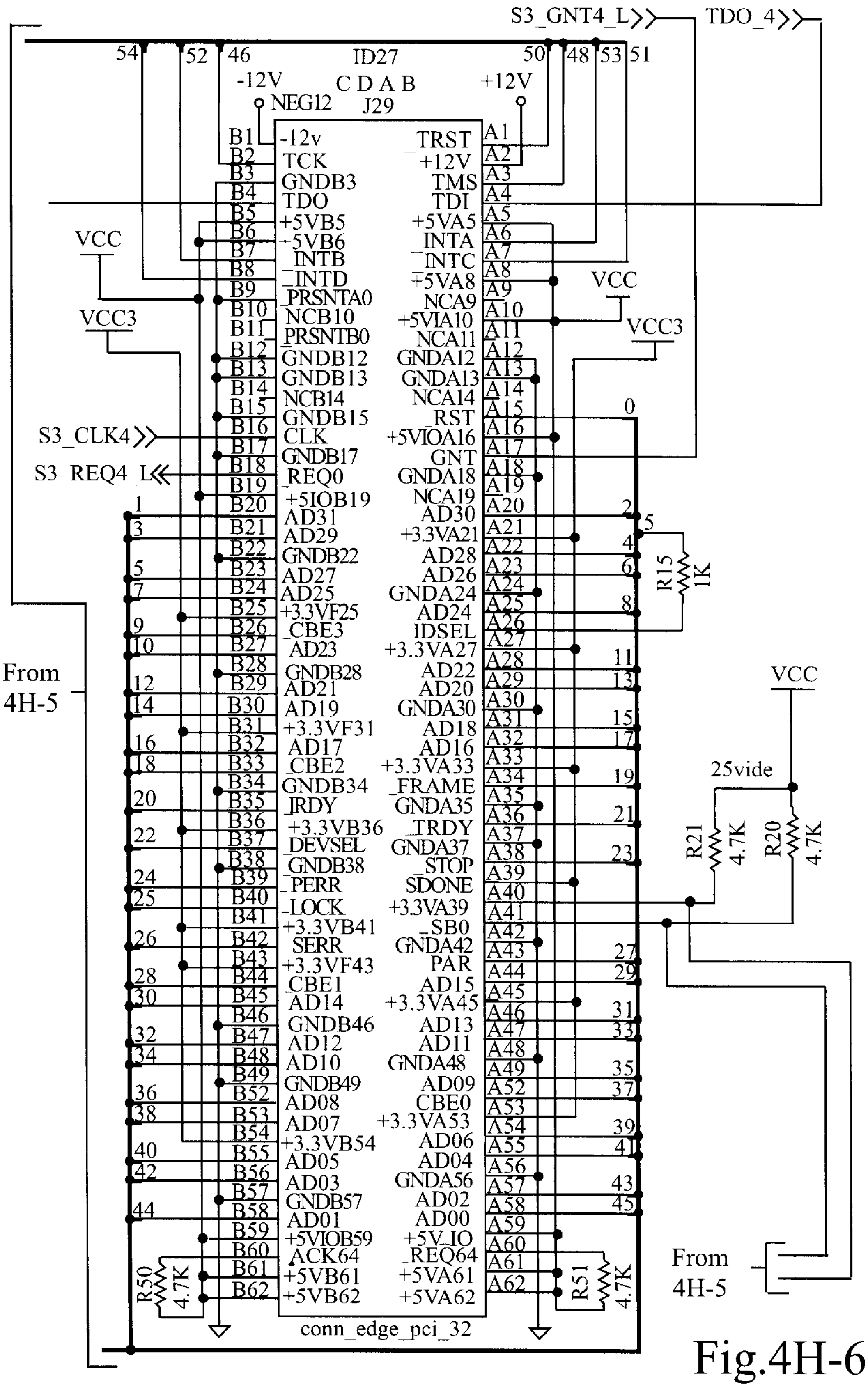
Figure 5A:
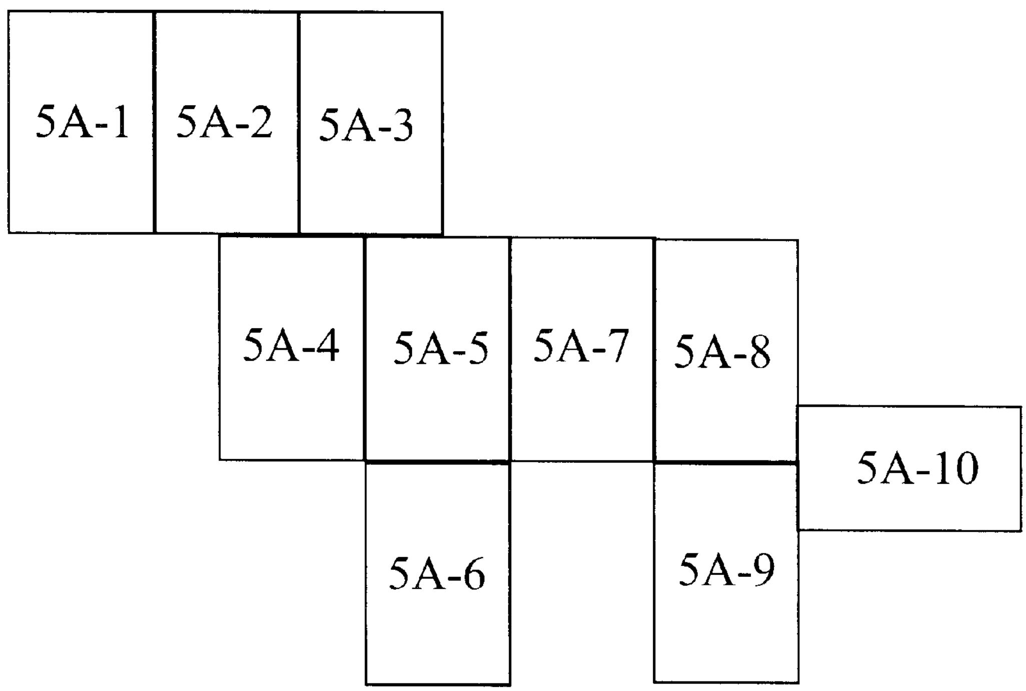
Figures 1, 5A:
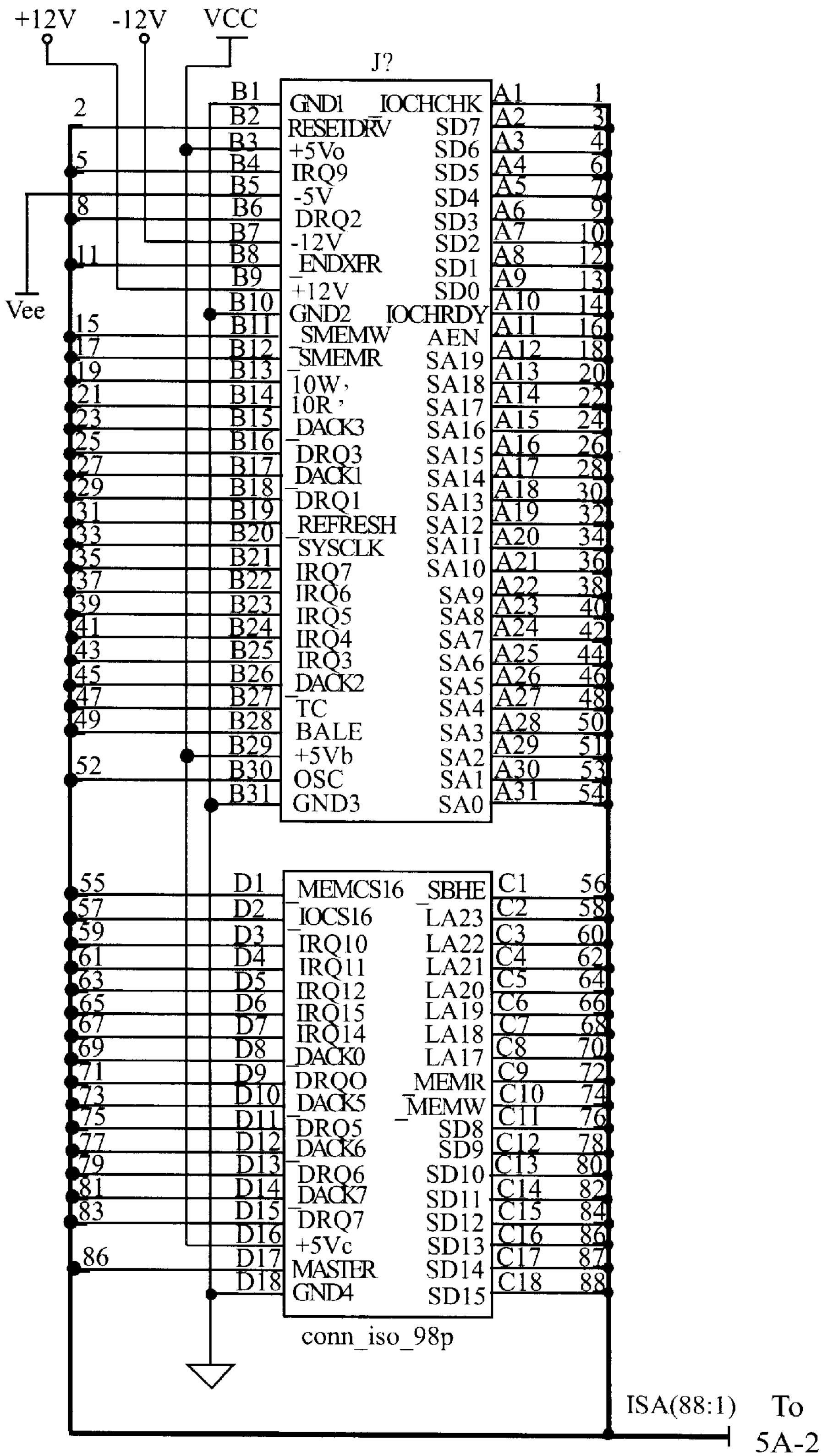
Figures 2, 5A:
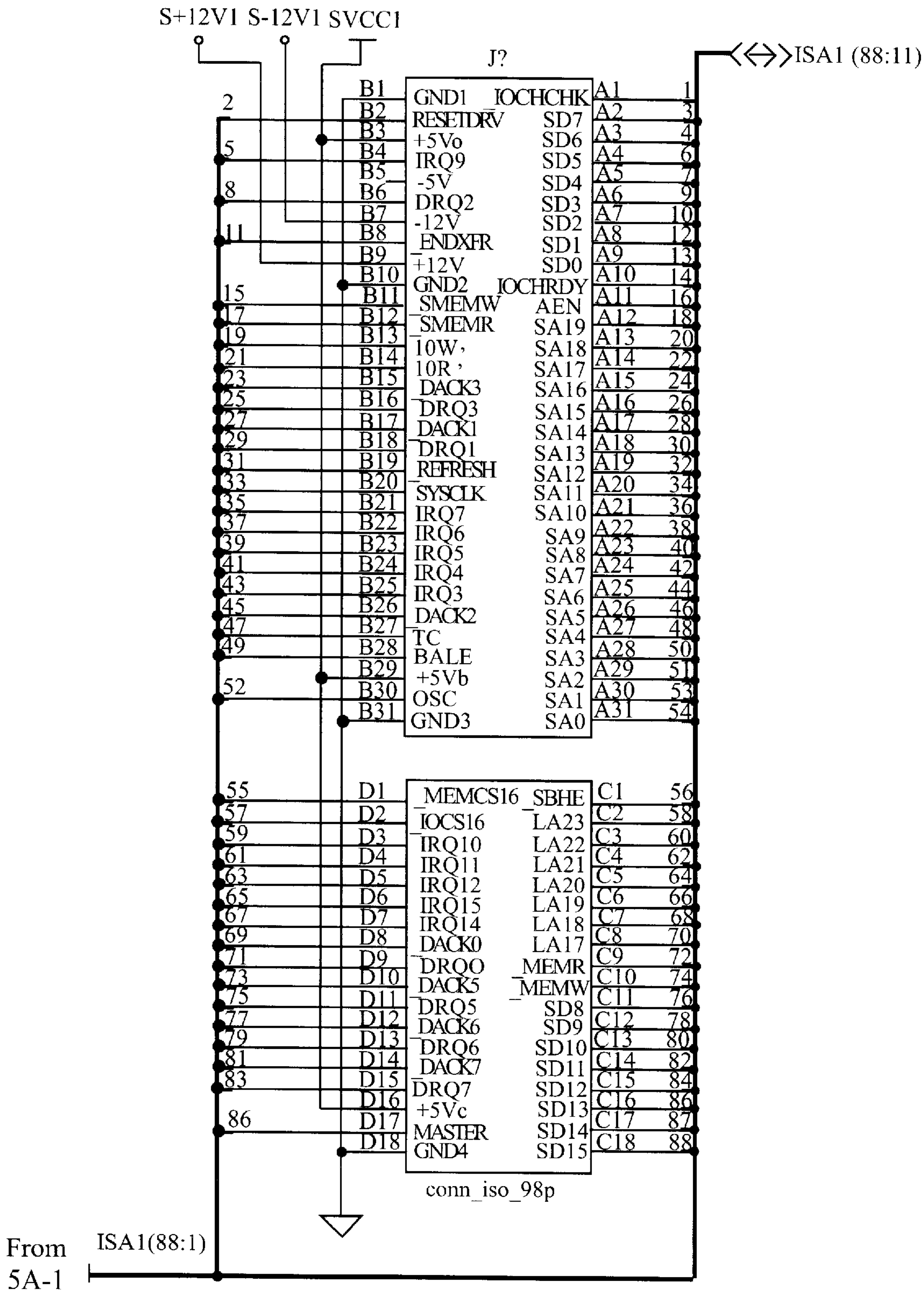
Figures 3, 5A:
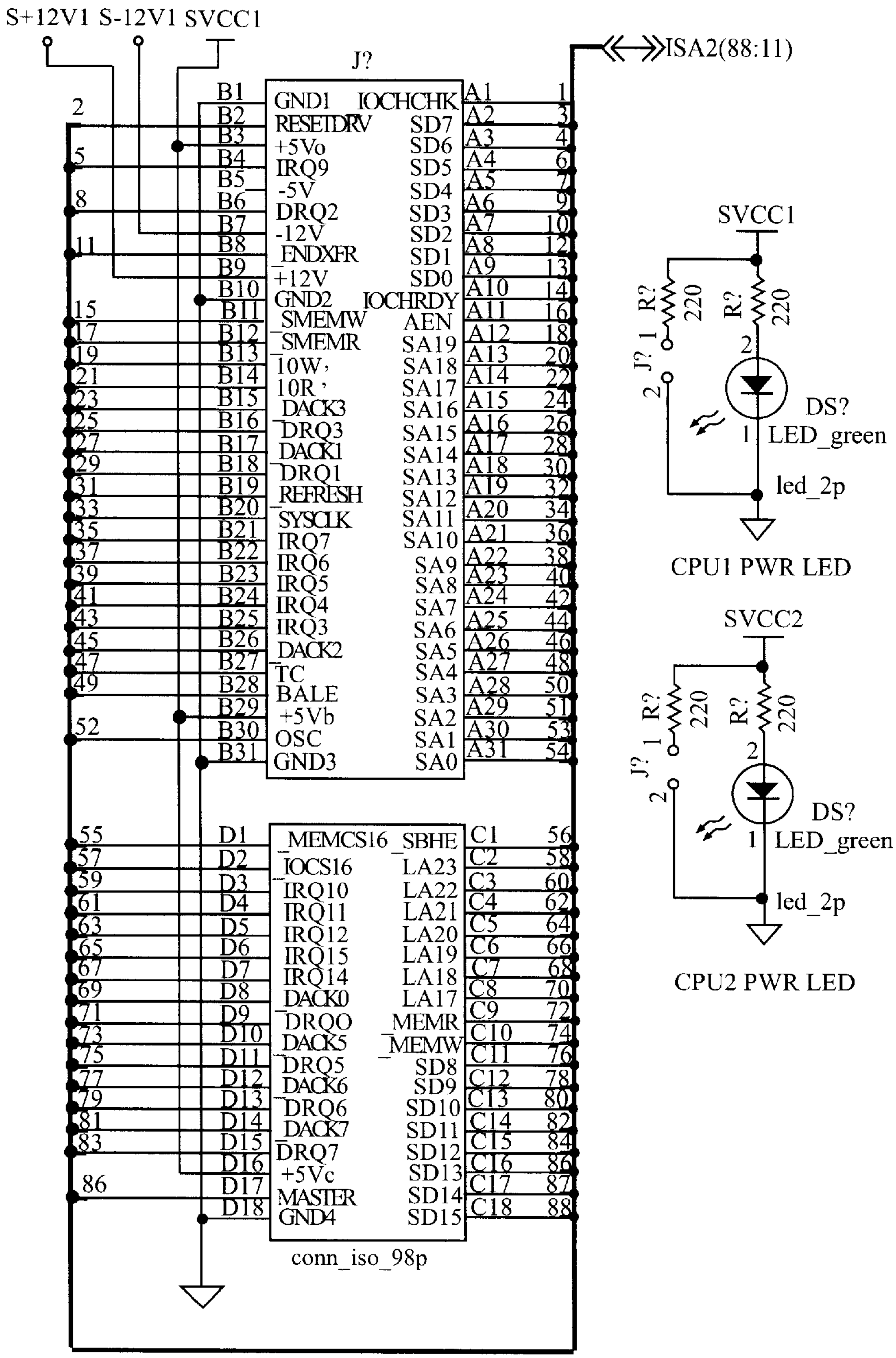
Figures 4, 5A:
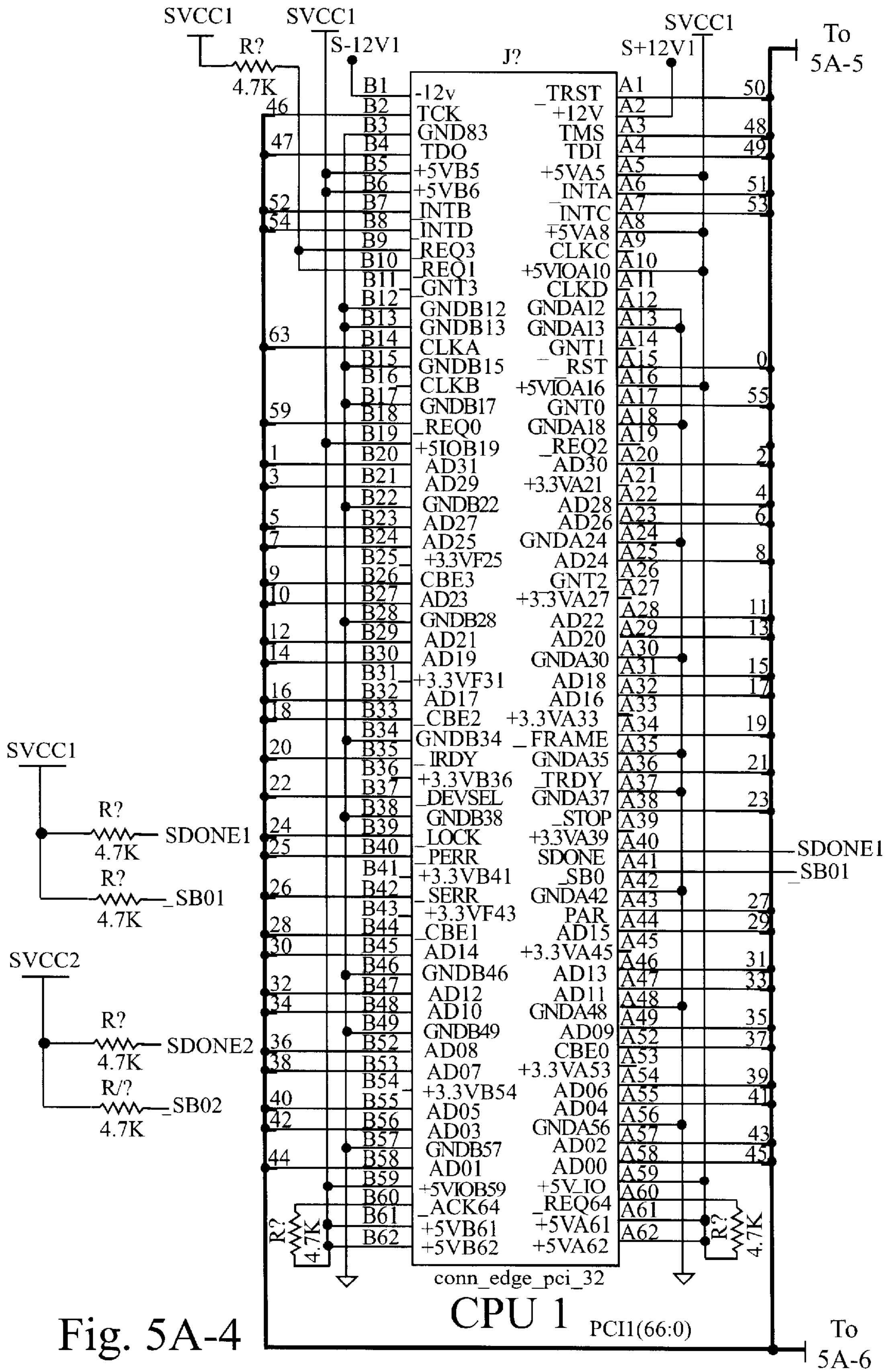
Figures 5, 5A:
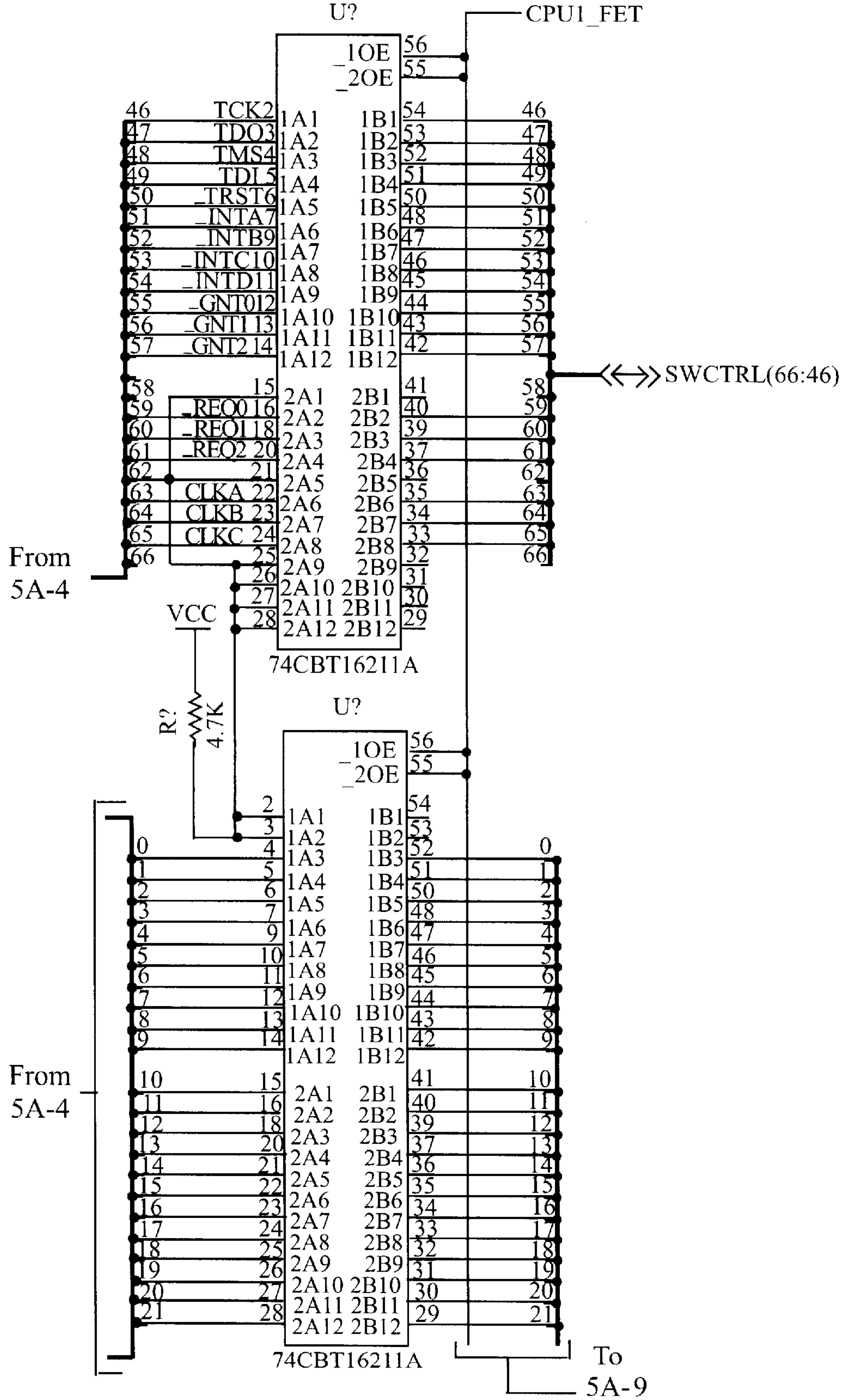
Figures 5, 5A, 6:
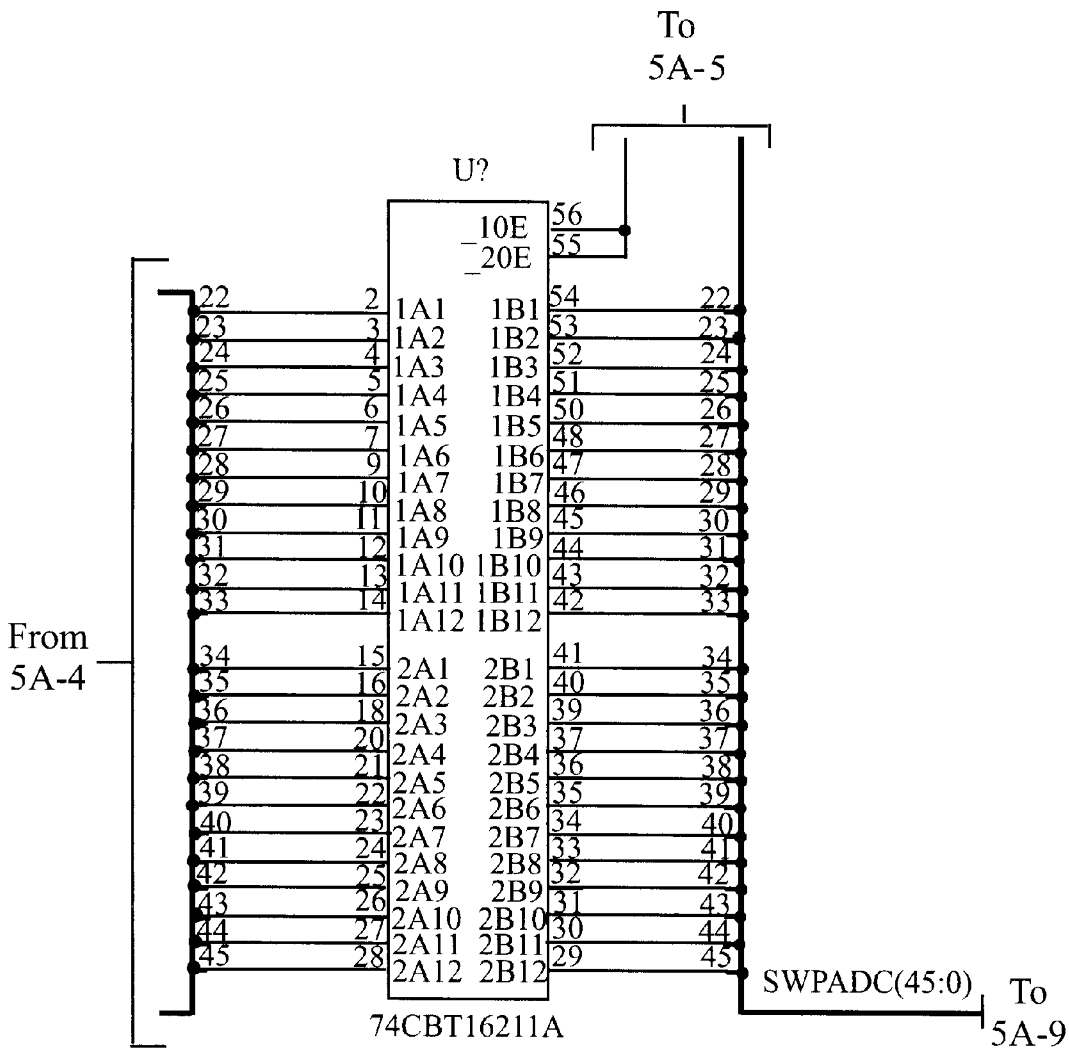
Figures 5, 5A, 6, 7:
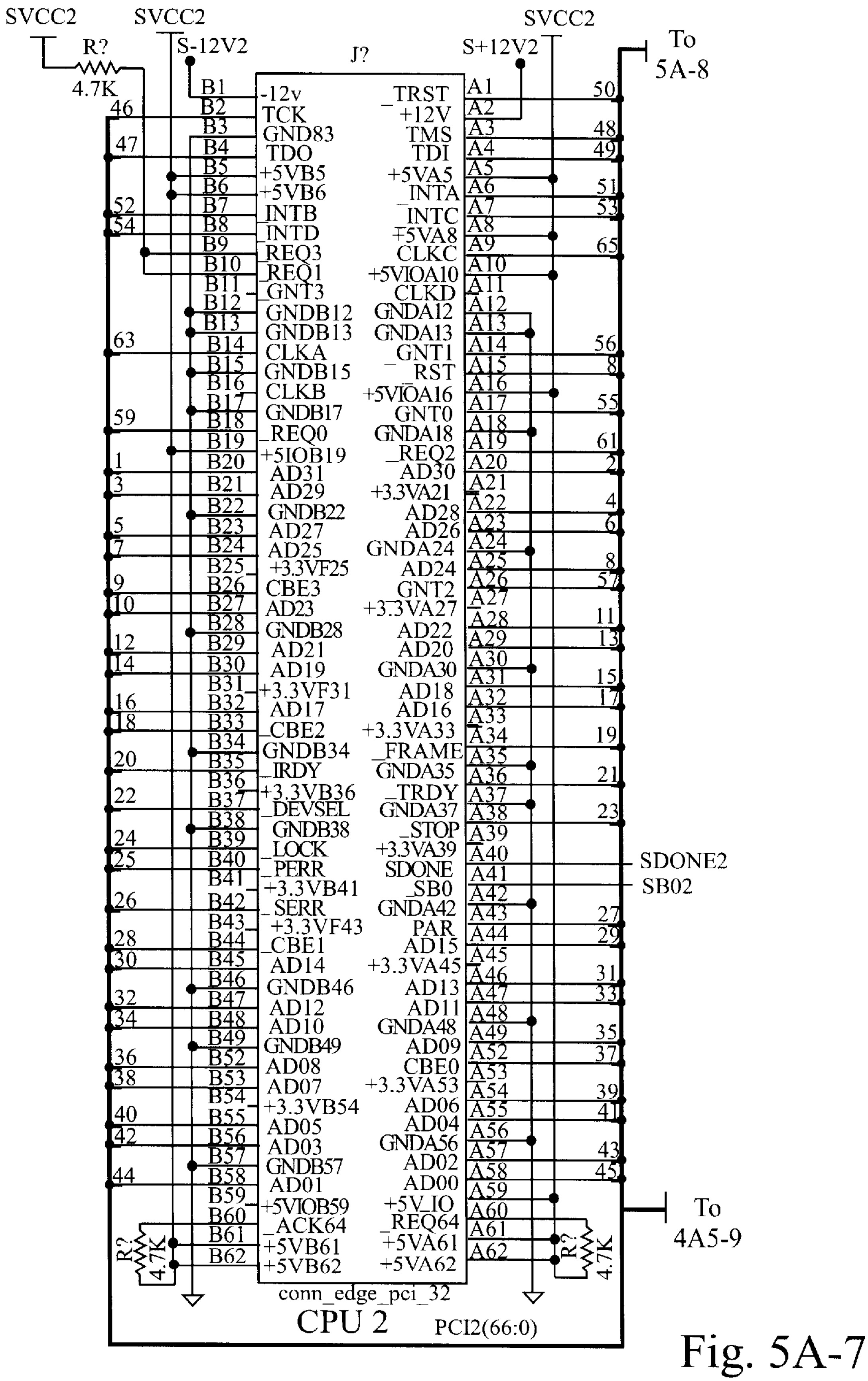
Figures 5, 5A, 6, 7, 8:
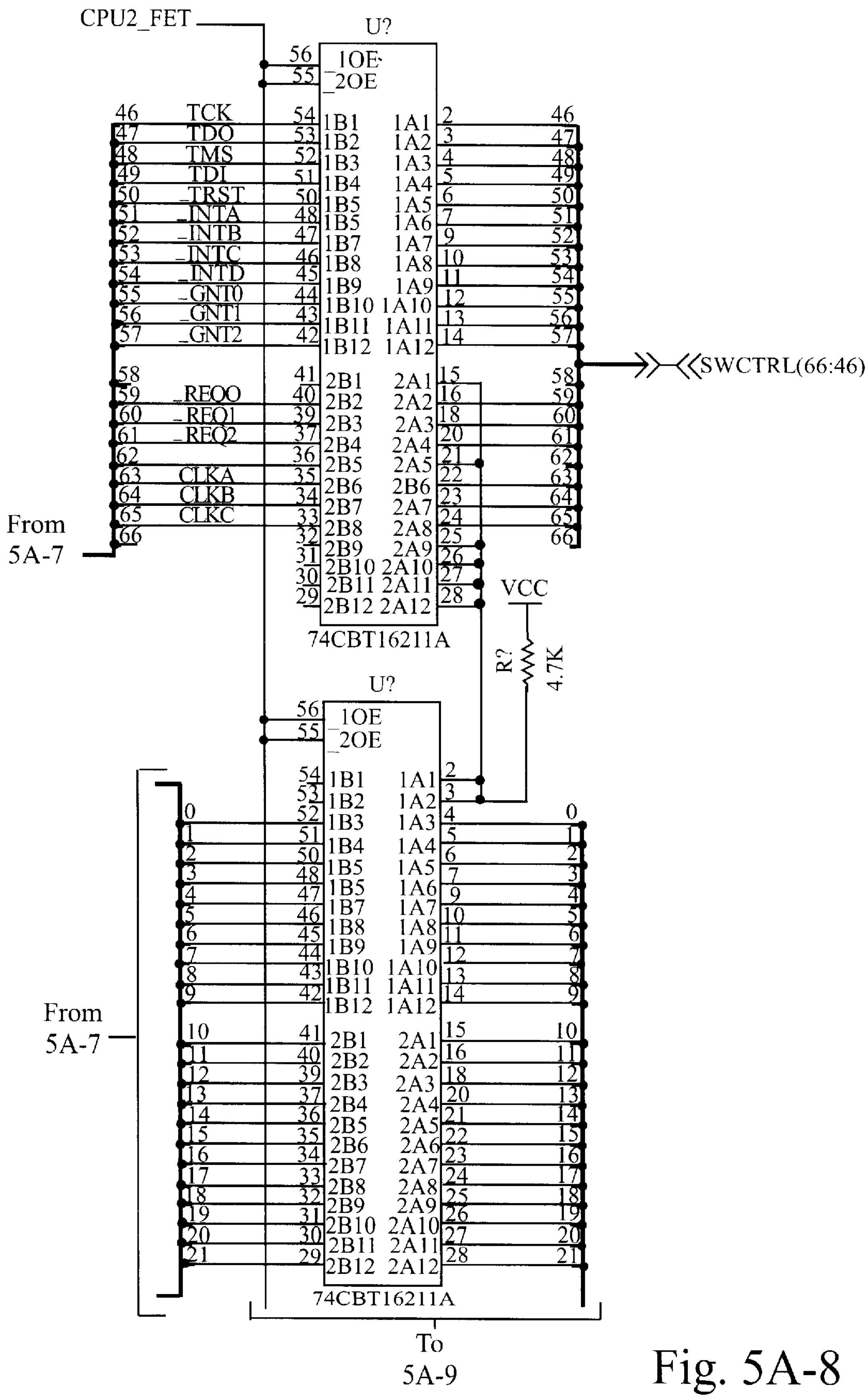
Figures 5, 5A, 6, 7, 8, 9:
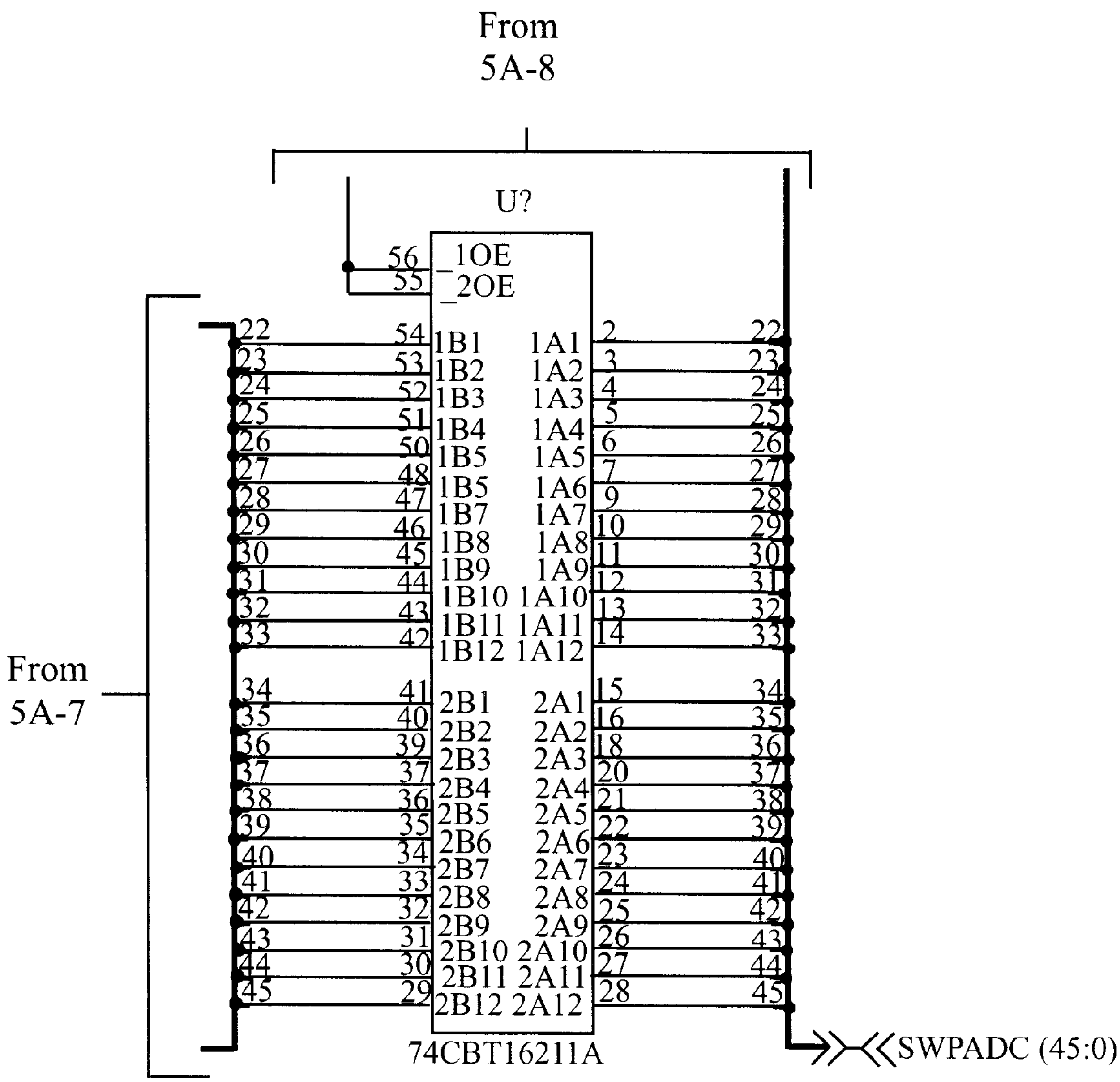
Figures 5, 5A, 6, 7, 8, 9, 10:
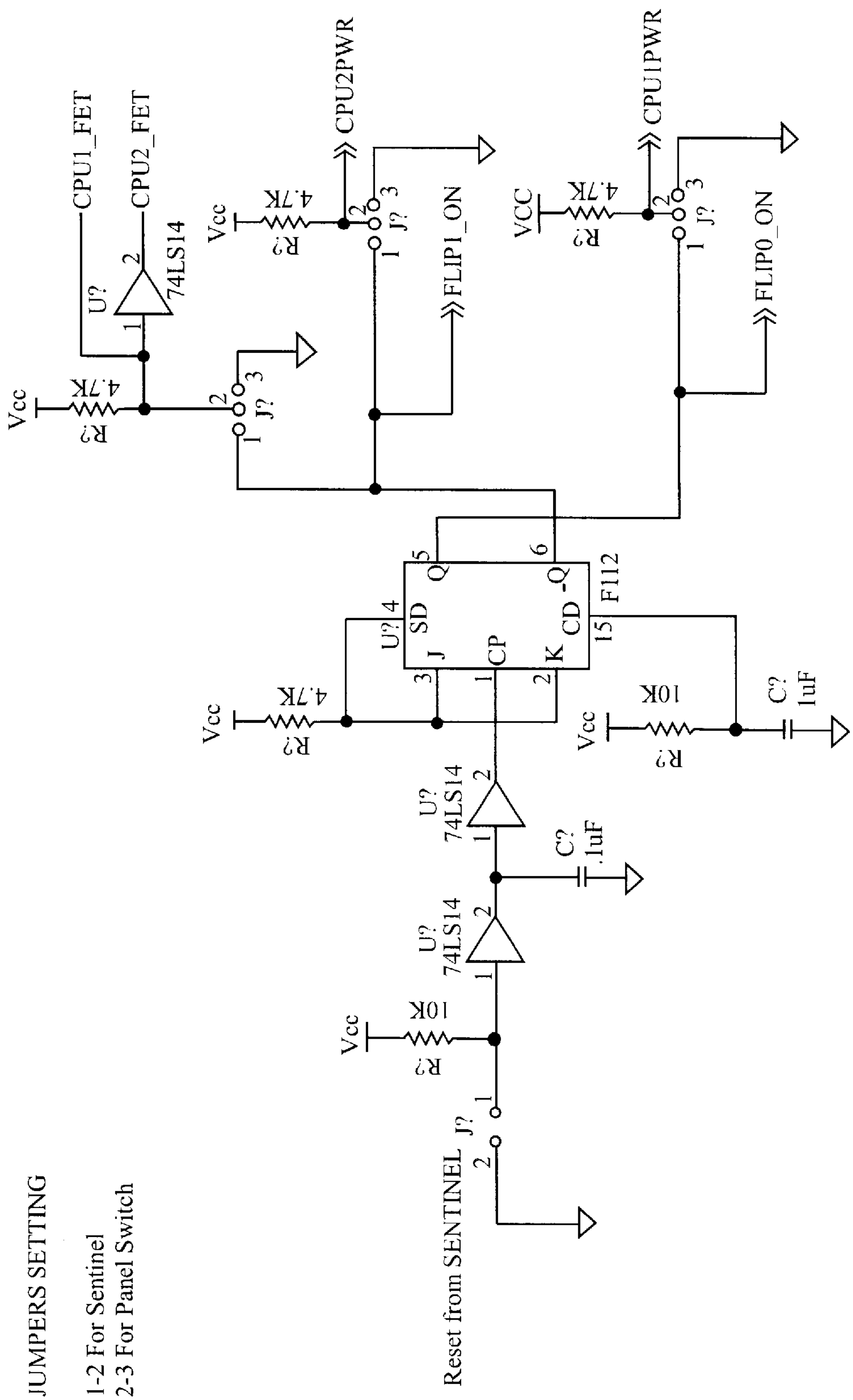
Figure 5B:
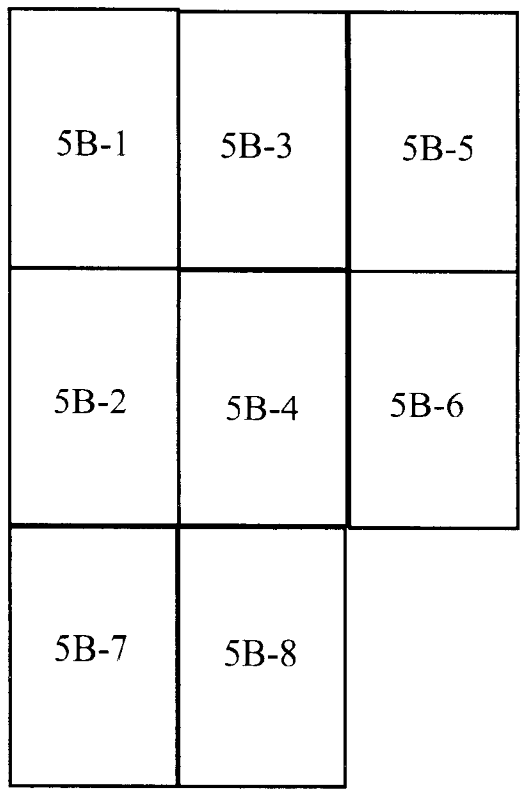
Figures 1, 5B:
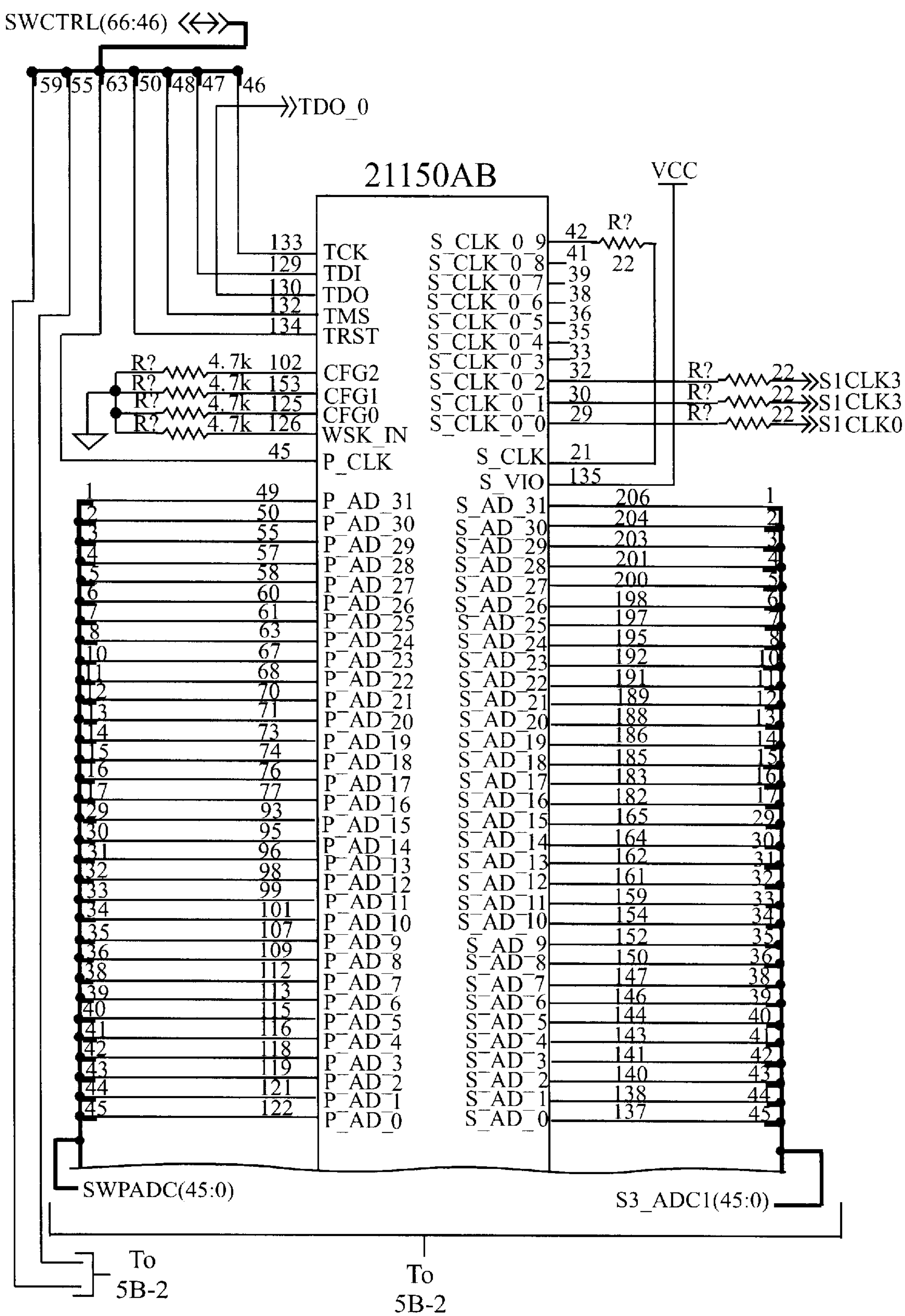
Figures 2, 5B:
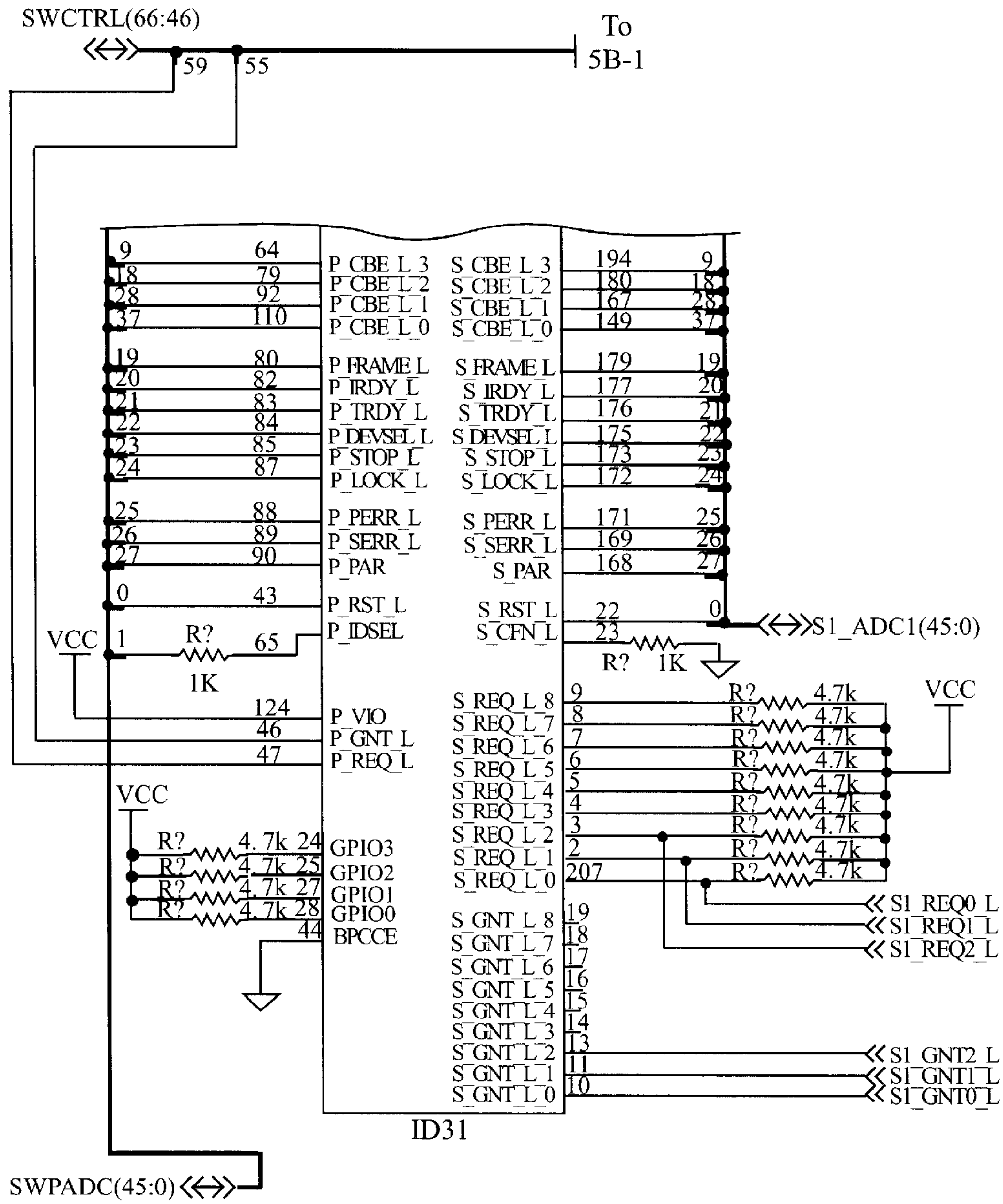
Figures 3, 5B:
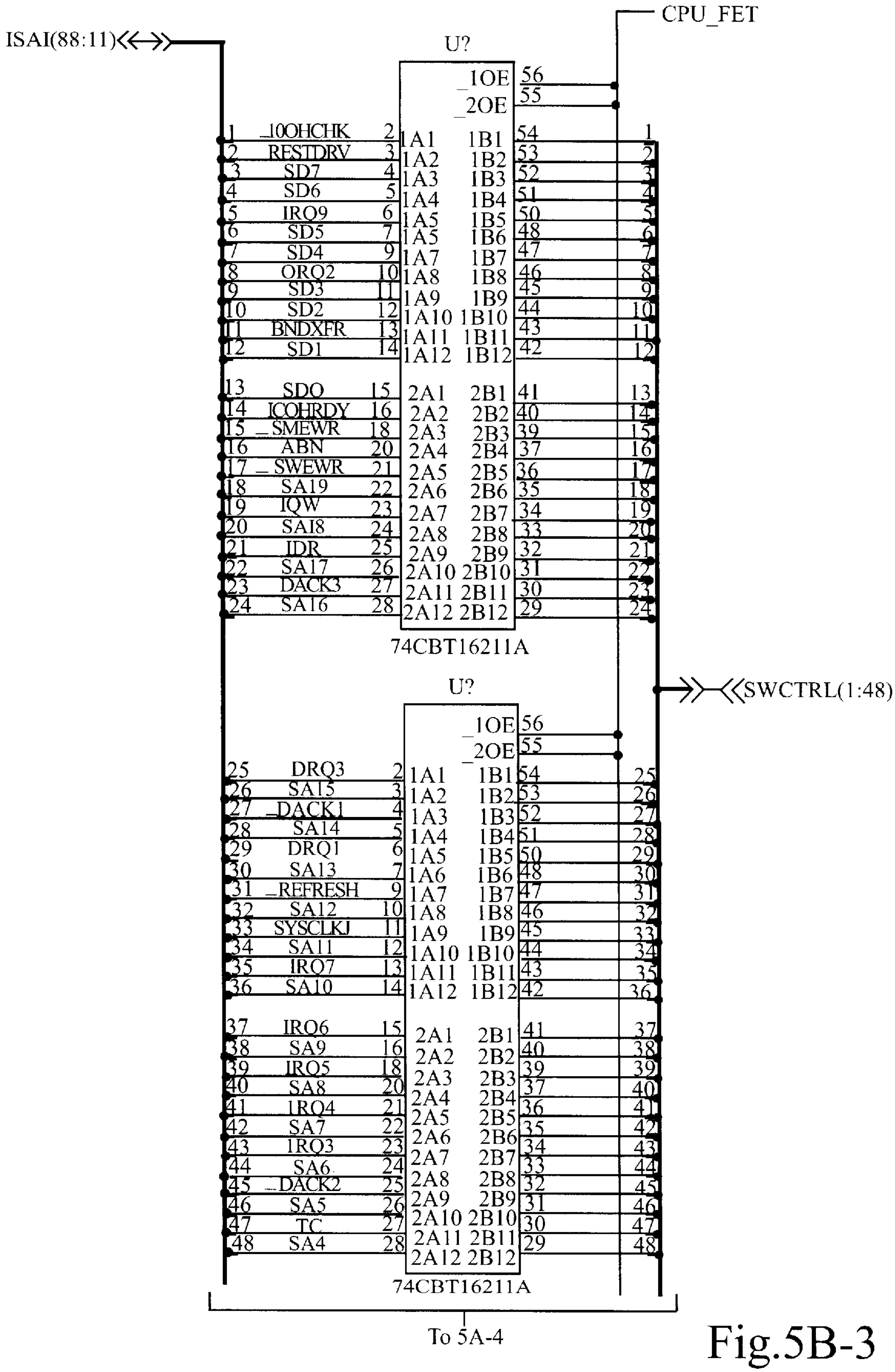
Figures 4, 5B:
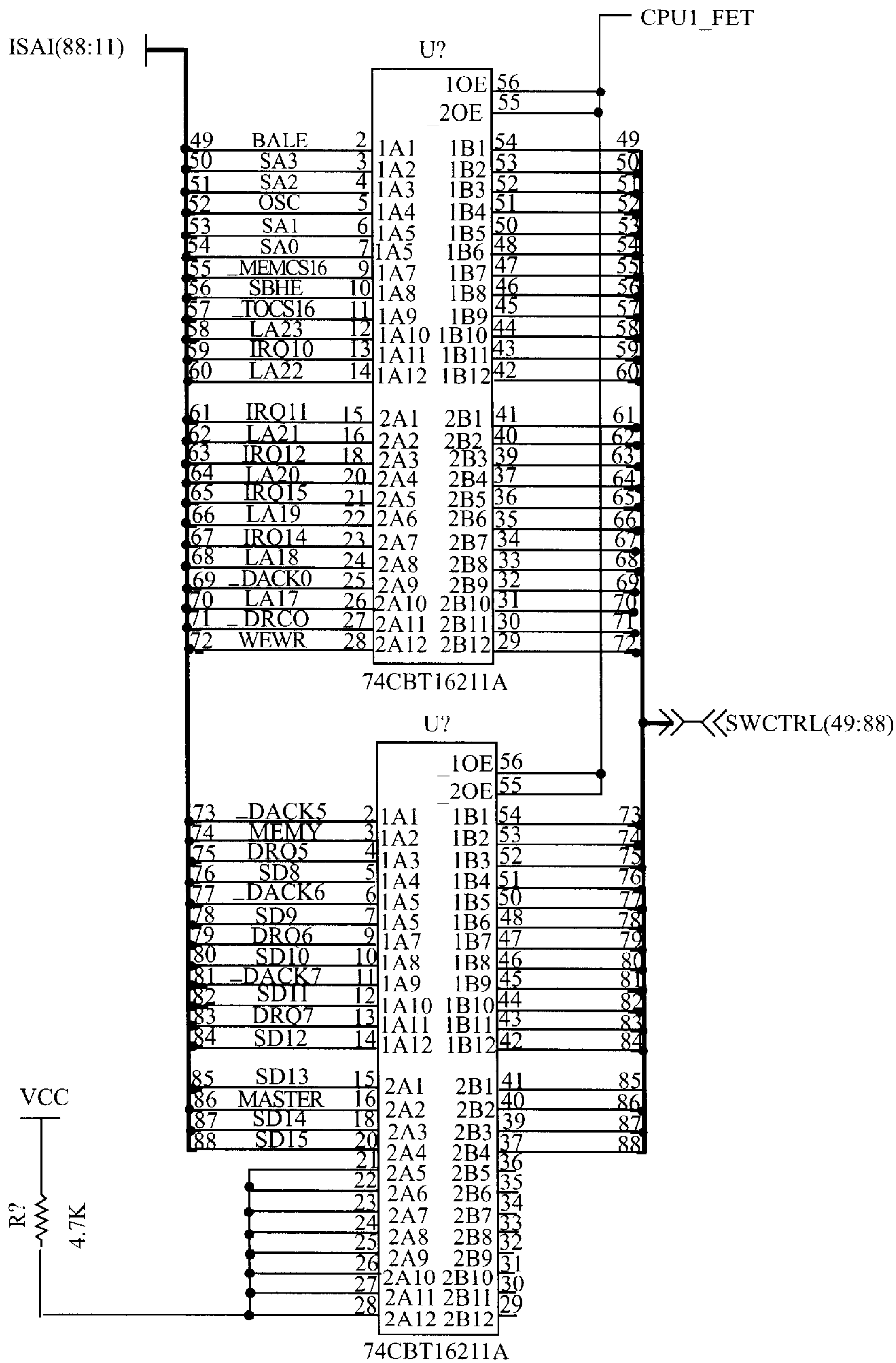
Figures 5, 5B:
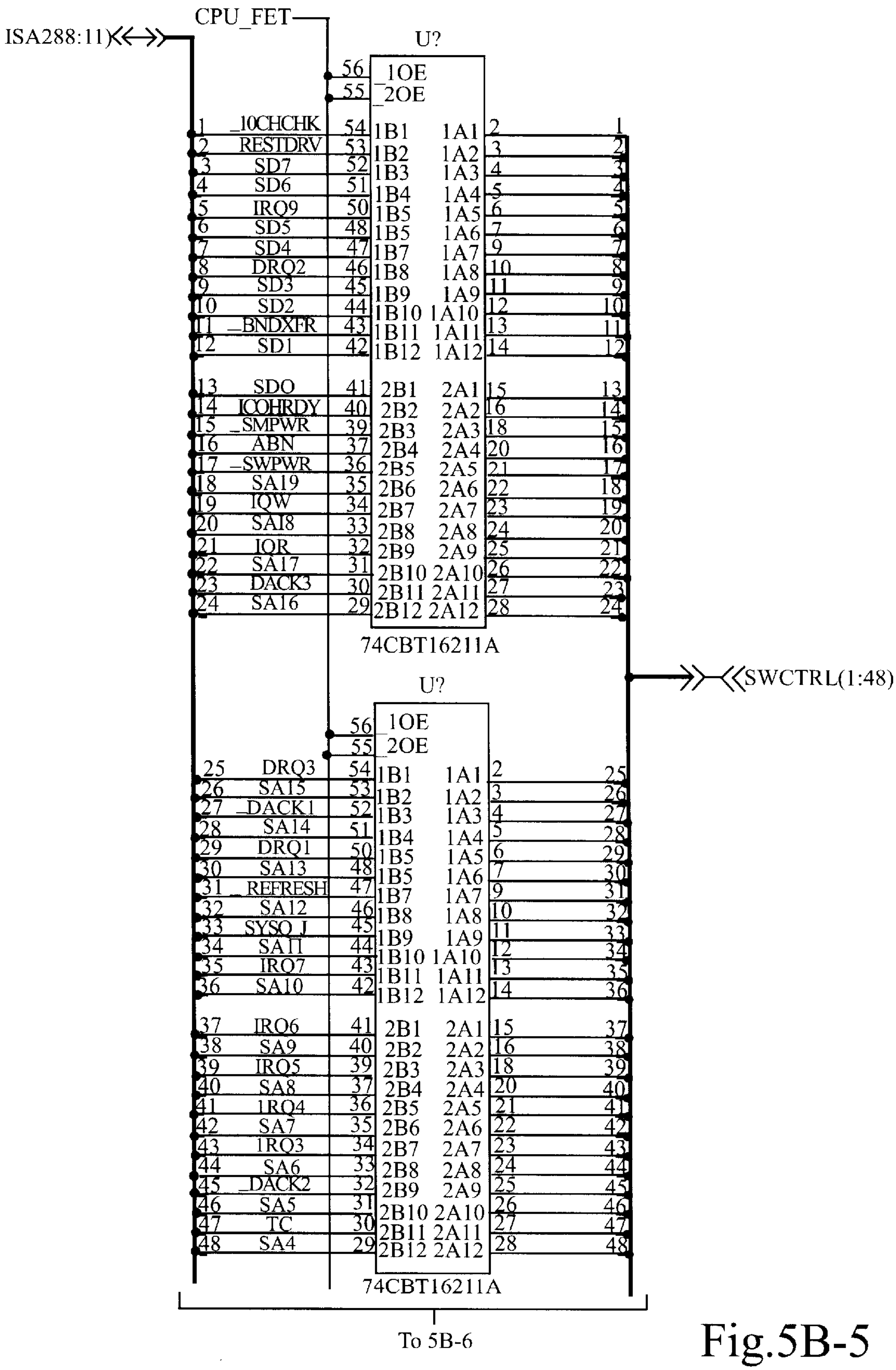
Figures 5, 5B, 6:
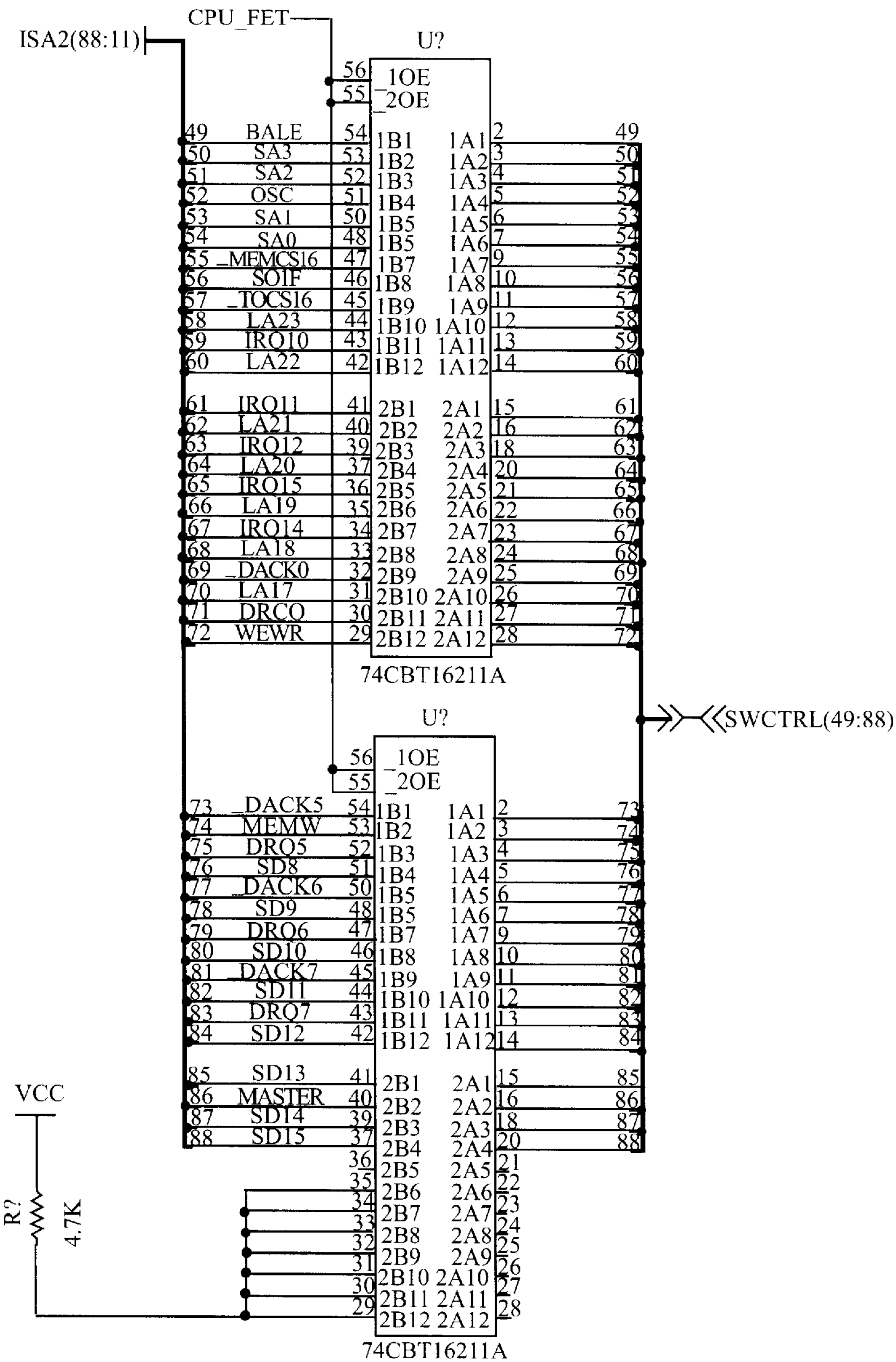
Figures 5, 5B, 6, 7:
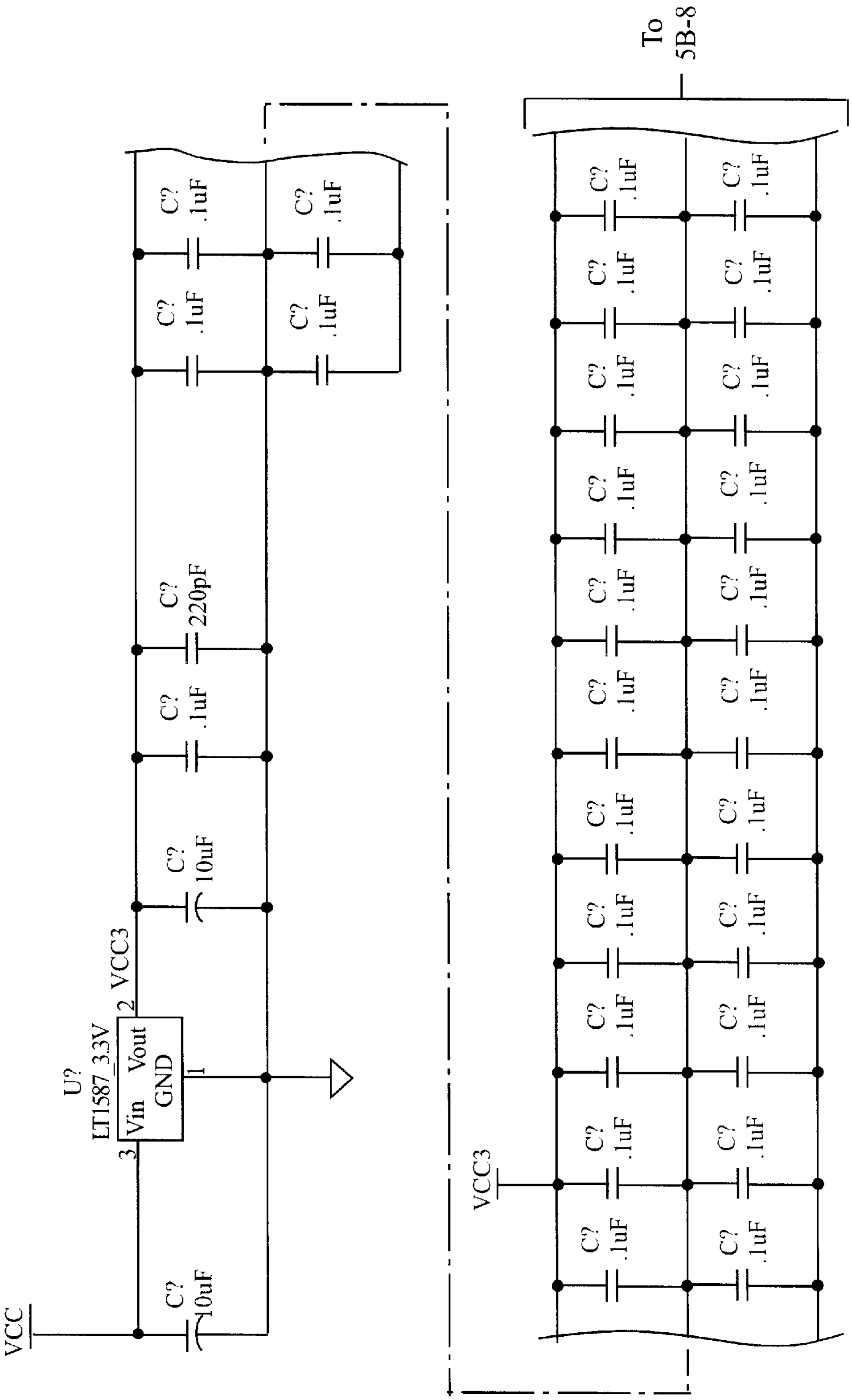
Figures 5, 5B, 6, 7, 8:
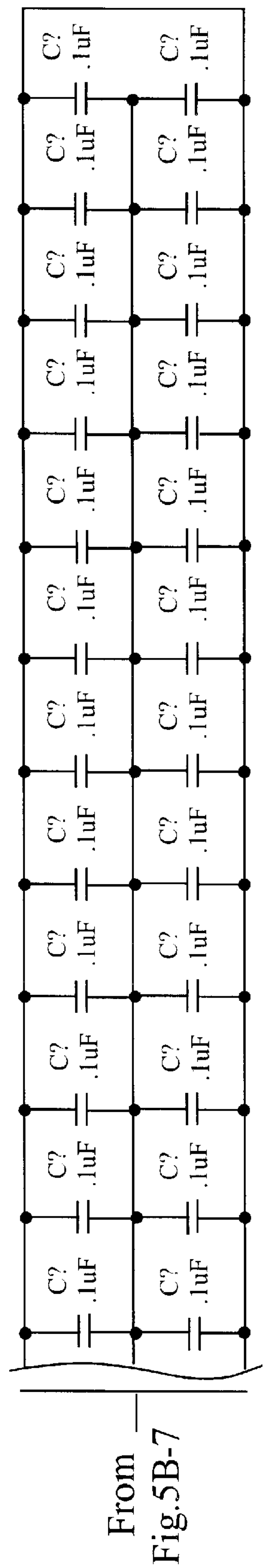
Figure 5C:
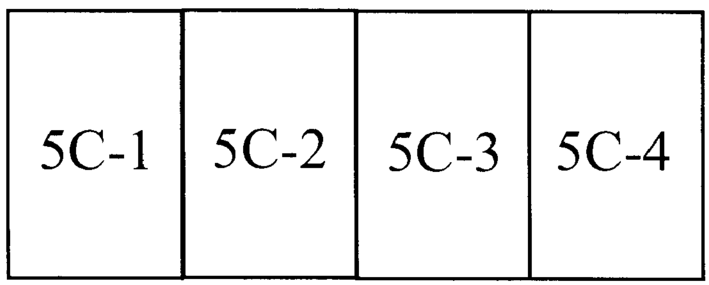
Figures 1, 5C:
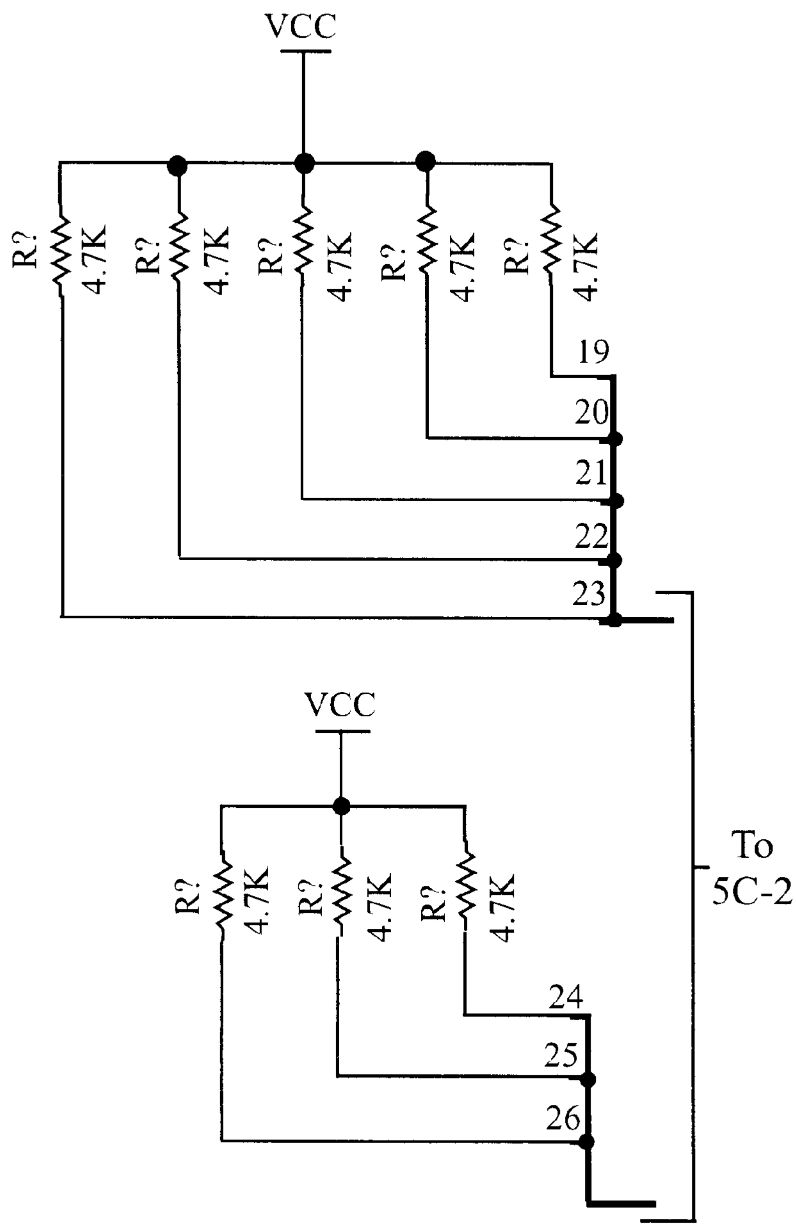
Figures 2, 5C:
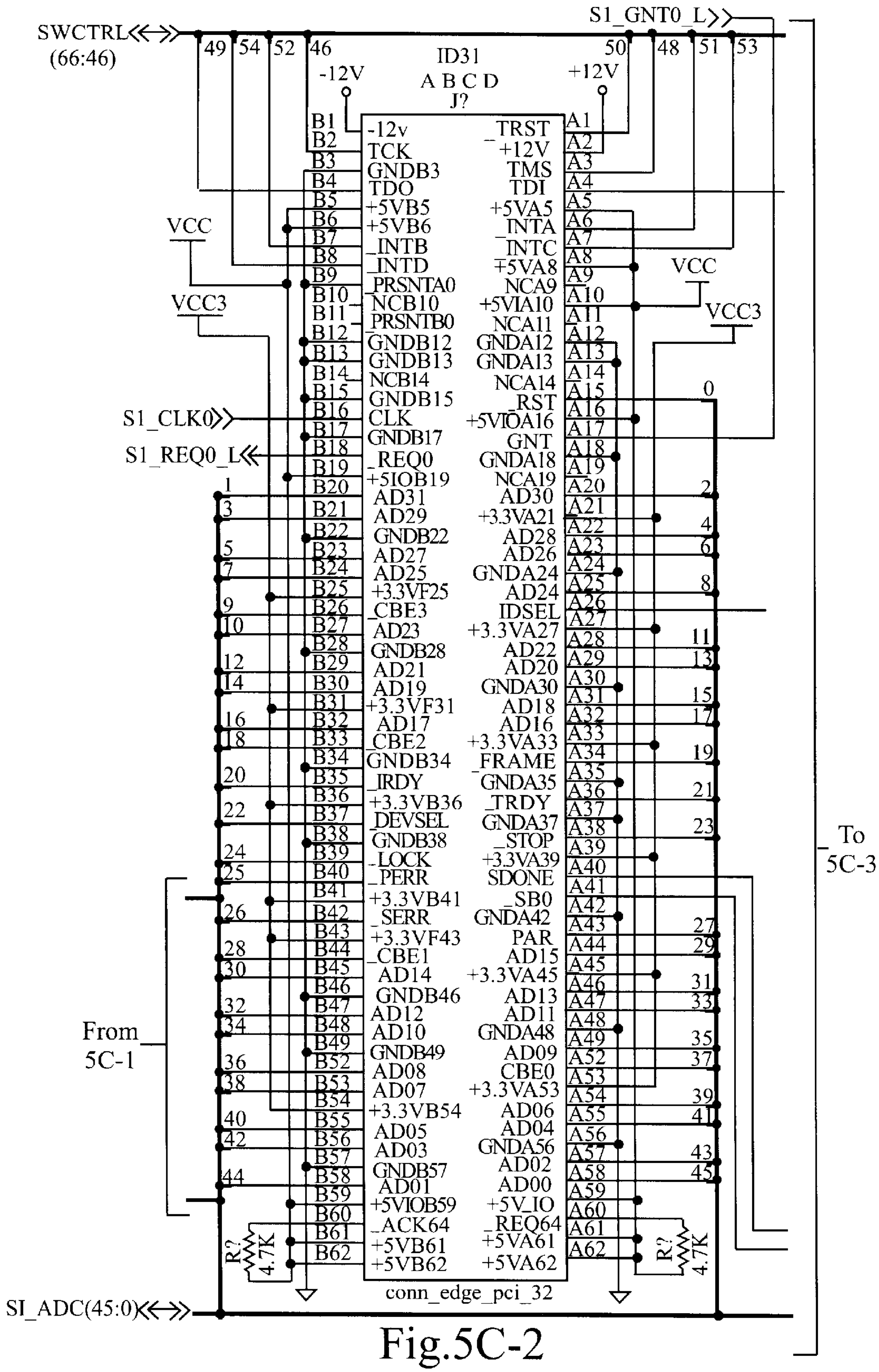
Figures 3, 5C:
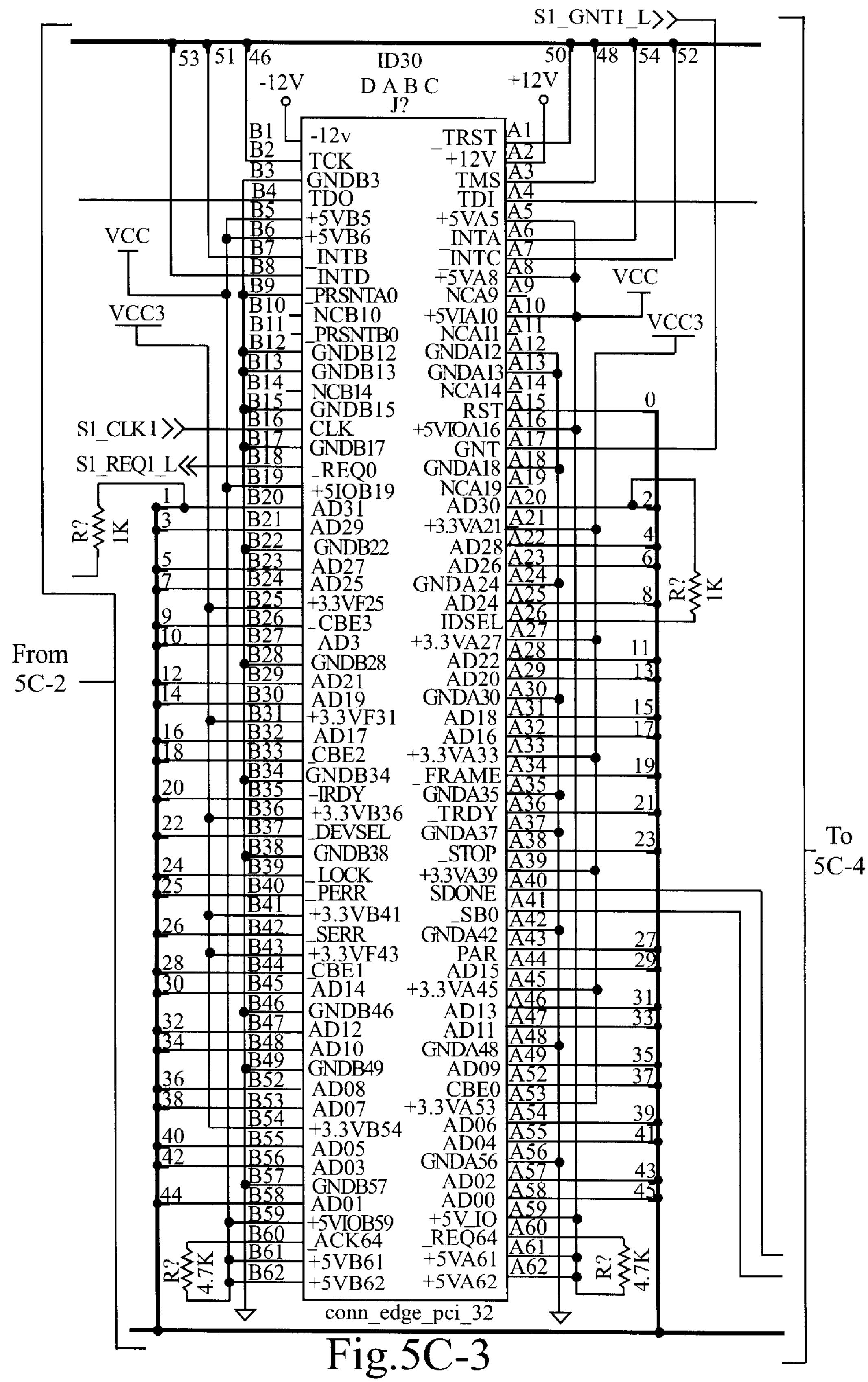
Figures 4, 5C:
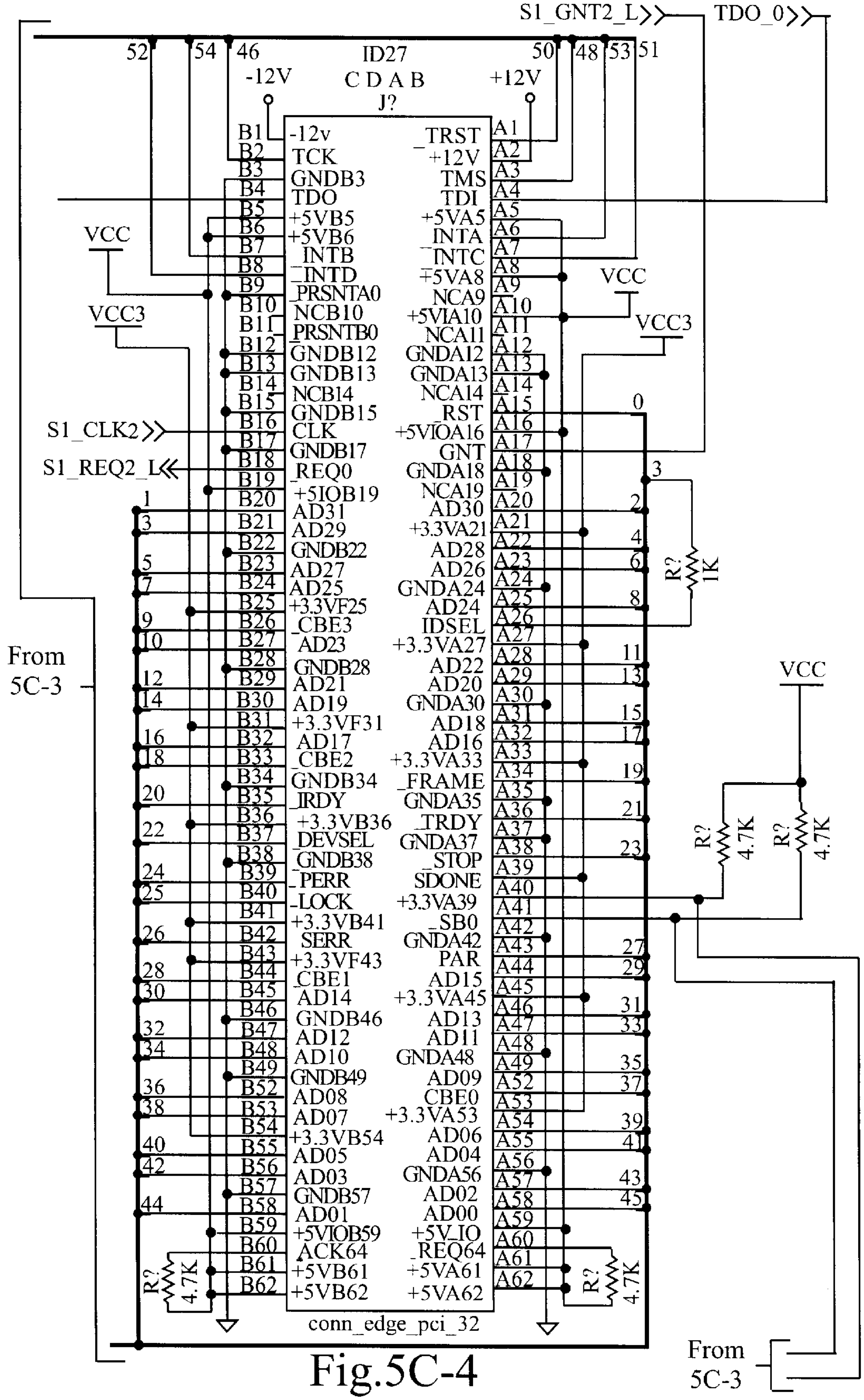
Figure 5D:
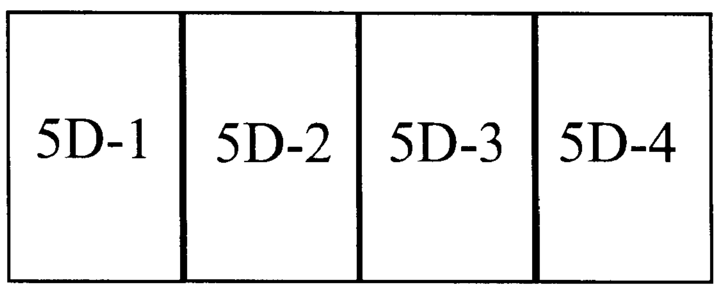
Figures 1, 5D:
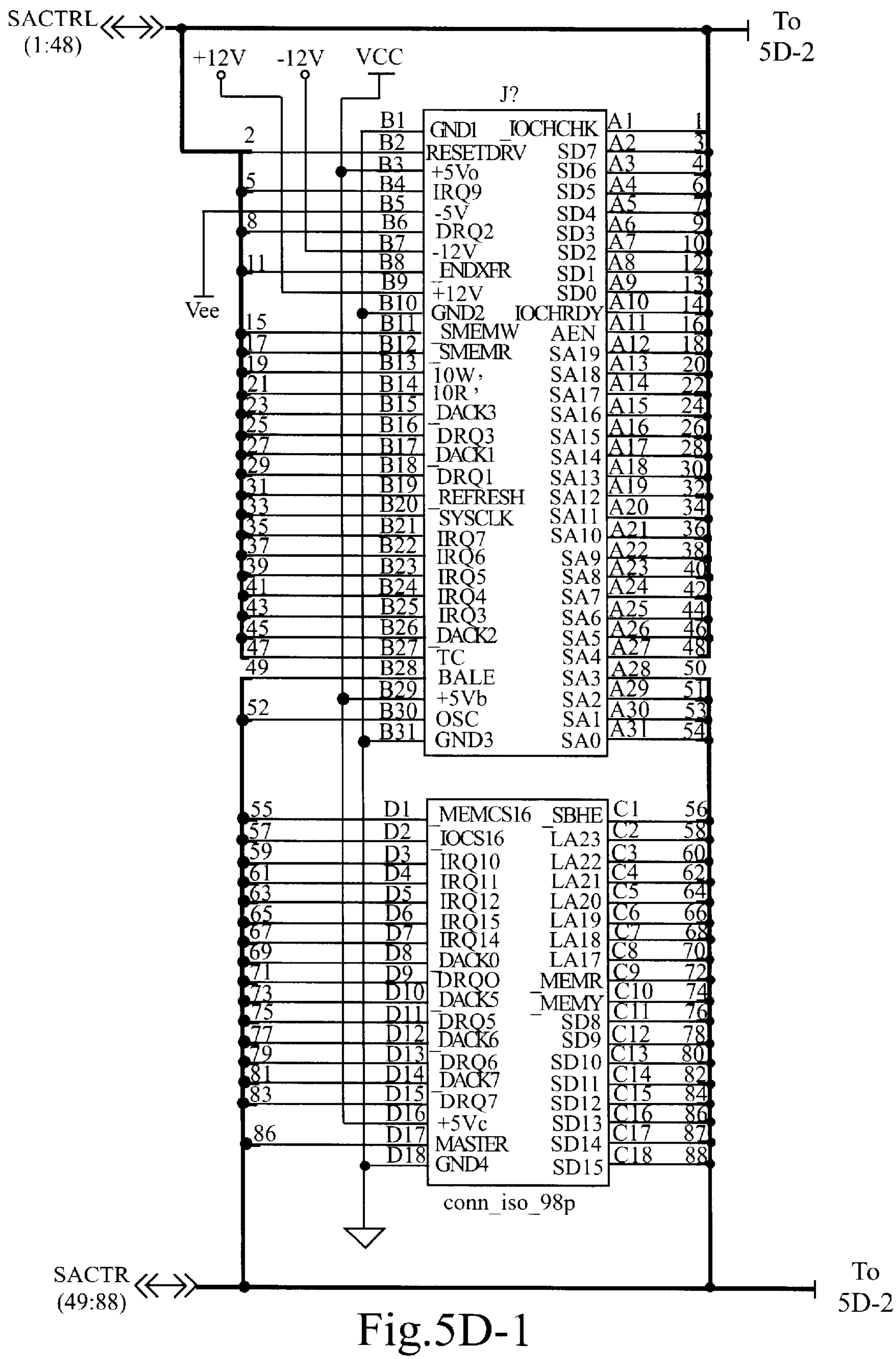
Figures 2, 5D:
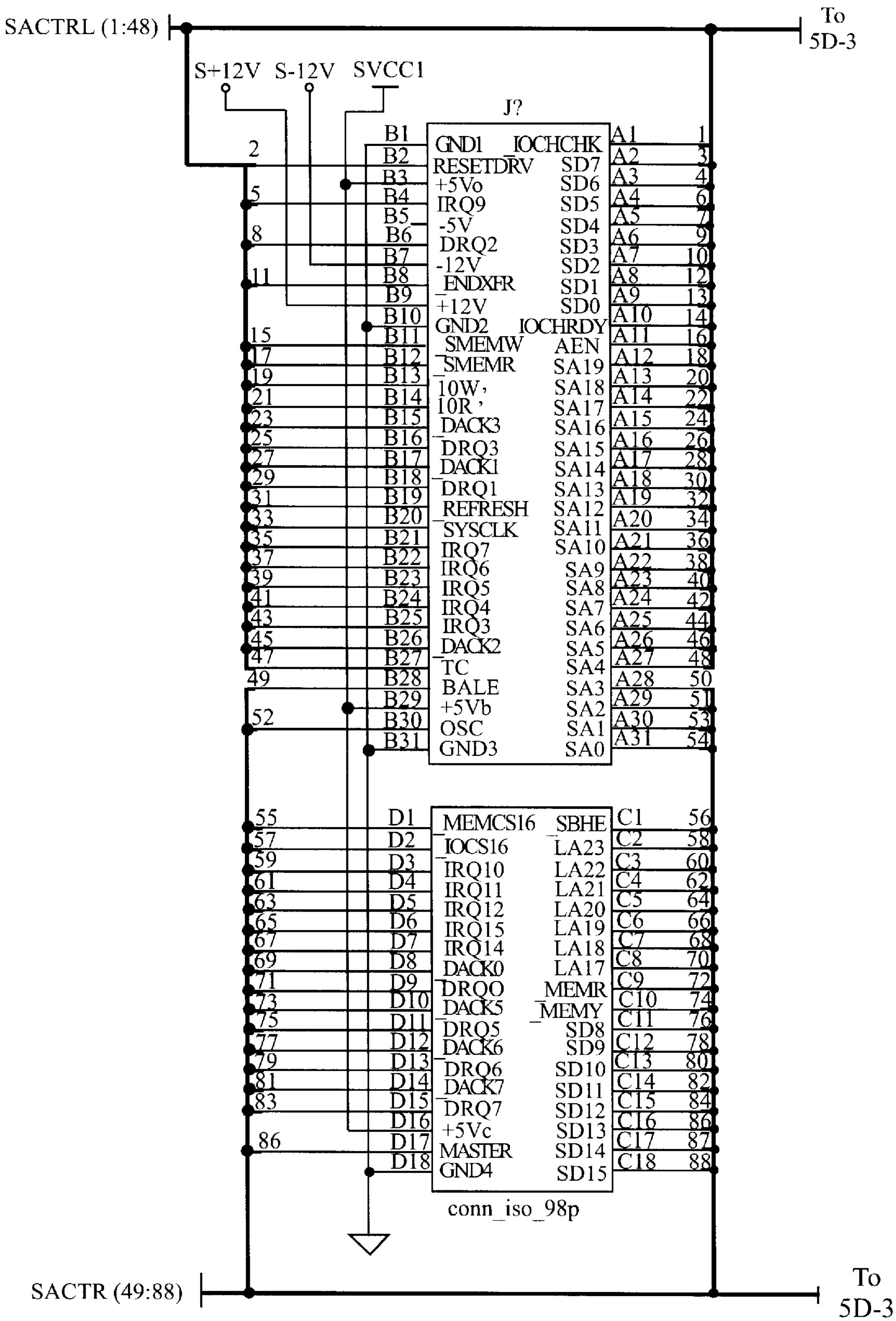
Figures 3, 5D:
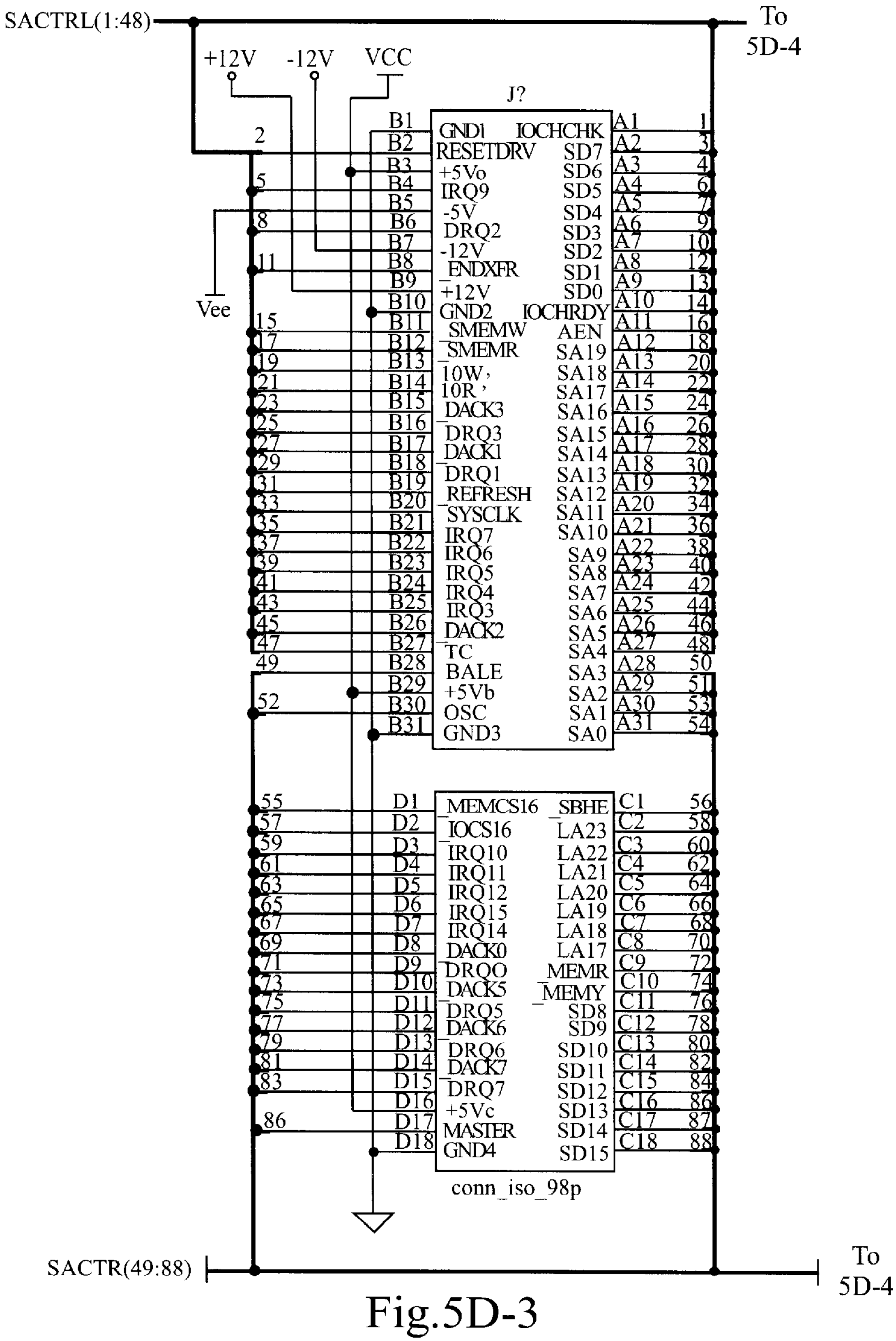
Figures 4, 5D:
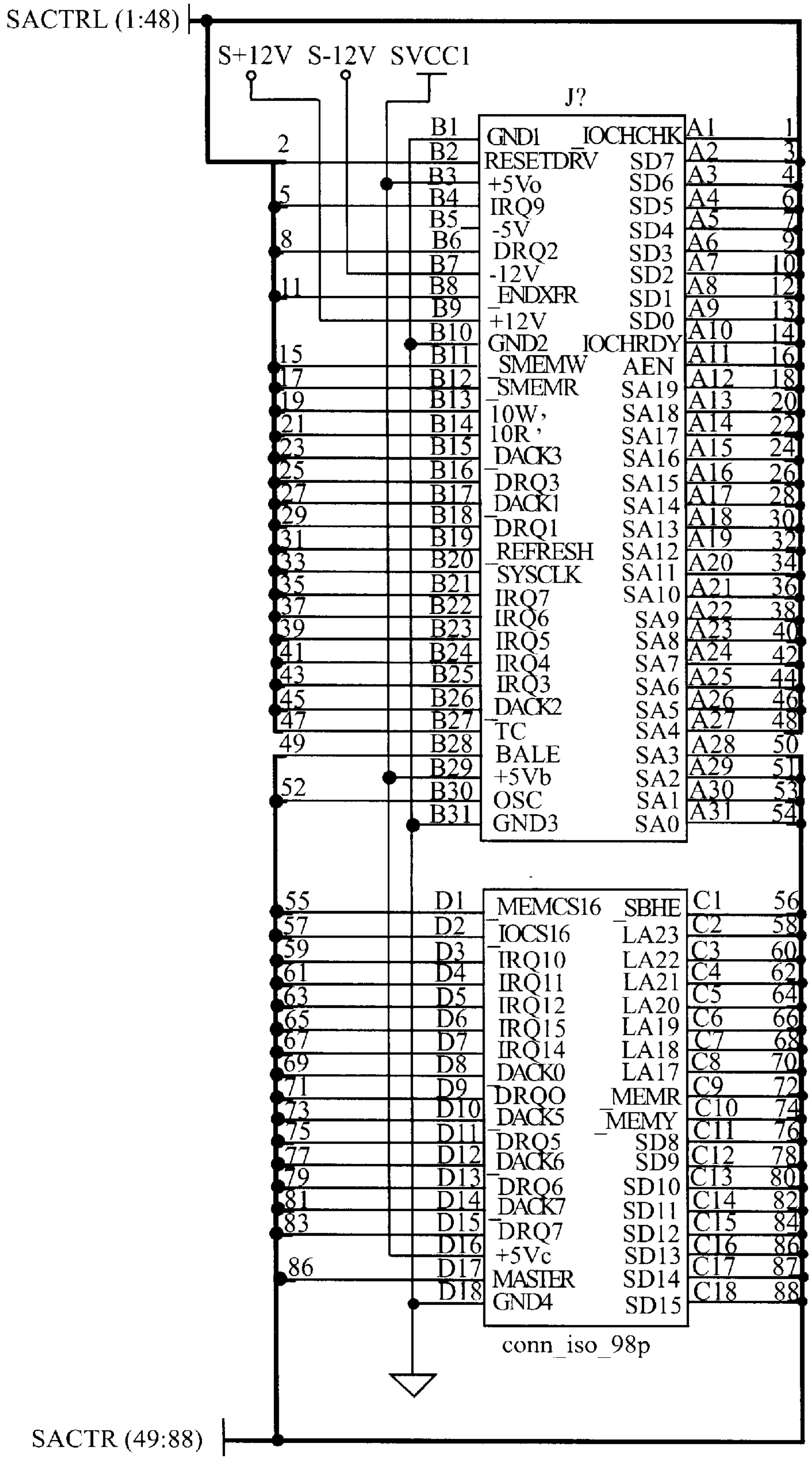
Figure 5E:
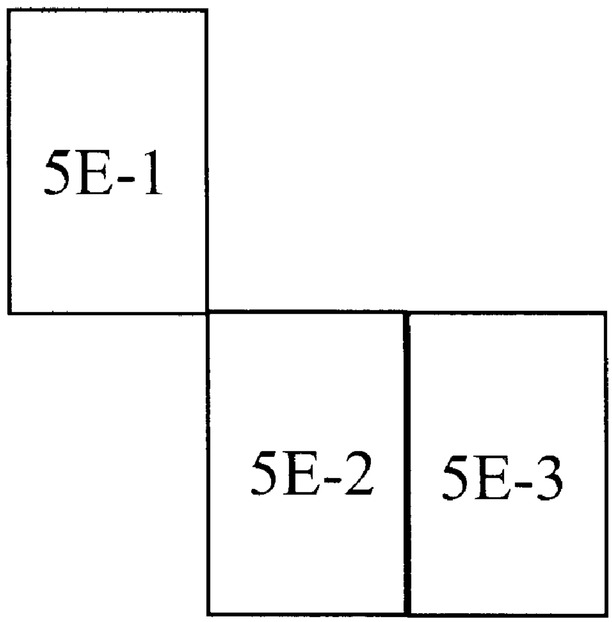
Figures 1, 5E:
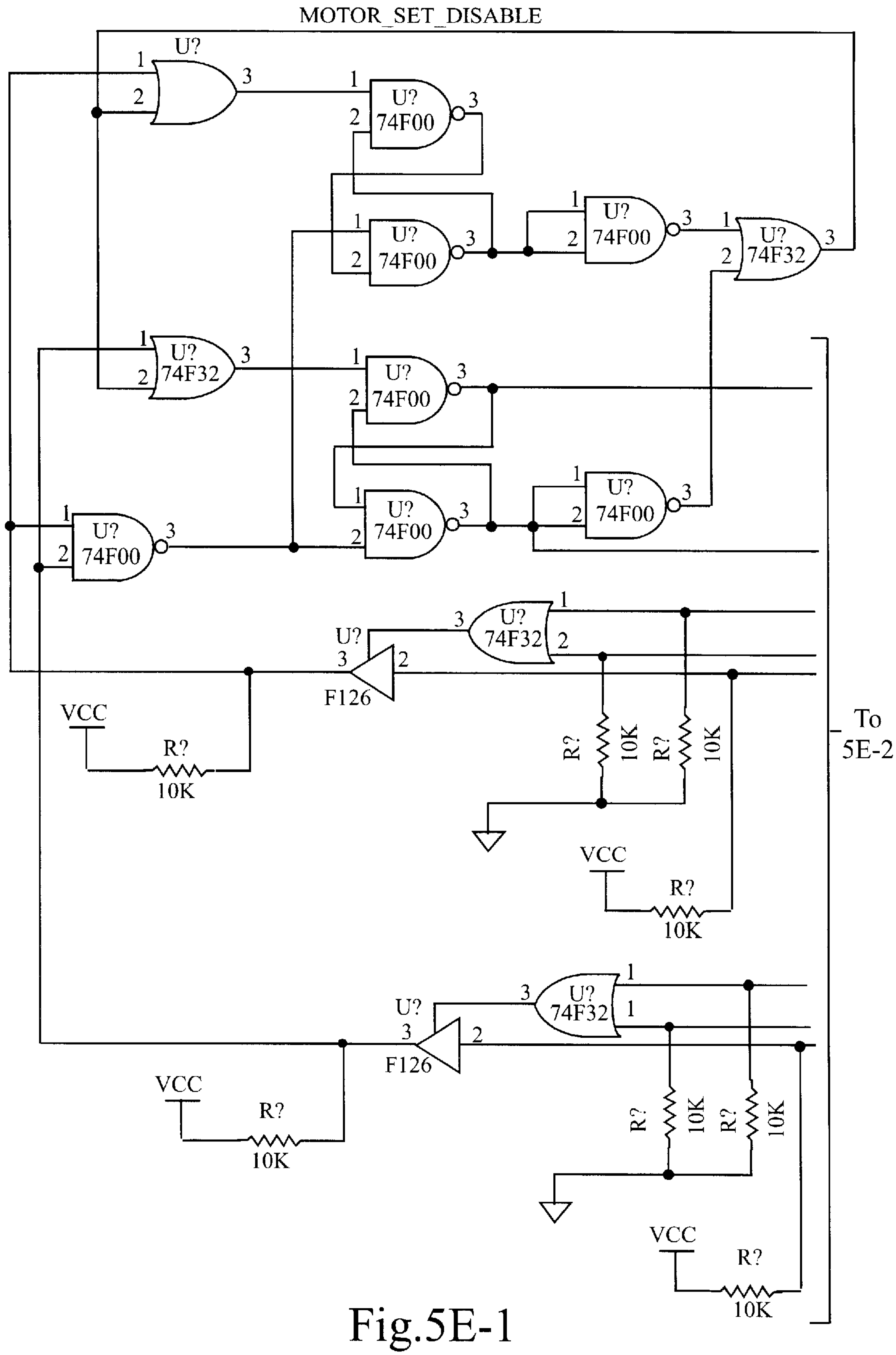
Figures 2, 5E:
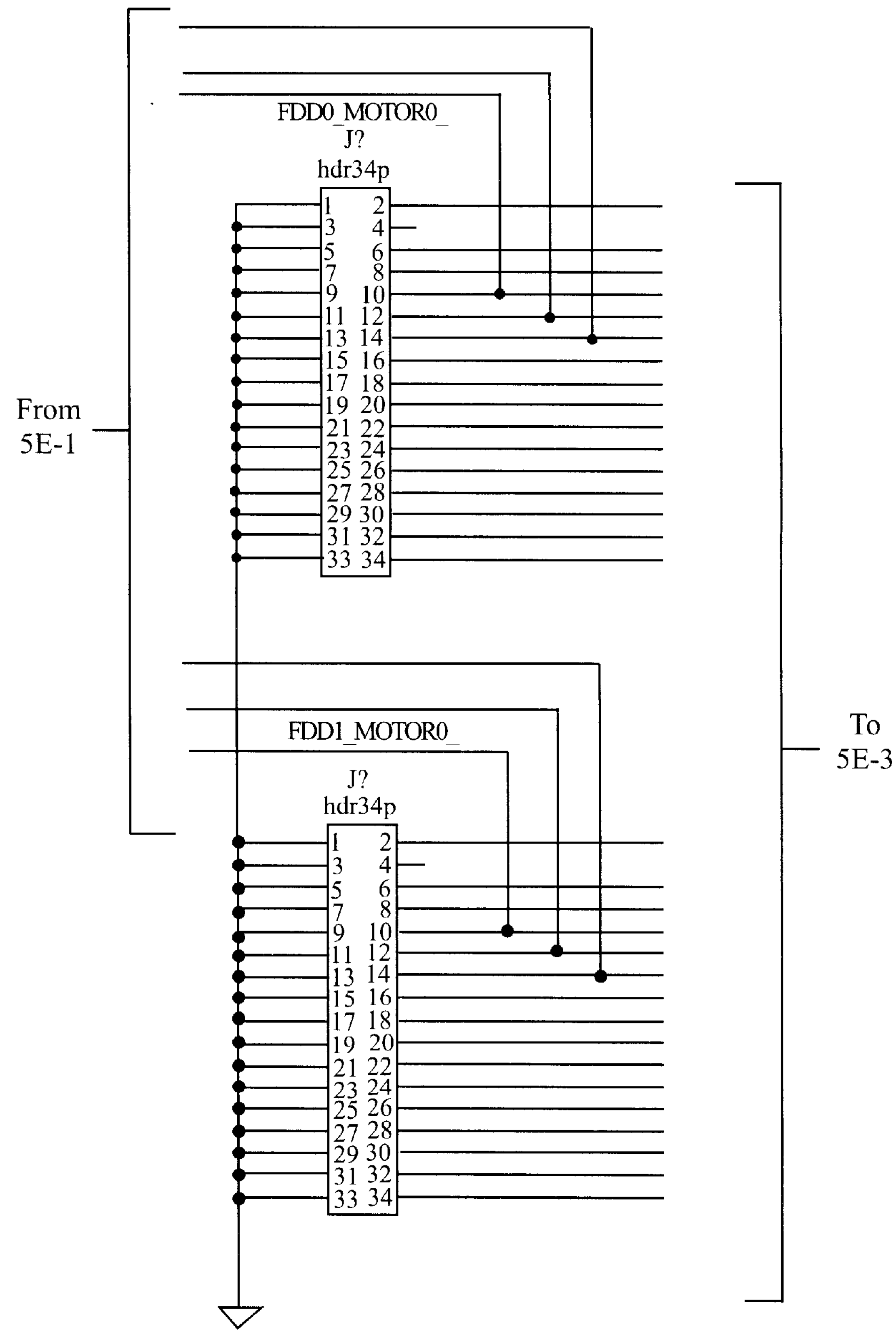
Figures 3, 5E:
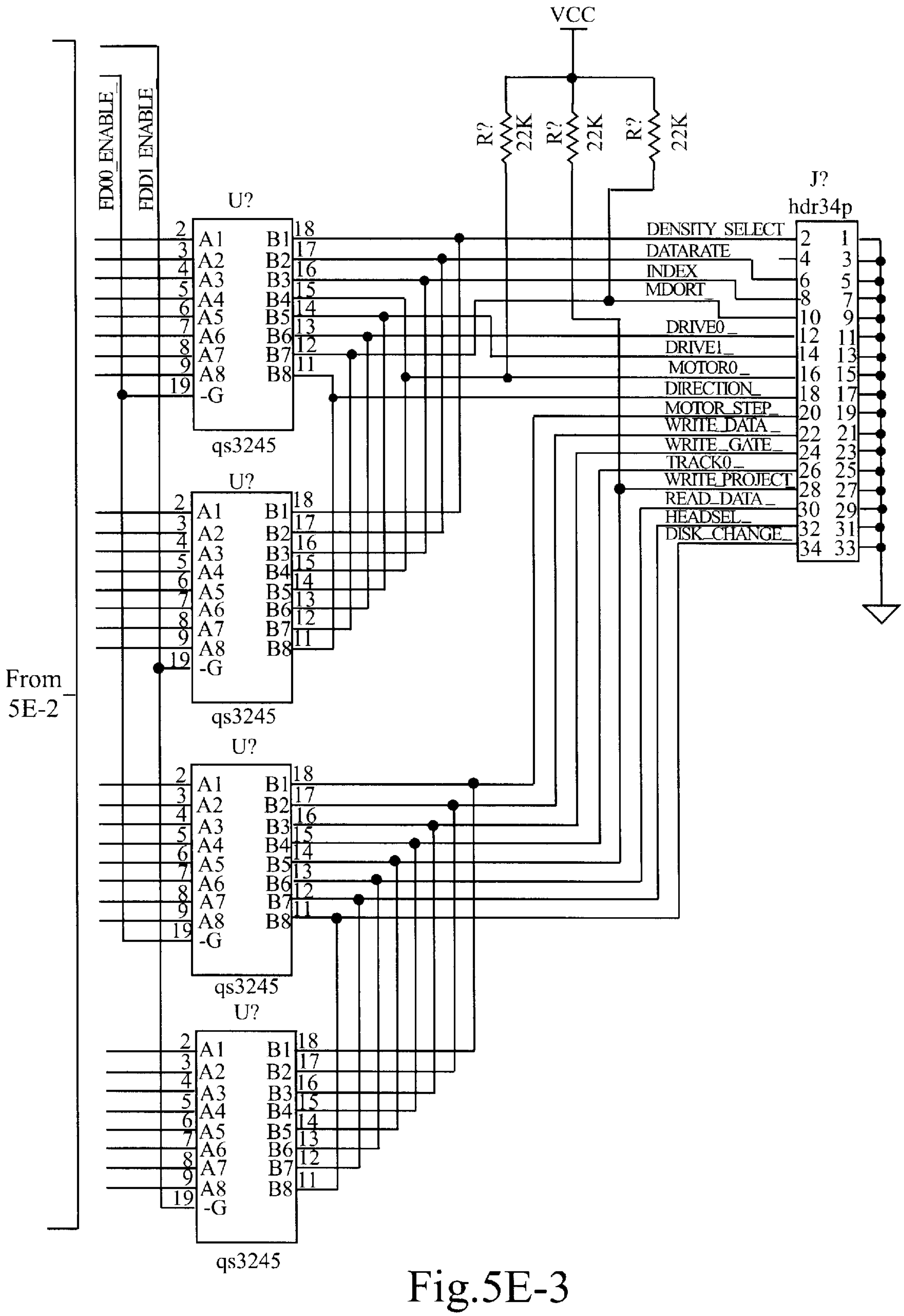
Figure 5F:
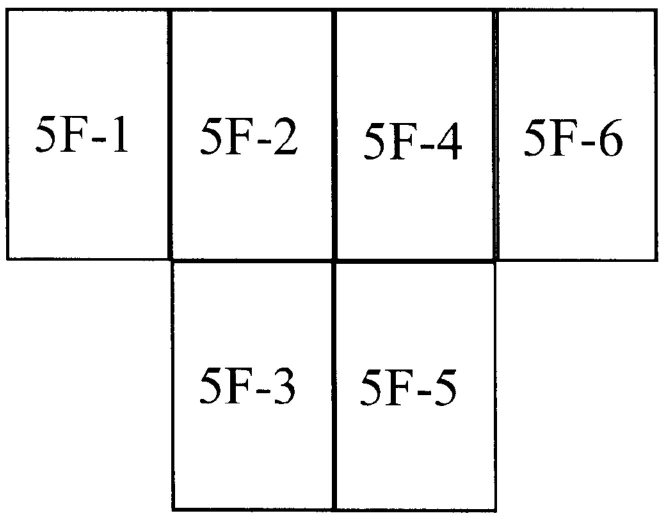
Figures 1, 5F:
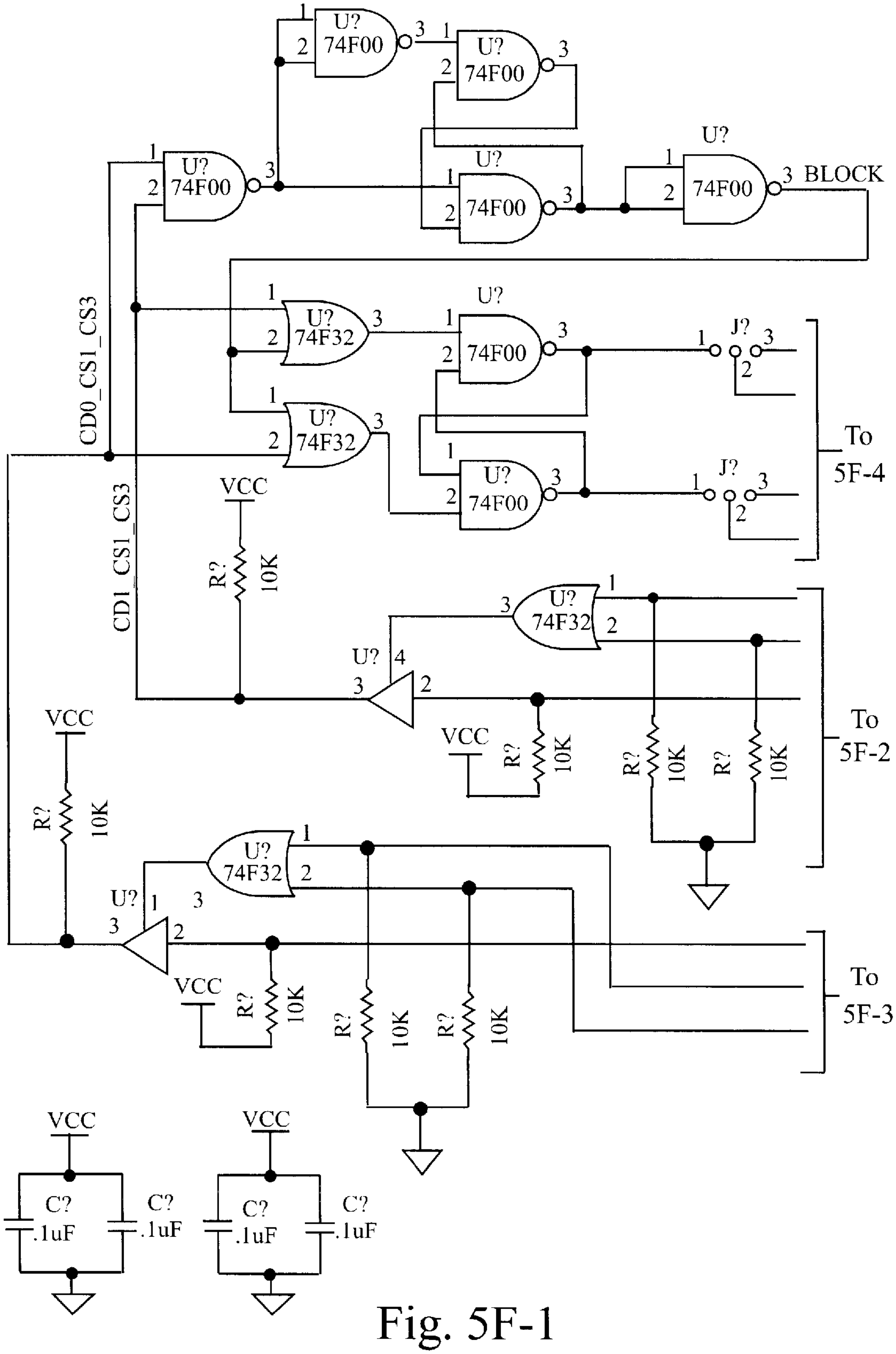
Figures 2, 5F:
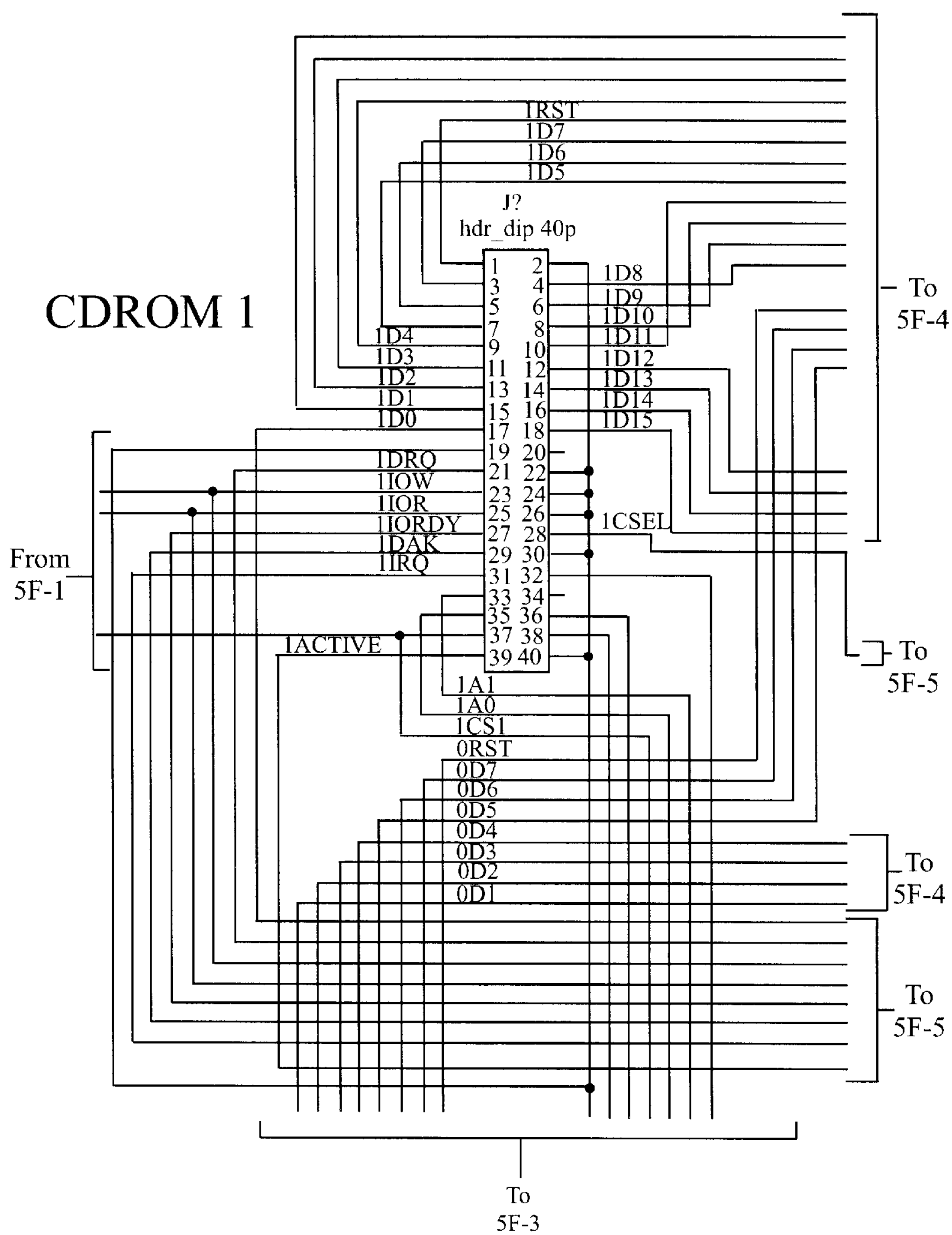
Figures 3, 5F:
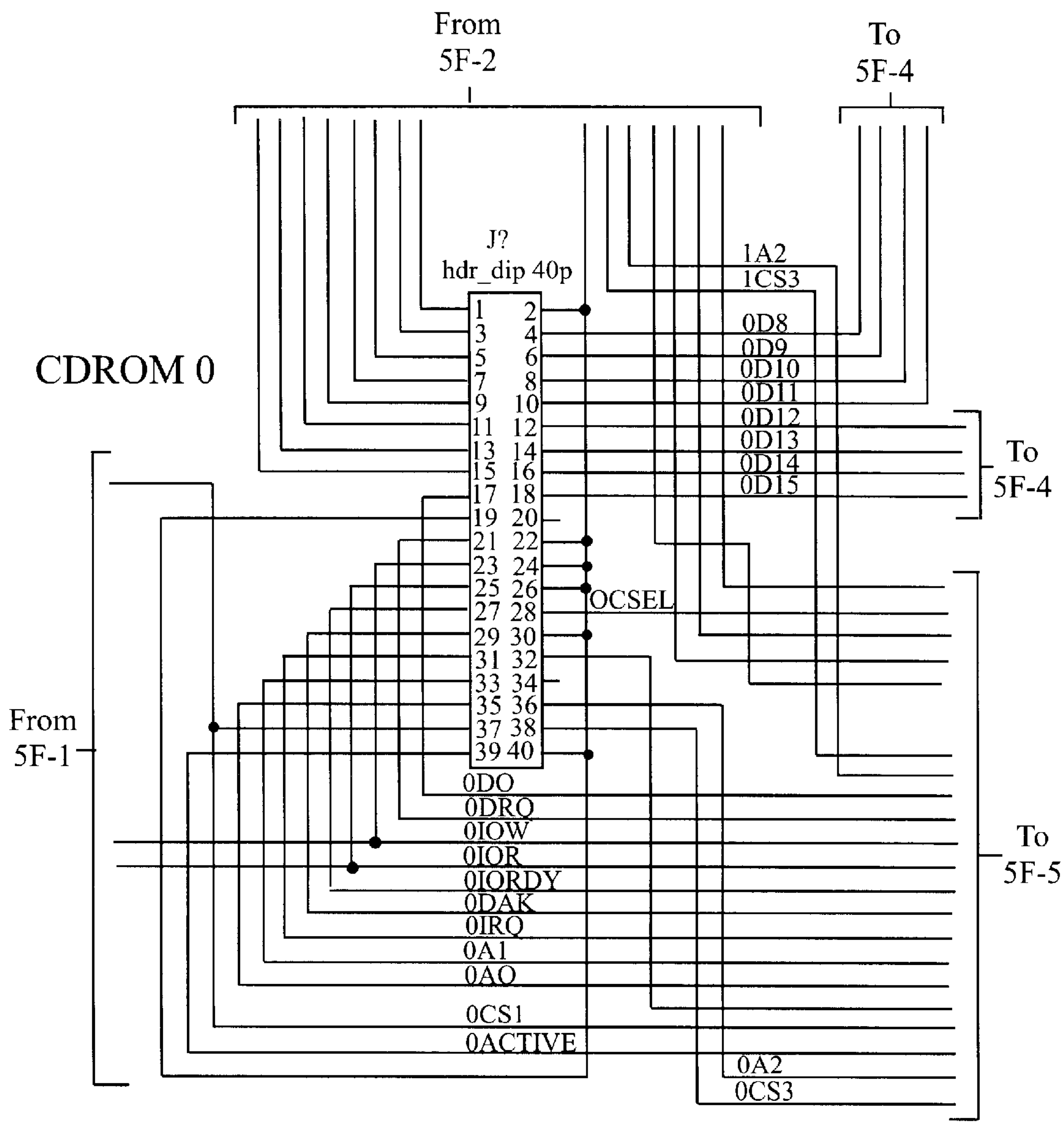
Figures 4, 5F:
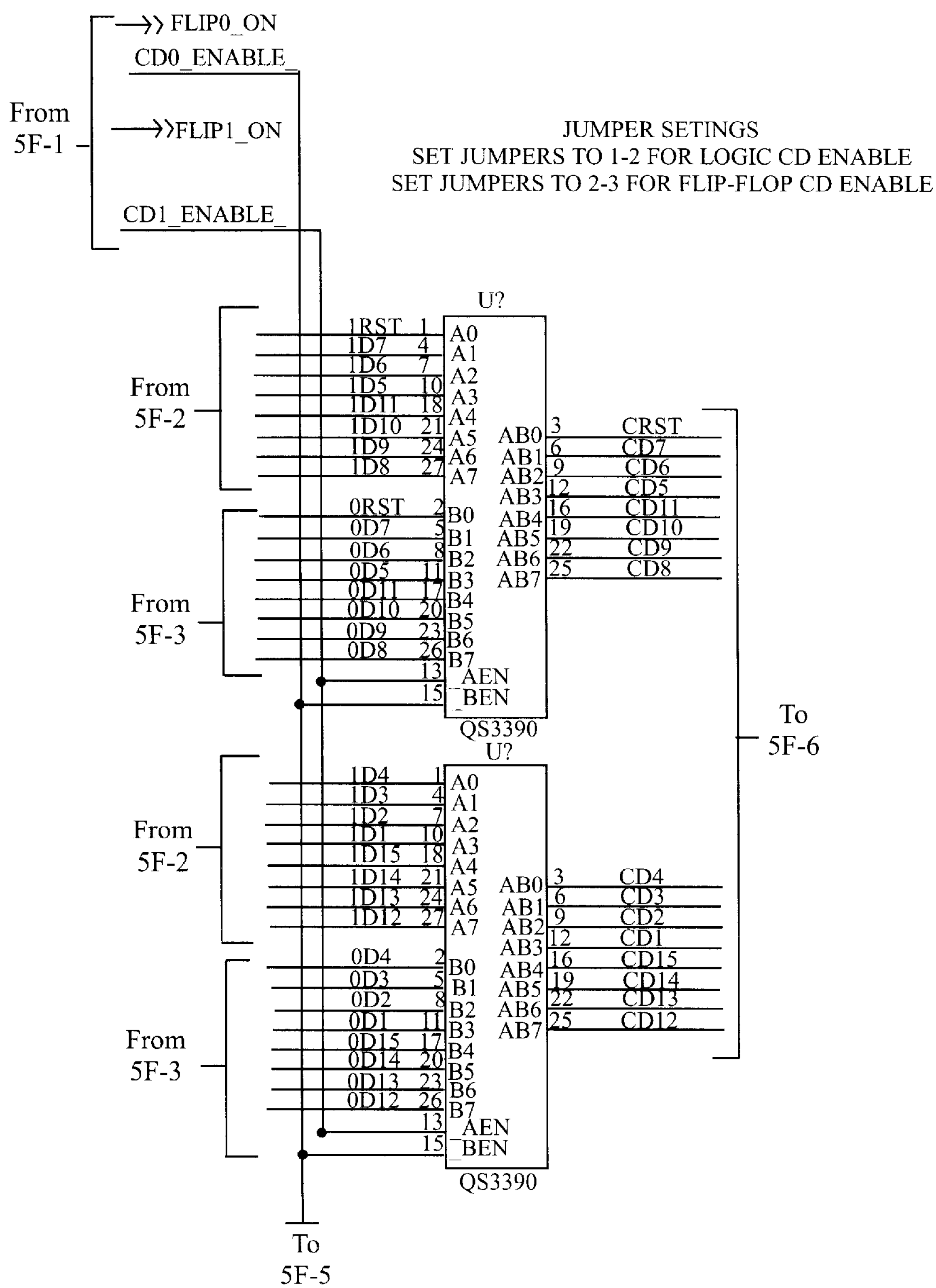
Figures 5, 5F:
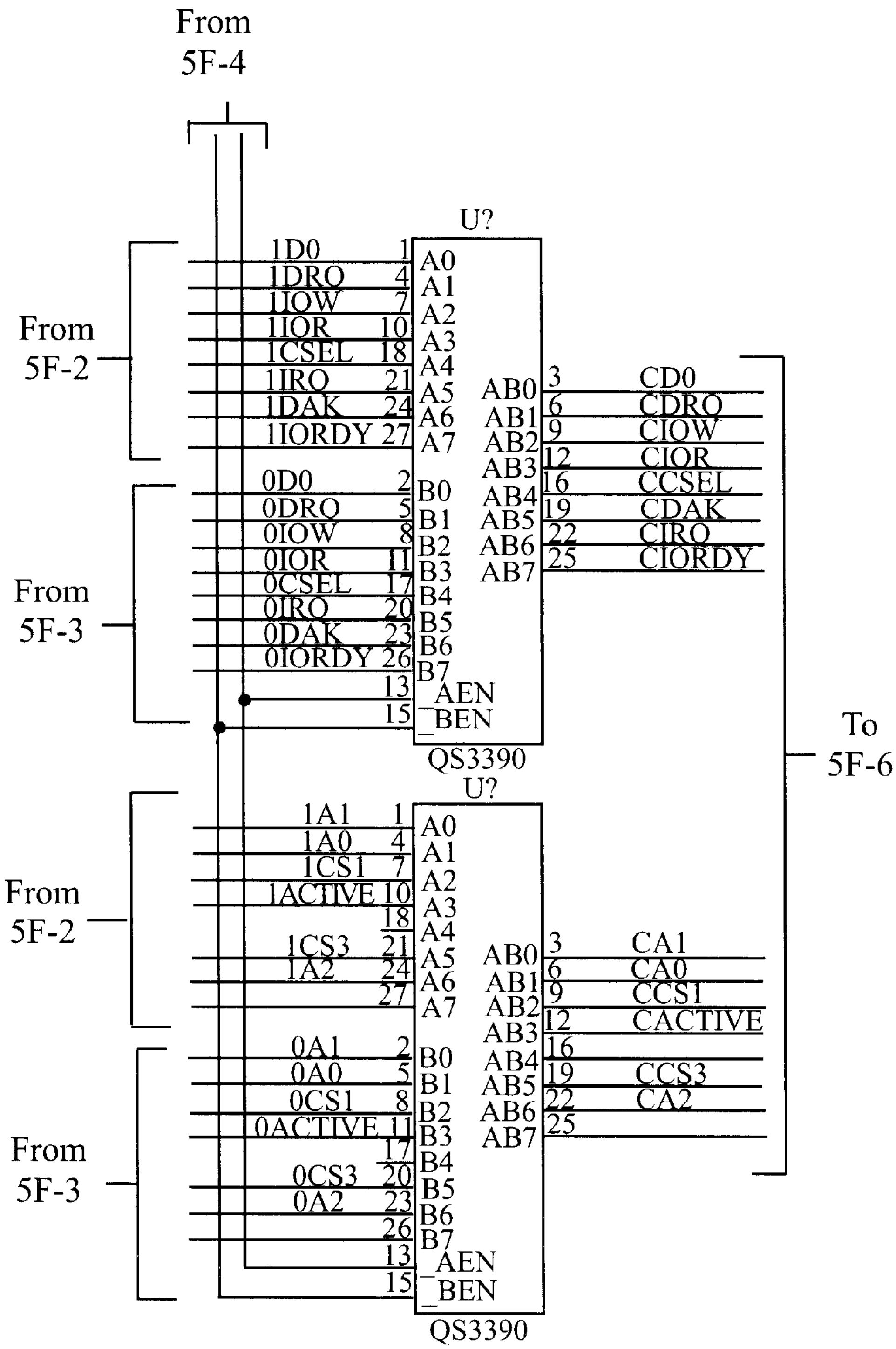
Figures 5, 5F, 6:
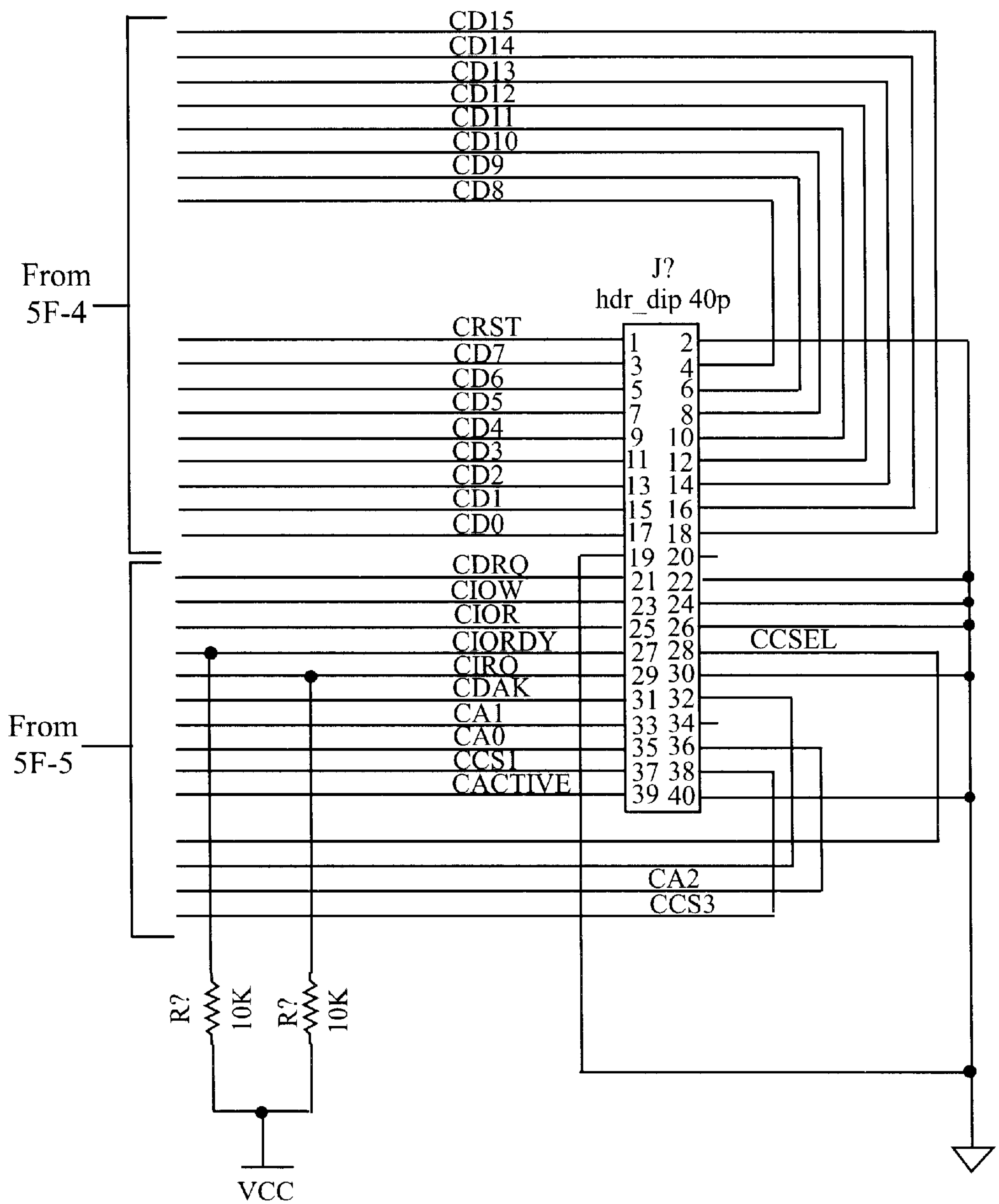
Figure 5G:
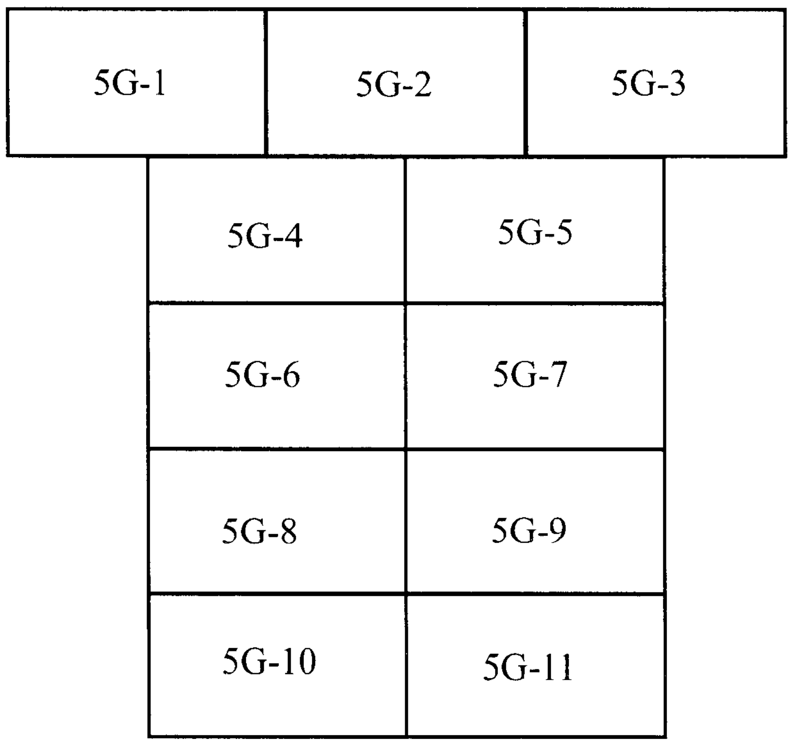
Figures 1, 5G:
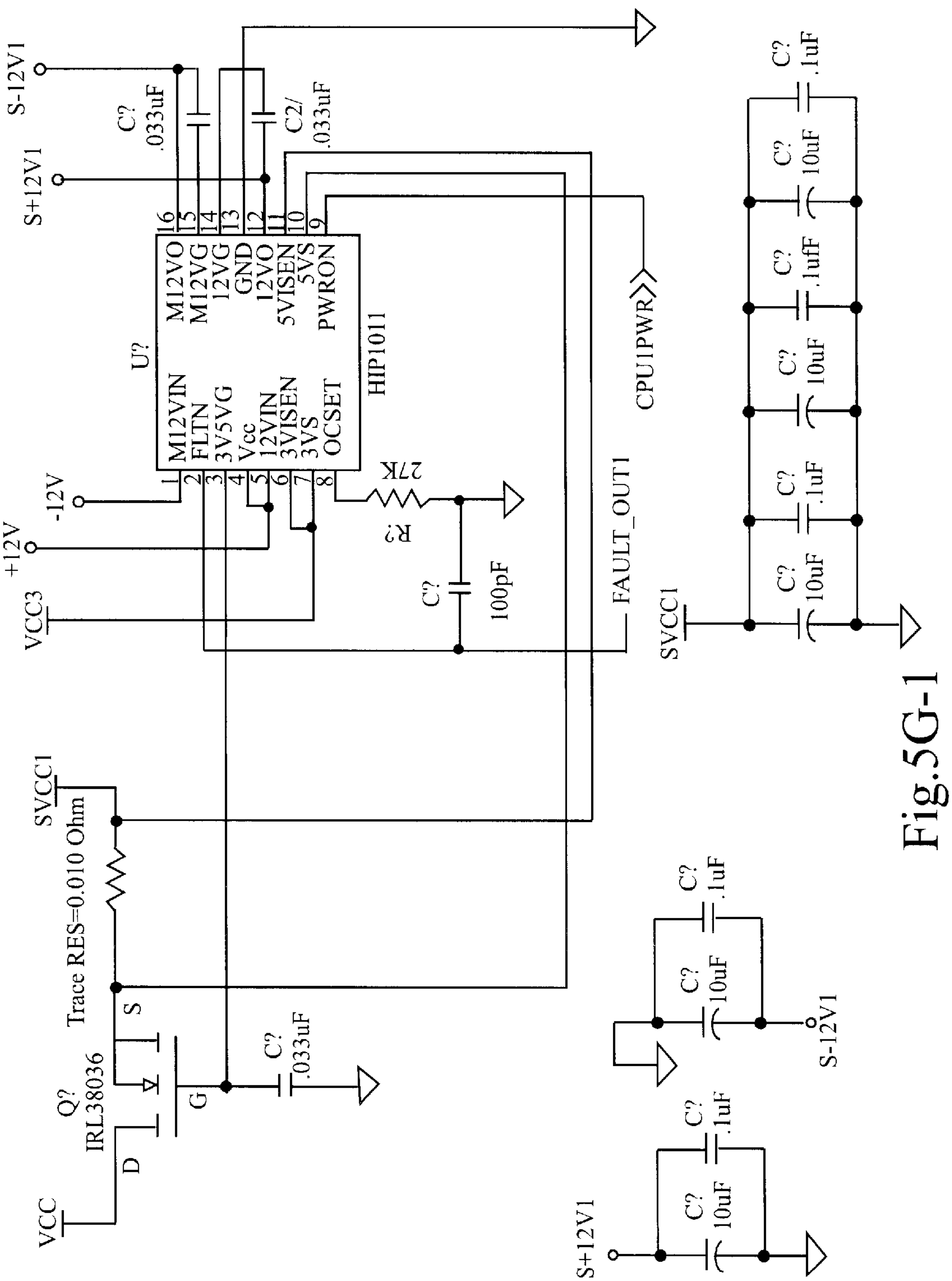
Figures 2, 5G:
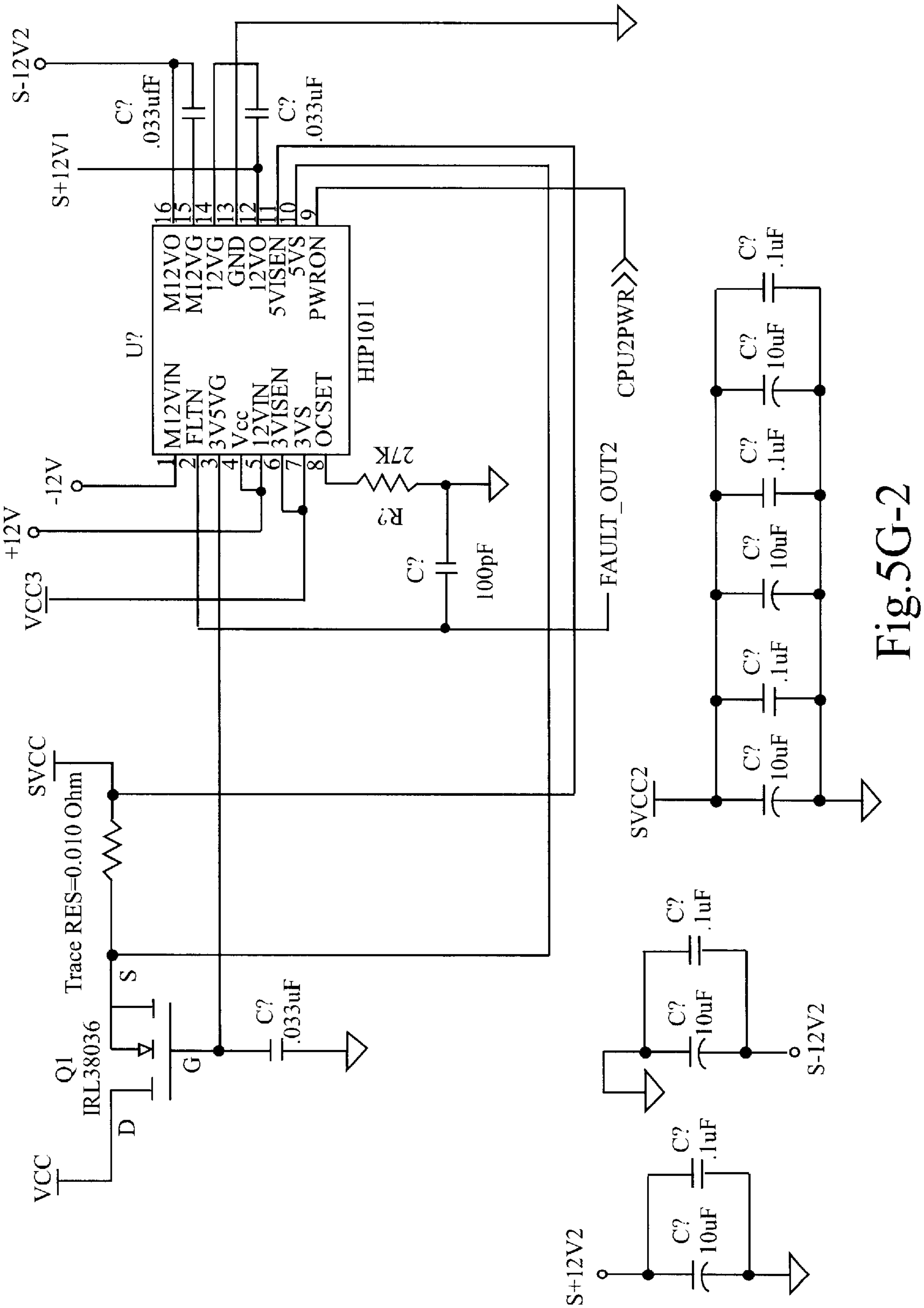
Figures 3, 5G:
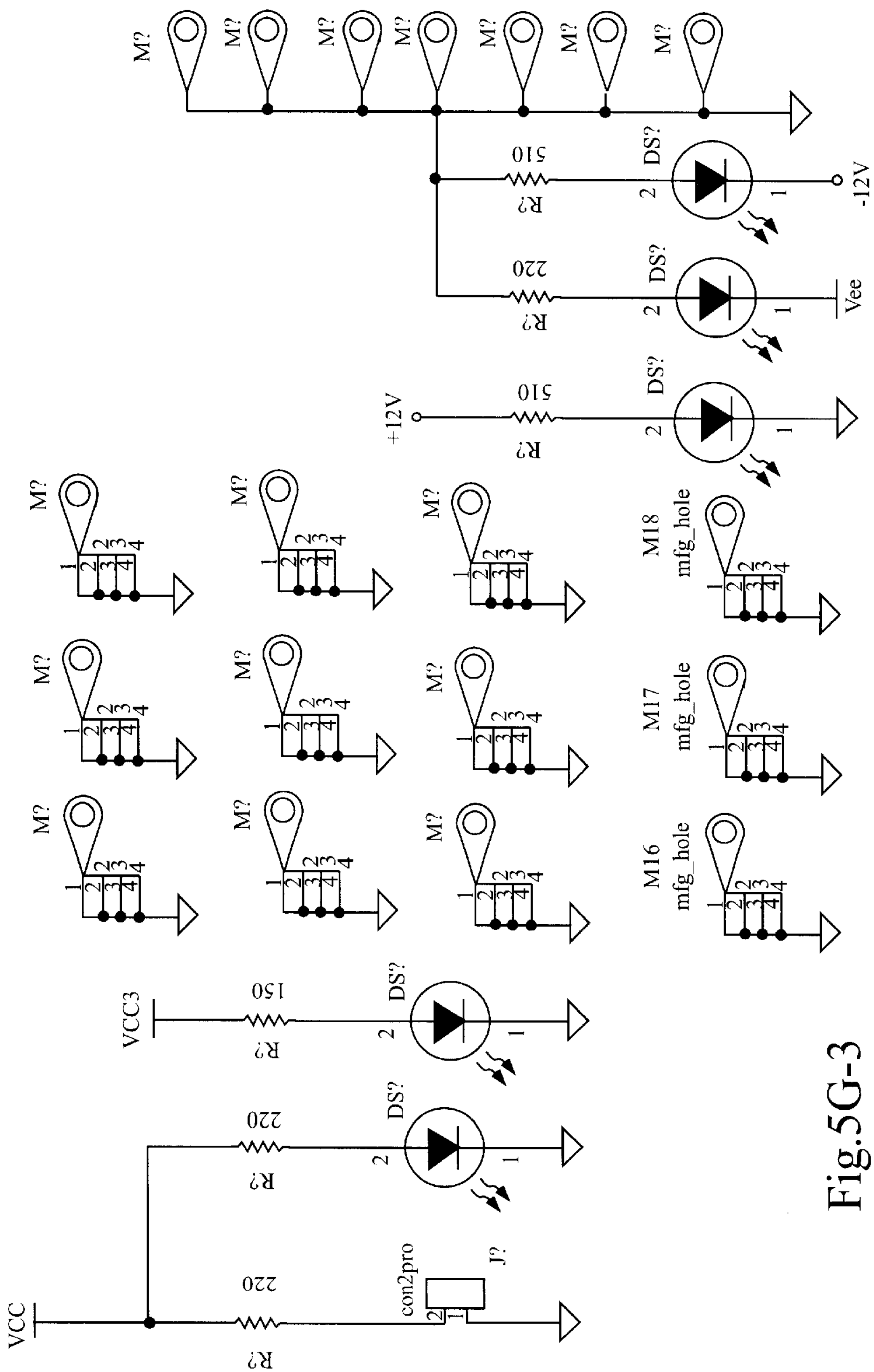
Figures 4, 5G:
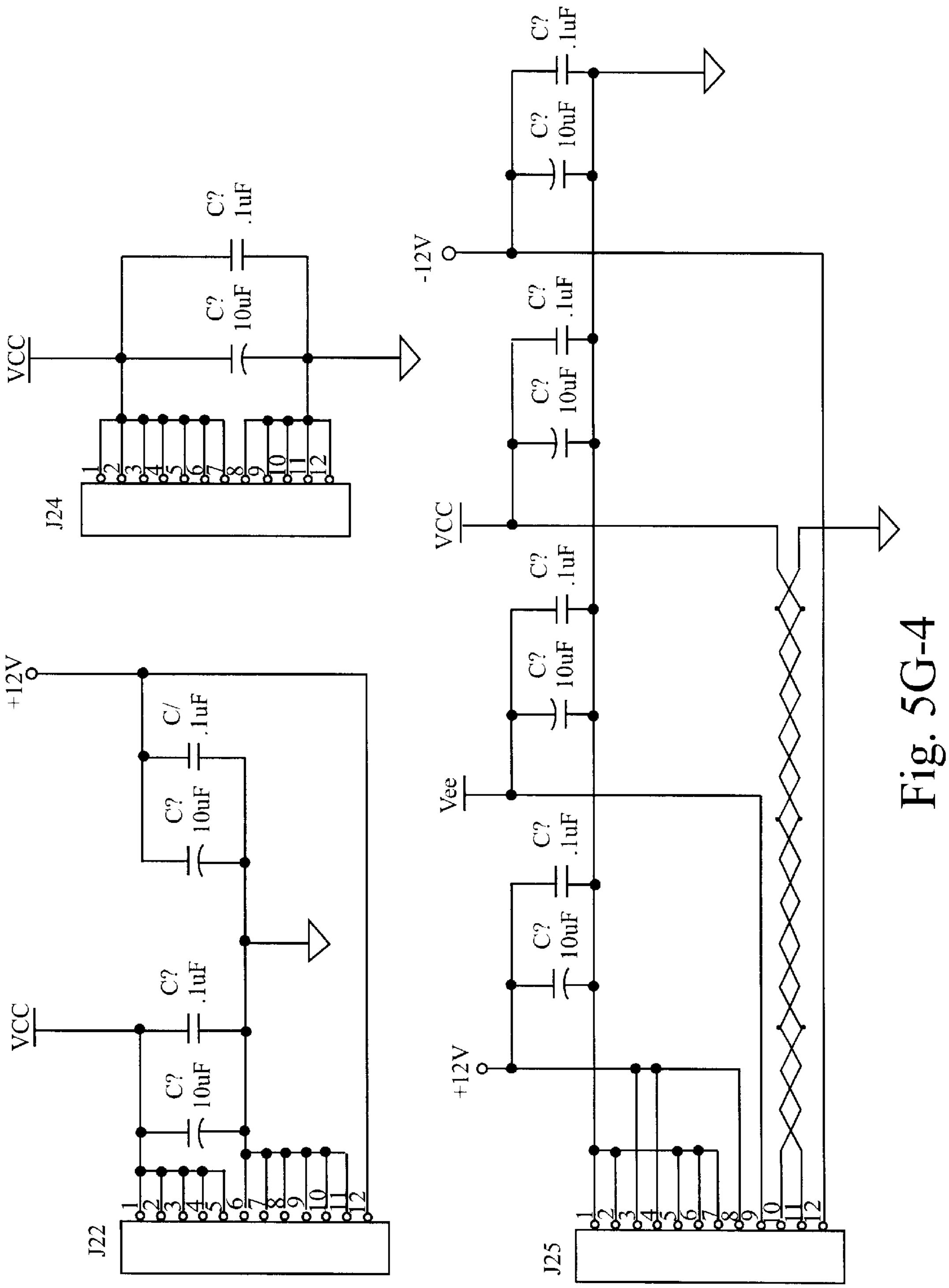
Figures 5, 5G:
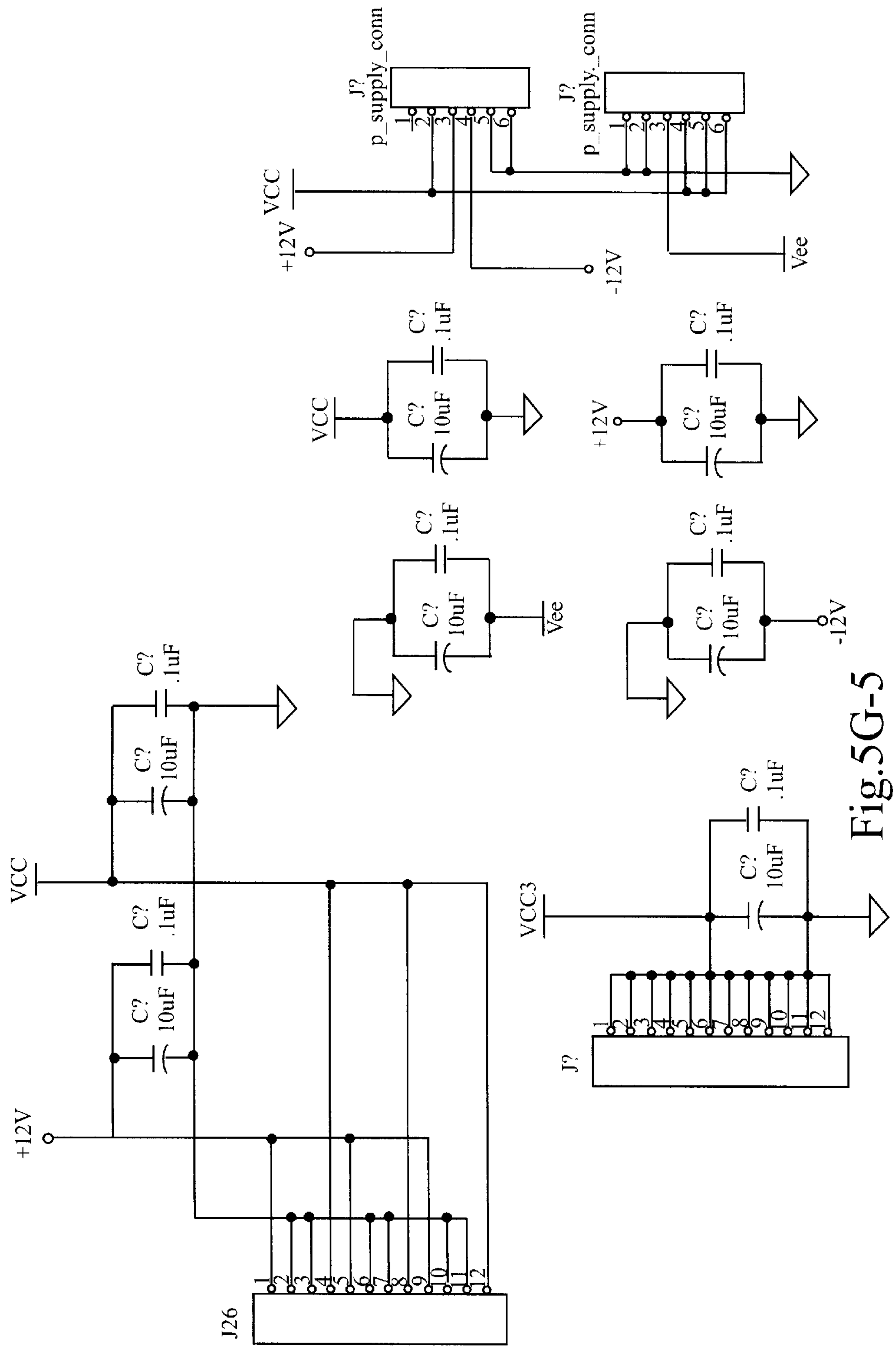
Figures 5, 5G, 6:
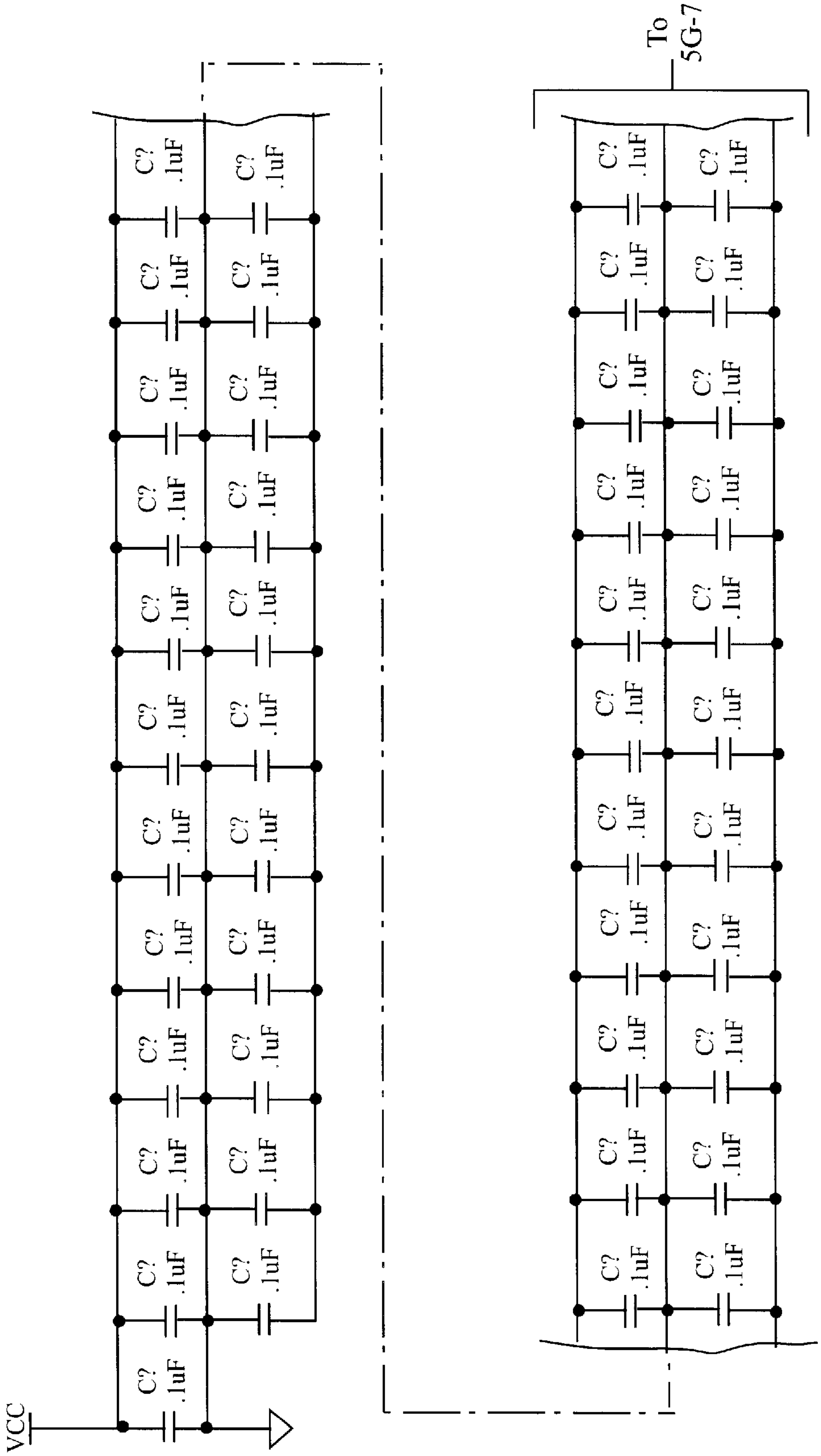
Figures 5, 5G, 6, 7:
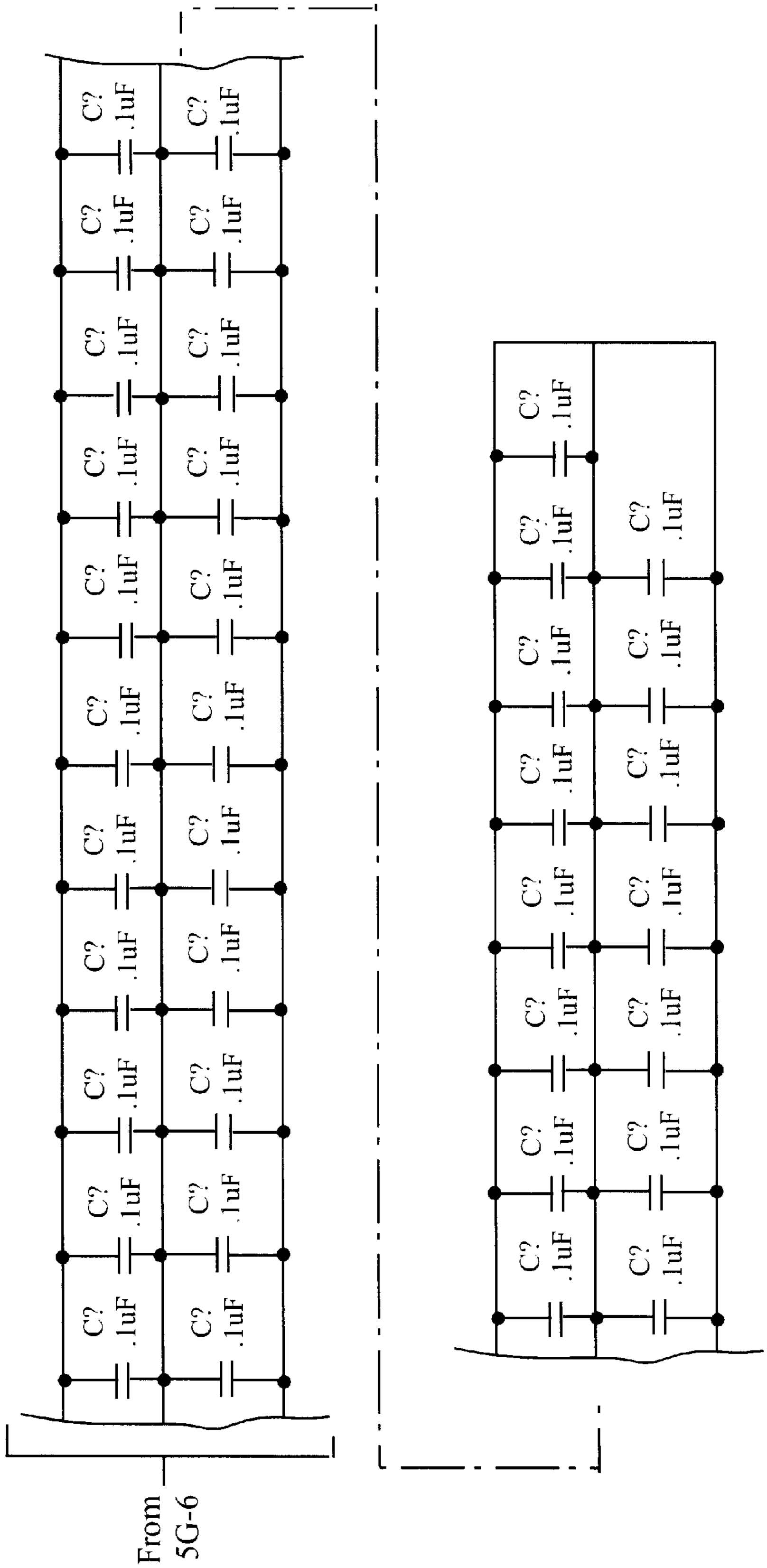
Figures 5, 5G, 6, 7, 8:
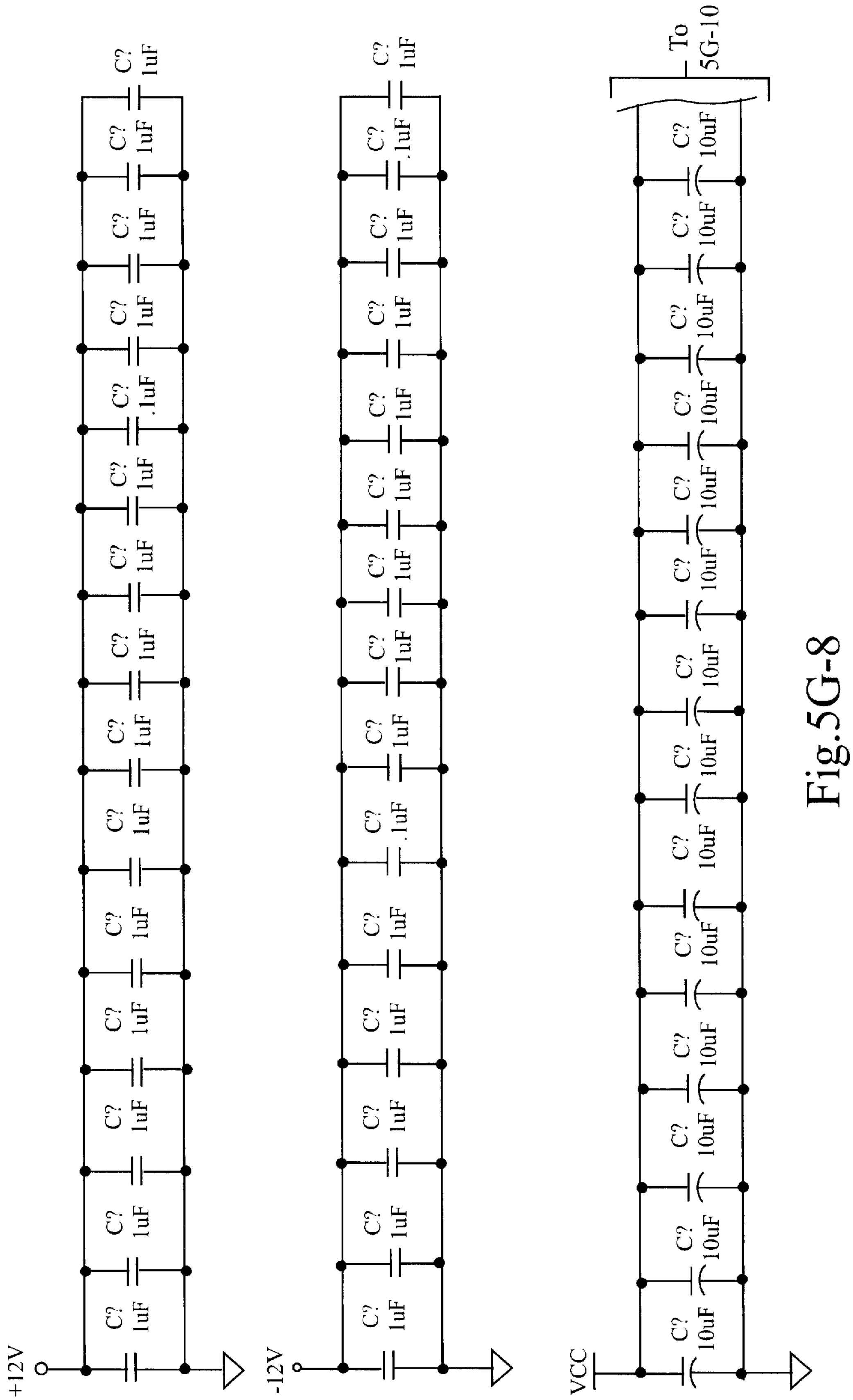
Figures 5, 5G, 6, 7, 8, 9:
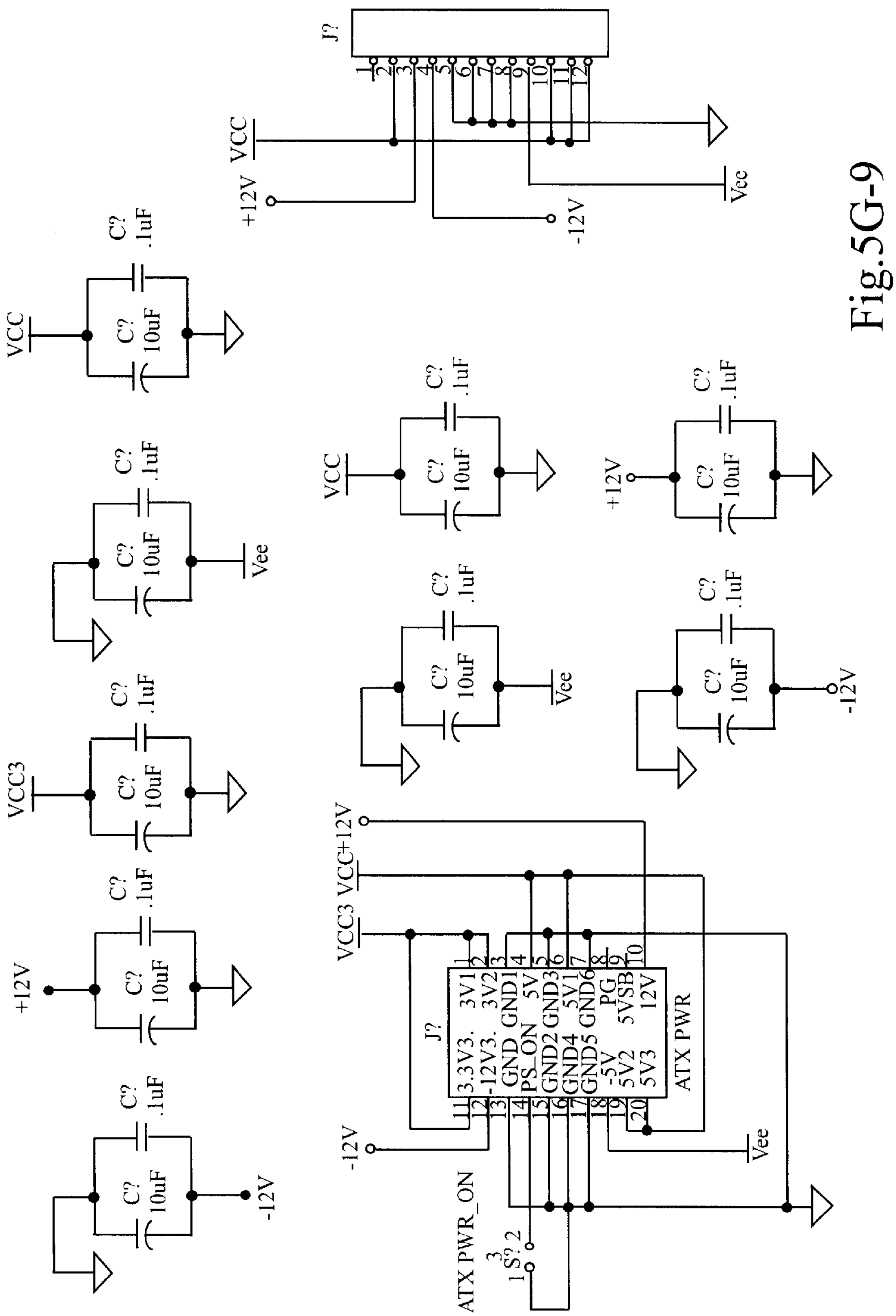
Figures 5, 5G, 6, 7, 8, 9, 10:
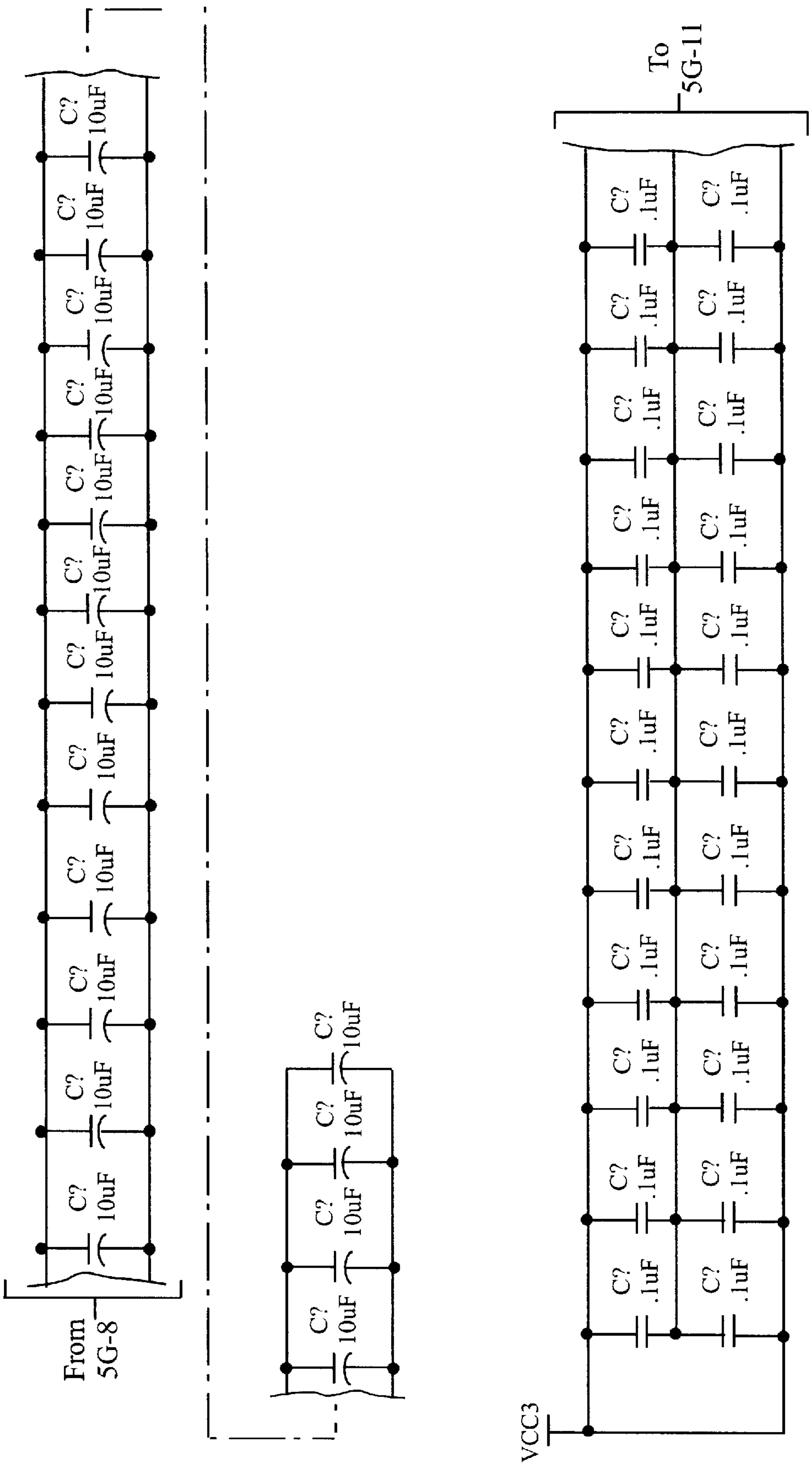
Figures 5, 5G, 6, 7, 8, 9, 10, 11:
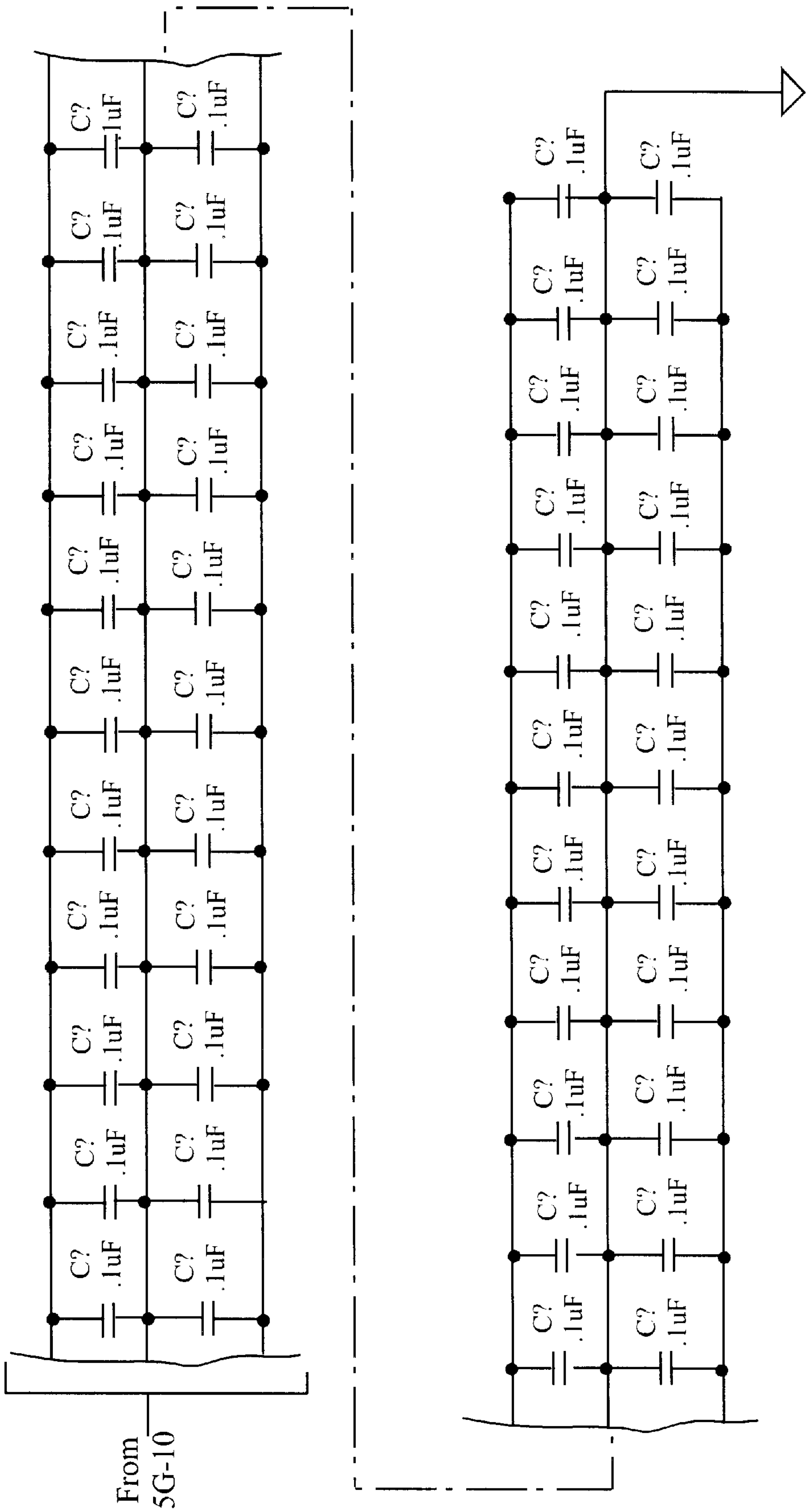
Figure 5H:
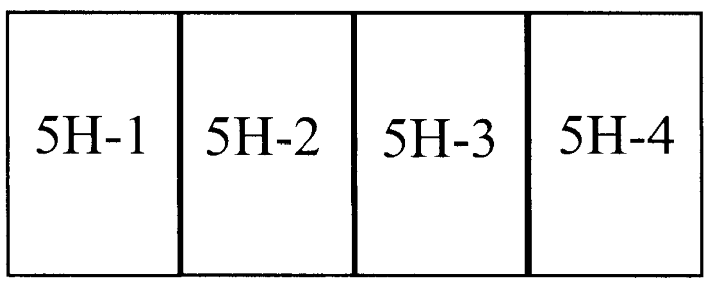
Figures 1, 5H:
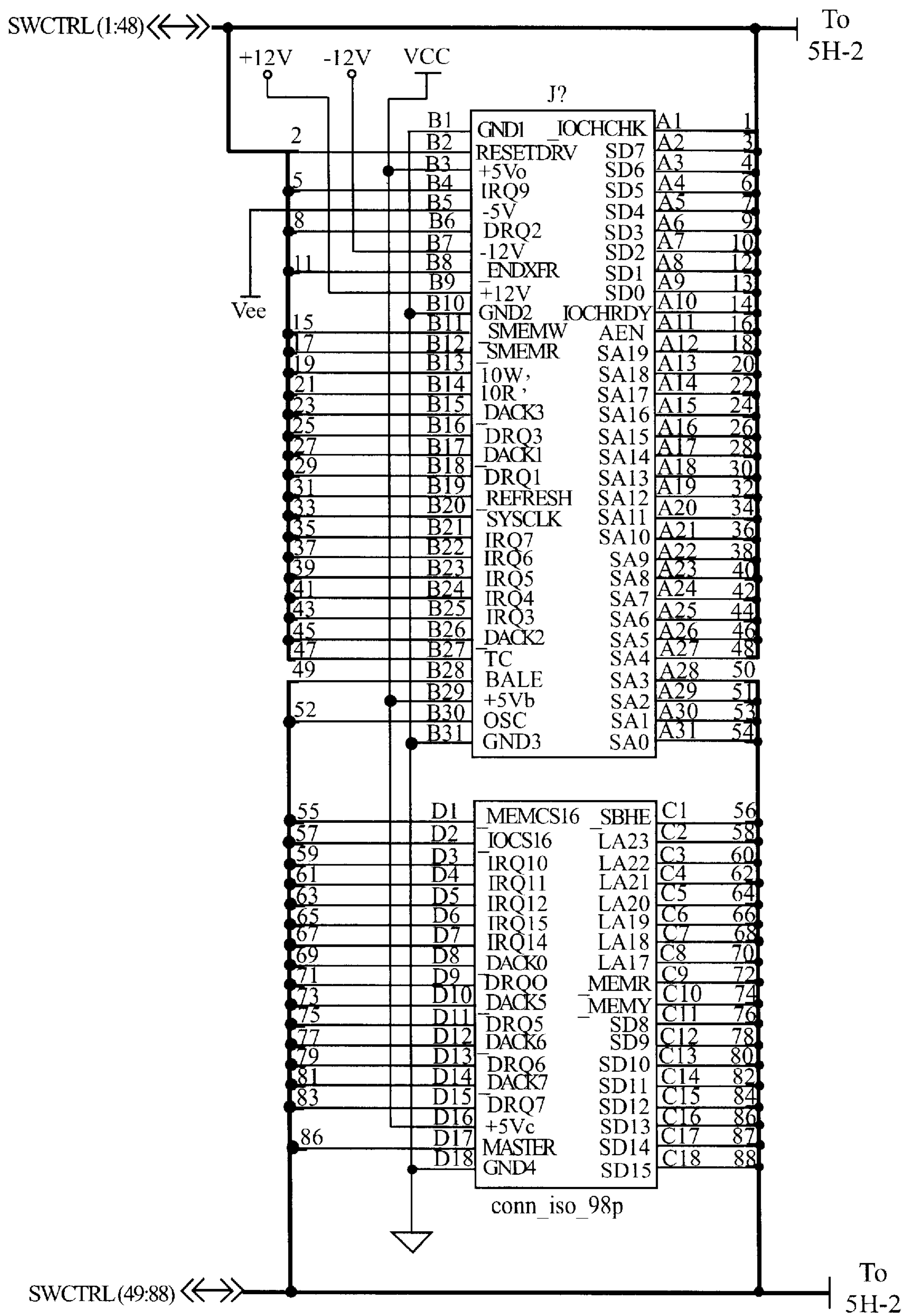
Figures 2, 5H:
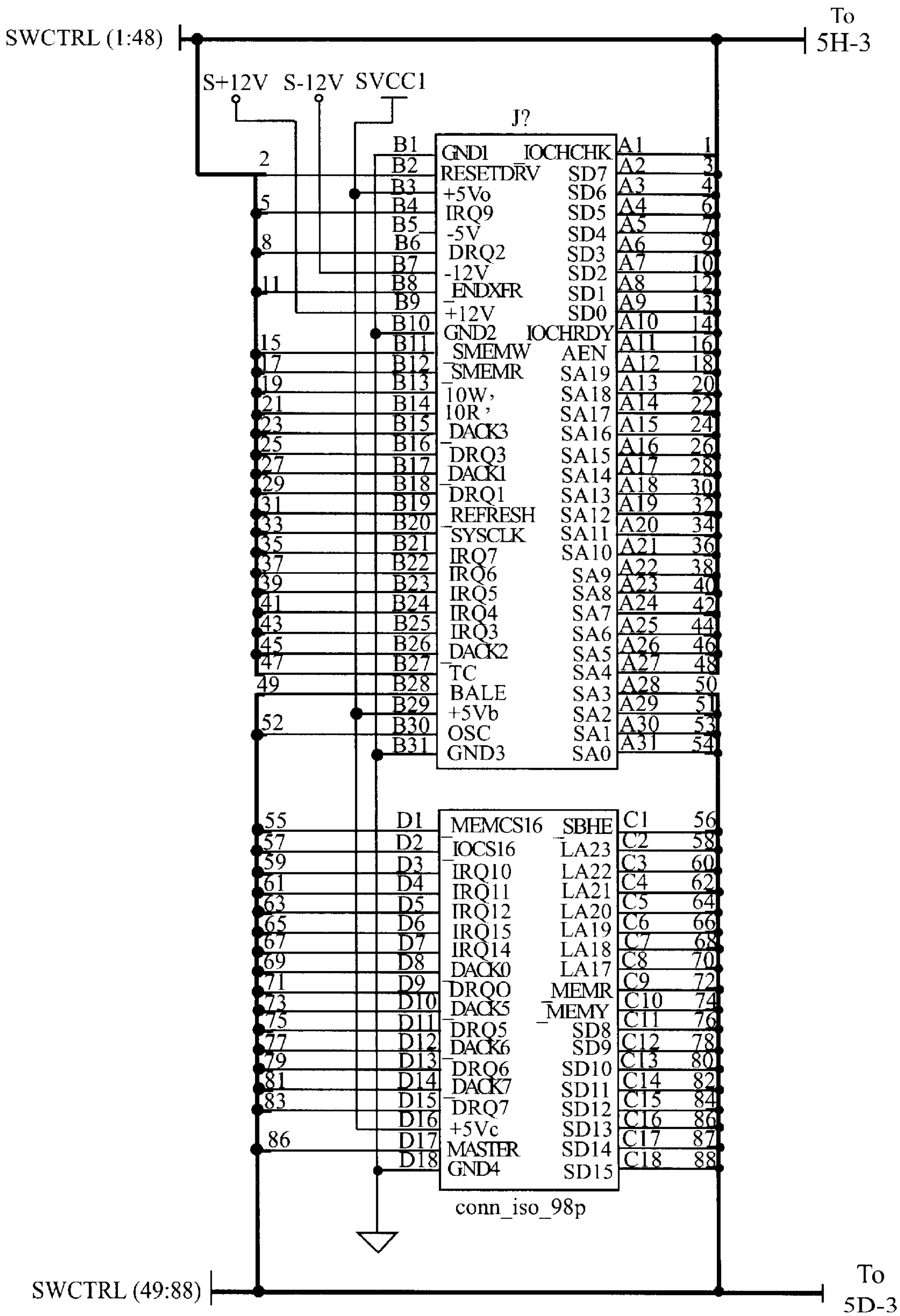
Figures 3, 5H:
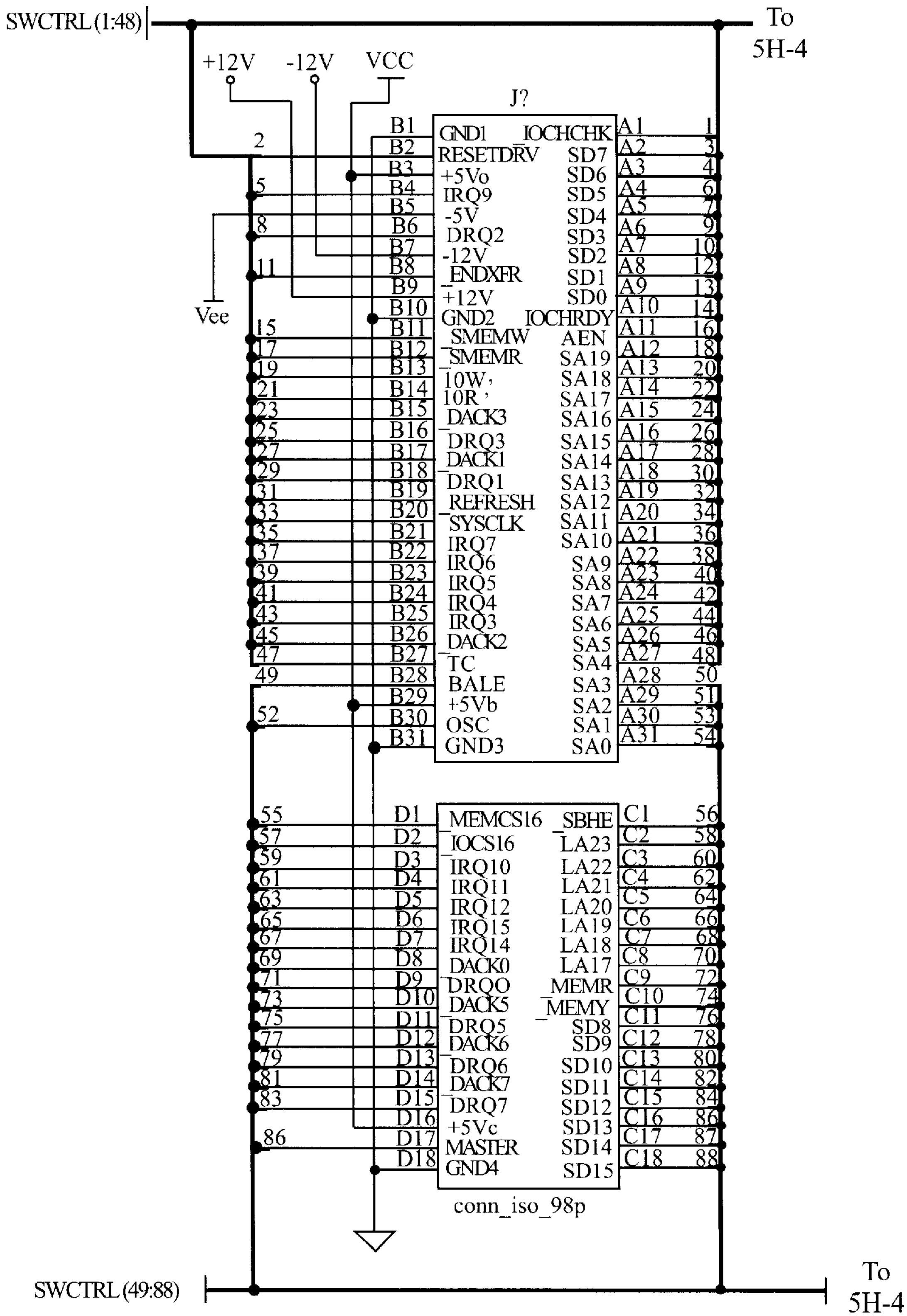
Figures 4, 5H:
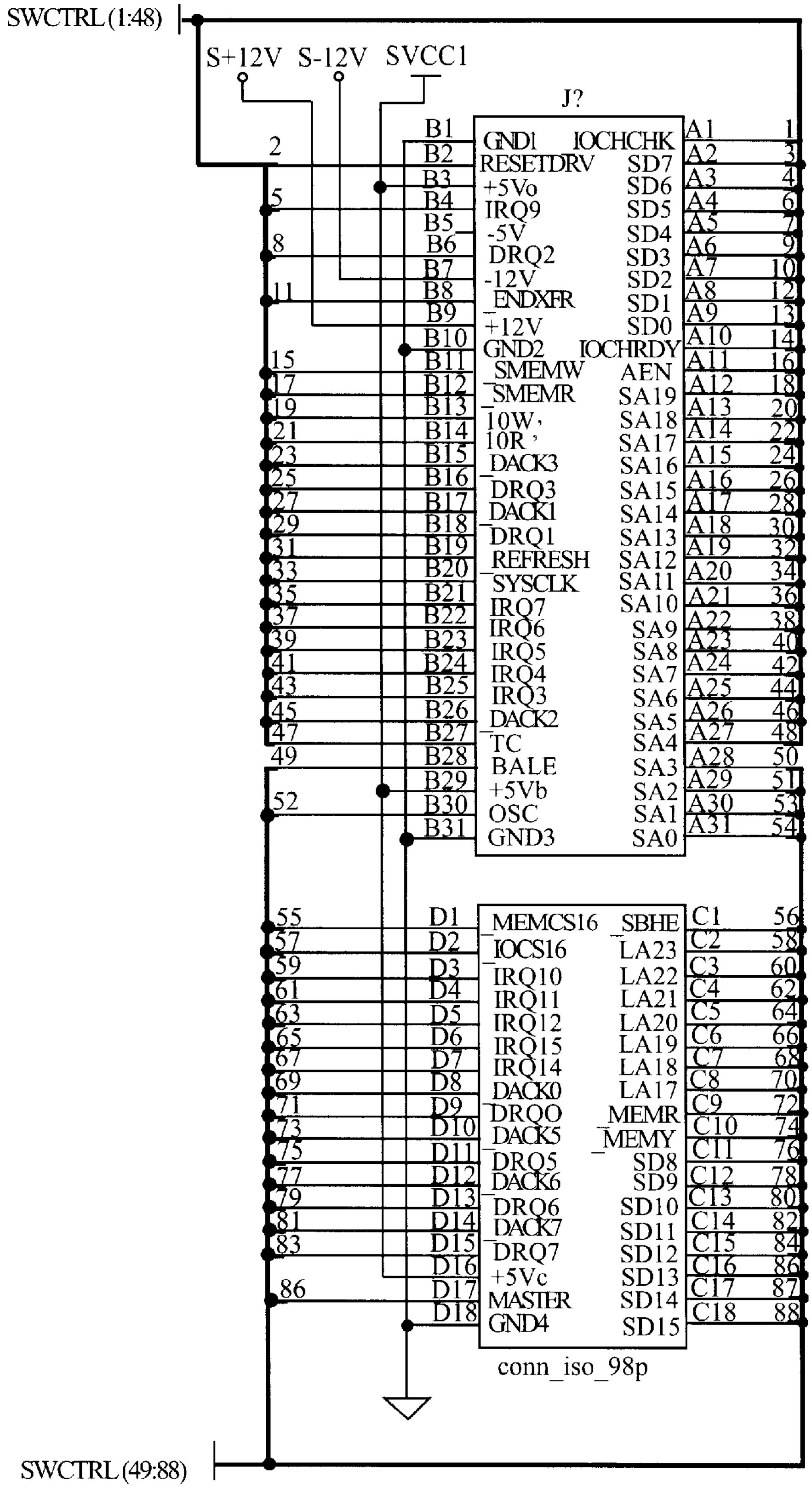
Figure 5I:
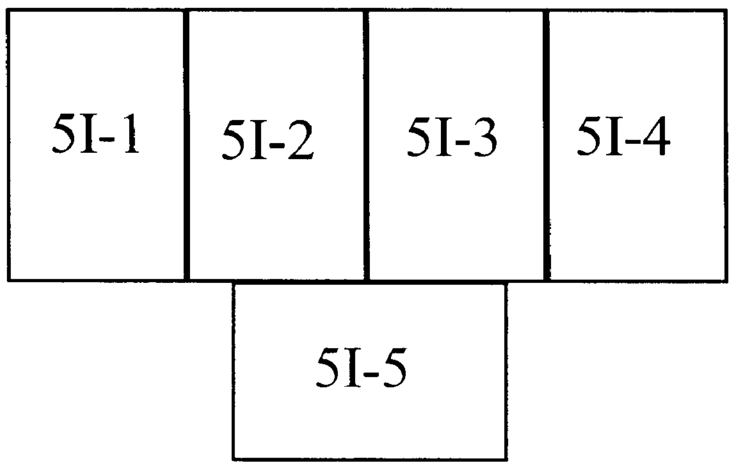
Figures 1, 5I:
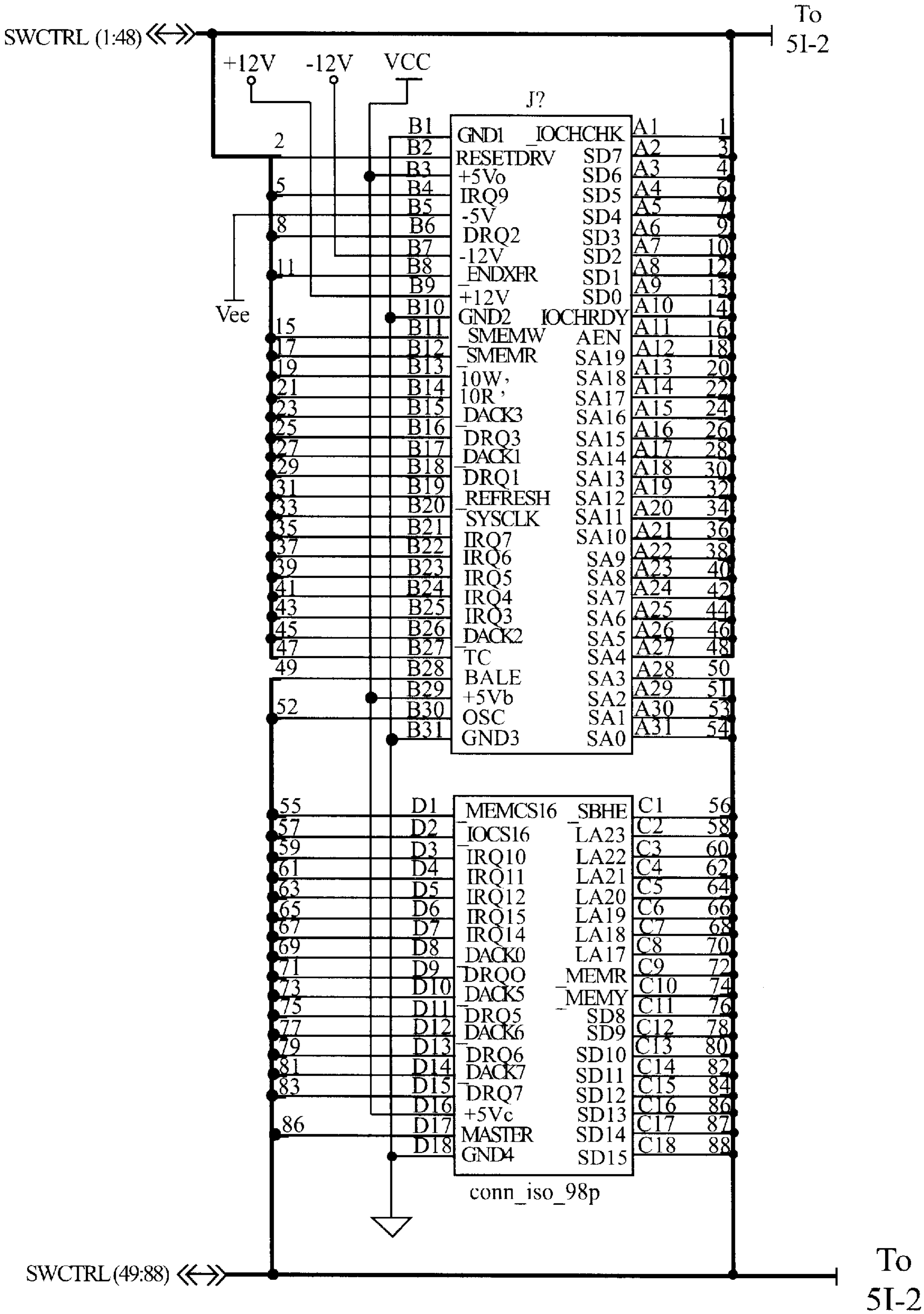
Figures 2, 5I:
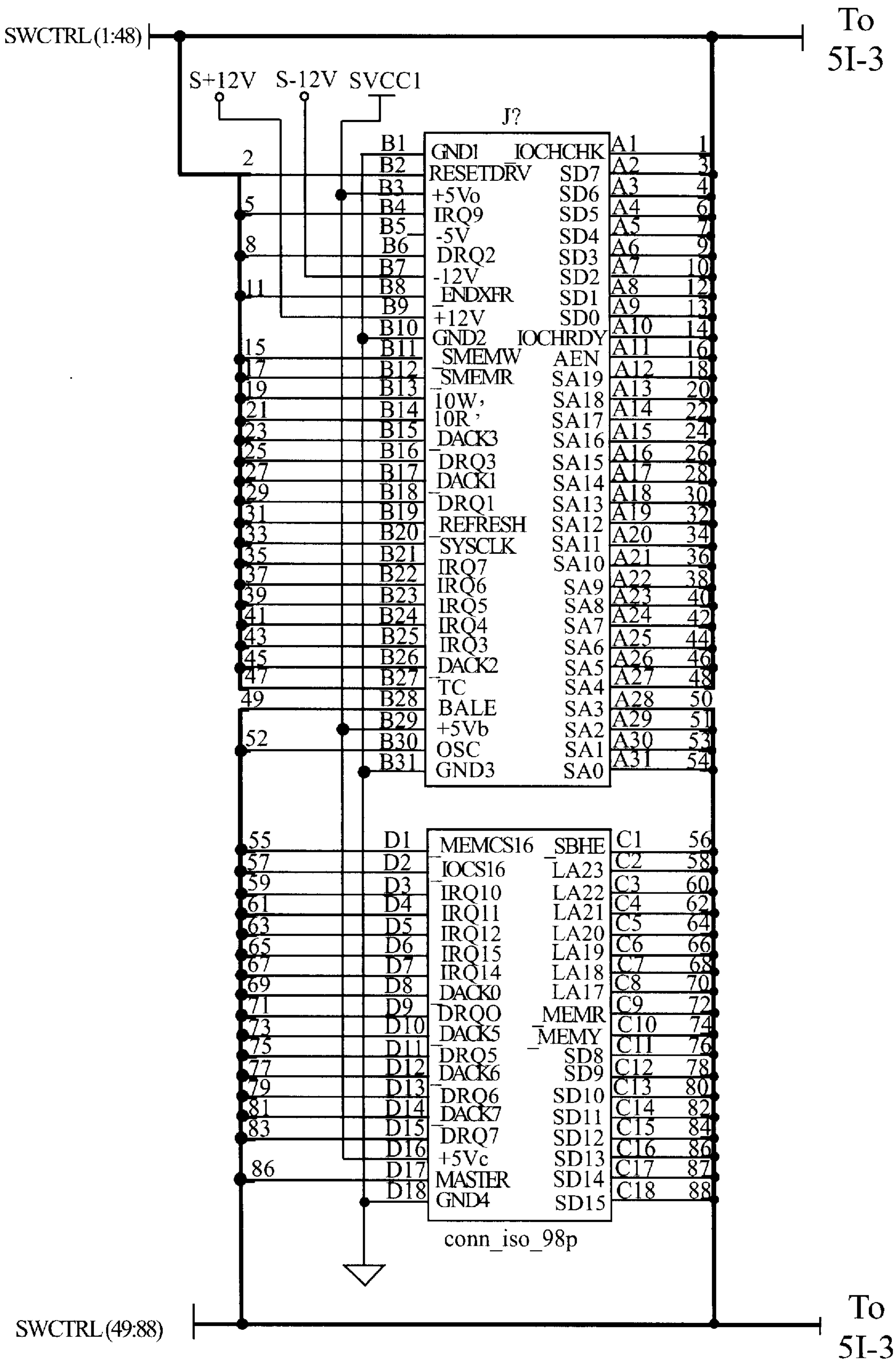
Figures 3, 5I:
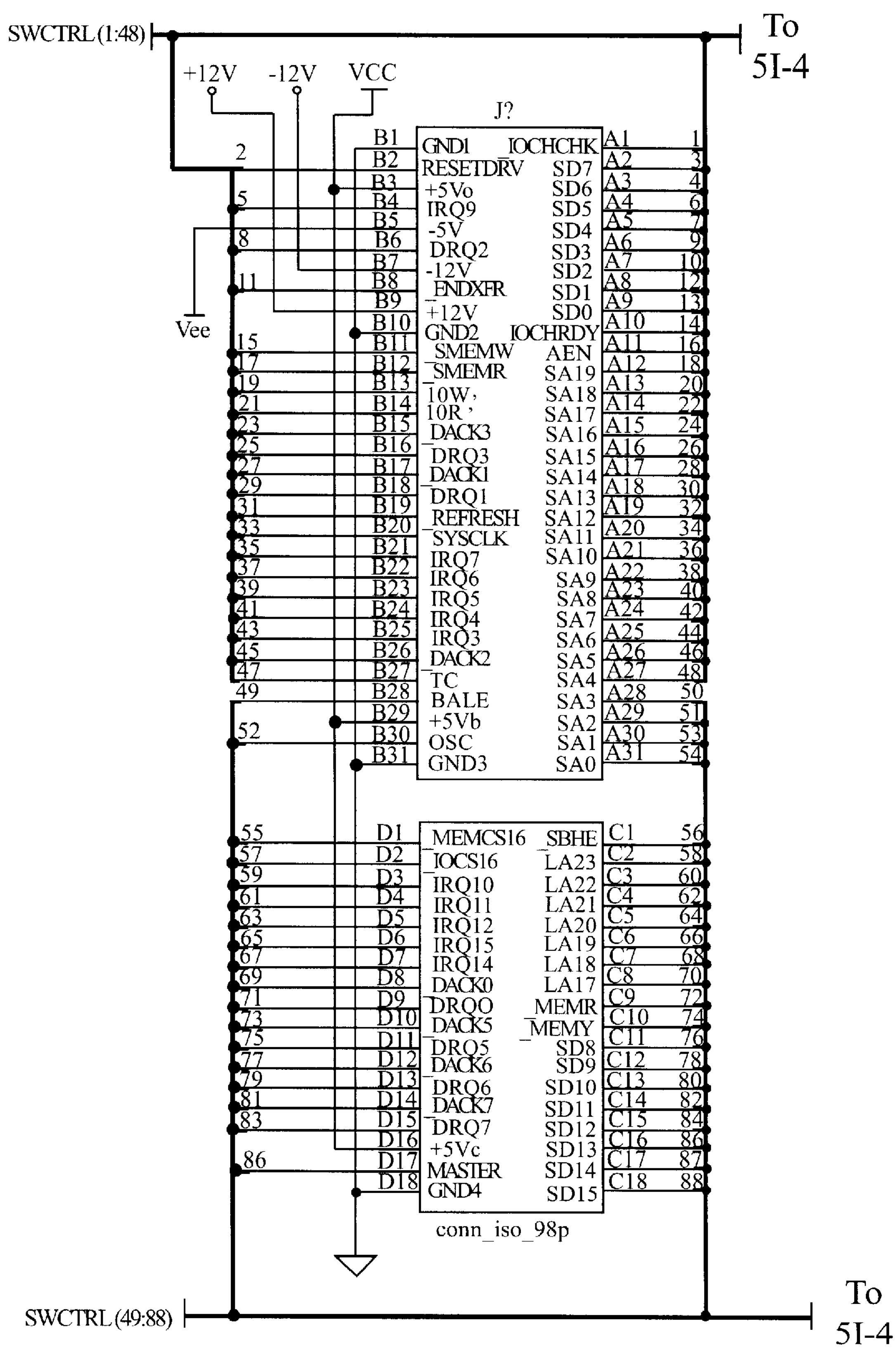
Figures 4, 5I:
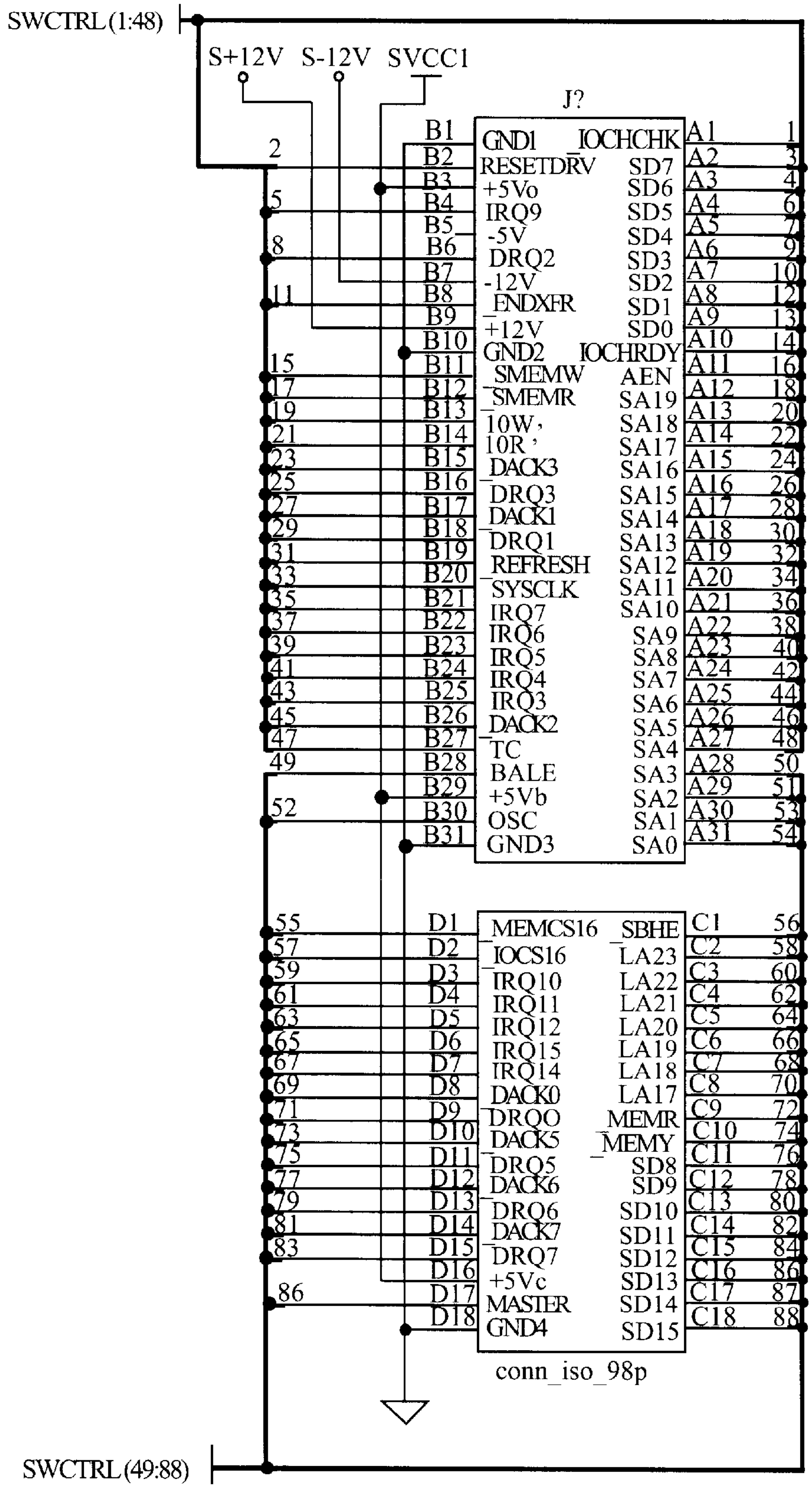
Figures 5, 5I:
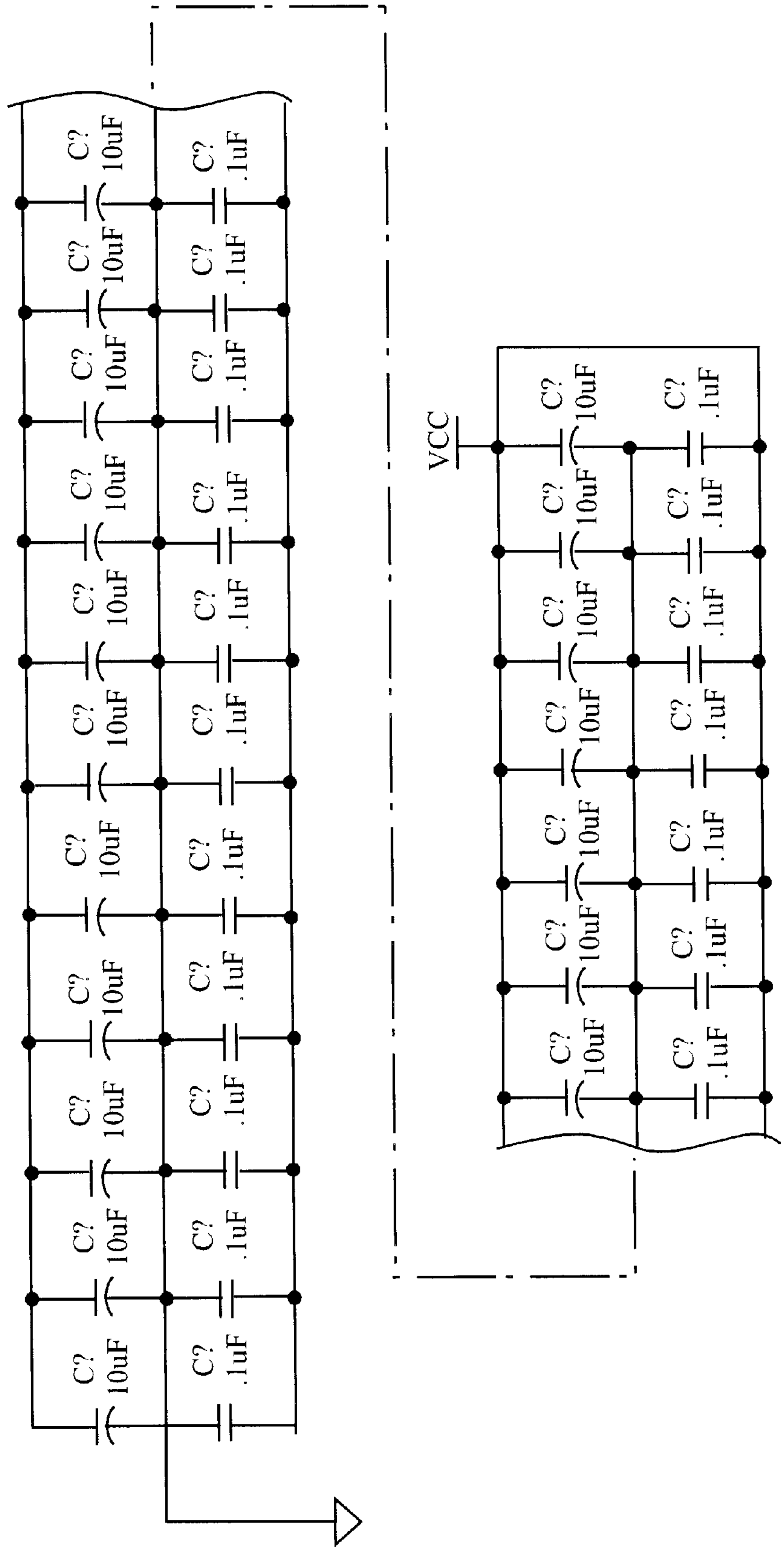

Referring to FIG. 4, shown is a schematic diagram of an exemplary implementation of the industrial personal computer system of FIG. 1. As the schematic diagram is self-explanatory, in view of the above description presented in reference to FIGS. 1 and 3, no further explanation of this schematic is made herein. Referring to FIG. 5, shown is a schematic diagram of an exemplary implementation of the industrial personal computer system of FIG. 2. As the schematic diagram is self-explanatory, in view of the above description presented in reference to FIGS. 1, 2 and 3, no further explanation of this schematic is made herein. While the invention herein disclosed has been described by means of specific embodiments and applications thereof, numerous modifications and variations could be made thereto by those skilled in the art without departing from the scope of the invention set forth in the claims.

What is claimed is:

1. A system, comprising:

a first computer; and a primary PCI bus coupled to said first computer via a first PCI bus switch; and a second computer coupled through a second PCI bus switch to said primary PCI bus; and a monitor system coupled to said first and second computers and said first and second PCI bus switches, wherein in the event of a malfunction in said first computer, said monitor system decouples said first computer from said primary PCI bus, by opening said first PCI bus switch and coupling said second computer to said primary PCI bus by closing said second PCI bus switch.

2. The system of claim 1, wherein said first PCI bus switch and second PCI bus switch are field effect transistor switches.

3. The system of claim 1, wherein said first and second computers are coupled to a power supply via a first and second power supply switch.

4. The system of claim 3, wherein said first and second power supply switches are coupled to said monitor system.

5. The system of claim 1, wherein said malfunction is a hardware malfunction of said first computer.

6. The system of claim 1, wherein said malfunction is a software malfunction of said first computer.

7. A system, comprising:

a computer; and a primary PCI bus coupled to said computer via a PCI bus switch; and a monitor system coupled to said computer and said PCI bus switch, wherein in the event of a malfunction in said computer, said monitor system decouples said computer from said primary PCI bus by opening said PCI bus switch, said monitoring system further comprising a signal indicating that a malfunction has occurred.

8. The system of claim 7, wherein said signal is an illuminated light.

9. The system of claim 8, wherein said illuminated light is on a front panel on a housing of the computer system.

10. The system of claim 7, wherein said PCI bus is a field effect transistor switch.

11. The system of claim 7, wherein said computer is coupled to a power supply via a power supply switch.

12. The system of claim 11, wherein said power supply switch is coupled to said monitor system.

13. The system of claim 7, wherein said malfunction is a hardware malfunction of said first computer.

14. The system of claim 7, wherein said malfunction is a software malfunction of said first computer.

15. A method of monitoring a computer system, comprising:

coupling a first computer to a primary PCI bus via a first PCI bus switch; and coupling a second computer to said primary PCI bus via a second PCI bus switch; and coupling said first and second computers and said first and second PCI bus switches to a monitor system; and producing a signal in said first computer at a regular interval; and resetting a watchdog timer in said monitor system in response to said signal; and decoupling said first computer from said primary PCI bus by opening said first PCI bus switch and coupling said second computer to said primary PCI bus by closing said second PCI bus switch in the event said watchdog timer is not reset.

16. The system of claim 15, further comprising at least one additional watchdog timer, wherein said watchdog timers operate independently of each other.

17. The system of claim 15, wherein said first PCI bus switch and second PCI bus switch are field effect transistor switches.

18. A system, comprising:

a first computer; and a primary PCI bus coupled to said first computer via a first PCI bus switch; and a second computer coupled through a second PCI bus switch to said primary PCI bus; and a monitoring system coupled to said first and second computers and said first and second PCI bus switches; and a watchdog timer within said monitoring system which is periodically reset in response to signals from said first computer; and a switch over circuit coupled to said watchdog timer such that in the event a malfunction occurs in said first computer, a watchdog timeout period is exceeded when said signals are not sent to said watchdog timer and is therefore not reset resulting in arming said switch over circuit so that said monitoring system decouples said first computer from said primary PCI bus, by opening said first PCI bus switch and coupling said second computer to said primary PCI bus by closing said second PCI bus switch.

19. The system of claim 18, wherein said first PCI bus switch and second PCI bus switch are field effect transistor switches.

20. The system of claim 18, wherein said malfunction is a hardware malfunction of said first computer.

21. The system of claim 18, wherein said malfunction is a software malfunction of said first computer.

* * * * *

UNITED STATES PATENT AND TRADEMARK OFFICE

CERTIFICATE OF CORRECTION

PATENT NO. : 6,708,286 B2
DATED : March 16, 2004
INVENTOR(S) : Curtis R. Alexander et al.

It is certified that error appears in the above-identified patent and that said Letters Patent is hereby corrected as shown below:

Title page,
Item [73], Assignee, change "I-Bue" to -- I-BUS --

Signed and Sealed this

Fifteenth Day of June, 2004

JON W. DUDAS
*Acting Director of the United States Patent and Trademark Office*